United States Patent
Bauer et al.

(10) Patent No.: US 12,522,811 B2
(45) Date of Patent: Jan. 13, 2026

(54) ENHANCED BCL11A RNP / CRISPR DELIVERY AND EDITING USING A 3XNLS-CAS9

(71) Applicants: THE CHILDREN'S MEDICAL CENTER CORPORATION, Boston, MA (US); UNIVERSITY OF MASSACHUSETTS, Boston, MA (US)

(72) Inventors: Daniel E. Bauer, Cambridge, MA (US); Scot A. Wolfe, Winchester, MA (US); PengPeng Liu, Worcester, MA (US); Yuxuan Wu, Boston, MA (US); Jing Zeng, Chongqing (CN)

(73) Assignees: THE CHILDREN'S MEDICAL CENTER CORPORATION; UNIVERSITY OF MASSACHUSETTS

( * ) Notice: Subject to any disclaimer, the term of this patent is extended or adjusted under 35 U.S.C. 154(b) by 1177 days.

(21) Appl. No.: 17/051,583

(22) PCT Filed: May 1, 2019

(86) PCT No.: PCT/US2019/030219
§ 371 (c)(1),
(2) Date: Oct. 29, 2020

(87) PCT Pub. No.: WO2019/213273
PCT Pub. Date: Nov. 7, 2019

(65) Prior Publication Data
US 2021/0115420 A1    Apr. 22, 2021

Related U.S. Application Data

(60) Provisional application No. 62/664,941, filed on May 1, 2018.

(51) Int. Cl.
| C12N 15/11 | (2006.01) |
|---|---|
| C12N 9/22 | (2006.01) |
| C12N 15/01 | (2006.01) |
| C12N 15/90 | (2006.01) |

(52) U.S. Cl.
CPC ............... *C12N 9/22* (2013.01); *C12N 15/11* (2013.01); *C12N 15/907* (2013.01); *C07K 2319/09* (2013.01); *C12N 2310/20* (2017.05)

(58) Field of Classification Search
None
See application file for complete search history.

(56) References Cited

U.S. PATENT DOCUMENTS

| 5,460,964 A | 10/1995 | Mcglave et al. |
|---|---|---|
| 5,635,387 A | 6/1997 | Fei et al. |
| 5,677,136 A | 10/1997 | Simmons et al. |
| 5,716,827 A | 2/1998 | Tsukamoto et al. |
| 5,750,397 A | 5/1998 | Tsukamoto et al. |
| 5,759,793 A | 6/1998 | Schwartz et al. |
| 5,928,638 A | 7/1999 | Uchida et al. |
| 6,682,907 B1 | 1/2004 | Charneau et al. |
| 8,383,604 B2 | 2/2013 | Orkin et al. |
| 9,228,185 B2 | 1/2016 | Orkin et al. |
| 9,822,355 B2 | 11/2017 | Orkin et al. |
| 9,885,041 B2 | 2/2018 | Orkin et al. |
| 10,287,588 B2 | 5/2019 | Milsom et al. |
| 10,662,429 B2 | 5/2020 | Milsom et al. |
| 2004/0259247 A1 | 12/2004 | Tuschl et al. |
| 2005/0227917 A1 | 10/2005 | Williams et al. |
| 2008/0051431 A1 | 2/2008 | Verhelle et al. |
| 2010/0273213 A1 | 10/2010 | Mineno et al. |
| 2011/0182867 A1 | 7/2011 | Orkin et al. |
| 2011/0294114 A1 | 12/2011 | Van Der Loo et al. |
| 2013/0004471 A1 | 1/2013 | Denaro et al. |
| 2013/0179999 A1 | 7/2013 | Hannon et al. |
| 2014/0018410 A1 | 1/2014 | Novobrantseva et al. |
| 2014/0068797 A1 | 3/2014 | Doudna et al. |
| 2015/0056705 A1 | 2/2015 | Conway et al. |
| 2015/0132269 A1 | 5/2015 | Orkin et al. |
| 2015/0133528 A1 | 5/2015 | Krieg et al. |
| 2015/0232882 A1 | 8/2015 | Zheng et al. |
| 2017/0173184 A1 | 6/2017 | Gaspar et al. |
| 2017/0218372 A1 | 8/2017 | Milsom et al. |
| 2018/0119138 A1 | 5/2018 | Conway et al. |

(Continued)

FOREIGN PATENT DOCUMENTS

| CN | 109706148 A | 5/2019 |
|---|---|---|
| EP | 1752536 A1 | 2/2007 |

(Continued)

OTHER PUBLICATIONS

Miura et al., BioRxiv, 2017, pp. 1-45.*
Chang et al., Cell Res., 2013, 23: 465-472.*
IDT User Guide (2016).*
Chakraborty et al., Stem Cell Reports, 2014, 3: 940-947.*
Chakraborty et al., Supplementary Informaiton, 2014.*
Aouida et al., Plos One, 2015, pp. 1-16.*
Sequence alignment, 2014.*
Johari et al. "Integrated cell and process engineering for improved transient production of a "difficult-to-express 1" fusion protein by CHO cells." Biotechnology and Bioengineering 112(12): 2527-2542 (2015).
Akinsheye et al., "Fetal hemoglobin in sickle cell anemia." Blood 118(1):19-27 (2011).
Amaya et al., "MI2β-mediated silencing of the fetal y-globin gene in adult erythroid cells." Blood 121(17):3493-501 (2013).

(Continued)

*Primary Examiner* — Ileana Popa
(74) *Attorney, Agent, or Firm* — NIXON PEABODY LLP; David S. Resnick; Jeanne N. Jodoin

(57) ABSTRACT

Provided herein are synthetic nucleic acids that encode a CRISPR enzyme fused to a series of nuclear localization signal sequences for the use of altering expression of a gene in a cell. Further provided herein are methods for altering gene expression in a cell comprising introducing the synthetic nucleic acids and a guide RNA, or a polypeptide and a guide RNA into a cell. In certain embodiments the cell is a quiescent cell, for example, a hematopoietic stem cell.

8 Claims, 61 Drawing Sheets

Specification includes a Sequence Listing.

(56) References Cited

U.S. PATENT DOCUMENTS

| | | | |
|---|---|---|---|
| 2018/0119175 | A1 | 5/2018 | Bauer et al. |
| 2020/0095582 | A1 | 3/2020 | Bauer et al. |
| 2020/0384032 | A1 | 12/2020 | Yuan et al. |

FOREIGN PATENT DOCUMENTS

| | | | |
|---|---|---|---|
| EP | 2334794 | B1 | 11/2016 |
| JP | 2006507841 | A | 3/2006 |
| SG | 10201704008 | R | 6/2017 |
| WO | 2004054512 | A2 | 7/2004 |
| WO | 2009007685 | A2 | 1/2009 |
| WO | 2010030963 | A2 | 3/2010 |
| WO | 2011072086 | A1 | 6/2011 |
| WO | 2011133889 | A2 | 10/2011 |
| WO | 2012073047 | A2 | 6/2012 |
| WO | 2012079046 | A2 | 6/2012 |
| WO | 2013049615 | A1 | 4/2013 |
| WO | 2013126794 | A1 | 8/2013 |
| WO | 2013176772 | A1 | 11/2013 |
| WO | 2014085593 | A1 | 6/2014 |
| WO | 2014093965 | A1 | 6/2014 |
| WO | 2015065964 | A1 | 5/2015 |
| WO | 2015148863 | A2 | 10/2015 |
| WO | 2015164739 | A1 | 10/2015 |
| WO | 2015164750 | A2 | 10/2015 |
| WO | 2015164759 | A2 | 10/2015 |
| WO | 2015183667 | A1 | 12/2015 |
| WO | 2016094304 | A2 | 6/2016 |
| WO | 2016182893 | A1 | 11/2016 |
| WO | 2016183448 | A1 | 11/2016 |
| WO | 2017040529 | A1 | 3/2017 |
| WO | 2334794 | B8 | 4/2017 |
| WO | 2017115268 | A1 | 7/2017 |
| WO | WO 17/115268 | * | 7/2017 |
| WO | 2017139576 | A1 | 8/2017 |
| WO | 2017173092 | A1 | 10/2017 |
| WO | 2017182881 | A2 | 10/2017 |
| WO | 2018218135 | A1 | 11/2018 |
| WO | 2019080920 | A1 | 5/2019 |
| WO | 2019113149 | A1 | 6/2019 |

OTHER PUBLICATIONS

Amendah et al., "Sickle cell disease-related pediatric medical expenditures in the U.S." American Journal of Preventive Medicine 38(4 Suppl):S550-S556 (2010).
Atweh et al., "Pharmacological induction of fetal hemoglobin in sickle cell disease and beta-thalassemia." Seminars in Hematology 38(4):367-73 (2001).
Bauer et al., "An Erythroid Enhancer of BCL11A Subject to Genetic Variation Determines Fetal Hemoglobin Level." Science 342(6155):253-257 (2013).
Bauer et al., "HbF-Associated Genetic Variation Marks an Erythroid Regulatory Element Essential for BCL11A Transcription and Subsequent Stage-Specific Globin Expression." Blood 120:828 (2012).
Bauer et al., "Hemoglobin switching's surprise: the versatile transcription factor BCL11A is a master repressor of fetal hemoglobin" Current Opinion in Genetics & Development 33:62-70 (2015).
Bauer et al., "Reawakening fetal hemoglobin: prospects for new therapies for the B-globin disorders." Blood 120 (15):2945-2953 (2012).
Bauer et al., "Supplementary Material: An Erythroid Enhancer of BCL11A Subject to Genetic Variation Determines Fetal Hemoglobin Level." Science 342(6155):253-257 (2013).
Bjurström et al. "Reactivating fetal hemoglobin expression in human adult erythroblasts through BCL11A knockdown using targeted endonucleases." Molecular Therapy—Nucleic Acids 5:e351 (2016).
Boettcher et al., "Choosing the right tool for the job: RNAI, TALEN, or CRISPR." Molecular Cell 58(4):575-585 (2015).
Bohmer et al., "Identification of fetal nucleated red cells in co-cultures from fetal and adult peripheral blood: differential effects of serum on fetal and adult erythropoiesis." Prenatal Diagnosis 19(7):628-636 (1999).
Bunn "Reversing ontogeny." New Engl. J. Med. 328(2):129-131 (1993).
Canver et al., "BCL11A enhancer dissection by Cas9-mediated in situ saturating mutagenesis." Nature 527 (7577):192-197 (2015).
Cao et al., "Recent advances in B-thalassemias." Pediatric Reports 3(2):65-71 (2011).
Chabchoub et al., "The facial dysmorphy in the newly recognised microdeletion 2p15-p16.1 refined to a 570 kb region in 2p15." Journal of Medical Genetics 45(3):189-192 (2008).
Coleman et al., "Sickle cell anemia: targeting the role of fetal hemoglobin in therapy." Clinical Pediatrics 46 (5):386-391 (2007).
Cox et al., "Therapeutic genome editing: prospects and challenges" Nature Medicine 21(2):121-131 (2015).
Dixit et al., "Hydroxyurea in thalassemia intermedia—a promising therapy." Annals of Hematology 84(7):441-446 (2005).
Doench et al., "Rational design of highly active sgRNAs for CRISPR-Cas9-mediated gene inactivation." Nature Biotechnology 32(12):1262-1267 (2014).
Doench et al., "Supplementary Material: Rational design of highly active sgRNAs for CRISPR-Cas9-mediated gene inactivation." Nature Biotechnology 32(12):1262-1267 (2014).
Examination Search Report, May 11, 2018 in corresponding Canadian No. 2737180.
Fenaux "Inhibitors of DNA methylation: beyond myelodysplastic syndromes." Nature Reviews Clinical Oncology 2 (S21):S36-S44 (2005).
Fischer et al., "Pulmonary Passage is a Major Obstacle for Intravenous Stem Cell Delivery: The Pulmonary First-Pass Effect" Stem Cells and Development 18(5):683-91 (2009).
Flanagan et al., "Hydroxycarbamide alters erythroid gene expression in children with sickle cell anaemia." British Journal of Haematology 157(2):240-248 (2012).
GenBank Accession No. NM_022893.4. "*Homo sapiens* BAF chromatin remodeling complex subunit BCL11A (BCL11A), transcript variant 1, mRNA." https://www.ncbi.nlm.nih.gov/nuccore/NM_022893.4 (2019).
GeneCard for BCL11A, retrieved from http://www.genecards.org/cgi-bin/carddisp.pl?gene=BCL11A on Jun. 22, 2012.
Goffin et al., "DNA methyltransferase inhibitors-state of the art." Annals of Oncology 13(11):1699-716 (2002).
Goldberg et al., "Treatment of sickle cell anemia with hydroxyurea and erythropoietin." New England Journal of Medicine 323(6):366-372 (1990).
Hackam "Translating animal research into clinical benefit" BMJ 334:163-68 (2007).
Hancarova et al. "A patient with de novo 0.45 Mb deletion of 2p16. 1: The role of BCL11A, PAPOLG, REL, and FLJ16341 in the 2p15-p16. 1 microdeletion syndrome." American Journal of Medical Genetics Part A 161(4):865-870 (2013).
Harding et al., "Large animal models for stem cell therapy", Stem Cell Research & Therapy 4(23):1-9 (2013).
Hebbel et al., "The HDAC inhibitors trichostatin A and suberoylanilide hydroxamic acid exhibit multiple modalities of benefit for the vascular pathobiology of sickle transgenic mice." Blood 115(12):2483-2490 (2010).
Hendel et al., "Chemically modified guide RNAs enhance CRISPR-Cas genome editing in human primary cells." Nature Biotechnology 33(9):985-989 (2015).
Higgs et al., "Genetic complexity in sickle cell disease." PNAS 105(33):11595-11596 (2008).
Ho et al., "In vitro induction of fetal hemoglobin in human erythroid progenitor cells." Experimental Hematology 31 (7):586-591 (2003).
Hsieh et al., "Allogeneic hematopoietic stem-cell transplantation for sickle cell disease." New England Journal of Medicine 361(24):2309-2317 (2009).
Jane et al., "Understanding fetal globin gene expression: a step towards effective HbF reactivation in haemoglobinopathies." British Journal of Haematology 102(2):415-423 (1998).

(56) References Cited

OTHER PUBLICATIONS

Kauf et al., "The cost of health care for children and adults with sickle cell disease." American Journal of Hematology 84(6):323-327 (2009).

Kirschner et al., "Genomic mapping of chromosomal region 2p15-p21 (D2S378-D2S391): integration of Genemap'98 within a framework of yeast and bacterial artificial chromosomes" Genomics 62(1):21-33 (1999).

Knowles et al. "Palmitate diet-induced loss of cardiac caveolin-3: a novel mechanism for lipid-induced contractile dysfunction." PLoS One 8(4): e61369 pp. 1-11 (2013).

Roggenkamp et al. "Tuning CRISPR-Cas9 gene drives in *Saccharomyces cerevisiae*." G3: Genes, Genomes, Genetics 8(3): 999-1018 (2018).

Xu et al., "Transcriptional silencing of beta-globin by BCL11A involvs long-range interactions and cooperation with SOX6." Genes and Development 24(8):783-798 (2010).

Yin et al. "BCL11A: a potential diagnostic biomarker and therapeutic target in human diseases." Bioscience Reports 39(11): 1-13 (2019).

Yin et al., "Bcl11a Causes p21 Cip1 Down-Regulation and Transplantable Leukemia in Nf1-Deficient Mice." Blood 110 (11):2657-2657 (2007) [Abstract Only].

Bofill-De Ros et al. "Guidelines for the optimal design of miRNA-based shRNAs." Methods 103: 157-166 (2016).

Esrick et al. "Post-transcriptional genetic silencing of BCL11A to treat sickle cell disease." New England Journal of Medicine 384(3): 205-215 (2021).

Guda et al. "miRNA-embedded shRNAs for lineage-specific BCL11A knockdown and hemoglobin F induction." Molecular Therapy 23(9): 1465-1474 (2015).

Win et al. "A modular and extensible RNA-based gene-regulatory platform for engineering cellular function." Proceedings of the National Academy of Sciences 104(36): 14283-14288 (2007).

Boden et al. "Enhanced gene silencing of HIV-1 specific siRNA using microRNA designed hairpins." Nucleic Acids Research 32(3): 1154-1158 (2004).

Brendel et al. "Lineage-specific BCL11A knockdown circumvents toxicities and reverses sickle phenotype." The Journal of Clinical Investigation 126(10): 3868-3878 (2016).

Brendel et al. "Optimization of Bcl11a Knockdown by miRNA scaffold embedded shmas leading to enhanced induction of fetal hemoglobin in erythroid cells for the treatment of beta-hemoglobinopathies." Blood 124(21): 2150-2150 (2014).

Calloni et al. "Scaffolds for artificial miRNA expression in animal cells." Human Gene Therapy Methods 26(5): 162-174 (2015).

Cante-Barrett et al. "Lentiviral gene transfer into human and murine hematopoietic stem cells: size matters." BMC Research Notes 9(1): 1-6 (2016).

Cavazzana-Calvo et al. "Transfusion independence and HMGA2 activation after gene therapy of human β-thalassaemia." Nature 467(7313): 318-322 (2010).

Clever et al. "RNA secondary structure and binding sites for gag gene products in the 5'packaging signal of human immunodeficiency virus type 1." Journal of Virology 69(4): 2101-2109 (1995).

Cullen et al. "Regulatory pathways governing HIV-1 replication." Cell 58(3): 423-426 (1989).

Cullen. "Human immunodeficiency virus as a prototypic complex retrovirus." Journal of Virology 65(3): 1053-1056 (1991).

Database GenBank [Online] Mar. 3, 2015, Anonymous: "TPA: Homo sapiens microRNA hsa-mir-144 precursor", XP55876619, Database accession No. LM608500.

Extended European Search Report mailed on Jan. 12, 2021, for European Application No. 18775163.1, 11 pages.

Ginn et al. "Gene therapy clinical trials worldwide to 2012—an update." The Journal of Gene Medicine 15(2): 65-77 (2013).

Huang et al. "Role of the hepatitis B virus posttranscriptional regulatory element in export of intronless transcripts." Molecular and Cellular Biology 15(7): 3864-3869 (1995).

Imren et al. "Permanent and panerythroid correction of murine β thalassemia by multiple lentiviral integration in hematopoietic stem cells." Proceedings of the National Academy of Sciences 99(22): 14380-14385 (2002).

International Search Report and Written Opinion mailed on Jun. 25, 2018, for International Application No. PCT/US2018/025165, 10 paqes.

Kitowski, "A Lentiviral Vector Conferring Coregulated, Erythroid-Specific Expression Of [gamma]-GLOBIN AND shRNA Sequences To BCL11A for the Treatment of Sickle Cell Disease," Aug. 1, 2016, 105 pages.

Kutner et al. "Production, concentration and titration of pseudotyped HIV-1-based lentiviral vectors." Nature Protocols 4(4): 495-505 (2009).

Kutner et al. "Simplified production and concentration of HIV-1-based lentiviral vectors using HYPERFlask vessels and anion exchange membrane chromatography." BMC Biotechnology 9(1): 1-7 (2009).

Landau et al. "Packaging system for rapid production of murine leukemia virus vectors with variable tropism." Journal of Virology 66(8): 5110-5113 (1992).

Liu et al. "HnRNP L binds a cis-acting RNA sequence element that enables intron-dependent gene expression." Genes & Development 9(14): 1766-1780 (1995).

Luc et al. "Bcl11a deficiency leads to hematopoietic stem cell defects with an aging-like phenotype." Cell Reports 16 (12): 3181-3194 (2016).

Mahajan et al. "Control of beta globin genes." Journal of Cellular Biochemistry 102(4): 801-810 (2007).

Malik et al. "Successful Correction of the Human Cooley's Anemia β-Thalassemia Major Phenotype Using a Lentiviral Vector Flanked by the Chicken Hypersensitive Site 4 Chromatin Insulator." Annals of the New York Academy of Sciences 1054(1): 238-249 (2005).

May et al. "Therapeutic haemoglobin synthesis in β-thalassaemic mice expressing lentivirus-encoded human β-globin." Nature 406(6791): 82-86 (2000).

Naldini. "Gene therapy returns to centre stage." Nature 526(7573): 351-360 (2015).

Negre et al. "Preclinical Evaluation of a Novel Lentiviral Vector Driving Lineage-Specific BCL11A Knockdown, β-Globin Induction and Simultaneous Repression of β-Globin for the Potential Treatment of Sickle Cell Disease." Blood 130(Supplement 1): 3557-3557 (2017).

Pawliuk et al. "Correction of sickle cell disease in transgenic mouse models by gene therapy." Science 294(5550): 2368-2371 (2001).

Pawliuk et al. "Correction of sickle cell disease in transgenic mouse models by gene therapy." Science 294(5550): 2368-2371 (2001) [Supplemental Material].

Rasmussen et al. "The miR-144/451 locus is required for erythroid homeostasis." Journal of Experimental Medicine 207(7): 1351-1358 (2010).

Soneoka et al. "A transient three-plasmid expression system for the production of high titer retroviral vectors." Nucleic Acids Research 23(4): 628-633 (1995).

Wang et al. "A 'suicide' CRISPR-Cas9 system to promote gene deletion and restoration by electroporation in Cryptococcus neoformans." Scientific Reports 6(1): 1-13 (2016).

Wu et al. "Highly efficient therapeutic gene editing of human hematopoietic stem cells." Nature Medicine 25(5): 776-783 (2019).

Yu et al. "Bcl11a is essential for lymphoid development and negatively regulates p53." Journal of Experimental Medicine 209(13): 2467-2483 (2012).

Zennou et al. "HIV-1 genome nuclear import is mediated by a central DNA flap." Cell 101(2): 173-185 (2000).

Zufferey et al. "Woodchuck hepatitis virus posttranscriptional regulatory element enhances expression of transgenes delivered by retroviral vectors." Journal of Virology 73(4): 2886-2892 (1999).

Koshy et al., "2-deoxy 5-azacytidine and fetal hemoglobin induction in sickle cell anemia." Blood 96(7):2379-2384 (2000).

Labie "Le contrôle en trans de la production d'hémoglobine fœtale: une recherche qui dure depuis 20 ans." Hématologie 14(2):165-166 (2008).

(56) References Cited

OTHER PUBLICATIONS

Lettre et al., "DNA polymorphisms at the BCL11A, HBS1L-MYB, and beta-globin loci associate with fetal hemoglobin levels and pain crises in sickle cell disease." PNAS 105(33):11869-11874 (2008).
Liu et al., "Bcl11a is essential for normal lymphoid development." Nature Immunology 4(6):525-532 (2003).
Liu et al., "Functional studies of BCL11A: characterization of the conserved BCL11A-XL splice variant and its interaction with BCL6 in nuclear paraspeckles of germinal center B cells." Molecular Cancer 5(18):1-6 (2006).
Lulli et al., "MicroRNA-486-3p regulates γ-globin expression in human erythroid cells by directly modulating BCL11A." PLoS One 8(4):e60436 (2013).
Makala et al., "Fetal Hemoglobin Induction to Treat b-Hemoglobinopathies: From Bench to Bedside" J Hematol Transfus 2(2):1-2 (2014).
Martin-Subero et al., "Recurrent involvement of the REL and BCL11A loci in classical Hodgkin lymphoma." Blood 99(4):1474-1477 (2002).
Matsuda et al., "Transcription factors LRF and BCL11A independently repress expression of fetal hemoglobin" Science 351(6270):285-289 (2016).
Menzel et al., "A QTL influencing F cell production maps to a gene encoding a zinc-finger protein on chromosome 2p15." Nature Genetics 39(10):1197-1199 (2007).
Migliaccio et al., "Influence of recombinant hematopoietins and of fetal bovine serum on the globin synthetic pattern of human BFUe." Blood 76(6):1150-1157 (1990).
Moffat et al., "A lentiviral RNAi library for human and mouse genes applied to an arrayed viral high-content screen." Cell 124(6):1283-1298 (2006).
Nemudryi et al., "TALEN and CRISPR/Cas Genome Editing Systems: Tools of Discovery" Acta Naturae, 6(3):19-40 (2014).
Neven et al., "A Mendelian predisposition to B-cell lymphoma caused by IL-10R deficiency," Blood 3713-3722 (2013).
Orkin et al., "Recent advances in globin research using genome-wide association studies and gene editing." Annals of the New York Academy of Sciences 1368 (1):5-10 (2016).
Papayannopoulou et al., "Erythroid progenitors circulating in the blood of adult individuals produce fetal hemoglobin in culture." Science 199(4335):1349-1350 (1978).
Pauling et al., "Sickle cell anemia a molecular disease." Science 110(2865):543-548 (1949).
Pembrey et al., "Fetal haemoglobin production and the sickle gene in the oases of Eastern Saudi Arabia." British journal of haematology 40(3):415-429 (1978).
Perrine "Fetal globin induction—can it cure beta thalassemia?" American Society of Hematology Education Program Book pp. 38-44 (2005).
Platt et al., "Mortality in sickle cell disease. Life expectancy and risk factors for early death." New England Journal of Medicine 330(23):1639-1644 (1994).
Purton et al., "All-trans retinoic acid enhances the long-term repopulating activity of cultured hematopoietic stem cells." Blood 95(2):470-477 (2000).
Renella et al. "Hematopoietic SIN lentiviral micro RNA-mediated silencing of BCL11A: pre-clinical evidence for a sickle cell disease gene-therapy trial." Blood 120(21):Abstract 753 (2012).
Ridley et al., "Erythropoietin: A Review" J Natl Med Assoc., 86(2):129-135 (1994).
Rodriguez et al., "A bioavailability and pharmacokinetic study of oral and intravenous hydroxyurea." Blood 9 (5):1533-1541 (1998).
Rosenblum et al., "Peripheral blood erythroid progenitors from patients with sickle cell anemia: HPLC separation of hemoglobins and the effect of a HbF switching factor." Progress in Clinical and Biological Research 191:397-410 (1985).
Saiki et al., "Human EVI9, a homologue of the mouse myeloid leukemia gene, is expressed in the hematopoietic progenitors and down-regulated during myeloid differentiation of HL60 cells." Genomics 70(3):387-391 (2000).

Sankaran et al., "Developmental and species-divergent globin switching are driven by BCL11A." Nature 460 (7259):1093-1097 (2009).
Sankaran et al., "Human fetal hemoglobin expression is regulated by the developmental stage-specific repressor BCL11A." Science 322(5909):1839-1843 (2008).
Sankaran et al., "Targeted therapeutic strategies for fetal hemoglobin induction." American Society of Hematology Education Program Book 2011(1):459-465 (2011).
Satterwhite et al., "The BCL11 gene family: involvement of BCL11A in lymphoid malignancies." Blood, 98 (12):3413-3420 (2001).
Schopman et al. "Optimization of shRNA inhibitors by variation of the terminal loop sequence." Antiviral Research 86 (2):204-211 (2010).
Sebastiani et al., "BCL11A enhancer haplotypes and fetal hemoglobin in sickle cell anemia." Blood Cells, Molecules, and Diseases 54(3):224-230 (2015).
Sedgewick et al., "BCL11A is a major HbF quantitative trait locus in three different populations with β-hemoglobinopathies." Blood Cells, Molecules, and Diseases 41(3):255-258 (2008).
Shen et al., "Modifcation of globin gene expression by RNA targeting strategies." Experimental Hematology, 35 (8):1209-1218 (2007).
Takeuchi et al., "Redesign of extensive protein-DNA interfaces of meganucleases using iterative cycles of in vitro compartmentalization." PNAS 111(11):4061-4066 (2014).
Taymans et al., "Radiation hybrid mapping of chromosomal region 2p15-p16: integration of expressed and polymorphic sequences maps at the Carney complex (CNC) and Doyne honeycomb retinal dystrophy (DHRD) loci." Genomics 56(3):344-349 (1999).
Terasawa et al., "Synthetic pre-miRNA-based shRNA as potent RNAI triggers." Journal of Nucleic Acids (2011).
Thein "Genetic modifiers of the beta-haemoglobinopathies." British Journal of Hematology, 141(3):357-366 (2008).
Thein et al., "Discovering the genetics underlying foetal haemoglobin production in adults." British Journal of Haematology 145(4):455-467 (2009).
Thompson "Structure, Function, and Molecular Defects of Factor IX." Blood 67(3):565-72 (1986).
Uda et al., "Genome-wide association study shows BCL11A associated with persistent fetal hemoglobin and amelioration of the phenotype of β-thalassemia." PNAS 105(5):1620-1625 (2008).
UCSC Genome Browser of Human Assembly, hg19. Feb. 2009. 1 Page.
Wang et al. "Genetic screens in human cells using the CRISPR/Cas9 system." Science 343(6166):80-84 (2013).
Wang et al. "Supplementary Material: Genetic screens in human cells using the CRISPR/Cas9 system." Science 343 (6166):80-84 (2013).
Wang et al., "In Vivo Delivery Systems for Therapeutic Genome Editing" International Journal of Molecular Sciences 17(5):1-19 (2016).
Wang et al., "Selection of hyperfunctional siRNAs with improved potency and specificity." Nucleic Acids Research 37 (22):e152 (2009).
White et al., "Factor VIII Gene and Hemophili A." Blood 73(1):1-12 (1989).
World Health Organization. "Sickle-cell anaemia. Report A59/9. Provisional agenda item 11.4." 59th World Health Assembly. www.who.int/GB/ebwha/pdf_files/WHA59/A59_9-en.pdf (2006).
Xu et al., "Correction of sickle cell disease in adult mice by interference with fetal hemoglobin silencing", Science 334 (6058):993-996 (2011).
Xu et al., "Reactivation of silenced human HbF in adult mice by inactivation of BCL11A." Blood 116: Abstract 643 (2010).
Zeng et al. "Therapeutic base editing of human hematopoietic stem cells." Nature Medicine 26.4: 535-541 (2020).
Cermak et al. "Efficient design and assembly of custom TALEN and other TAL effector-based constructs for DNA 1 targeting." Nucleic acids research 39.12: e82-e82 (2011).
Canver. "Elucidation of Mechanisms of Fetal Hemoglobin Regulation by CRISPR/Cas9 Mediated Genome Editing," Doctoral Dis-

(56) References Cited

OTHER PUBLICATIONS sertation, Harvard University, Graduate School of Arts and Sciences (2016).

* cited by examiner

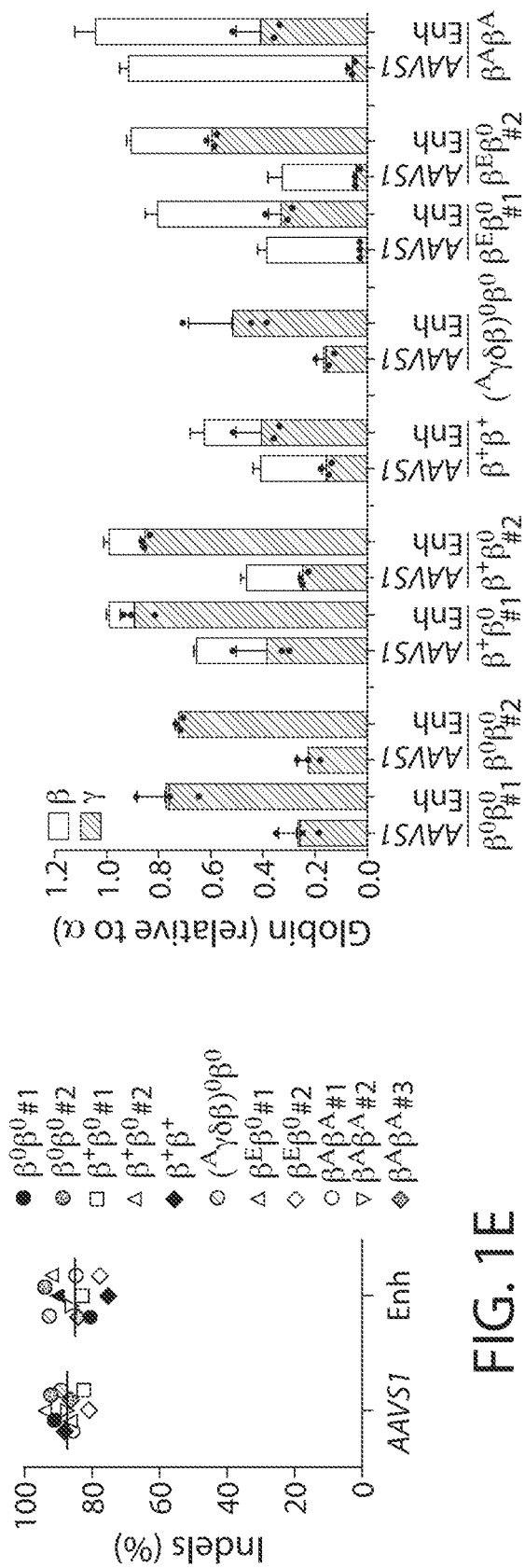

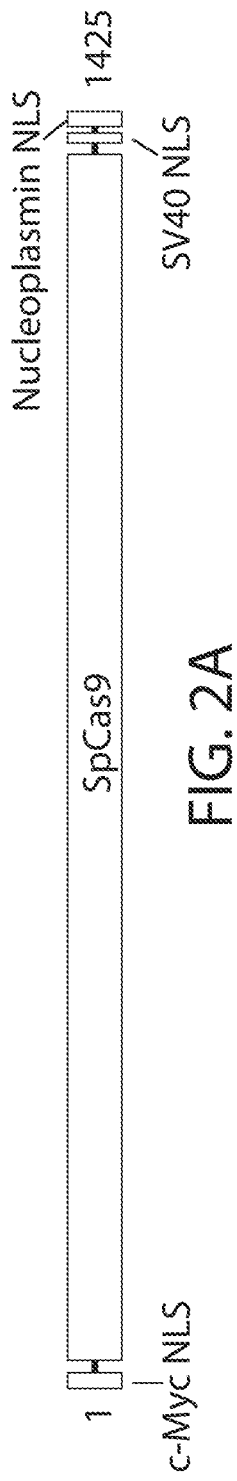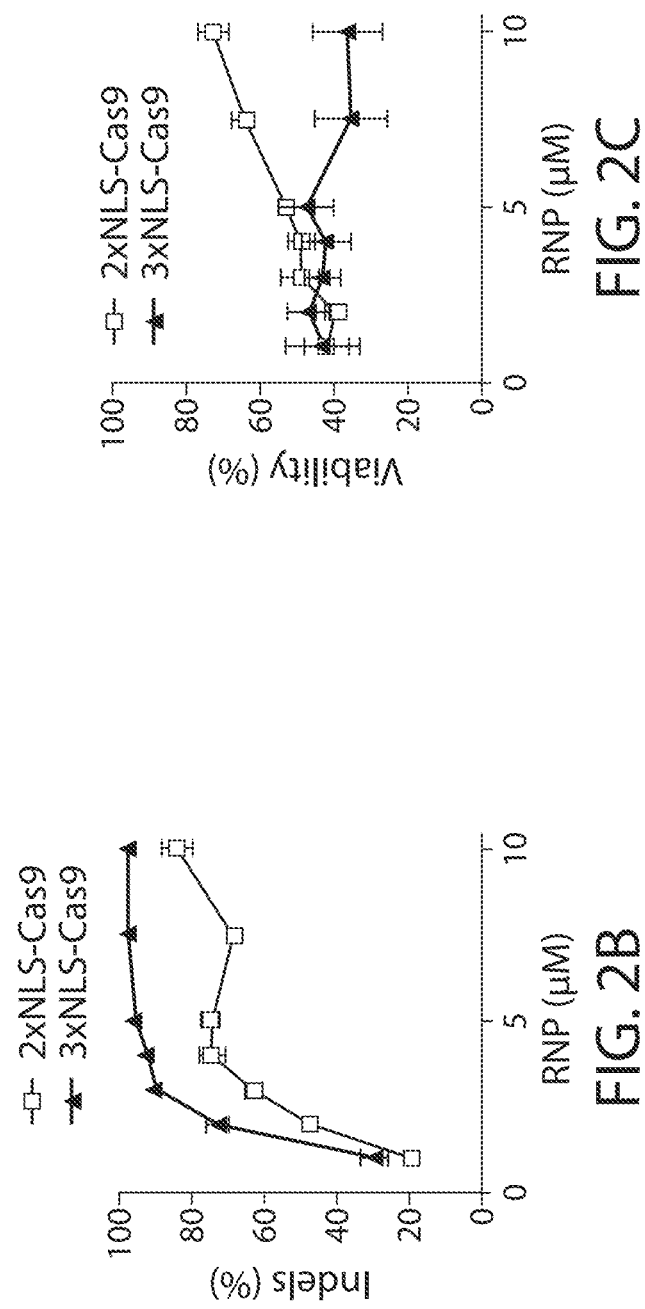
FIG. 2A
FIG. 2B
FIG. 2C

Fig. 2F

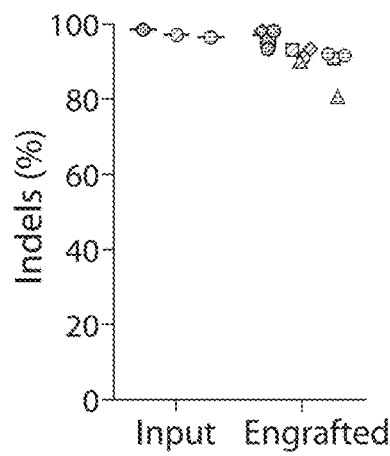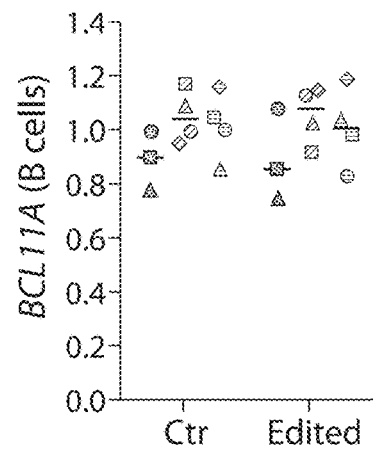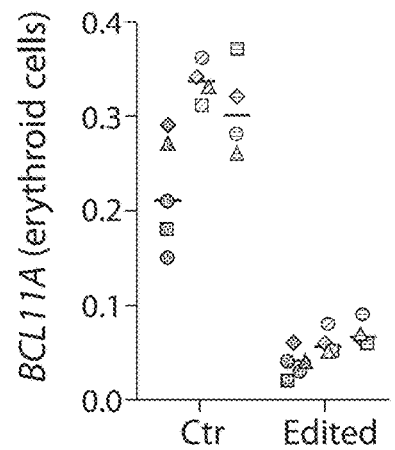
FIG. 2J  FIG. 2K  FIG. 2L
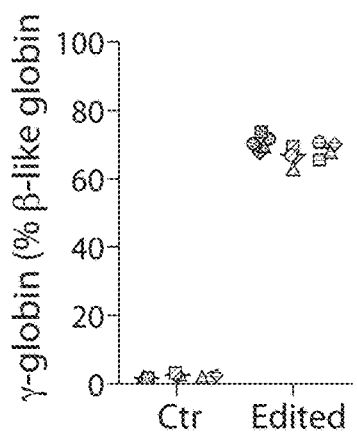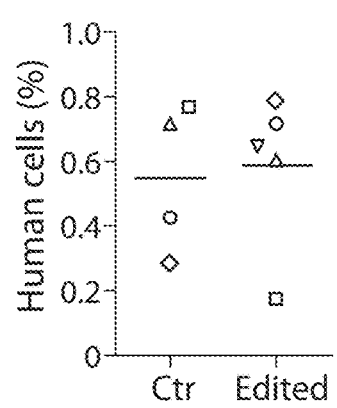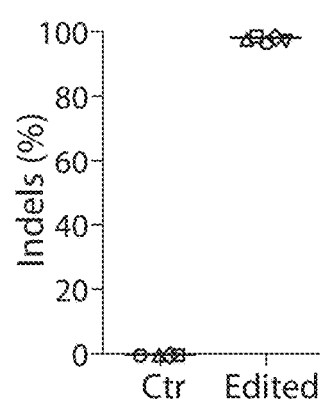
FIG. 2M  FIG. 2N  FIG. 2O

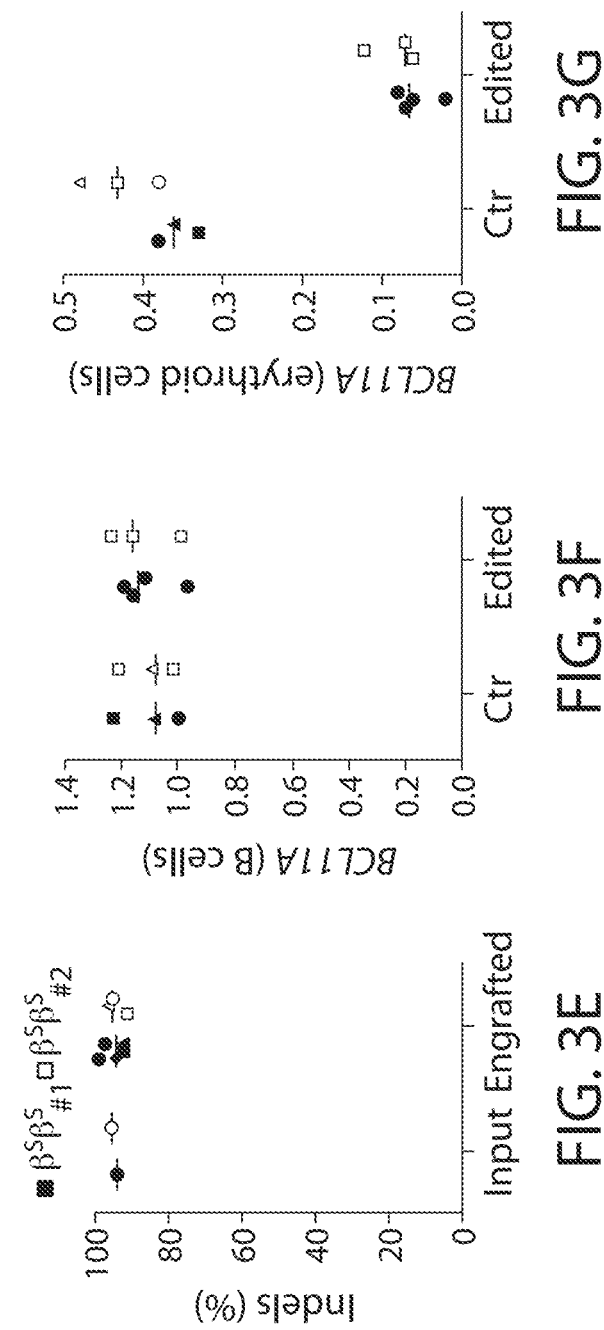

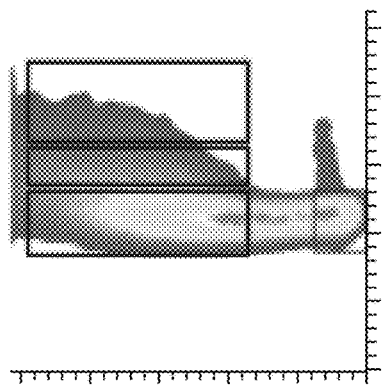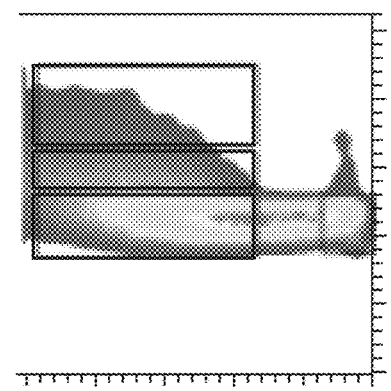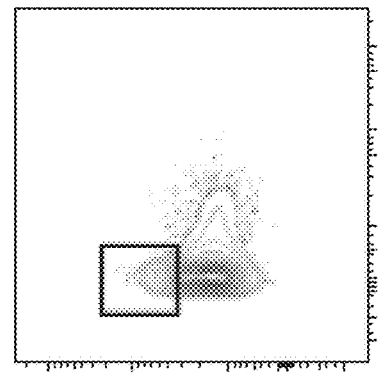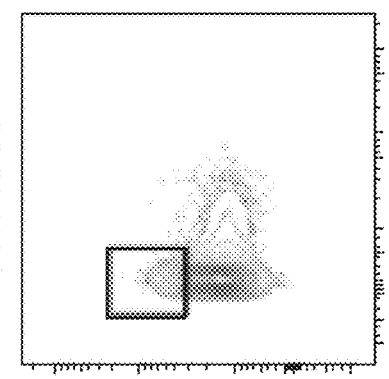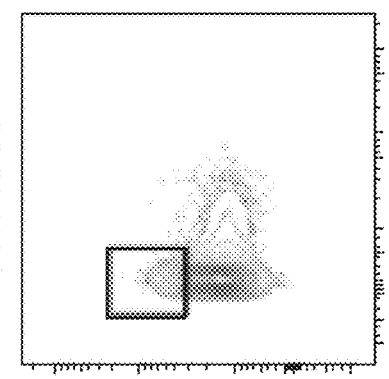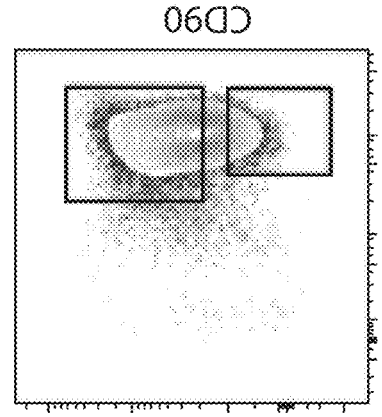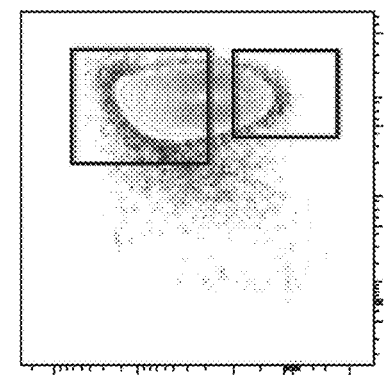
Fig. 14C
Fig. 14D

ENHANCED BCL11A RNP / CRISPR DELIVERY AND EDITING USING A 3XNLS-CAS9

CROSS REFERENCE TO RELATED APPLICATION

This application is a 371 National Phase Entry of International Patent Application No. PCT/US2019/030219 filed on May 1, 2019, which claims the benefit under 35 U.S.C. § 119(e) of U.S. Provisional Application No. 62/664,941, filed on May 1, 2018, the contents of which are incorporated herein by reference in their entirety.

GOVERNMENT SUPPORT

This invention was made with government support under Grant nos. DK093705, DK109232. OD022716, HL032262, and HG008399, awarded by the National Institutes of Health. The government has certain rights in the invention.

TECHNICAL FIELD

The technology described herein relates to methods of altering gene expression in a cell.

SEQUENCE LISTING

The instant application contains a Sequence Listing which has been submitted electronically in ASCII format and is hereby incorporated by reference in its entirety. Said ASCII copy, created on Oct. 23, 2020, is named 701039-091600WOPT_SL.txt and is 58,599 bytes in size.

BACKGROUND

Re-expression of the paralogous γ-globin genes (HBG1/2) could be a universal strategy to ameliorate the severe β-globin disorders sickle cell disease (SCD) and β-thalassemia by induction of fetal hemoglobin (HbF, $\alpha_2\gamma_2$). Previously, the inventors have shown that core sequences at the BCL11A erythroid enhancer are required for repression of HbF in adult-stage erythroid cells but dispensable in non-erythroid cells. Previous work has shown that decreasing the expression of BCL11A is an effective approach increase hbF in adult cells. This work has utilized CRISPR-Cas9 mediated gene modification, though this system has variable efficiency, specificity, and persistence in hematopoietic stem cells (HSCs).

Work described herein sought to optimize conditions of the CRISPR-Cas gene editing system in patient-derived HSCs as a nearly complete reaction lacking detectable genotoxicity or deleterious impact on stem cell function. Described herein are CRISPR enzymes fused to nuclear localization signal (NLS) sequences, where the number and type of NLS sequences increases its gene-editing efficacy as compared to enzymes lacking an NLS or containing a sub-optimal NLS composition, for example in a quiescent cell.

SUMMARY

Embodiments described herein are based in part to the discovery of a Cas-fusion protein comprising a c-Myc-like nuclear localization signal (NLS) sequence fused to its amino terminus and an SV40 nuclear localization sequence and nucleplasmin bipartate nuclear localization sequence fused to its carboxyl terminus exhibited a greater gene-editing capability in a hematopoietic cell as compared to a Cas enzyme lacking an NLS, or having a different configuration of NLSs. Accordingly, provided herein is a synthetic nucleic acid molecule comprising a CRISPR enzyme comprising at least one nuclear localization signal sequence fused at or near its amino terminus, and at least one nuclear localization signal sequence fused at or near its carboxy terminus.

In one embodiment of any aspect provided herein, the CRISPR enzyme has one nuclear localization signal sequence fused at or near its amino terminus, and two nuclear localization signal sequences fused at or near its carboxy terminus.

In one embodiment of any aspect provided herein, the nuclear localization signal sequence is selected from the group consisting of: SV40 large T-antigen, nucleoplasmin, c-Myc, c-Myc-like, and hRNPA1.

In one embodiment of any aspect provided herein, at least one of the nuclear localization signal sequences are identical. For example, the CRISPR enzyme can be fused to at least two SV40 nuclear localization sequences.

In one embodiment of any aspect provided herein, at least one of the nuclear localization signal sequences are different. For example, the CRISPR enzyme can be fused to at least one SV40 nuclear localization signal sequence and at least on c-Myc nuclear localization signal sequence.

In one embodiment of any aspect provided herein, the CRISPR enzyme has a c-Myc-like nuclear localization signal sequence fused to its amino terminus and an SV40 nuclear localization signal sequence and nucleplasmin bipartate nuclear localization signal sequence fused to its carboxyl terminus.

In one embodiment of any aspect provided herein, the CRISPR enzyme is a type II CRISPR system enzyme. In one embodiment of any aspect provided herein, the CRISPR enzyme is a Cas enzyme. Exemplary Cas proteins include, but are not limited to, Cpf1, C2c1, C2c3, Cas12a, Cas12b, Cas12c, Cas12d, Cas12e, Cas13a, Cas13b, and Cas13c. Cas1, Cas1B, Cas2, Cas3, Cas4, Cas5, Cas6, Cas7, Cas8, Cas9 (also known as Csn1 and Csx12), Cas100, Csy1, Csy2, Csy3, Cse1, Cse2, Csc1, Csc2, Csa5, Csn2, Csm2, Csm3, Csm4, Csm5, Csm6, Cmr1, Cmr3, Cmr4, Cmr5, Cmr6, Csb1, Csb2, Csb3, Csx17, Csx14, Csx10, Csx16, CsaX, Csx3, Csx1, Csx15, Csf1, Csf2, Csf3, Csf4, Cpf1, C2c1, C2c3, Cas12a, Cas12b, Cas12c, Cas12d, Cas12e, Cas13a, Cas13b, and Cas13c.

In one embodiment of any aspect provided herein, the synthetic nucleic acid molecule has a nucleotide sequence is SEQ ID NO: 21.

In one embodiment of any aspect provided herein, any of the synthetic nucleic acid molecules described herein are used in combination with a guide RNA, whereby the guide RNA targets and hybridizes with a target sequence of a DNA molecule and the polypeptide encoded by the synthetic nucleic acid molecule cleaves the DNA molecule, whereby expression of at least one gene product is altered.

Another aspect of the invention described herein provides a vector comprising any of the synthetic nucleic acid molecules described herein.

Another aspect of the invention described herein provides a polypeptide encoded by any of the synthetic nucleic acid molecules described herein. In one embodiment of any aspect, the polypeptide sequence is SEQ ID NO: 22.

Another aspect of the invention described herein provides a composition comprising any of the synthetic nucleic molecules, vectors, or polypeptides described herein. In one embodiment of any aspect, the composition further comprising a guide RNA that targets and hybridizes to a target sequence on a DNA molecule.

Yet another aspect of the invention described herein provides a ribonucleoprotein (RNP) complex comprising any of the polypeptides described herein and a guide RNA that targets and hybridizes to a target sequence on a DNA molecule. In one embodiment of any aspect, the RNP complex is used for altering the expression of at least one gene product.

Another aspect of the invention described herein provides a method of altering expression of at least one gene product comprising introducing into a cell any of the synthetic nucleic acid molecules, vectors, or polypeptides described herein, and at least one guide RNA that targets and hybridizes with a target sequence of a DNA molecule.

Another aspect of the invention described herein provides a method of altering expression of at least one gene product comprising introducing into a cell any of the compositions described herein and at least one guide RNA that targets and hybridizes with a target sequence of a DNA molecule.

Another aspect of the invention described herein provides a method of altering expression of at least one gene product comprising introducing into a cell any of the compositions or RNP complexes described herein.

In one embodiment of any aspect, the cell is a quiescent cell. Exemplary quiescent cells include, but is not limited to, a hematopoietic stem cell, a muscle stem cell, a neural stem cell, an intestinal stem cell, a skin stem cell or epidermal stem cell, a mesenchymal stem cell, a resting T cell, a memory T cell, a neuron, a neuronal stem cell, a myotube or skeletal myoblast or satellite cell, and a hepatocyte.

In one embodiment of any aspect, the cell is not a quiescent cell.

Another aspect of the invention described herein provides a method of altering expression of at least one gene product comprising introducing into a quiescent cell any of the synthetic nucleic acid molecules, vectors, or polypeptides described herein, and at least one guide RNA that targets and hybridizes with a target sequence of a DNA molecule.

Another aspect of the invention described herein provides a method of altering expression of at least one gene product comprising introducing into a quiescent cell any of the compositions described herein and at least one guide RNA that targets and hybridizes with a target sequence of a DNA molecule.

Another aspect of the invention described herein provides a method of altering expression of at least one gene product comprising introducing into a quiescent cell any of the compositions or RNP complexes described herein.

In one embodiment of any aspect, the method is used for altering the expression of fetal hemoglobin.

Definitions

For convenience, the meaning of some terms and phrases used in the specification, examples, and appended claims, are provided below. Unless stated otherwise, or implicit from context, the following terms and phrases include the meanings provided below. The definitions are provided to aid in describing particular embodiments, and are not intended to limit the claimed technology, because the scope of the technology is limited only by the claims. Unless otherwise defined, all technical and scientific terms used herein have the same meaning as commonly understood by one of ordinary skill in the art to which this technology belongs. If there is an apparent discrepancy between the usage of a term in the art and its definition provided herein, the definition provided within the specification shall prevail.

Definitions of common terms in immunology and molecular biology can be found in The Merck Manual of Diagnosis and Therapy, 19th Edition, published by Merck Sharp & Dohme Corp., 2011 (ISBN 978-0-911910-19-3); Robert S. Porter et al. (eds.), The Encyclopedia of Molecular Cell Biology and Molecular Medicine, published by Blackwell Science Ltd., 1999-2012 (ISBN 9783527600908); and Robert A. Meyers (ed.), Molecular Biology and Biotechnology: a Comprehensive Desk Reference, published by VCH Publishers, Inc., 1995 (ISBN 1-56081-569-8); Immunology by Werner Luttmann, published by Elsevier, 2006; Janeway's Immunobiology, Kenneth Murphy, Allan Mowat, Casey Weaver (eds.), Taylor & Francis Limited, 2014 (ISBN 0815345305, 9780815345305); Lewin's Genes XI, published by Jones & Bartlett Publishers, 2014 (ISBN-1449659055); Michael Richard Green and Joseph Sambrook, Molecular Cloning: A Laboratory Manual, 4th ed., Cold Spring Harbor Laboratory Press, Cold Spring Harbor, N.Y., USA (2012) (ISBN 1936113414); Davis et al., Basic Methods in Molecular Biology, Elsevier Science Publishing, Inc., New York, USA (2012) (ISBN 044460149X); Laboratory Methods in Enzymology: DNA, Jon Lorsch (ed.) Elsevier, 2013 (ISBN 0124199542); Current Protocols in Molecular Biology (CPMB), Frederick M. Ausubel (ed.), John Wiley and Sons, 2014 (ISBN 047150338X, 9780471503385), Current Protocols in Protein Science (CPPS), John E. Coligan (ed.), John Wiley and Sons, Inc., 2005; and Current Protocols in Immunology (CPI) (John E. Coligan, ADA M Kruisbeek, David H Margulies, Ethan M Shevach, Warren Strobe, (eds.) John Wiley and Sons, Inc., 2003 (ISBN 0471142735, 9780471142737), the contents of which are all incorporated by reference herein in their entireties.

The terms "decrease", "reduced", "reduction", or "inhibit" are all used herein to mean a decrease by a statistically significant amount. In some embodiments, "reduce," "reduction" or "decrease" or "inhibit" typically means a decrease by at least 10% as compared to a reference level (e.g. the absence of a given synthetic nucleic acid molecule, polypeptide, vector, composition, or RNP complex described herein) and can include, for example, a decrease by at least about 10%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, at least about 95%, at least about 98%, at least about 99%, or more. As used herein, "reduction" or "inhibition" does not encompass a complete inhibition or reduction as compared to a reference level. "Complete inhibition" is a 100% inhibition as compared to a reference level. Where applicable, a decrease can be preferably down to a level accepted as within the range of normal for an individual without a given disorder.

The terms "increased", "increase", "enhance", or "activate" are all used herein to mean an increase by a statically significant amount. In some embodiments, the terms "increased", "increase", "enhance", or "activate" can mean an increase of at least 10% as compared to a reference level, for example an increase of at least about 20%, or at least about 30%, or at least about 40%, or at least about 50%, or at least about 60%, or at least about 70%, or at least about 80%, or at least about 90% or up to and including a 100% increase or any increase between 10-100% as compared to a reference level, or at least about a 2-fold, or at least about a 3-fold, or at least about a 4-fold, or at least about a 5-fold or at least about a 10-fold increase, or any increase between 2-fold and 10-fold or greater as compared to a reference level. In the context of a marker or symptom, an "increase" is a statistically significant increase in such level.

As used herein, a "subject" means a human or animal. Usually the animal is a vertebrate such as a primate, rodent, domestic animal or game animal. Primates include, for example, chimpanzees, cynomologous monkeys, spider monkeys, and macaques, e.g., Rhesus. Rodents include, for example, mice, rats, woodchucks, ferrets, rabbits and hamsters. Domestic and game animals include, for example, cows, horses, pigs, deer, bison, buffalo, feline species, e.g., domestic cat, canine species, e.g., dog, fox, wolf, avian species, e.g., chicken, emu, ostrich, and fish, e.g., trout, catfish and salmon. In some embodiments, the subject is a mammal, e.g., a primate, e.g., a human. The terms, "individual," "patient" and "subject" are used interchangeably herein.

Preferably, the subject is a mammal. The mammal can be a human, non-human primate, mouse, rat, dog, cat, horse, or cow, but is not limited to these examples. Mammals other than humans can be advantageously used as subjects that represent animal models of disease e.g., hemaglobinopathies or cancer. A subject can be male or female.

A subject can be one who has been previously diagnosed with or identified as suffering from or having a condition in need of treatment (e.g. a hemoglobinopathy) or one or more complications related to such a condition, and optionally, have already undergone treatment for the condition or the one or more complications related to the condition. Alternatively, a subject can also be one who has not been previously diagnosed as having such condition or related complications. For example, a subject can be one who exhibits one or more risk factors for the condition or one or more complications related to the condition or a subject who does not exhibit risk factors.

A "subject in need" of treatment for a particular condition can be a subject having that condition, diagnosed as having that condition, or at risk of developing that condition.

In one embodiment, the term "engineered" and its grammatical equivalents as used herein can refer to one or more human-designed alterations of a nucleic acid, e.g., the nucleic acid within an organism's genome. In another embodiment, engineered can refer to alterations, additions, and/or deletion of genes. An "engineered cell" can refer to a cell with an added, deleted and/or altered gene. The term "cell" or "engineered cell" and their grammatical equivalents as used herein can refer to a cell of human or non-human animal origin.

In the various embodiments described herein, it is further contemplated that variants (naturally occurring or otherwise), alleles, homologs, conservatively modified variants, and/or conservative substitution variants of any of the particular polypeptides described are encompassed. As to amino acid sequences, one of ordinary skill will recognize that individual substitutions, deletions or additions to a nucleic acid, peptide, polypeptide, or protein sequence which alters a single amino acid or a small percentage of amino acids in the encoded sequence is a "conservatively modified variant" where the alteration results in the substitution of an amino acid with a chemically similar amino acid and retains the desired activity of the polypeptide. Such conservatively modified variants are in addition to and do not exclude polymorphic variants, interspecies homologs, and alleles consistent with the disclosure.

A given amino acid can be replaced by a residue having similar physicochemical characteristics, e.g., substituting one aliphatic residue for another (such as Ile, Val, Leu, or Ala for one another), or substitution of one polar residue for another (such as between Lys and Arg; Glu and Asp; or Gln and Asn). Other such conservative substitutions, e.g., substitutions of entire regions having similar hydrophobicity characteristics, are well known. Polypeptides comprising conservative amino acid substitutions can be tested in any one of the assays described herein to confirm that a desired activity, e.g. ligan-mediated receptor activity and specificity of a native or reference polypeptide is retained.

Amino acids can be grouped according to similarities in the properties of their side chains (in A. L. Lehninger, in Biochemistry, second ed., pp. 73-75, Worth Publishers, New York (1975)): (1) non-polar: Ala (A), Val (V), Leu (L), Ile (I), Pro (P), Phe (F), Trp (W), Met (M); (2) uncharged polar: Gly (G), Ser (S), Thr (T), Cys (C), Tyr (Y), Asn (N), Gln (Q); (3) acidic: Asp (D), Glu (E); (4) basic: Lys (K), Arg (R), His (H). Alternatively, naturally occurring residues can be divided into groups based on common side-chain properties: (1) hydrophobic: Norleucine, Met, Ala, Val, Leu, Ile; (2) neutral hydrophilic: Cys, Ser, Thr, Asn, Gln; (3) acidic: Asp, Glu; (4) basic: His, Lys, Arg; (5) residues that influence chain orientation: Gly, Pro; (6) aromatic: Trp, Tyr, Phe. Non-conservative substitutions will entail exchanging a member of one of these classes for another class. Particular conservative substitutions include, for example; Ala into Gly or into Ser; Arg into Lys; Asn into Gln or into His; Asp into Glu; Cys into Ser; Gln into Asn; Glu into Asp; Gly into Ala or into Pro; His into Asn or into Gln; Ile into Leu or into Val; Leu into Ile or into Val; Lys into Arg, into Gln or into Glu; Met into Leu, into Tyr or into Ile; Phe into Met, into Leu or into Tyr; Ser into Thr; Thr into Ser; Trp into Tyr; Tyr into Trp; and/or Phe into Val, into Ile or into Leu.

In some embodiments, a polypeptide described herein (or a nucleic acid encoding such a polypeptide) can be a functional fragment of one of the amino acid sequences described herein. As used herein, a "functional fragment" is a fragment or segment of a peptide which retains at least 50% of the wildtype reference polypeptide's activity according to an assay known in the art or described below herein. For example, a functional fragment described herein would retain at least 50% of the CRISPR enzyme function. One skilled in the art can assess the function of a CRISPR enzyme using standard techniques, for example those described herein below. A functional fragment can comprise conservative substitutions of the sequences disclosed herein.

In some embodiments, a polypeptide described herein can be a variant of a polypeptide or molecule as described herein. In some embodiments, the variant is a conservatively modified variant. Conservative substitution variants can be obtained by mutations of native nucleotide sequences, for example. A "variant," as referred to herein, is a polypeptide substantially homologous to a native or reference polypeptide, but which has an amino acid sequence different from that of the native or reference polypeptide because of one or a plurality of deletions, insertions or substitutions. Variant polypeptide-encoding DNA sequences encompass sequences that comprise one or more additions, deletions, or substitutions of nucleotides when compared to a native or reference DNA sequence, but that encode a variant protein or fragment thereof that retains activity of the non-variant polypeptide. A wide variety of PCR-based site-specific mutagenesis approaches are known in the art and can be applied by the ordinarily skilled artisan.

A variant amino acid or DNA sequence can be at least 90%, at least 91%, at least 92%, at least 93%, at least 94%, at least 95%, at least 96%, at least 97%, at least 98%, at least 99%, or more, identical to a native or reference sequence. The degree of homology (percent identity) between a native and a mutant sequence can be determined, for example, by comparing the two sequences using freely available computer programs commonly employed for this purpose on the world wide web (e.g. BLASTp or BLASTn with default settings).

Alterations of the native amino acid sequence can be accomplished by any of a number of techniques known to one of skill in the art. Mutations can be introduced, for example, at particular loci by synthesizing oligonucleotides containing a mutant sequence, flanked by restriction sites permitting ligation to fragments of the native sequence. Following ligation, the resulting reconstructed sequence encodes an analog having the desired amino acid insertion, substitution, or deletion. Alternatively, oligonucleotide-directed site-specific mutagenesis procedures can be employed to provide an altered nucleotide sequence having particular codons altered according to the substitution, deletion, or insertion required. Techniques for making such alterations are well established and include, for example, those disclosed by Walder et al. (Gene 42:133, 1986); Bauer et al. (Gene 37:73, 1985); Craik (BioTechniques, January 1985, 12-19); Smith et al. (Genetic Engineering: Principles and Methods, Plenum Press, 1981); and U.S. Pat. Nos. 4,518,584 and 4,737,462, which are herein incorporated by reference in their entireties. Any cysteine residue not involved in maintaining the proper conformation of a polypeptide also can be substituted, generally with serine, to improve the oxidative stability of the molecule and prevent aberrant crosslinking. Conversely, cysteine bond(s) can be added to a polypeptide to improve its stability or facilitate oligomerization.

As used herein, the term "DNA" is defined as deoxyribonucleic acid. The term "polynucleotide" is used herein interchangeably with "nucleic acid" to indicate a polymer of nucleosides. Typically, a polynucleotide is composed of nucleosides that are naturally found in DNA or RNA (e.g., adenosine, thymidine, guanosine, cytidine, uridine, deoxyadenosine, deoxythymidine, deoxyguanosine, and deoxycytidine) joined by phosphodiester bonds. However, the term encompasses molecules comprising nucleosides or nucleoside analogs containing chemically or biologically modified bases, modified backbones, etc., whether or not found in naturally occurring nucleic acids, and such molecules may be preferred for certain applications. Where this application refers to a polynucleotide it is understood that both DNA, RNA, and in each case both single- and double-stranded forms (and complements of each single-stranded molecule) are provided. "Polynucleotide sequence" as used herein can refer to the polynucleotide material itself and/or to the sequence information (i.e. the succession of letters used as abbreviations for bases) that biochemically characterizes a specific nucleic acid. A polynucleotide sequence presented herein is presented in a 5' to 3' direction unless otherwise indicated.

The term "polypeptide" as used herein refers to a polymer of amino acids. The terms "protein" and "polypeptide" are used interchangeably herein. A peptide is a relatively short polypeptide, typically between about 2 and 60 amino acids in length. Polypeptides used herein typically contain amino acids such as the 20 L-amino acids that are most commonly found in proteins. However, other amino acids and/or amino acid analogs known in the art can be used. One or more of the amino acids in a polypeptide may be modified, for example, by the addition of a chemical entity such as a carbohydrate group, a phosphate group, a fatty acid group, a linker for conjugation, functionalization, etc. A polypeptide that has a nonpolypeptide moiety covalently or noncovalently associated therewith is still considered a "polypeptide." Exemplary modifications include glycosylation and palmitoylation. Polypeptides can be purified from natural sources, produced using recombinant DNA technology or synthesized through chemical means such as conventional solid phase peptide synthesis, etc. The term "polypeptide sequence" or "amino acid sequence" as used herein can refer to the polypeptide material itself and/or to the sequence information (i.e., the succession of letters or three letter codes used as abbreviations for amino acid names) that biochemically characterizes a polypeptide. A polypeptide sequence presented herein is presented in an N-terminal to C-terminal direction unless otherwise indicated.

As used herein, "vector" refers to a nucleic acid construct designed for delivery to a host cell or for transfer between different host cells. As used herein, a vector can be viral or non-viral. The term "vector" encompasses any genetic element that is capable of replication when associated with the proper control elements and that can transfer gene sequences to cells. A vector can include, but is not limited to, a cloning vector, an expression vector, a plasmid, phage, transposon, cosmid, artificial chromosome, virus, virion, etc.

As used herein, the term "viral vector" refers to a nucleic acid vector construct that includes at least one element of viral origin and has the capacity to be packaged into a viral particle. The viral vector can contain a nucleic acid encoding a polypeptide as described herein in place of non-essential viral genes. The vector and/or particle may be utilized for the purpose of transferring nucleic acids into cells either in vitro or in vivo. Numerous forms of viral vectors are known in the art.

The term "expression" refers to the cellular processes involved in producing RNA and proteins and as appropriate, secreting proteins, including where applicable, but not limited to, for example, transcription, transcript processing, translation and protein folding, modification and processing. "Expression products" include RNA transcribed from a gene, and polypeptides obtained by translation of mRNA transcribed from a gene. The term "gene" means the nucleic acid sequence which is transcribed (DNA) to RNA in vitro or in vivo when operably linked to appropriate regulatory sequences. The gene may or may not include regions preceding and following the coding region, e.g. 5' untranslated (5'UTR) or "leader" sequences and 3' UTR or "trailer" sequences, as well as intervening sequences (introns) between individual coding segments (exons).

As used herein, the term "pharmaceutical composition" refers to the active agent in combination with a pharmaceutically acceptable carrier e.g. a carrier commonly used in the pharmaceutical industry. The phrase "pharmaceutically acceptable" is employed herein to refer to those compounds, materials, compositions, and/or dosage forms which are, within the scope of sound medical judgment, suitable for use in contact with the tissues of human beings and animals without excessive toxicity, irritation, allergic response, or other problem or complication, commensurate with a reasonable benefit/risk ratio. In some embodiments of any of the aspects, a pharmaceutically acceptable carrier can be a carrier other than water. In some embodiments of any of the aspects, a pharmaceutically acceptable carrier can be a cream, emulsion, gel, liposome, nanoparticle, and/or ointment. In some embodiments of any of the aspects, a pharmaceutically acceptable carrier can be an artificial or engineered carrier, e.g., a carrier in which the active ingredient would not be found to occur in nature.

As used herein, the term "administering," refers to the placement of a therapeutic or pharmaceutical composition as disclosed herein into a subject by a method or route which results in at least partial delivery of the agent at a desired site. Pharmaceutical compositions comprising agents as disclosed herein can be administered by any appropriate route which results in an effective treatment in the subject.

The term "statistically significant" or "significantly" refers to statistical significance and generally means a two standard deviation (2SD) or greater difference.

Other than in the operating examples, or where otherwise indicated, all numbers expressing quantities of ingredients or reaction conditions used herein should be understood as modified in all instances by the term "about." The term "about" when used in connection with percentages can mean±1%.

As used herein, the term "comprising" means that other elements can also be present in addition to the defined elements presented. The use of "comprising" indicates inclusion rather than limitation.

The term "consisting of" refers to compositions, methods, and respective components thereof as described herein, which are exclusive of any element not recited in that description of the embodiment.

As used herein the term "consisting essentially of" refers to those elements required for a given embodiment. The term permits the presence of additional elements that do not materially affect the basic and novel or functional characteristic(s) of that embodiment of the technology.

The singular terms "a," "an," and "the" include plural referents unless context clearly indicates otherwise. Similarly, the word "or" is intended to include "and" unless the context clearly indicates otherwise. Although methods and materials similar or equivalent to those described herein can be used in the practice or testing of this disclosure, suitable methods and materials are described below. The abbreviation, "e.g." is derived from the Latin exempli gratia, and is used herein to indicate a non-limiting example. Thus, the abbreviation "e.g." is synonymous with the term "for example."

In some embodiments of any of the aspects, the disclosure described herein does not concern a process for cloning human beings, processes for modifying the germ line genetic identity of human beings, uses of human embryos for industrial or commercial purposes or processes for modifying the genetic identity of animals which are likely to cause them suffering without any substantial medical benefit to man or animal, and also animals resulting from such processes.

Other terms are defined within the description of the various aspects and embodiments of the technology of the following.

BRIEF DESCRIPTION OF DRAWINGS

FIGS. 1A-1M show identification of efficient BCL11A enhancer guide RNAs for HbF induction and amelioration of β-thalassemia. (FIG. 1A) Eight modified synthetic (MS) sgRNAs targeting BCL11A enhancer DHS h+58 functional core marked with blue arrows. GATA and Half E-box motifs marked respectively with red or green. (FIG. 1B) Editing efficiency of Cas9 coupled with various sgRNAs (each targeting BCL11A enhancer with exception of AAVS1) in CD34+ HSPCs measured by TIDE analysis. (FIG. 1C) β-like globin expression by RT-qPCR analysis in erythroid cells in vitro differentiated from RNP edited CD34+ HSPCs. (FIG. 1D) Correlation of BCL11A mRNA expression determined by RT-qPCR versus HbF by HPLC. Black dots represent samples edited with Cas9 coupled with different sgRNAs. The Pearson correlation coefficient (r) is shown. (FIG. 1E) Editing efficiency as measured by TIDE analysis of Cas9: sgRNA RNP targeting AAVS1 or BCL11A DHS h+58 functional core (Enh) with MS-sgRNA-1617 in CD34+ HSPCs from β-thalassemia patients or healthy donors ($\beta^A\beta^A$) of indicated β-globin genotypes. (FIG. 1F-1H) β-like globin expression by RT-qPCR normalized by α-globin (P=0.00017 for BCL11A enhancer as compared to AAVS1 edited for all comparisons as determined by unpaired two-tailed Student's t tests), and HbF induction by HPLC analysis in erythroid cells in vitro differentiated. i, Enucleation of in vitro differentiated erythroid cells. (FIG. 1J) Cell size measured by relative forward scatter intensity. (FIG. 1K) Representative microscopy image showing rounder and more uniform appearance of enucleated erythroid cells following BCL11A enhancer editing. Blue arrow indicates poikilocytes. Bar=15 μm. (FIG. 1L-1M) Imaging flow cytometry was used to establish a circularity index (FIG. 1L) and then quantify (FIG. 1M) circularity of enucleated erythroid cells. Bar=5 μm. In all panels, data are plotted as mean±SD and analyzed using unpaired two-tailed Student's t tests. Data are representative of three biologically independent replicates.

(FIG. 2A) Schematic of 3×NLS-SpCas9 protein (1425 aa), with a c-Myc-like nuclear localization signal (NLS) at the N-terminus and SV40 and Nucleoplasmin NLSs at the C-terminus. (FIG. 2O) Indel frequencies within human BCL11A enhancer in BM 16 weeks after secondary transplantation. Median of each group with 3 to 9 mice in h, j-o is shown as line. Data are plotted as mean±SD for (FIG. 2B-2E, 2I) and analyzed using unpaired two-tailed Student's t tests. Data are representative of three biologically independent replicates.

FIG. 3A-3L show editing BCL11A enhancer in SCD patient HSCs prevents sickling. (FIG. 3A) Editing efficiency of 3×NLS-Cas9 coupled with MS-sgRNA-AAVS1 for control and -1617 for BCL11A enhancer editing in ($\beta^S\beta^S$ CD34$^+$ HSPCs as measured by TIDE analysis. (FIG. 3B) β-like globin expression in erythroid cells in vitro differentiated. Error bars indicate standard deviation (n=3 replicates). (FIG. 3C) Genotyping and β-like globin expression analysis of erythroid cells derived from single colonies derived from unedited (ctr) or edited $\beta^S\beta^S$ CD34$^+$ HSPCs. Error bars indicate standard deviation (n=3 technical replicates per colony). (FIG. 3D, 3E) NBSGW mice were transplanted with 3×NLS-Cas9 RNP (coupled with MS-sgRNA-1617) edited $\beta^S\beta^S$ CD34$^+$ HSPCs from two independent donors ($\beta^S\beta^S_{\#1}$ and $\beta^S\beta^S_{\#2}$). BM were collected 16 weeks after transplantation and analyzed for human cell chimerism (FIG. 3D) in BM, as well as the indel frequencies determined by TIDE analysis (FIG. 3E). (FIG. 3F-3H) RT-qPCR analysis of BCL11A expression in sorted human B cells (FIG. 3F) or human erythroid cells (FIG. 3G) and β-like globin expression in human erythroid cells sorted from BM (FIG. 3H). (FIG. 3I) BM from one mouse each engrafted with unedited control or edited cells ($\beta_S\beta^S_{\#1}$) from control mouse shown with black circle and edited mouse with blue triangle symbols in (FIG. 3D, 3E) were transplanted to four secondary NBSGW mice. After 16 weeks, BM was analyzed for human cell chimerism by flow cytometry. (FIG. 3J) Indel frequencies within human BCL11A enhancer in BM 16 weeks after secondary transplantation. Median of each group with 3 to 4 mice in d-j is shown as line. (FIG. 3K) Phase-contrast microscopy imaging of enucleated erythroid cells in vitro differentiated from BM of NBSGW mice transplanted with unedited or BCL11A enhancer edited $\beta^S\beta^S_{\#1}$ CD34$^+$ HSPCs with and without sodium metabisulfite (MBS) treatment. Cells with sickled cell morphology are indicated with red arrows. Bar=10 μm. (FIG. 3L) Analysis of in vitro sickling. Images were taken every 1 minute after MBS treatment. Result shown as percent sickled cells at each time point. Data are plotted as mean±SD for (FIG. 3A-3C) and analyzed using unpaired two-tailed Student's t tests. Data are representative of three biologically independent replicates.

(FIG. 4A) Correlation of indel frequencies of input HSPCs to indel frequencies of engrafted human cells in mice BM after 16 weeks. Each dot represents average indel frequencies of mice transplanted with the same input HSPCs. Legend denoting transplant is same as in (c). The Pearson correlation coefficient (r) is shown. (FIG. 4B) Indel spectrum of input cells from healthy donor $\beta^A\beta^A_{\#2}$ electroporated with 2×NLS-Cas9 (coupled with sgRNA-1617) supplemented with 2% glycerol and engrafted 16 week BM human cells. (FIG. 4C) Relative loss of edited alleles repaired by MMEJ and gain of edited alleles repaired by NHEJ in mice BM 16 weeks after transplant. The indel spectrum was determined by deep sequencing analysis. Indel length from −8 to +6 bp was calculated as NHEJ, and from −9 to −20 bp as MMEJ. These data comprise 28 mice transplanted with 8 BCL11A enhancer edited inputs and 5 mice transplanted with 2 AAVS1 edited inputs. Median of each group is shown as line, P<0.005, **P<0.0001 as determined by Kolmogorov-Smirnov test. (FIG. 4D-4G) Indel spectra of HSPCs stained and sorted 2 h after RNP electroporation with 3×NLS-Cas9 with sgRNA-1617. HSPCs prestimulated for 24 h prior to electroporation. HSPCs stained with CD34, CD38, CD90, CD45RA in (FIG. 4D) and with Pyronin Y, Hoechst 33342 in (FIG. 4E). Indels determined by Sanger sequencing with TIDE analysis after culturing cells for 4 days after sort. Relative loss of edited alleles repaired by MMEJ and gain of edited alleles repaired by NHEJ at BCL11A enhancer and AAVS1 in sorted enriched HSCs (FIG. 4F) or G0 phase cells (FIG. 4G) shown. Data are plotted as mean±SD for (FIG. 4F, 4G) and analyzed using unpaired two-tailed Student's t tests. Data are representative of three biologically independent replicates.

(FIG. 5A) Comparison of indel frequencies with in vitro transcribed (IVT), synthetic (syn) and modified synthetic (MS) sgRNAs in CD34$^+$ HSPCs by TIDE analysis. (FIG. 5G) Summary of deep sequencing data derived from the Cas9 RNP (coupled with MS-sgRNA-1617) edited CD34$^+$ HSPCs. Asterisk indicates unedited allele. (FIG. 5M, 5N) Genotyping and HbF level by HPLC of clonal erythroid cells derived from single CD34$^+$ cells from two independent healthy donors $\beta^A\beta^A_{\#1}$ in (FIG. 5M) and $\beta^A\beta^A_{\#3}$ in (FIG. 5N)) edited with MS-sgRNA-1617.

(FIG. 6A) Frequency distribution of alleles with and without indels (shown in blue and red respectively) from deep sequencing of CD34$^+$ HSPCs edited with 2×NLS-Cas9 RNP with indicated MS-sgRNAs targeting BCL11A enhancer. (FIG. 5B) Correlation of indel frequencies by deep sequencing versus indel frequencies by TIDE analysis. The Pearson correlation coefficient (r) is shown.

(FIG. 7A) Mouse bone marrow (BM) was analyzed for human cell chimerism by flow cytometry 16 weeks after transplantation, defined as % hCD45+/(% hCD45++% mCD45+) cells. Each symbol represents a mouse, and mean for each group is shown. (FIG. 7B) Indels at the human BCL11A enhancer were determined by TIDE analysis in the input HSPCs prior to transplant and in the mouse bone marrow 16 weeks after transplant. Each engrafted dot represents one mouse, and mean for each group is shown. (FIG. 7C) BM collected 16 weeks after transplantation was analyzed by flow cytometry for multi-lineage reconstitution (calculated as percentage of hCD45+ cells). (FIG. 7D) BM collected 16 weeks after transplantation was analyzed by flow cytometry for CD235a+ erythroid cells (calculated as percentage of mCD45−hCD45− cells). (FIG. 7E-7G) Gene expression analysis by RT-qPCR in human cells (from donor $\beta^A\beta^A_{\#2}$) from BM of engrafted mice. BCL11A expression normalized by CAT in human B cells (FIG. 7E) or human erythroid cells (FIG. 7F) sorted from BM of engrafted mice, and β-like globin expression (FIG. 7G) by RT-qPCR in human erythroid cells sorted from BM. (FIG. 7H) BM from one engrafted mouse with unedited control or edited cells (from donor $\beta^A\beta^A_{\#1}$) were transplanted to three secondary NBSGW mice each (control mouse shown with black circle and edited mouse with green diamond symbol in (FIG. 7A, 7B, 7D). After 16 weeks, BM was analyzed for human cell chimerism by flow cytometry. (FIG. 7I) Indel frequencies within human BCL11A enhancer in BM 16 weeks after secondary transplantation. Each symbol represents an individual recipient mouse. Data are plotted as mean±SD for (FIG. 7C). Median of each group with 2 to 4 mice is shown as line for the other panels.

(FIG. 8A) Dose dependent viability enhancement with glycerol or glycine after electroporation. 0.27 M=2% glycerol, 0.2 M=1.5% glycine. (FIG. 8B) Quantification of editing frequency from deep sequencing of CD34+ HSPCs edited with 3×NLS-Cas9 RNP with MS-sgRNA-1617. (FIG. 8C) Length distribution of alleles with and without indels (shown in blue and red respectively) from deep sequencing of the 3×NLS-Cas9 RNP with ms-sgRNA-1617. (FIG. 8D, 8E) Reduction of BCL11A mRNA by RT-qPCR or protein by western blot after editing of human BCL11A enhancer with 2×NLS-Cas9 or 3×NLS-Cas9 RNP with MS-sgRNA-AAVS1 or -1617 on various days of in vitro differentiation. Relative areas under curve (AUCs) are indicated. (FIG. 8F, 8G) β-like globin expression by RT-qPCR and HbF level by HPLC in erythroid cells in vitro differentiated from 3×NLS-Cas9 RNP coupled with MS-sgRNA-1617 edited CD34+ HSPCs. All data represent the mean±SD. Statistically significant differences are indicated as follows: *P<0.05 as determined by unpaired t test. P=0.0152 for (FIG. 8F) and 0.0443 for (FIG. 8G). In all panels, data are plotted as mean±SD and analyzed using unpaired two-tailed Student's t tests. Data are representative of three biologically independent replicates.

(FIG. 9A-9D) NBSGW mice were transplanted with 3×NLS-Cas9 RNP with MS-sgRNA-1617 edited healthy donor CD34+ HSPCs 2 h (day 0), 24 h (day 1) or 48 h (day 2) after electroporation. BM were collected 16 weeks after transplantation and analyzed by flow cytometry for human cell chimerism (FIG. 9A), multilineage reconstitution (FIG. 9B) or human erythroid cells (FIG. 9C) in BM, as well as indel frequencies determined by TIDE analysis (FIG. 9D). (FIG. 9E-9H) NBSGW mice were transplanted with 3×NLS-Cas9 RNP with MS-sgRNA-1617 edited healthy donor CD34+ HSPCs supplemented with 2%, 4% or 6% of glycerol for electroporation. BM were collected 16 weeks after transplantation and analyzed by flow cytometry for human cell chimerism (FIG. 9E), multilineage reconstitution (FIG. 9F) or human erythroid cells (FIG. 9G) in BM, as well as the indel frequencies determined by TIDE analysis (FIG. 9H). (FIG. 9I) Multi-lineage reconstitution analysis of BM collected from mice engrafted with control or edited CD34+ HSPCs (from donor $\beta^A\beta^A_{\#4}$). Error bars indicate standard deviation. Data are plotted as mean±SD for (FIG. 9B, 9F, 9I). Median of each group with 1 to 3 mice is shown as line for the other panels.

(FIG. 10A) Off-target sites detected by CIRCLE-seq for MS-sgRNA-1617 targeting human BCL11A enhancer. (FIG. 10B) Deep sequencing analysis of potential off-target sites detected by CIRCLE-seq or in silico computational prediction within human CD34+ HSPCs edited by 2×NLS-Cas9 or 3×NLS-Cas9 RNP (coupled with MS-sgRNA-1617) targeting BCL11A enhancer. On-target sequence is at the BCL11A enhancer. Dotted line at 0.1% denotes sensitivity of deep sequencing to detect indels. c, RT-qPCR analysis of p21 expression after gene editing. Relative expression to GAPDH is shown. Data are plotted as mean±SD and representative of three biologically independent replicates.

(FIG. 11E) Editing efficiency of 3×NLS-Cas9 coupled with MS-sgRNA-AAVS1 for control and -1617 for BCL11A enhancer editing in $\beta^S\beta^S_{\#2}$ CD34+ HSPCs as measured by TIDE analysis. (FIG. 11F) β-like globin expression by RT-qPCR analysis in erythroid cells in vitro differentiated from RNP edited $\beta^S\beta^S_{\#2}$ CD34+ HSPCs. Error bars indicate standard deviation (n=3 replicates). (FIG. 11G) Multilineage reconstitution analysis of BM collected from mice engrafted with control or edited CD34+ HSPCs (from donor $\beta^S\beta^S_{\#2}$). (FIG. 11H) Analysis of in vitro sickling of unedited control or edited enucleated $\beta^S\beta^S_{\#2}$ erythroid cells. Images were taken every 1 minute after MBS treatment. Result shown as percent sickled cells at each time point. Data are plotted as mean±SD for (FIG. 11B, 11, 11E, 11F, 11G). Median of each group with 1 to 3 mice is shown as line for the other panels.

(FIG. 12A) Indel frequencies of indicated input HSPCs and engrafted human cells in 16 week BM. (FIG. 12B) Correlation between input cell number and human engraftment rates in 16 week BM. (FIG. 12C) Correlation of BCL11A mRNA versus γ-globin mRNA determined by RT-qPCR. Black dots represent erythroid cells from CD34+ HSPCs edited with SpCas9 coupled with various sgRNAs differentiated in vitro without engraftment; red dots represent erythroid cells sorted from mice BM engrafted from human CD34+ HSPCs edited with SpCas9 coupled with MS-sgRNA-1617. The Pearson correlation coefficient (r) is shown. (FIG. 12D) BM cells (engrafted from donor $β^Aβ^A_{\#1}$ and $β^Sβ^S_{\#1}$) collected from engrafted mice were in vitro differentiated to human erythroid cells for HbF level analysis by HPLC. Each dot represents erythroid cells differentiated from BM of one mouse, and mean±SD for each group is shown. (FIG. 12E) Relative loss of indels in HSC-enriched CD34+ CD38− CD90+ CD45RA− sorted population as compared to bulk pre-sorted HSPCs after editing by 2 µM or 5 µM RNP. All data represent the mean±SD. Statistically significant differences are indicated as follows: **P<0.0001, P<0.01 (P=0.0046) as determined by unpaired t test. (FIG. 12F) Comparison of β-like globin expression by RT-qPCR between erythroid cells in vitro differentiated from RNP edited CD34+ HSPCs (pre-engraftment) and engrafted bone marrow (post-engraftment). Statistically significant differences are indicated as follows: **P<0.0001, *P<0.001 (P=0.0006), **P<0.01 (P=0.0092) as determined by unpaired t test. In all panels, data are plotted as mean±SD and analyzed using unpaired two-tailed Student's t tests. Data are from indicated number of mice for (FIG. 12A, 12B, 12C) or representative of three biologically independent replicates for (FIG. 12C, 12E, 12F).

FIG. 13A-13G show indel spectrums of engrafted bone marrow and corresponding input cells. Indel spectrums of engrafted bone marrow (BM) and corresponding input cells from four donors electroporated with 2×NLS-Cas9 or 3×NLS-Cas9 coupled with MS-sgRNA-1617 (FIG. 13A) or -AAVS1 (FIG. 13B) supplemented with different concentration of glycerol (0% G to 6% G). (FIG. 13C) Relative loss of edited alleles repaired by MMEJ and gain of edited alleles repaired by NHEJ in mice BM 16 weeks after transplant. The indel spectrum was determined by TIDE analysis. Indel length from −8 to +6 bp was calculated as NHEJ, and from −9 to −20 bp as MMEJ. These data comprise 28 mice transplanted with 8 BCL11A enhancer edited inputs and 5 mice transplanted with 2 AAVS1 edited inputs. Median of each group is shown as line, P<0.005, **P<0.0001 as determined by Kolmogorov-Smirnov test. (FIG. 13D, 13E) Summary of most frequent indels by deep sequencing of bone marrow cells from primary recipient (FIG. 13D) and secondary recipient (FIG. 13E) engrafted with BCL11A enhancer edited CD34+ HSPCs. Asterisk indicates unedited allele. (FIG. 13F, 13G) Indel spectra of HSPCs stained and sorted 2 h after RNP electroporation with 3×NLS-Cas9 with sgRNA-AAVS1. HSPCs prestimulated for 24 h prior to electroporation. HSPCs stained with CD34, CD38, CD90, CD45RA in (FIG. 13F) and with Pyronin Y, Hoechst 33342 in (FIG. 13F). Indels determined by Sanger sequencing with TIDE analysis after culturing cells for 4 days after sort. Data are representative of three biologically independent replicates.

FIG. 14A-14D show Flow cytometry of CD34+ HSPCs with 24 hours of culture. Cryopreserved G-CSF mobilized CD34+ HSPCs were stained with CD34, CD38, CD90, and CD45RA antibodies (in FIG. 14A), or stained with Hoechst 33342 and Pyronin Y (in FIG. 14B) at 0 hours following thaw or after 24 hours in culture with SCF, TPO and FLT3-L. HSPCs were electroporated with RNP with 3×-NLS-SpCas9 with BCL11A enhancer or AAVS1 targeting sgRNA. After 2 hour recovery, cells were stained with CD34, CD38, CD90, and CD45RA or with Hoechst 33342 and Pyronin Y, and sorted according to gates as shown in FIG. 14C, 14D.

DETAILED DESCRIPTION

CRISPR System

Figure 1A:
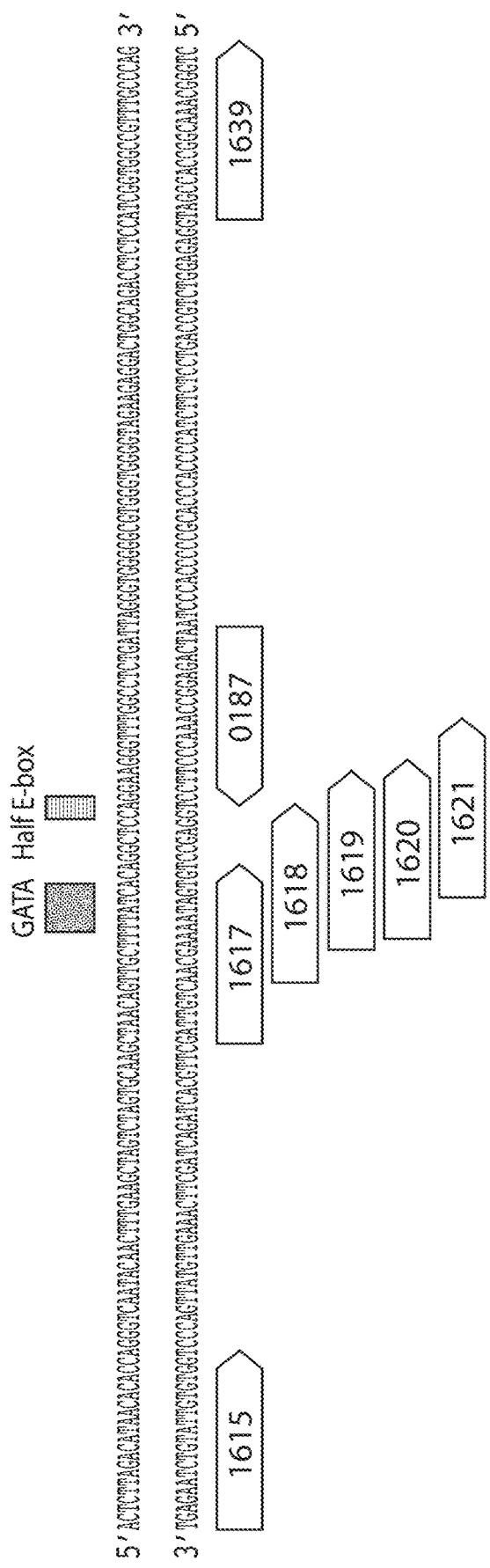
Figure 1D:
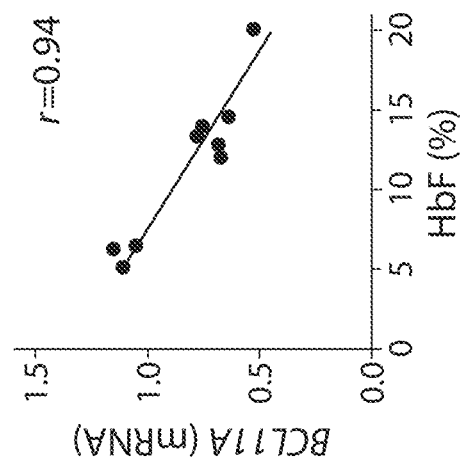
Figure 1C:
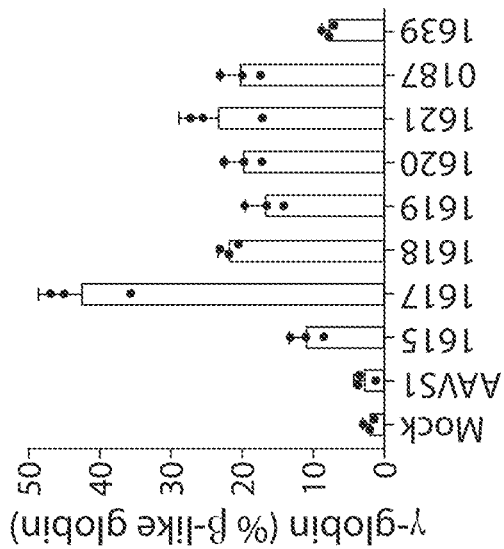
Figure 1B:
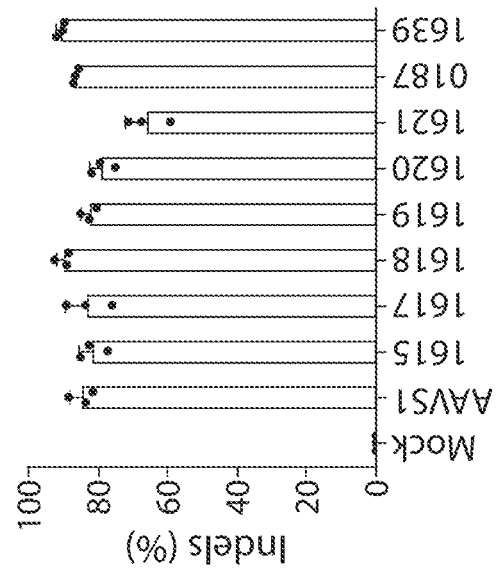
Figure 1I:
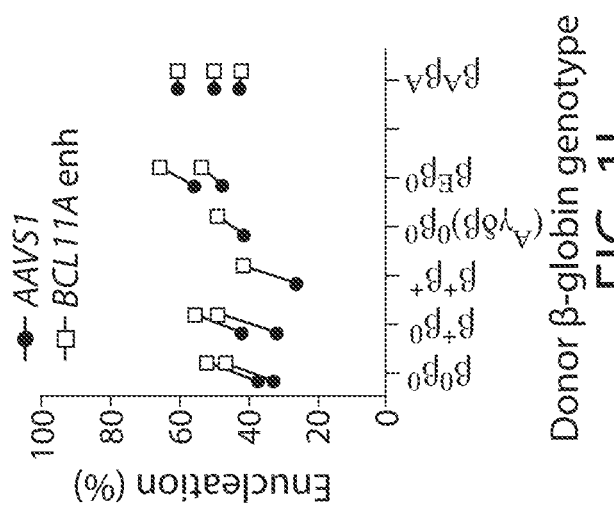

The invention described herein improves on the widely-used CRISPR system for the use of gene-editing in the cell. Data presented herein show that the traditional CRISPR enzyme, Cas9, has reduced efficacy in a quiescent cell, for example a stem cell. By introducing a unique series of nuclear localization signal sequences to the Cas9 sequence, the inventors have found that they could unexpectedly, and dramatically increase the gene-editing capacity of the CRISPR system in a hematopoietic stem cell.

Others have previously shown that the addition of a nuclear localization signal sequence to a CRISPR enzyme effects its DNA cleavage capabilities, however, due to the vast number of known nuclear localization signal sequences, it would be impossible to predict which combination would yield the greatest effect. Work described herein shows a novel NLS-CRISPR enzyme fusion in which the CRISPR enzyme Cas9 has a c-Myc-like nuclear localization signal sequence fused to its amino terminus and an SV40 nuclear localization signal sequence and nucleoplasmin bipartate nuclear localization signal sequence fused to its carboxyl terminus. Moreover, a unique set of linkers are used within the sequence of this NLS-CRISPR enzyme fusion. Data presented herein highlight the unexpected gene-efficacy of this novel NLS-CRISPR enzyme fusion. In particular, these data demonstrate the extremely high efficiency of gene editing in hematopoietic stem cells. Finally, it is specifically contemplated that this unique series of nuclear localization signal sequences and linkers exemplified herein could be applied to other CRISPR enzymes to increase their gene-editing efficacy.

In general, "CRISPR system" refers collectively to transcripts and other elements involved in the expression of or directing the activity of CRISPR-associated ("Cas") genes, including sequences encoding a Cas gene, a tracr (trans-activating CRISPR) sequence (e.g. tracrRNA or an active partial tracrRNA), a tracr-mate sequence (encompassing a "direct repeat" and a tracrRNA-processed partial direct repeat in the context of an endogenous CRISPR system), a guide sequence (also referred to as a "spacer" in the context of an endogenous CRISPR system), or other sequences and transcripts from a CRISPR locus. In some embodiments, one or more elements of a CRISPR system is derived from a type I, type II, or type III CRISPR system. In some embodiments, one or more elements of a CRISPR system is derived from a particular organism comprising an endogenous CRISPR system, such as *Streptococcus pyogenes*. In general, a CRISPR system is characterized by elements that promote the formation of a CRISPR complex at the site of a target sequence (also referred to as a protospacer in the context of an endogenous CRISPR system). In the context of formation of a CRISPR complex, "target sequence" refers to a sequence to which a guide sequence is designed to have complementarity, where hybridization between a target sequence and a guide sequence promotes the formation of a CRISPR complex. Full complementarity is not necessarily required, provided there is sufficient complementarity to cause hybridization and promote formation of a CRISPR complex. A target sequence may comprise any polynucleotide, such as DNA or RNA polynucleotides. In some embodiments, a target sequence is located in the nucleus or cytoplasm of a cell. In some embodiments, the target sequence may be within an organelle of a eukaryotic cell, for example, mitochondrion or chloroplast. A sequence or template that may be used for recombination into the targeted locus comprising the target sequences is referred to as an "editing template" or "editing polynucleotide" or "editing sequence". In aspects of the invention, an exogenous template polynucleotide may be referred to as an editing template. In an aspect of the invention the recombination is homologous recombination.

Typically, in the context of an endogenous CRISPR system, formation of a CRISPR complex (comprising a guide sequence hybridized to a target sequence and complexed with one or more Cas proteins) results in cleavage of one or both strands in or near (e.g. within 1, 2, 3, 4, 5, 6, 7, 8, 9, 10, 20, 50, or more base pairs from) the target sequence. Without wishing to be bound by theory, the tracr sequence, which may comprise or consist of all or a portion of a wild-type tracr sequence (e.g. about or more than about 20, 26, 32, 45, 48, 54, 63, 67, 85, or more nucleotides of a wild-type tracr sequence), may also form part of a CRISPR complex, such as by hybridization along at least a portion of the tracr sequence to all or a portion of a tracr mate sequence that is operably linked to the guide sequence. In some embodiments, the tracr sequence has sufficient complementarity to a tracr mate sequence to hybridize and participate in formation of a CRISPR complex. As with the target sequence, it is believed that complete complementarity is not needed, provided there is sufficient to be functional. In some embodiments, the tracr sequence has at least 50%, 60%, 70%, 80%, 90%, 95% or 99% of sequence complementarity along the length of the tracr mate sequence when optimally aligned. In some embodiments, one or more vectors driving expression of one or more elements of a CRISPR system are introduced into a cell such that expression of the elements of the CRISPR system direct formation of a CRISPR complex at one or more target sites. For example, an NLS-Cas fusion enzyme, a guide sequence linked to a tracr-mate sequence, and a tracr sequence could each be operably linked to separate regulatory elements on separate vectors. Alternatively, two or more of the elements expressed from the same or different regulatory elements, may be combined in a single vector, with one or more additional vectors providing any components of the CRISPR system not included in the first vector. CRISPR system elements that are combined in a single vector may be arranged in any suitable orientation, such as one element located 5' with respect to ("upstream" of) or 3' with respect to ("downstream" of) a second element. The coding sequence of one element may be located on the same or opposite strand of the coding sequence of a second element, and oriented in the same or opposite direction. In some embodiments, a single promoter drives expression of a transcript encoding a CRISPR enzyme and one or more of the guide sequence, tracr mate sequence (optionally operably linked to the guide sequence), and a tracr sequence embedded within one or more intron sequences (e.g. each in a different intron, two or more in at least one intron, or all in a single intron). In some embodiments, the CRISPR enzyme, guide sequence, tracr mate sequence, and tracr sequence are operably linked to and expressed from the same promoter.

NLS-CRISPR Enzyme Fusion

In one embodiment, the CRISPR enzyme is a Cas protein. Non-limiting examples of Cas proteins include Cpf1, C2c1, C2c3, Cas12a, Cas12b, Cas12c, Cas12d, Cas12e, Cas13a, Cas13b, and Cas13c. Cas1, Cas1B, Cas2, Cas3, Cas4, Cas5, Cas6, Cas7, Cas8, Cas9 (also known as Csn1 and Csx12), Cas100, Csy1, Csy2, Csy3, Cse1, Cse2, Csc1, Csc2, Csa5, Csn2, Csm2, Csm3, Csm4, Csm5, Csm6, Cmr1, Cmr3, Cmr4, Cmr5, Cmr6, Csb1, Csb2, Csb3, Csx17, Csx14, Csx10, Csx16, CsaX, Csx3, Csx1, Csx15, Csf1, Csf2, Csf3, Csf4, Cpf1, C2c1, C2c3, Cas12a, Cas12b, Cas12c, Cas12d, Cas12e, Cas13a, Cas13b, and Cas13c homologs thereof, or modified versions thereof. These enzymes are known; for example, the amino acid sequence of *S. pyogenes* Cas9 protein may be found in the SwissProt database under accession number Q99ZW2. In some embodiments, the CRISPR enzyme has DNA cleavage activity, such as Cas9. In some embodiments the CRISPR enzyme is Cas9, and may be Cas9 from *S. pyogenes* or *S. pneumoniae*. In some embodiments, the CRISPR enzyme directs cleavage of one or both strands at the location of a target sequence, such as within the target sequence and/or within the complement of the target sequence. In some embodiments, the CRISPR enzyme directs cleavage of one or both strands within about 1, 2, 3, 4, 5, 6, 7, 8, 9, 10, 15, 20, 25, 50, 100, 200, 500, or more base pairs from the first or last nucleotide of a target sequence.

Various aspects herein provide a CRISPR enzyme comprising at least one nuclear localization signal sequences (NLSs). In some embodiments, the CRISPR enzyme comprises at least one NLSs at or near the amino-terminus, at least one NLSs at or near the carboxy-terminus, or a combination of these (e.g. one or more NLS at the amino-terminus and one or more NLS at the carboxy terminus). When more than one NLS is present, each may be selected independently of the others, such that a single NLS may be present in more than one copy and/or in combination with one or more other NLSs present in one or more copies. Typically, an NLS consists of one or more short sequences of positively charged lysines or arginines exposed on the protein surface, but other types of NLS are known. Non-limiting examples of NLSs include an NLS sequence derived from: the NLS of the SV40 virus large T-antigen, having the amino acid sequence PKKKRKV (SEQ ID NO: 1); the NLS from nucleoplasmin (e.g. the nucleoplasmin bipartite NLS with the sequence KRPAATKKAGQAKKKK (SEQ ID NO: 2)); the c-myc NLS having the amino acid sequence PAAKRVKLD (SEQ ID NO: 3) or RQRR-NELKRSP (SEQ ID NO: 4); the hRNPA1 M9 NLS having the sequence NQSSNFGPMKGGNFG-GRSSGPYGGGGQYFAKPRNQGGY (SEQ ID NO: 5); the sequence RMRIZFKNKGKDTAELRRRRVEVS-VELRKAKKDEQILKRRNV (SEQ ID NO: 6) of the IBB domain from importin-alpha; the sequences VSRKRPRP (SEQ ID NO: 7) and PPKKARED (SEQ ID NO: 8) of the myoma T protein; the sequence PQPKKKPL (SEQ ID NO: 9) of human p53; the sequence SALIKKKKKMAP (SEQ ID NO: 10) of mouse c-abl IV; the sequences DRLRR (SEQ ID NO: 11) and PKQKKRK (SEQ ID NO: 12) of the influenza virus NS1; the sequence RKLKKKIKKL (SEQ ID NO: 13) of the Hepatitis virus delta antigen; the sequence REKKKFLKRR (SEQ ID NO: 14) of the mouse Mx1 protein; the sequence KRKGDEVDGVDEVAKKKSKK (SEQ ID NO: 15) of the human poly(ADP-ribose) polymerase; the sequence RKCLQAGMNLEARKTKK (SEQ ID NO: 16) of the steroid hormone receptors (human) glucocorticoid; the sequence GKRKLITSEEERSPAKR-GRKS (SEQ ID NO: 17) of 53BP1; the sequence KRKRRP (SEQ ID NO. 18) of BRCA1; the sequence KRKGSPCDT-LASSTEKRRRE (SEQ ID NO. 19) of SRC-1; and the sequence KRNFRSALNRKE (SEQ ID NO: 20) of IRF3.

In one embodiment, the synthetic nucleic acid comprises, consists of, or consists essentially of the sequence of SEQ ID NO: 21.

```
                                                            (SEQ ID NO: 21)
CCGGCAGCTAAGAAAAAGAAACTGGATGGCAGCGTCGACATGGATAAGAAATACTCAATAGGCTTA

GATATCGGCACAAATAGCGTCGGATGGGCGGTGATCACTGATGAATATAAGGTTCCGTCTAAAAAG

TTCAAGGTTCTGGGAAATACAGACCGCCACAGTATCAAAAAAAATCTTATAGGGGCTCTTTTATTT

GACAGTGGAGAGACAGCGGAAGCGACTCGTCTCAAACGGACAGCTCGTAGAAGGTATACACGTCGG

AAGAATCGTATTTGTTATCTACAGGAGATTTTTTCAAATGAGATGGCGAAAGTAGATGATAGTTTC

TTTCATCGACTTGAAGAGTCTTTTTTGGTGGAAGAAGACAAGAAGCATGAACGTCATCCTATTTTT

GGAAATATAGTAGATGAAGTTGCTTATCATGAGAAATATCCAACTATCTATCATCTGCGAAAAAAA

TTGGTAGATTCTACTGATAAAGCGGATTTGCGCTTAATCTATTTGGCCTTAGCGCATATGATTAAG

TTTCGTGGTCATTTTTTGATTGAGGGAGATTTAAATCCTGATAATAGTGATGTGGACAAACTATTT

ATCCAGTTGGTACAAACCTACAATCAATTATTTGAAGAAAACCCTATTAACGCAAGTGGAGTAGAT

GCTAAAGCGATTCTTTCTGCACGATTGAGTAAATCAAGACGATTAGAAAATCTCATTGCTCAGCTC

CCCGGTGAGAAGAAAAATGGCTTATTTGGGAATCTCATTGCTTTGTCATTGGGTTTGACCCCTAAT

TTTAAATCAAATTTTGATTTGGCAGAAGATGCTAAATTACAGCTTTCAAAAGATACTTACGATGAT

GATTTAGATAATTTATTGGCGCAAATTGGAGATCAATATGCTGATTTGTTTTTGGCAGCTAAGAAT

TTATCAGATGCTATTTTACTTTCAGATATCCTAAGAGTAAATACTGAAATAACTAAGGCTCCCCTA

TCAGCTTCAATGATTAAACGCTACGATGAACATCATCAAGACTTGACTCTTTTAAAAGCTTTAGTT

CGACAACAACTTCCAGAAAAGTATAAAGAAATCTTTTTTGATCAATCAAAAAACGGATATGCAGGT

TATATTGATGGGGGAGCTAGCCAAGAAGAATTTTATAAATTTATCAAACCAATTTTAGAAAAAATG

GATGGTACTGAGGAATTATTGGTGAAACTAAATCGTGAAGATTTGCTGCGCAAGCAACGGACCTTT

GACAACGGCTCTATTCCCCATCAAATTCACTTGGGTGAGCTGCATGCTATTTTGAGAAGACAAGAA

GACTTTTATCCATTTTTAAAGACAATCGTGAGAAGATTGAAAAAATCTTGACTTTTCGAATTCCT

TATTATGTTGGTCCATTGGCGCGTGGCAATAGTCGTTTTGCATGGATGACTCGGAAGTCTGAAGAA

ACAATTACCCCATGGAATTTTGAAGAAGTTGTCGATAAAGGTGCTTCAGCTCAATCATTTATTGAA

CGCATGACAAACTTTGATAAAAATCTTCCAAATGAAAAAGTACTACCAAAACATAGTTTGCTTTAT

GAGTATTTACGGTTTATAACGAATTGACAAAGGTCAAATATGTTACTGAAGGAATGCGAAAACCA

GCATTTCTTCAGGTGAACAGAAGAAAGCCATTGTTGATTTACTCTTCAAAACAAATCGAAAGTA

ACCGTTAAGCAATTAAAAGAAGATTATTTCAAAAAAATAGAATGTTTTGATAGTGTTGAAATTTCA
```

```
                          -continued
GGAGTTGAAGATAGATTTAATGCTTCATTAGGTACCTACCATGATTTGCTAAAAATTATTAAAGAT

AAAGATTTTTTGGATAATGAAGAAAATGAAGATATCTTAGAGGATATTGTTTTAACATTGACCTTA

TTTGAAGATAGGGAGATGATTGAGGAAAGACTTAAAACATATGCTCACCTCTTTGATGATAAGGTG

ATGAAACAGCTTAAACGTCGCCGTTATACTGGTTGGGGACGTTTGTCTCGAAAATTGATTAATGGT

ATTAGGGATAAGCAATCTGGCAAAACAATATTAGATTTTTTGAAATCAGATGGTTTTGCCAATCGC

AATTTTATGCAGCTGATCCATGATGATAGTTTGACATTTAAAGAAGACATTCAAAAAGCACAAGTG

TCTGGACAAGGCGATAGTTTACATGAACATATTGCAAATTTAGCTGGTAGCCCTGCTATTAAAAAA

GGTATTTTACAGACTGTAAAAGTTGTTGATGAATTGGTCAAAGTAATGGGGCGGCATAAGCCAGAA

AATATCGTTATTGAAATGGCACGTGAAAATCAGACAACTCAAAAGGGCCAGAAAAATTCGCGAGAG

CGTATGAAACGAATCGAAGAAGGTATCAAAGAATTAGGAAGTCAGATTCTTAAAGAGCATCCTGTT

GAAAATACTCAATTGCAAATGAAAAGCTCTATCTCTATTATCTCCAAAATGGAAGAGACATGTAT

GTGGACCAAGAATTAGATATTAATCGTTTAAGTGATTATGATGTCGATCACATTGTTCCACAAAGT

TTCCTTAAAGACGATTCAATAGACAATAAGGTCTTAACGCGTTCTGATAAAAATCGTGGTAAATCG

GATAACGTTCCAAGTGAAGAAGTAGTCAAAAAGATGAAAAACTATTGGAGACAACTTCTAAACGCC

AAGTTAATCACTCAACGTAAGTTTGATAATTTAACGAAAGCTGAACGTGGAGGTTTGAGTGAACTT

GATAAAGCTGGTTTTATCAAACGCCAATTGGTTGAAACTCGCCAAATCACTAAGCATGTGGCACAA

ATTTTGGATAGTCGCATGAATACTAAATACGATGAAAATGATAAACTTATTCGAGAGGTTAAAGTG

ATTACCTTAAAATCTAAATTAGTTTCTGACTTCCGAAAAGATTTCCAATTCTATAAAGTACGTGAG

ATTAACAATTACCATCATGCCCATGATGCGTATCTAAATGCCGTCGTTGGAACTGCTTTGATTAAG

AAATATCCAAAACTTGAATCGGAGTTTGTCTATGGTGATTATAAAGTTTATGATGTTCGTAAAATG

ATTGCTAAGTCTGAGCAAGAAATAGGCAAAGCAACCGCAAAATATTTCTTTTACTCTAATATCATG

AACTTCTTCAAAACAGAAATTACACTTGCAAATGGAGAGATTCGCAAACGCCCTCTAATCGAAACT

AATGGGGAAACTGGAGAAATTGTCTGGGATAAAGGGCGAGATTTTGCCACAGTGCGCAAAGTATTG

TCCATGCCCCAAGTCAATATTGTCAAGAAAACAGAAGTACAGACAGGCGGATTCTCCAAGGAGTCA

ATTTTACCAAAAAGAAATTCGGACAAGCTTATTGCTCGTAAAAAAGACTGGGATCCAAAAAAATAT

GGTGGTTTTGATAGTCCAACGGTAGCTTATTCAGTCCTAGTGGTTGCTAAGGTGGAAAAAGGGAAA

TCGAAGAAGTTAAAATCCGTTAAAGAGTTACTAGGGATCACAATTATGGAAAGAAGTTCCTTTGAA

AAAAATCCGATTGACTTTTTAGAAGCTAAAGGATATAAGGAAGTTAAAAAAGACTTAATCATTAAA

CTACCTAAATATAGTCTTTTTGAGTTAGAAAACGGTCGTAAACGGATGCTGGCTAGTGCCGGAGAA

TTACAAAAAGGAAATGAGCTGGCTCTGCCAAGCAAATATGTGAATTTTTTATATTTAGCTAGTCAT

TATGAAAAGTTGAAGGGTAGTCCAGAAGATAACGAACAAAACAATTGTTTGTGGAGCAGCATAAG

CATTATTTAGATGAGATTATTGAGCAAATCAGTGAATTTTCTAAGCGTGTTATTTTAGCAGATGCC

AATTTAGATAAAGTTCTTAGTGCATATAACAAACATAGAGACAAACCAATACGTGAACAAGCAGAA

AATATTATTCATTTATTTACGTTGACGAATCTTGGAGCTCCCGCTGCTTTTAAATATTTTGATACA

ACAATTGATCGTAAACGATATACGTCTACAAAAGAAGTTTTAGATGCCACTCTTATCCATCAATCC

ATCACTGGTCTTTATGAAACACGCATTGATTTGAGTCAGCTAGGAGGTGACACCGGTGGTGGTCCC

GGGGGTGGTGCGGCCGCAGGCAGCGGAAGCCCTAAGAAAAAACGAAAAGTTGGCAGCGGAAGCAAA

AGGCCGGCGGCCACGAAAAAGGCCGGCCAGGCAAAAAAGAAAAAGCTCGAGCACCACCACCACCAC

CAC
```

In one embodiment, the synthetic nucleic acid comprises, consists of, or consists essentially of a sequence having at least 90%, at least 91%, at least 92%, at least 93%, at least 94%, at least 95%, at least 96%, at least 97%, at least 98%, at least 99%, or more, identical to SEQ ID NO: 21, and retains as least 50% of the function of SEQ ID NO: 21, e.g., DNA cleaving functionality.

In general, the one or more NLSs are of sufficient strength to drive accumulation of the CRISPR enzyme in a detectable amount in the nucleus of a eukaryotic cell. In general, strength of nuclear localization activity may derive from the number of NLSs in the CRISPR enzyme, the particular NLS(s) used, or a combination of these factors. Detection of accumulation in the nucleus may be performed by any suitable technique. For example, a detectable marker may be fused to the CRISPR enzyme, such that location within a cell may be visualized, such as in combination with a means for detecting the location of the nucleus (e.g. a stain specific for the nucleus such as DAPI). Examples of detectable markers include fluorescent proteins (such as Green fluorescent proteins, or GFP; RFP; CFP), and epitope tags (HA tag, flag tag, SNAP tag). Cell nuclei may also be isolated from cells using standard methods (e.g., cell lysis and centrifugation spins to separate the nuclei and cytosol), the contents of which may then be analyzed by any suitable process for detecting protein, such as immunohistochemistry, Western blot, or enzyme activity assay. Accumulation in the nucleus may also be determined indirectly, such as by an assay for the effect of CRISPR complex formation (e.g. assay for DNA cleavage or mutation at the target sequence, or assay for altered gene expression activity affected by CRISPR complex formation and/or CRISPR enzyme activity), as compared to a control no exposed to the CRISPR enzyme or complex, or exposed to a CRISPR enzyme lacking the one or more NLSs.

One aspect of the invention described herein provides a vector comprising any of the synthetic nucleic molecules described herein.

One aspect of the invention described herein provides a polypeptide encoded by any of the synthetic nucleic molecules described herein.

In one embodiment, the polypeptide sequence comprises, consists of, or consists essentially of the sequence of SEQ ID NO: 22.

```
                                        (SEQ ID NO: 22)
PAAKKKKLDGSVDMDKKYSIGLDIGINSVGTNAVITDEYKVPSKKF

KVLGNTDRHSIKKNLIGALLFDSGETAEATRLKRTARRRYTRRKNR

ICYLQEIFSNEMAKVDDSFFHRLEESFLVEEDKKHERHPIFGNIVD

EVAYHEKYPTIYHLRKKLVDSTDKADLRLIYLALAHMIKFRGHFLI

EGDLNPDNSDVDKLFIQLVQTYNQLFEENPINASGVDAKAILSARL

SKSRRLENLIAQLPGEKKNGLFGNLIALSLGLIPNFKSNFDLAEDA

KLQLSKDTYDDDLDNLLAQIGDQYADLFLAAKNLSDAILLSDILRV

NTEITKAPLSASMIKRYDEHHQDLTLLKALVRQQLPEKYKEIFFDQ

SKNGYAGYIDGGASQEEFYKFIKPILEKMDGTEELLVKLNREDLLR

KQRTFDNGSIPHQIHLGELHAILRRQEDFYPFLKDNREKIEKILTF

RIPYYVGPLARGNSRFAWMTRKSEETITPWNFEEVVDKGASAQSFI

ERMTNFDKNLPNEKVLPKHSLLYEYFTVYNELTKVKYVTEGMRKPA

FLSGEQKKAIVDLLFKINRKVIVKQLKEDYFKKIECFDSVEISGVE

DRFNASLGTYHDLLKIIKDKDFLDNEENEDILEDIVLTLTLFEDRE

MIEERLKTYAHLFDDKVMKQLKRRRYTGWGRLSRKLINGIRDKQSG

KTILDFLKSDGFANRNFMQLIHDDSLTFKEDIQKAQVSGQGDSLHE

HIANLAGSPAIKKGILQTVKVVDELVKVMGRHKPENIVIEMARENQ

TTQKGQKNSRERMKRIEEGIKELGSQILKEHPVENTQLQNEKLYLY

YLQNGRDMYVDQELDINRLSDYDVDHIVPQSFLKDDSIDNKVLTRS

DKNRGKSDNVPSEEVVKKMKNYWRQLLNAKLITQRKFDNLTKAERG

GLSELDKAGFIKRQLVETRQITKHVAQILDSRMNTKYDENDKLIRE

VKVITLKSKLVSDFRKDFQFYKVREINNYHHAHDAYLNAVVGTALI

KKYPKLESEFVYGDYKVYDVRKMIAKSEQEIGKATAKYFFYSNIMN

FFKTEITLANGEIRKRPLIETNGETGEIVWDKGRDFATVRKVLSMP

QVNIVKKTEVQTGGFSKESILPKRNSDKLIARKKDWDPKKYGGFDS

PTVAYSVLVVAKVEKGKSKKLKSVKELLGITIMERSSFEKNPIDFL

EAKGYKEVKKDLIIKLPKYSLFELENGRKRMLASAGELQKGNELAL

PSKYVNFLYLASHYEKLKGSPEDNEQKQLFVEQHKHYLDEIIEQIS

EFSKRVILADANLDKVLSAYNKHRDKPIREQAENIIHLFTLTNLGA

PAAFKYFDTTIDRKRYTSTKEVLDATLIHQSITGLYETRIDLSQLG

GDTGGGPGGGAAAGSGSPKKKRKVGSGSKRPAATKKAGQAKKKKLE

HHHHHH
```

The following describes SEQ ID No: 22 presented herein above: Bolded, double underlined text indicates the cMyc-like NLS; Italicized, underlined text indicates various linkers; Regular text indicates Cas9; Double underlined text indicates SV40 NLS; Bolded, underlined text indicates the nucleoplasmin NLS; and Underlined text indicates the 6×HIS tag.

In one embodiment, the polypeptide comprises, consists of, or consists essentially of a sequence having at least 90%, at least 91%, at least 92%, at least 93%, at least 94%, at least 95%, at least 96%, at least 97%, at least 98%, at least 99%, or more, identical to SEQ ID NO: 22, and retains as least 50% of the function of SEQ ID NO: 21, e.g., DNA cleaving functionality.

In some embodiments, the 6×HIS tag is removed from the sequence of SEQ ID NO: 22 prior to its use in a method of altering a cell's genome.

In one embodiment, linkers are inserted in between at least one NLS sequence and the CRISPR enzyme sequence, and/or in between two NLS sequences. In one embodiment, at least 1, 2, 3, 4, 5, 6, 7, 8, 9, 10 or more linkers are included in the synthetic nucleic acid or polypeptides described herein. When more than one linker is used, the more than one linkers can be identical, or the more than one linkers can be different. Table 1 below presents nucleotide and protein sequences for exemplary linkers.

TABLE 1 nucleotide and protein seuqences for exemplary linkers

| Protein linker | Corresponding nucleic acid linker |
|---|---|
| sequences Gly-Gly-Ser-Gly | sequences Ggcggta gcggc |

TABLE 1-continued nucleotide and protein seuqences
for exemplary linkers

| Protein linker | Corresponding nucleic acid linker |
|---|---|
| (SEQ ID NO: 23) | (SEQ ID NO: 24) |
| (Gly-Gly-Ser-Gly)x3 (SEQ ID NO: 25) | Ggcggtagc Ggcggaggc Agcggtggc ggcagcggc (SEQ ID NO: 26) |
| (Gly-Gly-Ser-Gly)x5 (SEQ ID NO: 27) | Ggcggtagc Ggcggcggt Agcggcgga Ggcagcggt Ggcggcagc Ggcggcggt Agcggc (SEQ ID NO: 28) |
| TGGGPGGG AAAGSGS (SEQ ID NO: 29) | Accggtggt Ggtcccggg Ggtggtgcg gccgcaggc agcggaagc (SEQ ID NO: 30) |
| SGGSSGGSS GSETPGTSE SATPESSGG SSGGS (SEQ ID NO: 31) | Tctggaggat Ctagcggagg Atcctctgga Agcgagacac Caggcacaag Cgagtccgcc Acaccagaga Gctccggcgg Ctcctccgga Ggatcc (SEQ ID NO: 32) |

Vectors

Several aspects of the invention relate to a vector comprising any of the synthetic nucleic acids or polypeptides described herein. In one embodiment, the vector can further comprise a guide RNA. Vectors can be designed for expression of synthetic nucleic acids or polypeptides in prokaryotic or eukaryotic cells. For example, synthetic nucleic acids or polypeptides can be expressed in bacterial cells such as *Escherichia coli*, insect cells (using baculovirus expression vectors), yeast cells, or mammalian cells. Suitable host cells are discussed further in Goeddel, GENE EXPRESSION TECHNOLOGY: METHODS IN ENZYMOLOGY 185, Academic Press. San Diego, Calif. (1990). Alternatively, the recombinant expression vector can be transcribed and translated in vitro, for example using T7 promoter regulatory sequences and T7 polymerase.

Vectors may be introduced and propagated in a prokaryote. In some embodiments, a prokaryote is used to amplify copies of a vector to be introduced into a eukaryotic cell or as an intermediate vector in the production of a vector to be introduced into a eukaryotic cell (e.g. amplifying a plasmid as part of a viral vector packaging system). In some embodiments, a prokaryote is used to amplify copies of a vector and express one or more nucleic acids, such as to provide a source of one or more proteins for delivery to a host cell (e.g., a quiescent cell) or host organism. Expression of polypeptides in prokaryotes is most often carried out in *Escherichia coli* with vectors containing constitutive or inducible promoters directing the expression of either fusion or non-fusion proteins. Fusion vectors add a number of amino acids to a protein encoded therein, such as to the amino terminus of the recombinant protein. Such fusion vectors may serve one or more purposes, such as: (i) to increase expression of recombinant protein; (ii) to increase the solubility of the recombinant protein; and (iii) to aid in the purification of the recombinant protein by acting as a ligand in affinity purification. Often, in fusion expression vectors, a proteolytic cleavage site is introduced at the junction of the fusion moiety and the recombinant protein to enable separation of the recombinant protein from the fusion moiety subsequent to purification of the fusion protein. Such enzymes, and their cognate recognition sequences, include Factor Xa, thrombin and enterokinase. Example fusion expression vectors include pGEX (Pharmacia Biotech Inc; Smith and Johnson, 1988. *Gene* 67: 31-40), pMAL (New England Biolabs, Beverly, Mass.) and pRIT5 (Pharmacia, Piscataway. N.J.) that fuse glutathione S-transferase (GST), maltose E binding protein, or protein A, respectively, to the target recombinant protein.

Examples of suitable inducible non-fusion *E. coli* expression vectors include pTrc (Amrann et al., (1988) *Gene* 69:301-315) and pET 11d (Studier et al., GENE EXPRESSION TECHNOLOGY: METHODS IN ENZYMOLOGY 185, Academic Press, San Diego, Calif. (1990) 60-89).

In some embodiments, a vector is a yeast expression vector. Examples of vectors for expression in yeast *Saccharomyces cerivisae* include pYepSec1 (Baldari, et al., 1987. *EMBO J.* 6: 229-234), pMFa (Kuijan and Herskowitz, 1982. *Cell* 30: 933-943), pJRY88 (Schultz et al., 1987. *Gene* 54: 113-123), pYES2 (Invitrogen Corporation, San Diego, Calif.), and picZ (InVitrogen Corp, San Diego, Calif.).

In some embodiments, a vector drives polypeptide (i.e., protein) expression in insect cells using baculovirus expression vectors. Baculovirus vectors available for expression of proteins in cultured insect cells (e.g., SF9 cells) include the pAc series (Smith, et al., 1983. *Mol. Cell. Biol.* 3: 2156-2165) and the pVL series (Lucklow and Summers, 1989. *Virology* 170: 31-39).

In some embodiments, a vector is capable of driving expression of one or more sequences in mammalian cells using a mammalian expression vector. Examples of mammalian expression vectors include pCDM8 (Seed, 1987. *Nature* 329: 840) and pMT2PC (Kaufman, et al., 1987. *EMBO J.* 6: 187-195). When used in mammalian cells, the expression vector's control functions are typically provided by one or more regulatory elements. For example, commonly used promoters are derived from polyoma, adenovirus 2, cytomegalovirus, simian virus 40, and others disclosed herein and known in the art. For other suitable expression systems for both prokaryotic and eukaryotic cells see, e.g., Chapters 16 and 17 of Sambrook, et al., MOLECULAR CLONING: A LABORATORY MANUAL. 2nd ed., Cold Spring Harbor Laboratory, Cold Spring Harbor Laboratory Press, Cold Spring Harbor, N.Y., 1989.

In some embodiments, the recombinant mammalian expression vector is capable of directing expression of the synthetic nucleic acid preferentially in a particular cell type (e.g., tissue-specific regulatory elements are used to express the nucleic acid in, for example, a hematopoietic cell). Tissue-specific regulatory elements are known in the art. Non-limiting examples of suitable tissue-specific promoters include the albumin promoter (liver-specific; Pinkert, et al., 1987. *Genes Dev.* 1: 268-277), lymphoid-specific promoters (Calame and Eaton, 1988. *Adv. hnmunol.* 43: 235-275), in particular promoters of T cell receptors (Winoto and Baltimore, 1989. *EMBO J.* 8: 729-733) and immunoglobulins (Baneiji, et al., 1983. *Cell* 33: 729-740; Queen and Baltimore, 1983. *Cell* 33: 741-748), neuron-specific promoters (e.g., the neurofilament promoter; Byrne and Ruddle, 1989. *Proc. Natl. Acad. Sci. USA* 86: 5473-5477), pancreas-specific promoters (Edlund, et al., 1985. *Science* 230: 912-916), and mammary gland-specific promoters (e.g., milk whey promoter; U.S. Pat. No. 4,873,316 and European Application Publication No. 264,166). Developmentally-regulated promoters are also encompassed, e.g., the murine hox promoters (Kessel and Gruss, 1990. *Science* 249: 374-379) and the α-fetoprotein promoter (Campes and Tilghman, 1989. *Genes Dev.* 3: 537-546).

The eukaryotic cells may be those of or derived from a particular organism, such as a mammal, including but not limited to human, mouse, rat, rabbit, dog, or non-human primate.

In one embodiment, the synthetic nucleic acid molecules described herein are introduced to a cell via a non-viral method. Methods of non-viral delivery of nucleic acids include lipofection, nucleofection, microinjection, biolistics, virosomes, liposomes, immunoliposomes, polycation or lipid:nucleic acid conjugates, naked DNA, artificial virions, and agent-enhanced uptake of DNA. Lipofection is described in e.g., U.S. Pat. Nos. 5,049,386, 4,946,787; and 4,897,355) and lipofection reagents are sold commercially (e.g., Transfectam™ and Lipofectin™). Cationic and neutral lipids that are suitable for efficient receptor-recognition lipofection of polynucleotides include those of Felgner, WO 91/17424; WO 91/16024. Delivery can be to cells (e.g. in vitro or ex vivo administration) or target tissues (e.g. in vivo administration).

The preparation of lipid:nucleic acid complexes, including targeted liposomes such as immunolipid complexes, is well known to one of skill in the art (see, e.g., Crystal, Science 270:404-410 (1995); Blaese et al., Cancer Gene Ther. 2:291-297 (1995); Behr et al., Bioconjugate Chem. 5:382-389 (1994); Remy et al., Bioconjugate Chem. 5:647-654 (1994); Gao et al., Gene Therapy 2:710-722 (1995); Ahmad et al., Cancer Res. 52:4817-4820 (1992); U.S. Pat. Nos. 4,186,183, 4,217,344, 4,235,871, 4,261,975, 4,485,054, 4,501,728, 4,774,085, 4,837,028, and 4,946,787).

In some embodiments, a cell is transiently or non-transiently transfected with one or more vectors described herein. In some embodiments, a cell is transfected as it naturally occurs in a subject. In some embodiments, a cell that is transfected is taken from a subject. In some embodiments, the cell is derived from cells taken from a subject, such as a cell line. A wide variety of cell lines for tissue culture are known in the art. Examples of cell lines include, but are not limited to, C8161, CCRF-CEM, MOLT, mIMCD-3, NHDF, HeLa-S3, Huh1, Huh4, Huh7, HUVEC, HASMC, HEKn, HEKa, MiaPaCell, Panel, PC-3, TF1, CTLL-2, C1R, Rat6, CV1, RPTE, A10, T24, J82, A375, ARH-77, Calu1, SW480, SW620, SKOV3, SK-UT, CaCo2, P388D1, SEM-K2, WEHI-231, HB56, TIB55, Jurkat, J45.01, LRMB, Bcl-1, BC-3, IC21, DLD2, Raw264.7, NRK, NRK-52E, MRCS, MEF, Hep G2, HeLa B, HeLa T4, COS, COS-1, COS-6, COS-M6A, BS-C-1 monkey kidney epithelial, BALB/3T3 mouse embryo fibroblast, 3T3 Swiss, 3T3-L1, 132-d5 human fetal fibroblasts; 10.1 mouse fibroblasts, 293-T, 3T3, 721, 9L, A2780, A2780ADR, A2780cis, A172, A20, A253, A431, A-549, ALC, B16, B35, BCP-I cells, BEAS-2B, bEnd.3, BHK-21, BR 293, BxPC3, C3H-10T1/2, C6/36, Cal-27, CHO, CHO-7, CHO-IR, CHO-K1, CHO-K2, CHO-T, CHO Dhfr-/-, COR-L23, COR-L23/CPR, COR-L235010, COR-L23/R23, COS-7, COV-434, CML T1, CMT, CT26, D17, DH82, DU145, DuCaP, EL4, EM2, EM3, EMT6/AR1, EMT6/AR10.0, FM3, H1299, H69, HB54, HB55, HCA2, HEK-293, HeLa, Hepalcic7, HL-60, HMEC, HT-29, Jurkat, JY cells, K562 cells, Ku812, KCL22, KG1, KYO1, LNCap, Ma-Mel 1-48, MC-38, MCF-7, MCF-10A, MDA-MB-231, MDA-MB-468, MDA-MB-435, MDCK II, MDCK II, MOR/0.2R, MONO-MAC 6, MTD-1A, MyEnd, NCI-H69/CPR, NCI-H69/LX10, NCI-H69/LX20, NCI-H69/LX4, NIH-3T3, NALM-1, NW-145, OPCN/OPCT cell lines, Peer, PNT-1A/PNT 2, RenCa, RIN-5F, RMA/RMAS, Saos-2 cells, Sf-9, SkBr3, T2, T-47D, T84, THP1 cell line, U373, U87, U937, VCaP, Vero cells, WM39, WT-49, X63, YAC-1, YAR, and transgenic varieties thereof. Cell lines are available from a variety of sources known to those with skill in the art (see, e.g., the American Type Culture Collection (ATCC) (Manassas, Va.)). In some embodiments, a cell transfected with one or more vectors described herein is used to establish a new cell line comprising one or more vector-derived sequences. In some embodiments, a cell transiently transfected with the components of a CRISPR system as described herein (such as by transient transfection of one or more vectors, or transfection with RNA), and modified through the activity of a CRISPR complex, is used to establish a new cell line comprising cells containing the modification but lacking any other exogenous sequence. In some embodiments, cells transiently or non-transiently transfected with one or more vectors described herein, or cell lines derived from such cells are used in assessing one or more test compounds.

One aspect provided herein is a ribonucleoprotein (RNP) complex comprising a polypeptide encoded by any of the synthetic nucleic acids described herein and a guide RNA.

Compositions

Various aspects described herein provides a composition comprising of, consisting of, or consisting essentially of any of the synthetic nucleic acids, vectors, polypeptides, or RNP complexes described herein. In one embodiment, the composition further comprises a guide RNA that targets and hybridizes to a target sequence of a DNA molecule. As used herein, "hybridizes" or "hybridization" refers to a reaction in which one or more polynucleotides react to form a complex that is stabilized via hydrogen bonding between the bases of the nucleotide residues. The hydrogen bonding may occur by Watson Crick base pairing, Hoogstein binding, or in any other sequence specific manner. The complex may comprise two strands forming a duplex structure, three or more strands forming a multi stranded complex, a single self hybridizing strand, or any combination of these. A hybridization reaction may constitute a step in a more extensive process, such as the initiation of PCR, or the cleavage of a polynucleotide by an enzyme. A sequence capable of hybridizing with a given sequence is referred to as the "complement" of the given sequence.

The sequence of the guide RNA (e.g., the sequence homologous to the target gene of interest) can be determined for the intended use. For example, to target the bcl11a gene, one would choose a guide RNA that targets and hybridize to bcl11a in a manner that effectively results in the desired alteration of the gene's expression. In general, a guide sequence is any polynucleotide sequence having sufficient complementarity with a target polynucleotide sequence to hybridize with the target sequence and direct sequence-specific binding of a CRISPR complex to the target sequence. In some embodiments, the degree of complementarity between a guide sequence and its corresponding target sequence, when optimally aligned using a suitable alignment algorithm, is about or more than about 50%, 60%, 75%, 80%, 85%, 90%, 95%, 97.5%, 99%, or more. Optimal alignment may be determined with the use of any suitable algorithm for aligning sequences, non-limiting example of which include the Smith-Waterman algorithm, the Needleman-Wunsch algorithm, algorithms based on the Burrows-Wheeler Transform (e.g. the Burrows Wheeler Aligner), ClustalW, Clustal X, BLAT, Novoalign (Novocraft Technologies, ELAND (Illumina, San Diego, Calif.), SOAP (available at soap.genomics.org.cn), and Maq (available at maq.sourceforge.net). In some embodiments, a guide sequence is about or more than about 5, 10, 11, 12, 13, 14, 15, 16, 17, 18, 19, 20, 21, 22, 23, 24, 25, 26, 27, 28, 29, 30, 35, 40, 45, 50, 75, or more nucleotides in length. In some embodiments, a guide sequence is less than about 75, 50, 45, 40, 35, 30, 25, 20, 15, 12, or fewer nucleotides in length. The ability of a guide sequence to direct sequence-specific binding of a CRISPR complex to a target sequence may be assessed by any suitable assay. For example, the components of a CRISPR system sufficient to form a CRISPR complex, including the guide sequence to be tested, may be provided to a host cell having the corresponding target sequence, such as by transfection with vectors encoding the components of the CRISPR sequence, followed by an assessment of preferential cleavage within the target sequence, such as by Surveyor assay as described herein. Similarly, cleavage of a target polynucleotide sequence may be evaluated in a test tube by providing the target sequence, components of a CRISPR complex, including the guide sequence to be tested and a control guide sequence different from the test guide sequence, and comparing binding or rate of cleavage at the target sequence between the test and control guide sequence reactions. Other assays are possible, and will occur to those skilled in the art.

A guide sequence may be selected to target any target sequence. In some embodiments, the target sequence is a sequence within a genome of a cell. Exemplary target sequences include those that are unique in the target genome. For example, for the *S. pyogenes* Cas9, a unique target sequence in a genome may include a Cas9 target site of the form MMMMMMMMNNNNNNNNNNNNXGG where NNNNNNNNNNNNXGG (N is A, G, T, or C; and X can be anything) has a single occurrence in the genome. A unique target sequence in a genome may include an *S. pyogenes* Cas9 target site of the form MMMMMMMMMNNNNNNNNNNNXGG where NNNNNNNNNNNXGG (N is A, G, T, or C; and X can be anything) has a single occurrence in the genome. Alternatively, the first 8 positions in the above mentioned unique sequences can be NNNNNNNN, for example, NNNNNNNNNNNNNNNNNNNNXGG.

In one embodiment, the compositions described herein further comprise a pharmaceutically acceptable carrier. The phrase "pharmaceutically acceptable" is employed herein to refer to those compounds, materials, compositions, and/or dosage forms which are, within the scope of sound medical judgment, suitable for use in contact with the tissues of human beings and animals without excessive toxicity, irritation, allergic response, or other problem or complication, commensurate with a reasonable benefit/risk ratio.

As used herein, the terms "pharmaceutically acceptable", "physiologically tolerable" and grammatical variations thereof, as they refer to compositions, carriers, diluents and reagents, are used interchangeably and represent that the materials are capable of administration to or upon a mammal without the production of undesirable physiological effects such as nausea, dizziness, gastric upset and the like. A pharmaceutically acceptable carrier will not promote the raising of an immune response to an agent with which it is admixed, unless so desired. The preparation of a pharmacological composition that contains active ingredients dissolved or dispersed therein is well understood in the art and need not be limited based on formulation. Typically, such compositions are prepared as injectable either as liquid solutions or suspensions, however, solid forms suitable for solution, or suspensions, in liquid prior to use can also be prepared. The preparation can also be emulsified or presented as a liposome composition. The active ingredient can be mixed with excipients which are pharmaceutically acceptable and compatible with the active ingredient and in amounts suitable for use in the therapeutic methods described herein. Suitable excipients are, for example, water, saline, dextrose, glycerol, ethanol or the like and combinations thereof. In addition, if desired, the composition can contain minor amounts of auxiliary substances such as wetting or emulsifying agents, pH buffering agents and the like which enhance the effectiveness of the active ingredient. The therapeutic composition of the present invention can include pharmaceutically acceptable salts of the components therein. Pharmaceutically acceptable salts include the acid addition salts (formed with the free amino groups of the polypeptide) that are formed with inorganic acids such as, for example, hydrochloric or phosphoric acids, or such organic acids as acetic, tartaric, mandelic and the like. Salts formed with the free carboxyl groups can also be derived from inorganic bases such as, for example, sodium, potassium, ammonium, calcium or ferric hydroxides, and such organic bases as isopropylamine, trimethylamine, 2-ethylamino ethanol, histidine, procaine and the like. Physiologically tolerable carriers are well known in the art. Exemplary liquid carriers are sterile aqueous solutions that contain no materials in addition to the active ingredients and water, or contain a buffer such as sodium phosphate at physiological pH value, physiological saline or both, such as phosphate-buffered saline. Still further, aqueous carriers can contain more than one buffer salt, as well as salts such as sodium and potassium chlorides, dextrose, polyethylene glycol and other solutes. Liquid compositions can also contain liquid phases in addition to and to the exclusion of water. Exemplary of such additional liquid phases are glycerin, vegetable oils such as cottonseed oil, and water-oil emulsions. The amount of an active agent used with the methods described herein that will be effective in the treatment of a particular disorder or condition will depend on the nature of the disorder or condition, and can be determined by standard clinical techniques.

Altering Gene Expression

Aspects described herein are directed to methods of altering the expression of a gene product. The NLS-Cas enzyme fusions described herein (i.e., any of the synthetic nucleic acid molecules, polypeptides, vectors, etc,) can be used in combination with other CRISPR system components to induce alterations to the cell's genome. One such method comprises introducing into a cell any of the synthetic nucleic acids, vectors, polypeptides, or compositions described herein, in combination with at least one guide RNA.

Another method for altering the expression of a gene product provided herein comprises introducing into a cell any of the compositions described herein in combination with at least one guide RNA.

Finally, another method for altering the expression of a gene product provided herein comprises introducing into a cell any of the compositions or RNP complexes described herein.

It is specifically contemplated herein that any gene in the cell's genome can be altered using methods herein.

In one embodiment, altering the expression of a gene is increasing the expression. As used herein, the terms "increased", "increase", "enhance", or "activate" are all used herein to mean an increase by a statically significant amount. In some embodiments, the terms "increased", "increase", "enhance", or "activate" can mean an increase of at least 10% as compared to a reference level, for example an increase of at least about 20%, or at least about 30%, or at least about 40%, or at least about 50%, or at least about 60%, or at least about 70%, or at least about 80%, or at least about 90% or up to and including a 100% increase or any increase between 10-100% as compared to a reference level, or at least about a 2-fold, or at least about a 3-fold, or at least about a 4-fold, or at least about a 5-fold or at least about a 10-fold increase, or any increase between 2-fold and 10-fold or greater as compared to a reference level. In the context of a marker or symptom, an "increase" is a statistically significant increase in such level.

In one embodiment, altering the expression of a gene is decreasing the expression. As used herein, the terms "decrease", "reduced", "reduction", or "inhibit" are all used herein to mean a decrease by a statistically significant amount. In some embodiments, "reduce," "reduction" or "decrease" or "inhibit" typically means a decrease by at least 10% as compared to a reference level (e.g. the absence of a given treatment or agent) and can include, for example, a decrease by at least about 10%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, at least about 95%, at least about 98%, at least about 99%, or more. As used herein, "reduction" or "inhibition" does not encompass a complete inhibition or reduction as compared to a reference level. "Complete inhibition" is a 100% inhibition as compared to a reference level. Where applicable, a decrease can be preferably down to a level accepted as within the range of normal for an individual without a given disorder.

As used herein, the term "genome editing" and "gene editing" refers to a reverse genetics method using artificially engineered nucleases to cut and create specific double-stranded breaks at a desired location(s) in the genome, which are then repaired by cellular endogenous processes such as, homologous recombination (HR), homology directed repair (HDR) and non-homologous end-joining (NHEJ). NHEJ directly joins the DNA ends in a double-stranded break, while HDR utilizes a homologous sequence as a template for regenerating the missing DNA sequence at the break point.

In one embodiment, the cell is a quiescent cell. As used herein, "quiescent cell" refers to a cell in a reversible state in which it does not divide but retains the ability to re-enter cell proliferation. Exemplary quiescent cells include, but are not limited to, a hematopoietic stem cell, a muscle stem cell, a neural stem cell, an intestinal stem cell, a skin stem cell or epidermal stem cell, a mesenchymal stem cell, a resting T cell, a memory T cell, a neuron, a neuronal stem cell, a myotube or skeletal myoblast or satellite cell, and a hepatocyte.

In one embodiment, the cell is a hematopoietic progenitor cell. "Hematopoietic progenitor cell" as the term is used herein, refers to cells of a stem cell lineage that give rise to all the blood cell types including the myeloid (monocytes and macrophages, neutrophils, basophils, eosinophils, erythrocytes, megakaryocytes/platelets, dendritic cells), and the lymphoid lineages (T-cells, B-cells, NK-cells). A "cell of the erythroid lineage" indicates that the cell being contacted is a cell that undergoes erythropoiesis such that upon final differentiation it forms an erythrocyte or red blood cell (RBC). Such cells belong to one of three lineages, erythroid, lymphoid, and myeloid, originating from bone marrow hematopoietic progenitor cells. Upon exposure to specific growth factors and other components of the hematopoietic microenvironment, hematopoietic progenitor cells can mature through a series of intermediate differentiation cellular types, all intermediates of the erythroid lineage, into RBCs. Thus, cells of the "erythroid lineage", as the term is used herein, comprise hematopoietic progenitor cells, rubriblasts, prorubricytes, erythroblasts, metarubricytes, reticulocytes, and erythrocytes.

One skilled in the art can identify a hematopoietic progenitor cell, for example, by assessing the cell for at least one of the cell surface marker characteristic of hematopoietic progenitor cells: CD34+, CD59+, Thy1/CD90+, CD38lo/−, and C-kit/CD117+. Preferably, the hematopoietic progenitor cells have several of these markers. The hematopoietic progenitor cells of the erythroid lineage have the cell surface marker characteristic of the erythroid lineage, e.g., CD71 and CD235a (also known as human glycophorin A).

Stem cells, such as hematopoietic stem cells, are capable of proliferation and giving rise to more progenitor cells having the ability to generate a large number of mother cells that can in turn give rise to differentiated or differentiable daughter cells. The daughter cells themselves can be induced to proliferate and produce progeny that subsequently differentiate into one or more mature cell types, while also retaining one or more cells with parental developmental potential. The term "stem cell" refers then, to a cell with the capacity or potential, under particular circumstances, to differentiate to a more specialized or differentiated phenotype, and which retains the capacity, under certain circumstances, to proliferate without substantially differentiating. In one embodiment, the term progenitor or stem cell refers to a generalized mother cell whose descendants (progeny) specialize, often in different directions, by differentiation, e.g., by acquiring completely individual characters, as occurs in progressive diversification of embryonic cells and tissues. Cellular differentiation is a complex process typically occurring through many cell divisions. A differentiated cell may derive from a multipotent cell which itself is derived from a multipotent cell, and so on. While each of these multipotent cells may be considered stem cells, the range of cell types each can give rise to may vary considerably. Some differentiated cells also have the capacity to give rise to cells of greater developmental potential. Such capacity may be natural or may be induced artificially upon treatment with various factors. In many biological instances, stem cells are also "multipotent" because they can produce progeny of more than one distinct cell type, but this is not required for "stem-ness." Self-renewal is the other classical part of the stem cell definition, and it is essential as used in this document. In theory, self-renewal can occur by either of two major mechanisms. Stem cells may divide asymmetrically, with one daughter retaining the stem state and the other daughter expressing some distinct other specific function and phenotype. Alternatively, some of the stem cells in a population can divide symmetrically into two stems, thus maintaining some stem cells in the population as a whole, while other cells in the population give rise to differentiated progeny only. Generally, "progenitor cells" have a cellular phenotype that is more primitive (i.e., is at an earlier step along a developmental pathway or progression than is a fully differentiated cell). Often, progenitor cells also have significant or very high proliferative potential. Progenitor cells can give rise to multiple distinct differentiated cell types or to a single differentiated cell type, depending on the developmental pathway and on the environment in which the cells develop and differentiate.

In one embodiment, the methods described herein are used for altering the expression of fetal hemoglobin. In another embodiment, the methods described herein are used for increasing the expression of fetal hemoglobin. As used herein the term "increasing the fetal hemoglobin levels" in a cell indicates that fetal hemoglobin is at least 5% higher in populations treated with any form of the NLS-CRISPR enzyme as described herein (i.e., a synthetic nucleic acid, polypeptide, vector, etc), than in a comparable, control population, wherein no form of the NLS-CRISPR enzyme is present. It is preferred that the percentage of fetal hemoglobin expression in a population treated with such NLS-CRISPR enzyme described herein is at least 10% higher, at least 20% higher, at least 30% higher, at least 40% higher, at least 50% higher, at least 60% higher, at least 70% higher, at least 80% higher, at least 90% higher, at least 1-fold higher, at least 2-fold higher, at least 5-fold higher, at least 10 fold higher, at least 100 fold higher, at least 1000-fold higher, or more than a control treated population of comparable size and culture conditions. The term "control treated population" is used herein to describe a population of cells that has been treated with identical media, viral induction, nucleic acid sequences, temperature, confluency, flask size, pH, etc., with the exception of any of the NLS-CRISPR enzymes described herein. In one embodiment, any method known in the art can be used to measure an increase in fetal hemoglobin expression, e. g. Western Blot analysis of fetal γ-globin protein and quantifying mRNA of fetal γ-globin.

Engineered Cells

In one embodiment, the nucleic acid, vector, polypeptide, RNP complex, or a composition thereof described herein can be used to engineer a cell that has an altered gene expression as compared to a wild-type cell. In another embodiment, the methods described herein can be used to engineer a cell that has an altered gene expression as compared to a wild-type cell. For example, a quiescent cell can be engineered to have increased level of fetal hemoglobin using methods described herein. In one embodiment, the engineered cell is a quiescent cell, for example, a hematopoietic stem cell. In one embodiment, the engineered cell is a quiescent cell that can be administered to a subject in need thereof. In one embodiment, the engineered cell can be an isolated cell, or can be comprised in an isolated population.

The term "isolated cell" as used herein refers to a cell that has been removed from an organism in which it was originally found, or a descendant of such a cell. Optionally the cell has been cultured in vitro, e.g., in the presence of other cells. Optionally the cell is later introduced into a second organism or re-introduced into the organism from which it (or the cell from which it is descended) was isolated.

The term "isolated population" with respect to an isolated population of cells as used herein refers to a population of cells that has been removed and separated from a mixed or heterogeneous population of cells. In some embodiments, an isolated population is a substantially pure population of cells as compared to the heterogeneous population from which the cells were isolated or enriched. In some embodiments, the isolated population is an isolated population of engineered human hematopoietic progenitor cells, e.g., a substantially pure population of engineered human hematopoietic progenitor cells as compared to a heterogeneous population of cells comprising engineered human hematopoietic progenitor cells and cells from which the human hematopoietic progenitor cells were derived.

Isolated populations of cells useful as a therapeutic are often desired to be substantially pure. The term "substantially pure," with respect to a particular cell population, refers to a population of cells that is at least about 75%, preferably at least about 85%, more preferably at least about 90%, and most preferably at least about 95% pure, with respect to the cells making up a total cell population. That is, the terms "substantially pure" or "essentially purified," with regard to a population of, for example, engineered hematopoietic progenitor cells, refers to a population of cells that contain fewer than about 20%, more preferably fewer than about 15%, 10%, 8%, 7%, most preferably fewer than about 5%, 4%, 3%, 2%, 1%, or less than 1%, of cells that are not engineered hematopoietic progenitor cells as defined by the terms herein.

In one embodiment, the engineered cell can be comprised in a composition. In another embodiment, the engineered cell can be comprised in a pharmaceutical composition. A composition of cell described herein can further comprise a pharmaceutically acceptable carrier. It is desired that any pharmaceutically acceptable carrier used is beneficial in promoting the health and/or growth of the cells and does not result in an adverse effect or negatively impact the cells comprised in the composition. For example, a carrier that results in cell death or alters the physiological properties (e.g., size, shape, pH, etc.) would not be desired.

The disclosure described herein, in a preferred embodiment, does not concern a process for cloning human beings, processes for modifying the germ line genetic identity of human beings, uses of human embryos for industrial or commercial purposes or processes for modifying the genetic identity of animals which are likely to cause them suffering without any substantial medical benefit to man or animal, and also animals resulting from such processes.

The disclosure described herein, in a preferred embodiment, does not concern a process for cloning human beings, processes for modifying the germ line genetic identity of human beings, uses of human embryos for industrial or commercial purposes or processes for modifying the genetic identity of animals which are likely to cause them suffering without any substantial medical benefit to man or animal, and also animals resulting from such processes.

Kits

In one aspect, the invention provides kits containing any one or more of the elements disclosed in the above methods and compositions. In one embodiment, the kit comprises, consists of, or consists essentially of any of the synthetic nucleic molecules, vectors, polypeptides, compositions, or RNP complexes describe herein. In another embodiment, the kit further comprises a guide RNA. In another embodiment, the kit further comprises a component of the CRISPR system. In some embodiments, a kit comprises one or more reagents for use in a process utilizing one or more of the elements described herein. Reagents may be provided in any suitable container. For example, a kit may provide one or more reaction or storage buffers. Reagents may be provided in a form that is usable in a particular assay, or in a form that requires addition of one or more other components before use (e.g. in concentrate or lyophilized form). A buffer can be any buffer, including but not limited to a sodium carbonate buffer, a sodium bicarbonate buffer, a borate buffer, a Tris buffer, a MOPS buffer, a HEPES buffer, and combinations thereof. In some embodiments, the buffer is alkaline. In some embodiments, the buffer has a pH from about 7 to about 10. In some embodiments, the kit comprises one or more oligonucleotides corresponding to a guide sequence for insertion into a vector so as to operably link the guide sequence and a regulatory element.

Furthermore, the disclosure described herein does not concern the destruction of a human embryo.

The present invention can be defined in any of the following numbered paragraphs:

1) signal sequence fused at or near its amino terminus, and at least one nuclear localization signal sequence fused at or near its carboxy terminus.
2) The synthetic nucleic acid molecule of paragraph 1, wherein the CRISPR enzyme has one nuclear localization signal sequence fused at or near its amino terminus, and two nuclear localization signal sequences fused at or near its carboxy terminus.
3) The synthetic nucleic acid molecule of any of the preceding paragraphs, wherein the nuclear localization sequence is selected from the group consisting of: SV40 large T-antigen, nucleoplasmin, c-Myc, c-Myc-like, and hRNPA1.
4) The synthetic nucleic acid molecule of any of the preceding paragraphs, wherein the at least one nuclear localization signal sequences are identical.
5) The synthetic nucleic acid molecule of any of the preceding paragraphs, wherein the at least one nuclear localization signal sequences are different.
6) The synthetic nucleic acid molecule of any of the preceding paragraphs, wherein the CRISPR enzyme has a c-Myc-like nuclear localization signal sequence fused to its amino terminus and an SV40 nuclear localization signal sequence and nucleplasmin bipartate nuclear localization signal sequence fused to its carboxyl terminus.
7) The synthetic nucleic acid molecule of any of the preceding paragraphs, wherein the CRISPR enzyme is a type II CRISPR system enzyme.
8) The synthetic nucleic acid molecule of any of the preceding paragraphs, wherein the CRISPR enzyme is a Cas enzyme.
9) The synthetic nucleic acid molecule of any of the preceding paragraphs, wherein the Cas protein is selected from the group consisting of: Cas9, Csn2, Cas4, Cpf1, C2c1, C2c3, Cas12a, Cas12b, Cas12c, Cas12d, Cas12e, Cas13a, Cas13b, and Cas13c.
10) The synthetic nucleic acid molecule of any of the preceding paragraphs, wherein the nucleotide sequence is SEQ ID NO. 1.
11) The synthetic nucleic acid molecule of any of the preceding paragraphs, wherein the synthetic nucleic acid molecule is used in combination with a guide RNA, whereby the guide RNA targets and hybridizes with a target sequence of a DNA molecule and the synthetic nucleic acid molecule cleaves the DNA molecule, whereby expression of the at least one gene product is altered.
12) A vector comprising the synthetic nucleic acid molecule of paragraphs 1-11.
13) A polypeptide encoded by the synthetic nucleic acid of paragraphs 1-11.
14) The polypeptide of paragraph 13, wherein the polypeptide sequence is SEQ ID NO. 2
15) A composition comprising any of the synthetic nucleic molecules of paragraphs 1-11, the vector of paragraph 12, or the polypeptide of paragraphs 13-14.
16) The composition of paragraph 15, further comprising a guide RNA that targets and hybridizes to a target sequence on a DNA molecule.
17) A ribonucleoprotein (RNP) complex comprising the polypeptide of paragraphs 13-14 and a guide RNA that targets and hybridizes to a target sequence on a DNA molecule.
18) The RNP complex of paragraph 17 for the use of altering the expression of at least one gene product.
19) A method of altering expression of at least one gene product, the method comprising introducing into a cell any of the synthetic nucleic acid molecules of paragraphs 1-11, the vector of paragraph 12, or the polypeptide of paragraphs 13-14, and at least one guide RNA that targets and hybridizes with a target sequence of a DNA molecule.
20) A method of altering expression of at least one gene product, the method comprising introducing into a cell the composition of paragraph 15 and at least one guide RNA that targets and hybridizes with a target sequence of a DNA molecule.
21) A method of altering expression of at least one gene product, the method comprising introducing into a cell the composition of paragraph 16 or the RNP complex of paragraph 17.
22) The methods of paragraphs 19-21, wherein the cell is a quiescent cell.
23) The method of paragraph 22, wherein the quiescent cell is selected from the group consisting of: a hematopoietic stem cell, a muscle stem cell, a neural stem cell, an intestinal stem cell, a skin stem cell or epidermal stem cell, a mesenchymal stem cell, a resting T cell, a memory T cell, a neuron, a neuronal stem cell, a myotube or skeletal myoblast or satellite cell, and a hepatocyte.
24) The method of paragraphs 19-21, wherein the cell is not a quiescent cell.
25) The method of paragraph 19-21, for the use in altering the expression of fetal hemoglobin.
26) A method of altering expression of at least one gene product, the method comprising introducing into a quiescent cell any of the synthetic nucleic acid molecules of paragraphs 1-11, the vector of paragraph 12, or the polypeptide of paragraphs 13-14, and at least one guide RNA that targets and hybridizes with a target sequence of a DNA molecule.
27) A method of altering expression of at least one gene product, the method comprising introducing into a quiescent cell the composition of paragraph 15 and at least one guide RNA that targets and hybridizes with a target sequence of a DNA molecule.
28) A method of altering expression of at least one gene product, the method comprising introducing into a quiescent cell the composition of paragraph 16 or the RNP complex of paragraph 17.
29) The method of paragraph 26-28, for the use in altering the expression of fetal hemoglobin.

This invention is further illustrated by the following example which should not be construed as limiting. The contents of all references cited throughout this application, as well as the figures are incorporated herein by reference.

Example 1

Figure 5A:
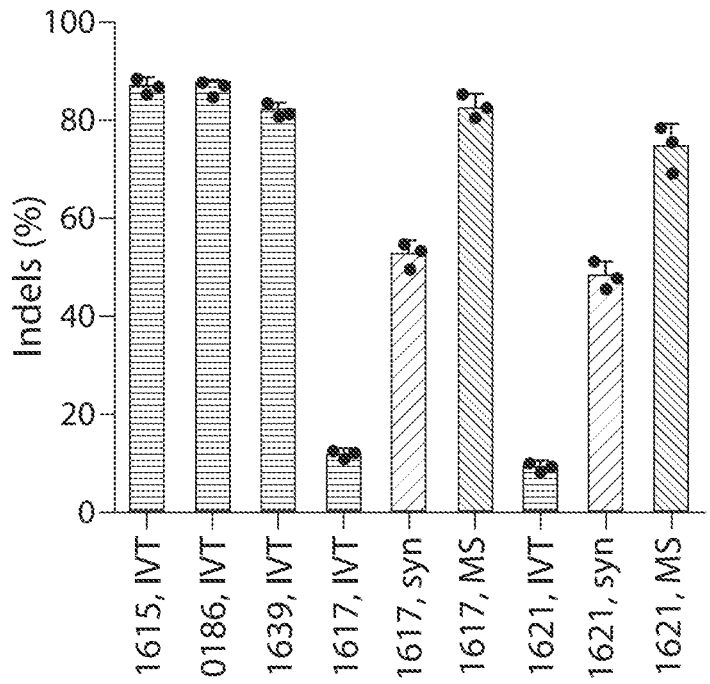
FIG. 5A-5N show Cas9 RNP dose dependent editing of BCL11A enhancer for HbF induction in CD34$^+$ HSPCs.
Figure 5B:
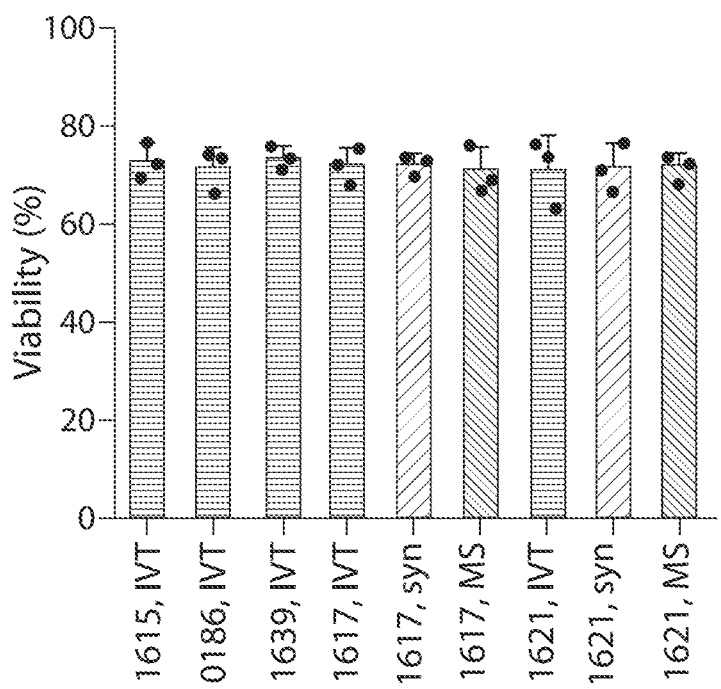
(FIG. 5B) Comparison of viability of CD34$^+$ HSPCs edited with in vitro transcribed (IVT), synthetic (syn) and modified synthetic (MS) sgRNAs.
Figure 5C:
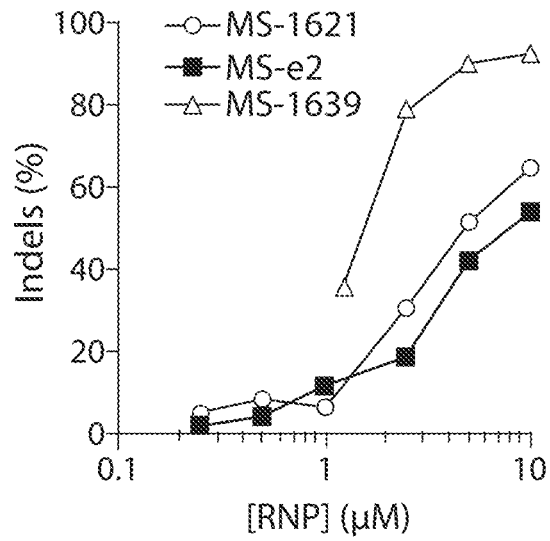
(FIG. 5C) Dose dependent editing rates with Cas9 coupled with MS-sgRNA-1617 and -1639 targeting BCL11A enhancer and -e2 targeting BCL11A exon2 in CD34$^+$ HSPCs by TIDE analysis.
Figure 5D:
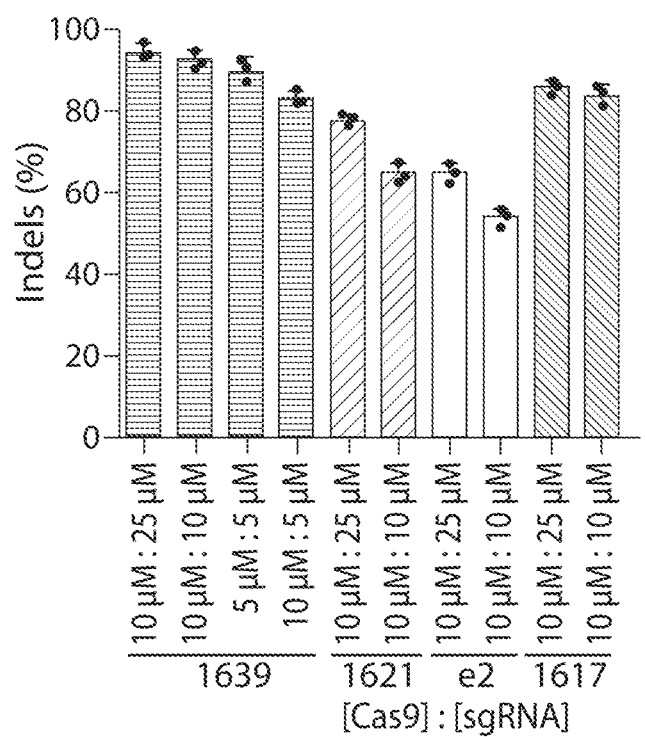
(FIG. 5D) Comparison of indel frequencies with different molar ratios of Cas9 to MS-sgRNA in CD34$^+$ HSPCs by TIDE analysis.
Figure 5E:
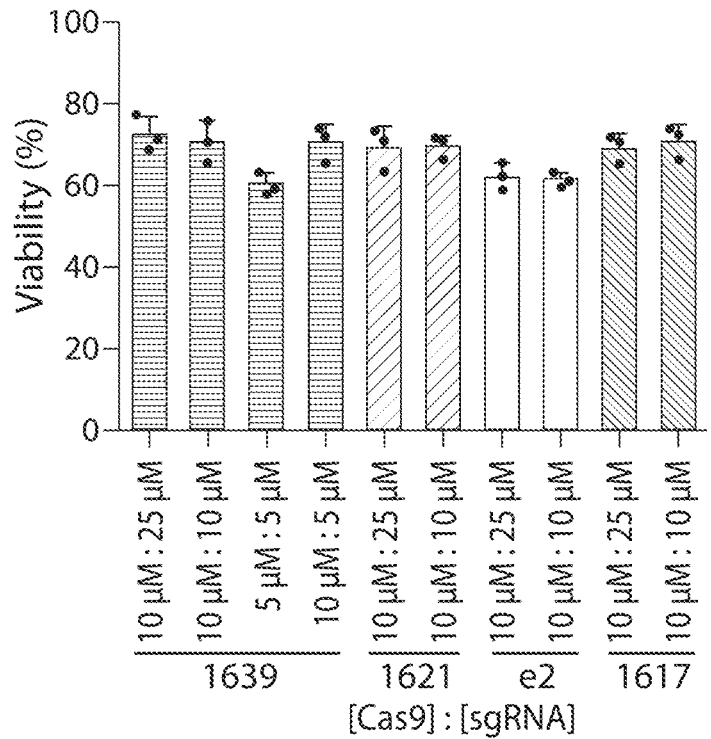
(FIG. 5E) Comparison of viability of CD34$^+$ HSPCs edited with different molar ratios of Cas9 to MS-sgRNA.
Figure 5F:
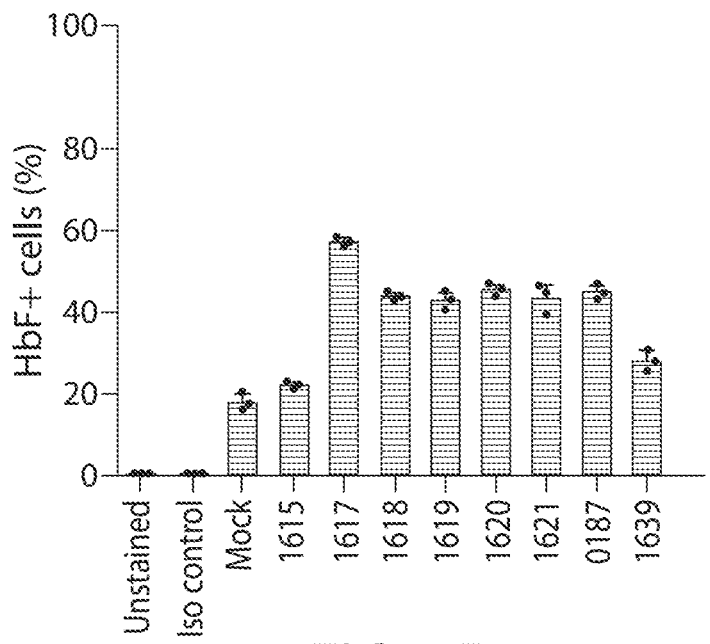
(FIG. 5F) Percent HbF cells by flow cytometry analysis in erythroid cells in vitro differentiated from CD34$^+$ HSPCs edited by RNP coupled with various sgRNAs (each targeting BCL11A enhancer). Error bars indicate standard deviation (n=3 replicates).
Figure 5H:
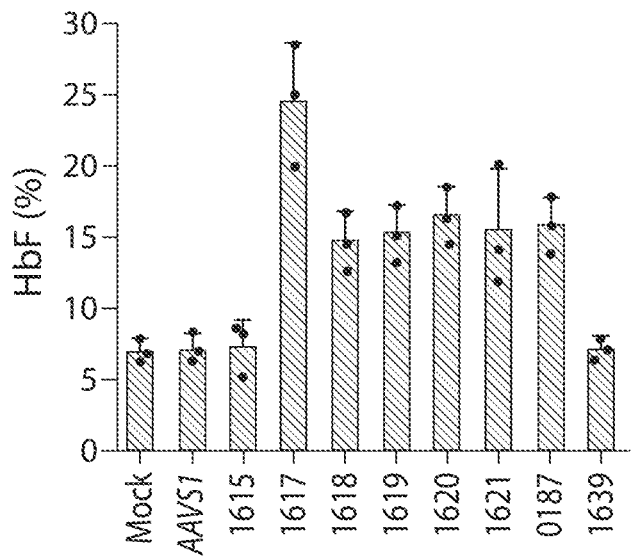
(FIG. 5H) HbF induction by HPLC analysis in erythroid cells in vitro differentiated from RNP edited CD34$^+$ HSPCs.

Electroporation of Cas9 and sgRNA RNP complexes enables delivery of a transient pulse of genome editing material to human cells[7,8]. Previously lentiviral pooled sgRNA screening had been employed to identify a set of sgRNAs targeting the core of the +58 erythroid enhancer of BCL11A resulting in potent HbF derepression[3]. in vitro transcription was used to produce sgRNAs targeting the BCL11A enhancer and electroporated RNP complexes to healthy donor CD34+ HSPCs, which resulted in variable editing (9.5-87.0% indels; FIG. 5a, 5b). Consistent with prior observations, chemically modified synthetic (MS) sgRNAs produced more efficient editing than in vitro transcribed sgRNAs following RNP electroporation of CD34+ HSPCs[9]. A dose-dependent relationship was observed between RNP concentration and indel frequency and similar editing efficiency at Cas9:sgRNA molar ratios ranging from 1:1 to 1:2.5 (FIG. 5c-5e).

Figure 5I:
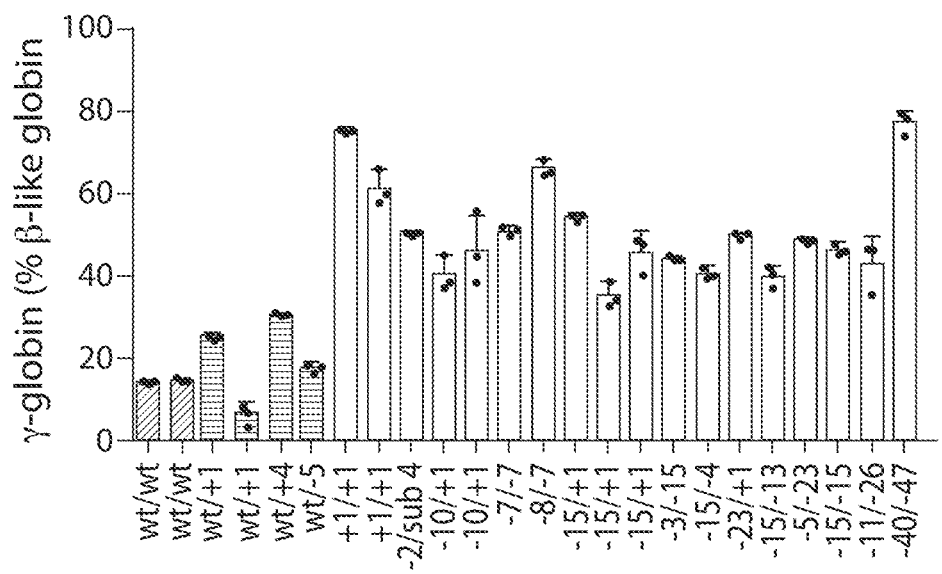
(FIG. 5I) Genotyping and β-like globin expression analysis of clonal erythroid cells derived from single CD34$^+$ HSPCs. Error bars indicate standard deviation (n=3 technical replicates per colony).
Figure 5J:
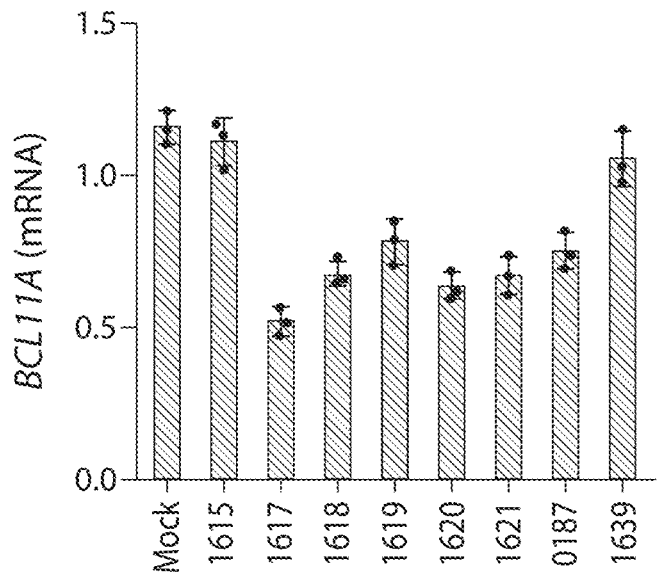
(FIG. 5J) BCL11A expression in CD34$^+$ HSPCs edited with Cas9 coupled with various MS-sgRNAs targeting BCL11A enhancer. Expression normalized to CAT, measured by RT-qPCR on day 11 of in vitro differentiation. Error bars indicate standard deviation (n=3 replicates).
Figure 5K:
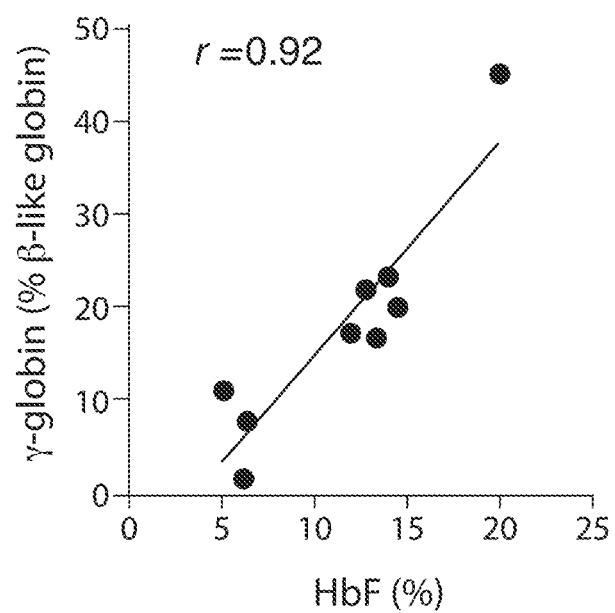
(FIG. 5K) Correlation of γ-globin mRNA expression determined by RT-qPCR versus HbF by HPLC. Black dots represent samples edited with 2×NLS-Cas9 coupled with various MS-sgRNAs.
Figure 5L:
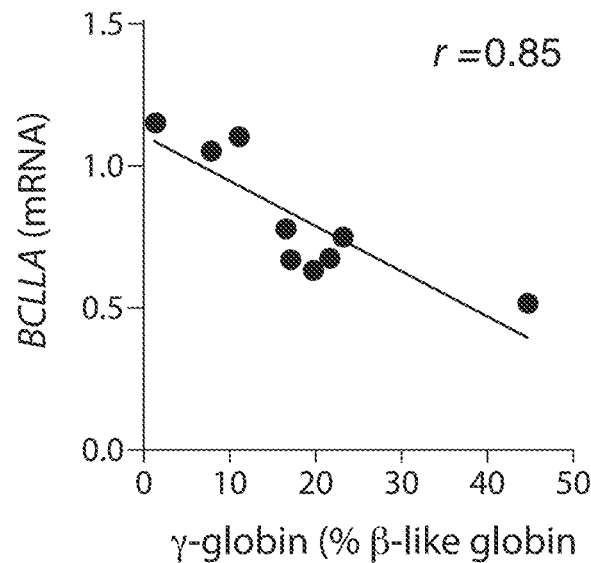
(FIG. 5L) Correlation of BCL11A mRNA versus γ-globin mRNA determined by RT-qPCR. Black dots represent samples edited with 2×NLS-Cas9 coupled with various sgRNAs.
Figure 5M:
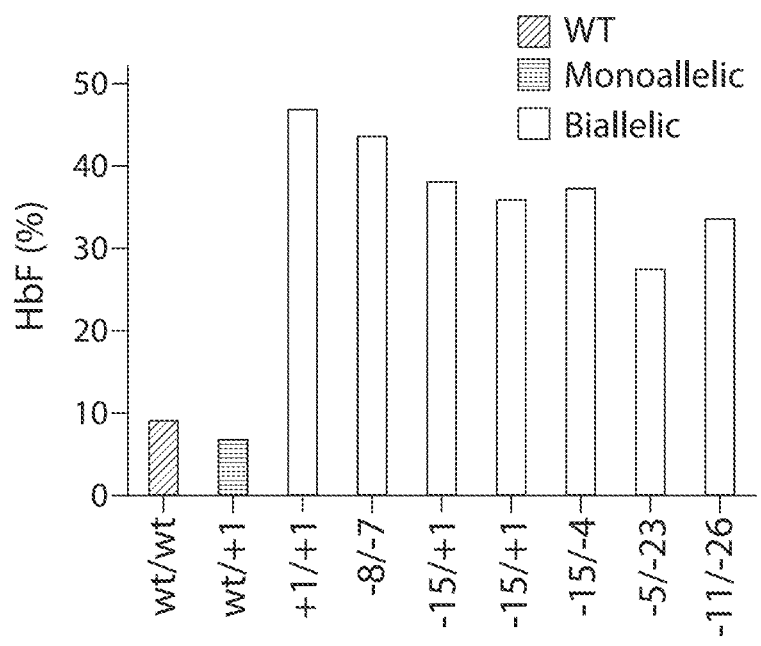
Figure 5N:
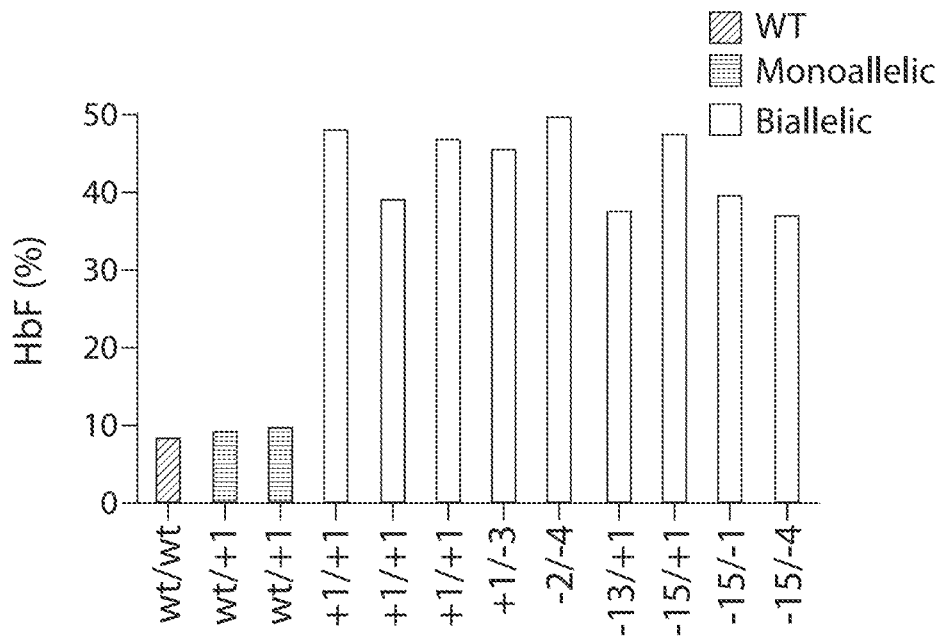
Figure 5O:
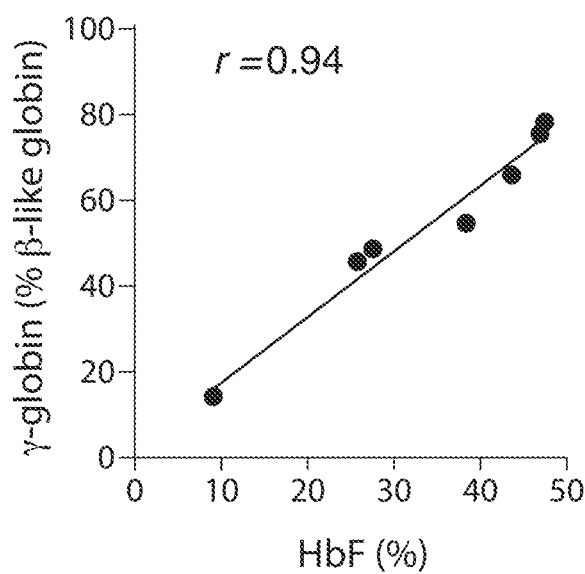
(FIG. 5O) Correlation of percent γ-globin mRNA determined by RT-qPCR versus HbF by HPLC. Black dots represent single colonies edited with 2×NLS-Cas9 coupled with MS-sgRNA-1617. The Pearson correlation coefficient (r) is shown. In all panels, data are plotted as mean±SD. Data are representative of three biologically independent replicates.
Figure 6A:
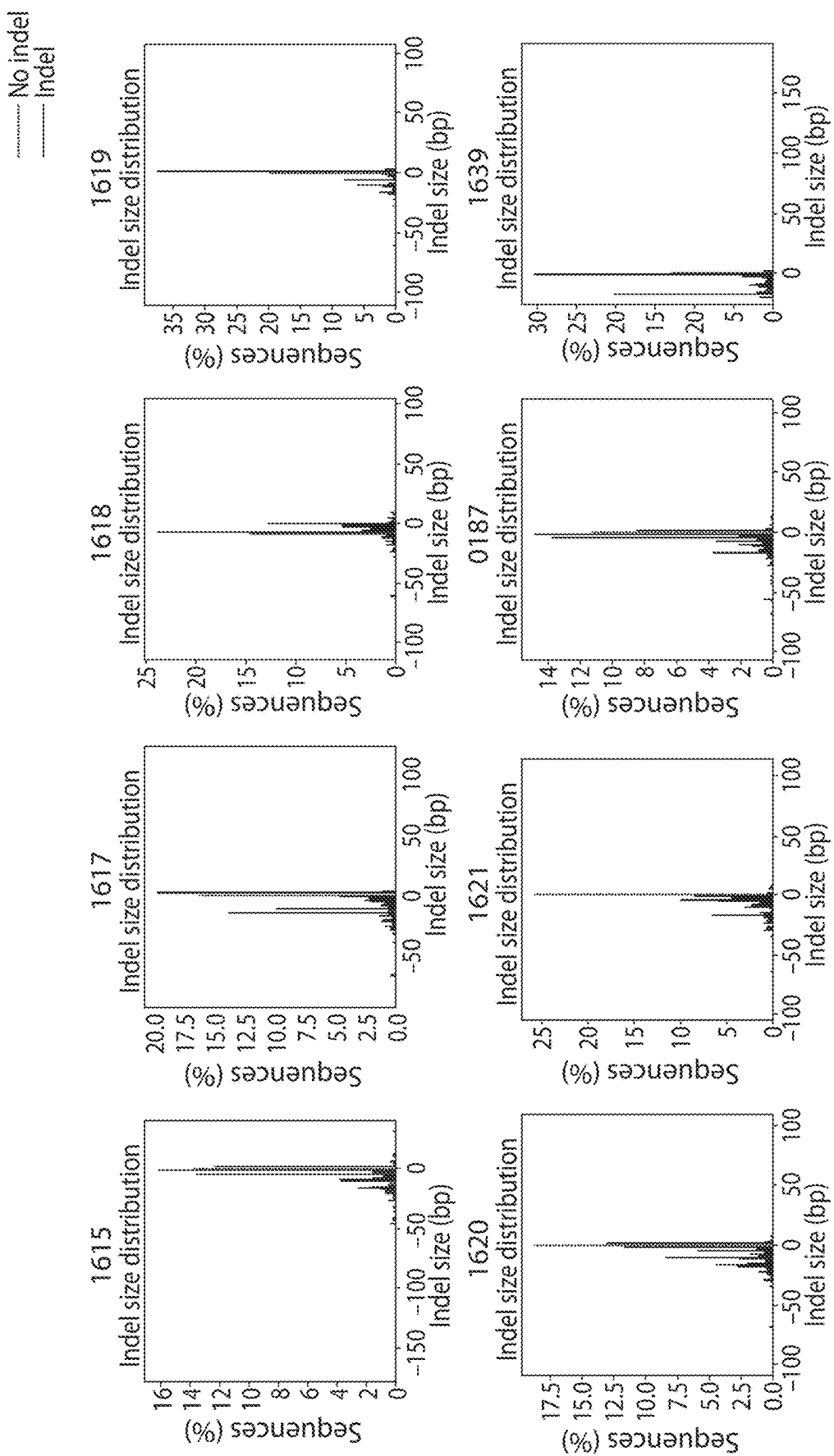
FIG. 6A-6B show indel frequencies from deep sequencing.
Figure 6B:
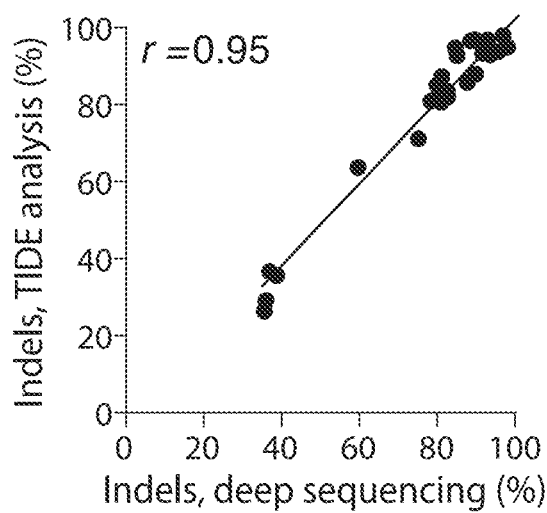
Figure 7A:
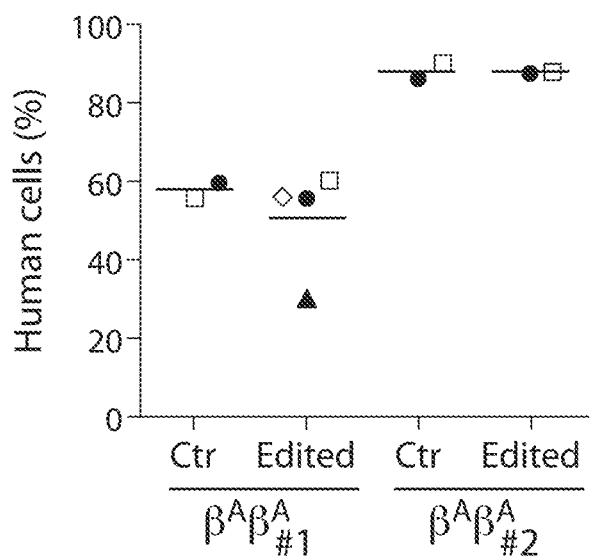
FIG. 7A-7I show long-term multi-lineage engraftment of BCL11A enhancer edited HSPCs in immunodeficient mice. CD34+ HSPCs from two healthy donors were electroporated with 2×NLS-SpCas9 RNP (coupled with MS-sgRNA-1617) and transplanted into NBSGW mice. Non-electroporated cells were transplanted as controls. 0.4 million cells per mouse were infused for donor $\beta^A\beta^A_{\#1}$, and 0.8 million cells per mouse for donor $\beta^A\beta^A_{\#2}$.
Figure 7B:
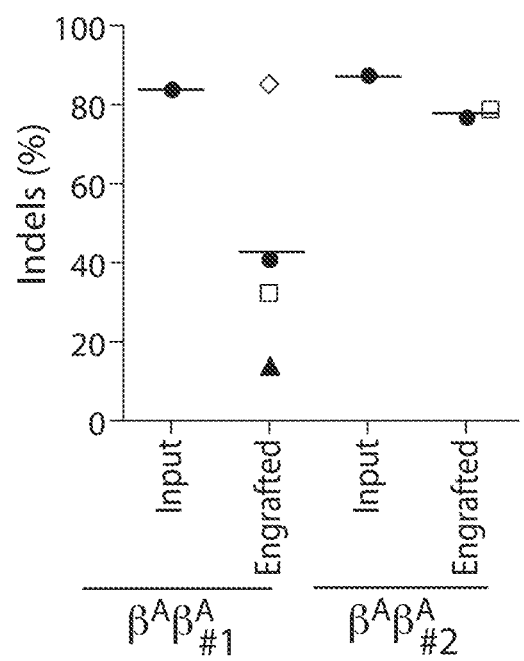
Figure 7C:
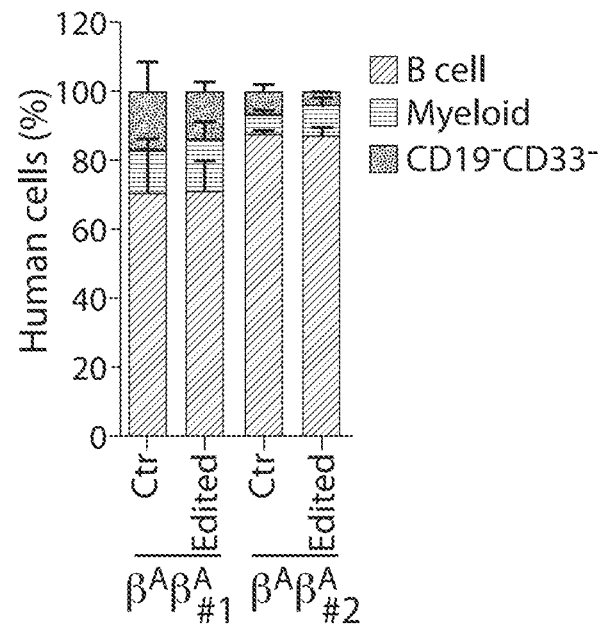
Figure 7D:
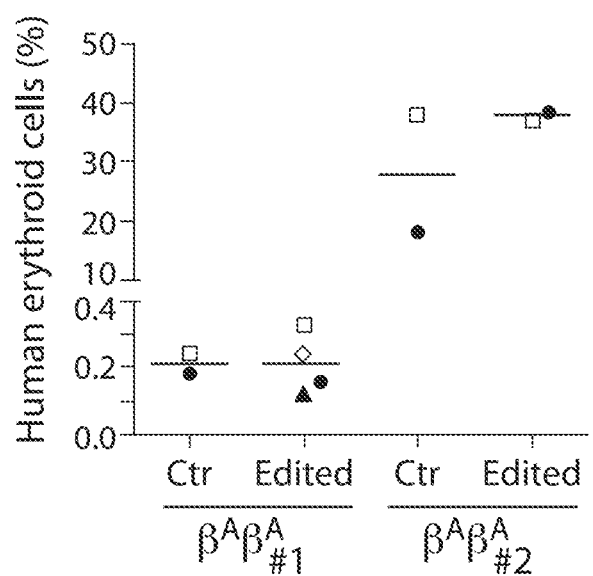
Figure 7E:
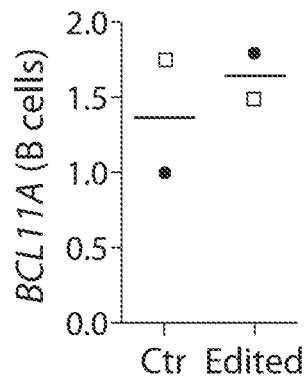

Of 8 MS-sgRNAs targeting the core of the +58 erythroid enhancer of BCL11A in CD34+ HSPCs, editing efficiency ranged from 66.1-90.7% indel frequency (FIG. 1a, 1b, FIG. 6a-6b). Editing with sgRNA-1617, which cleaves directly within a GATA1 binding motif[10] at the core of the +58 enhancer, gave the highest levels of γ-globin and HbF induction in erythroid progeny (FIG. 1a, 1c, and FIG. 5f, 5h). Editing of the BCL11A enhancer resulted in reduction in BCL11A transcript expression by 54.6% (FIG. 5j). A strong correlation was observed between reduction of BCL11A expression and induction of γ-globin and HbF (FIG. 1d, 5j-5l). Deep sequencing confirmed the high rate of indels, and showed that the most common mutations were +1 bp insertions, as produced by imprecise nonhomologous-end joining repair (NHEJ), followed by –15 bp and –13 bp deletions, each products of microhomology-mediated end joining (MMEJ) repair (FIGS. 1f, 5g, and 6a-6b). Clonal analysis of the erythroid progeny of CD34+ HSPCs edited at the BCL11A enhancer by sgRNA-1617 was conducted, assessing genotype, globin gene expression by RT-qPCR, and HbF analysis by HPLC (FIG. 5i, 7d, 7e, and data not shown). Colonies with biallelic enhancer modifications demonstrated elevated γ-globin mRNA levels (mean 50.8% of total β-like globin, range 35.3-75.1%, as compared to 14.7% in unedited colonies) and elevated HbF protein levels (mean 37.6%, range 27.5-46.9%, as compared to 9.1% in unedited colonies). Single base insertions at the sgRNA-1617 cleavage site were just as effective as longer deletions at increasing HbF levels.

Figure 1H:
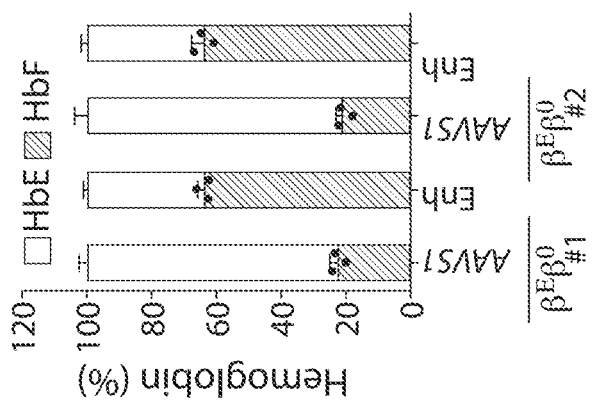
Figure 1G:
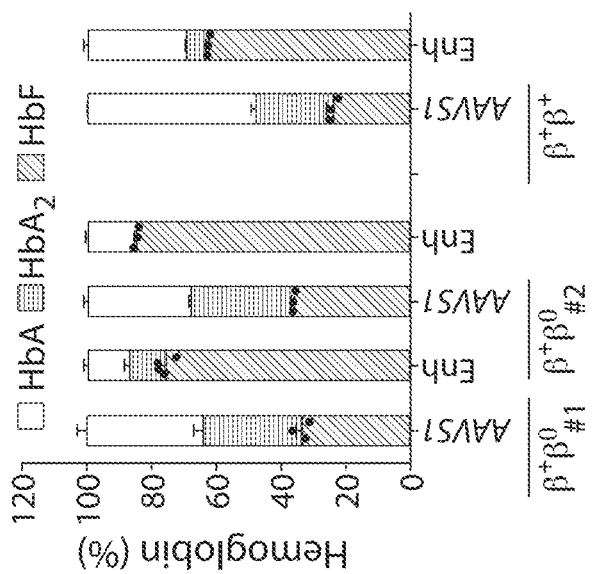
Figure 1J:
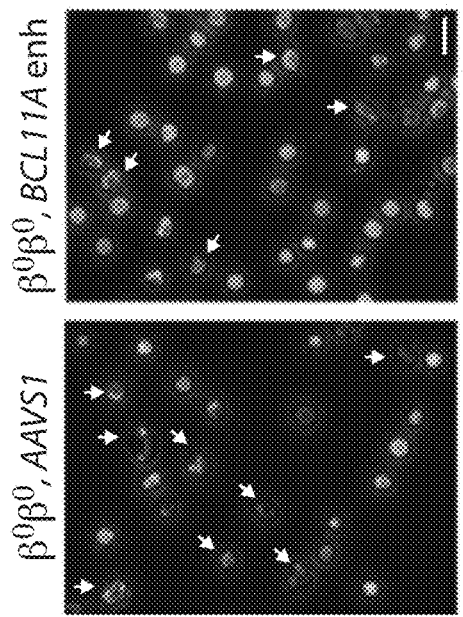
Figure 1L:
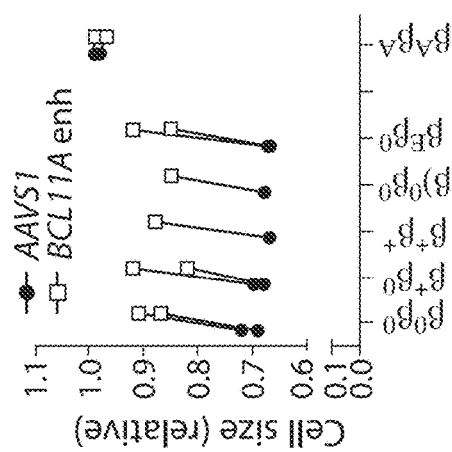
Figure 1K:
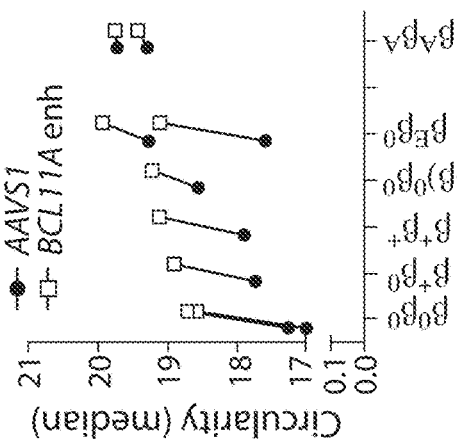
Figure 1M:
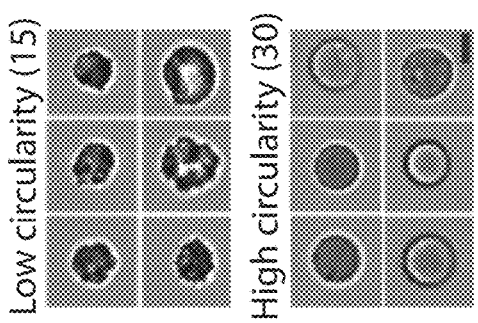

To test if this BCL11A enhancer editing approach would result in clinically meaningful γ-globin induction, CD34+ HSPCs from seven patients with β-thalassemia of varying genotypes were edited, including $β^0β^0$, $β^+β^0$, $β^+β^+$, $(^Aγδβ)^0β^0$ and $β_Eβ^0$ (Table 2). The RNP editing rate with MS-sgRNA-1617 was similar to that from healthy control HSPCs (mean 84.4% indels; range 75.3-92.5%, FIG. 1e). RNP editing of the AAVS1 locus served as a functionally neutral control. In each β-thalassemia donor's BCL11A enhancer edited cells, potent induction of γ-globin (mean 63.6% relative to α-globin; range 33.0-89.0%; FIG. 1f) and induction of HbF fraction in donors with residual expression of HbA or HbE (FIG. 1g, 1h) was demonstrated. Without wishing to be bound by a particular theory, it was hypothesized that therapeutically relevant amelioration of globin chain imbalance, the pathophysiologic underpinning of β-thalassemia, would result in improvement of terminal erythroid maturation. A higher frequency of enucleation, larger size, and more circular shape of terminal erythroid cells were found in each of the β-thalassemia samples, but no effect on the healthy donor samples, following BCL11A enhancer editing (FIG. 1i-1m).

Figure 7F:
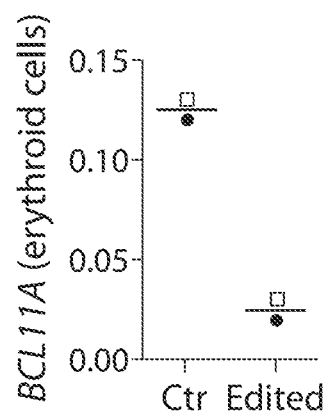
Figure 7G:
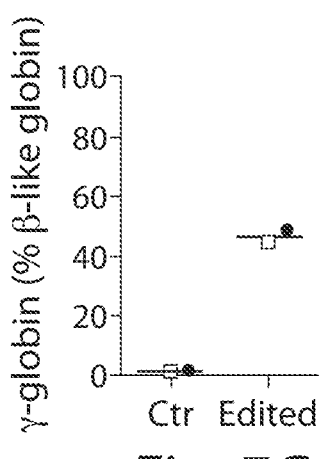
Figure 7H:
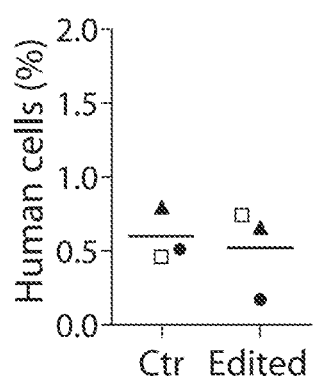
Figure 7I:
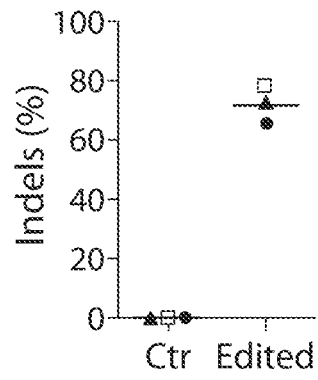

The durability of an autologous hematopoietic cell therapy depends on the ability to permanently modify stem cells. To test the impact of BCL11A enhancer editing on HSCs, edited human CD34+ HSPCs were engrafted into immunodeficient NBSGW mice, since they support not only myeloid and lymphoid but also erythroid engraftment[11]. Using two separate donors, it was found that the recipients of edited and unedited CD34+ HSPCs had similar levels of human lymphoid, myeloid, and erythroid cell engraftment within the bone marrow after 16 weeks (FIG. 7a, 7c, 7d, and data not shown). Variability was observed in the fraction of indels in the engrafting cells from edited mice, ranging from 13.8%-85.5% (FIG. 7b). Comparing the indel frequencies in the input cells to the engrafting cells a mean reduction of 40.9% was observed. In the engrafting bone marrow cells, no reduction in BCL11A transcript levels in edited B-lymphocytes were found, but 80.0% reduction in edited erythroid cells, consistent with the strict lineage specificity of these enhancer sequences (FIG. 7e, 7f). In human erythroid cells from the bone marrow, robust induction of γ-globin was observed, increasing from 1.8% to 46.8% upon editing (FIG. 7g). Edited bone marrow cells were able to support secondary transplantation to a similar level as unedited cells, while maintaining a mean indel frequency of 72.2%, consistent with gene editing of self-renewing HSCs (FIG. 7h, 7i). Long-term engrafting HSCs not bearing biallelic therapeutic edits represent a possible barrier to full therapeutic benefit. In SCD a minority fraction of residual sickle erythrocytes can potentially result in negative rheologic and pathologic consequences[12,13]. Therefore, methods to maximize editing efficiency in HSCs were investigated.

Figure 2E:
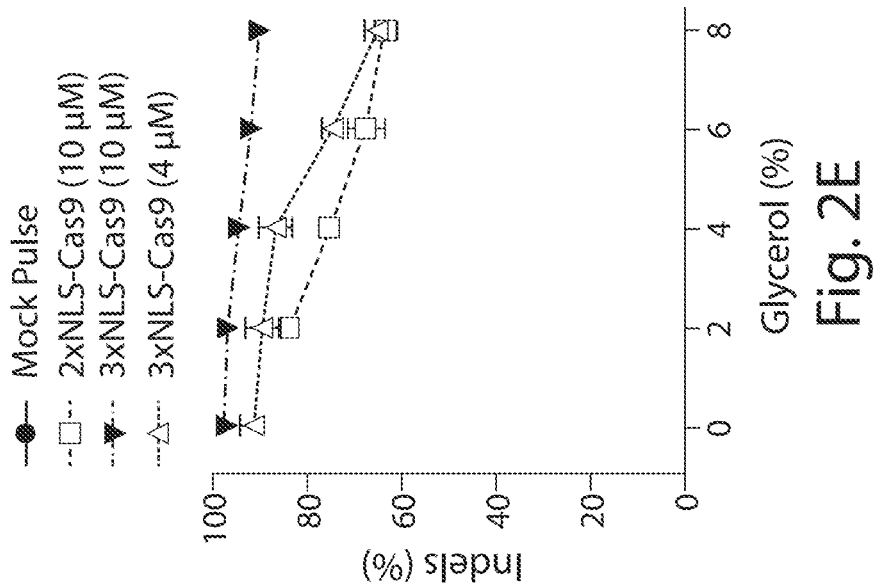
FIG. 2A-2O show highly efficient BCL11A enhancer editing in HSCs.
(FIG. 2B) Dose-dependent editing of human BCL11A enhancer with 2×NLS-Cas9 or 3×NLS-Cas9 RNP.
(FIG. 2C) Viability of CD34+ HSPCs after electroporation with 2×NLS-Cas9 and 3×NLS-Cas9.
(FIG. 2D) Viability of CD34+ HSPCs after electroporation with RNP and glycerol. e, Indel frequencies of CD34+ HSPCs after electroporation with RNP and glycerol. Error bars indicate standard deviation (n=3 replicates with three independent healthy donors in FIG. 2B-2E.
(FIG. 2F) Summary of most frequent indels by deep sequencing following 3×NLS-Cas9 RNP BCL11A enhancer editing of CD34+ HSPCs. Asterisk indicates unedited allele.
(FIG. 2G) Western blot analysis showing reduction of BCL11A protein after editing of human BCL11A enhancer with 2×NLS-Cas9 or 3×NLS-Cas9 RNP (MS-sgRNA-AAVS1 or MS-sgRNA-1617) at indicated days of in vitro differentiation. Blots are cropped, BCL11A observed at ~120 kDa, GAPDH at ~37 kDa.
(FIG. 2H-2J) NBSGW mice transplanted with 3×NLS-Cas9 RNP (coupled with MS-sgRNA-1617) edited CD34+ HSPCs from three independent healthy donors ($\beta^A\beta^A_{\#1}$, $\beta^A\beta^A_{\#5}$). BM collected 16 weeks after transplantation were analyzed by flow cytometry for human cell chimerism (FIG. 2H), multilineage reconstitution from $\beta^A\beta^A_{\#1}$ (FIG. 2I) in BM, as well as the indel frequencies determined by TIDE analysis (FIG. 2J).
(FIG. 2K-2M) RT-qPCR analysis of BCL11A expression in sorted human B cells (FIG. 2K) or human erythroid cells (FIG. 2L) and β-like globin expression in sorted human erythroid cells (FIG. 2M) from NBSGW mice transplanted with 3×NLS-Cas9 RNP edited CD34+ HSPCs.
(FIG. 2N) BM from one mouse each engrafted with unedited control or edited cells ($\beta^A\beta^A_{\#1}$) were transplanted to secondary NBSGW mice and BM was analyzed for human cell chimerism after 16 weeks.
Figure 2D:
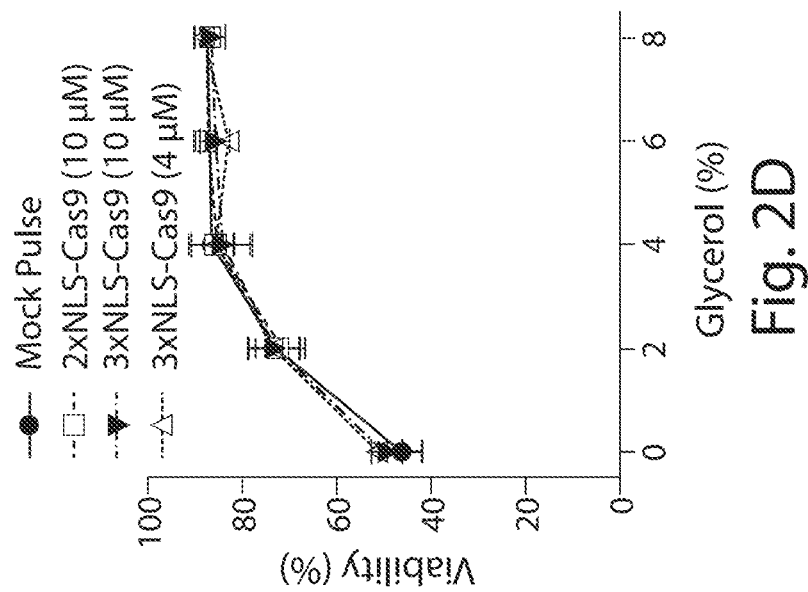
Figure 2F:
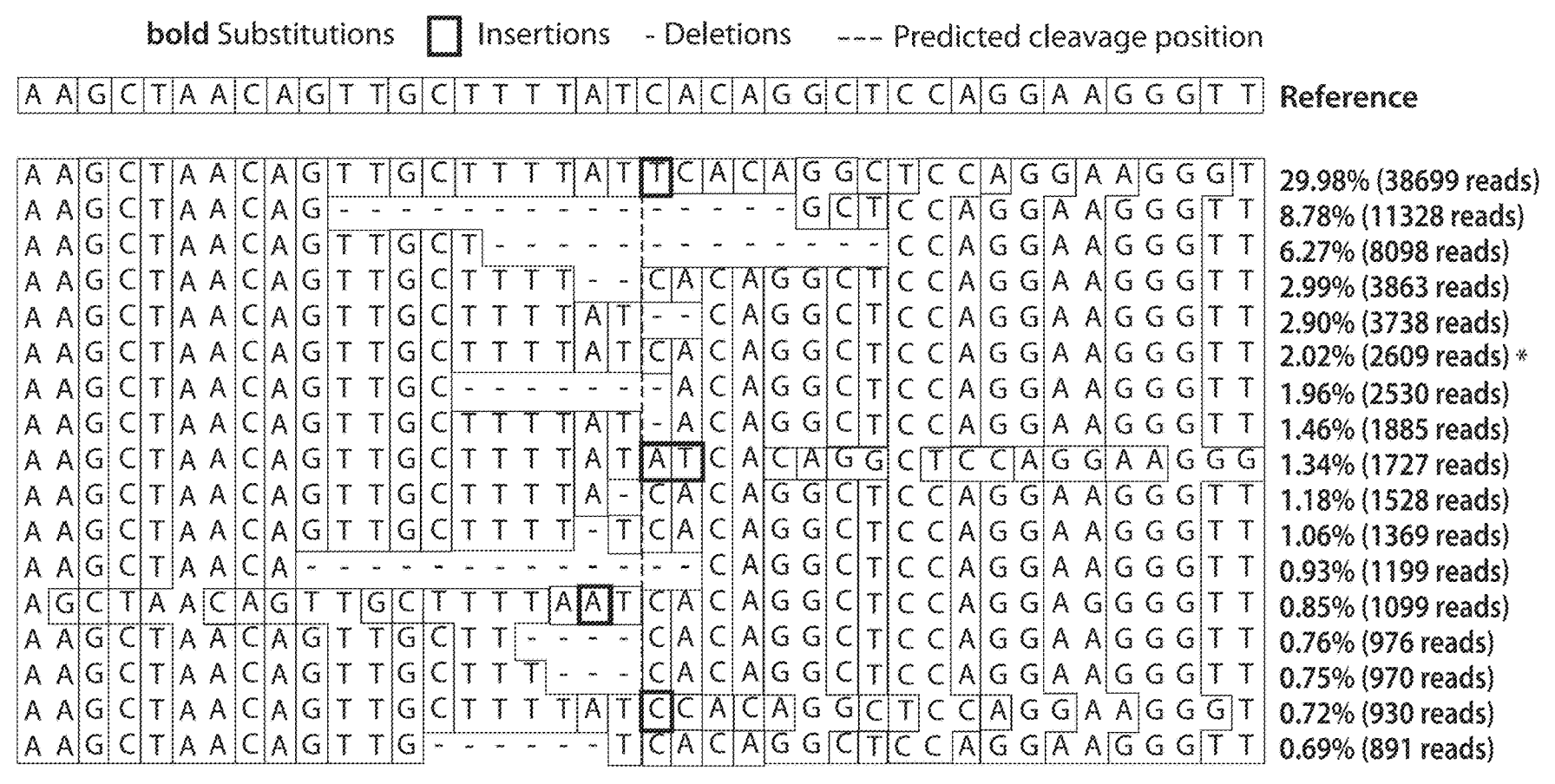
Figure 2G:
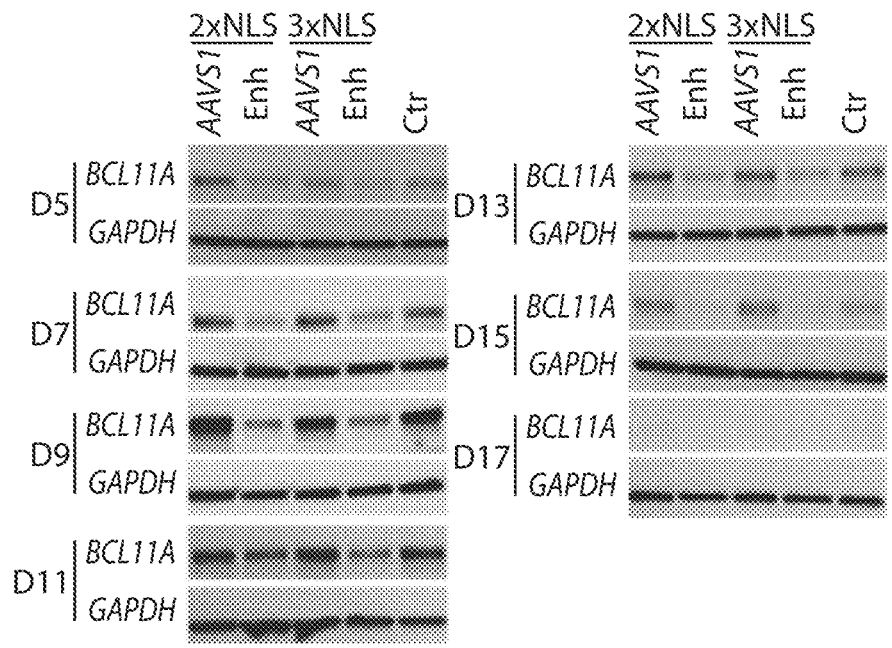
Figure 8A:
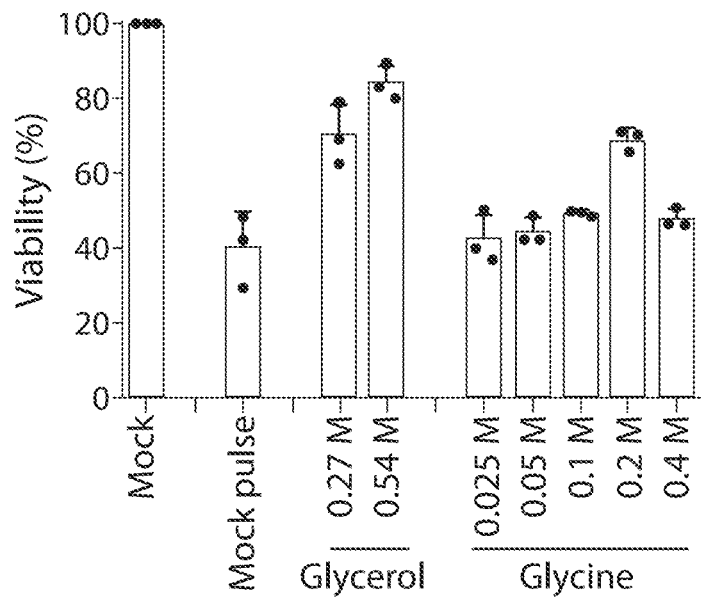
FIG. 8A-8G show highly efficient editing of BCL11A enhancer in CD34+ HSPCs.
Figure 8B:
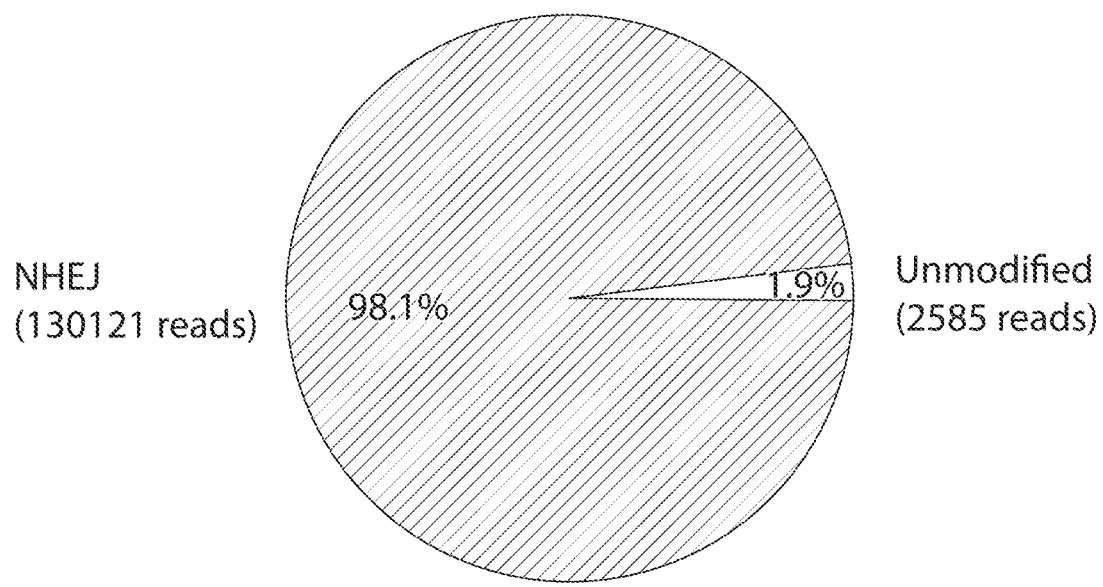
Figure 8C:
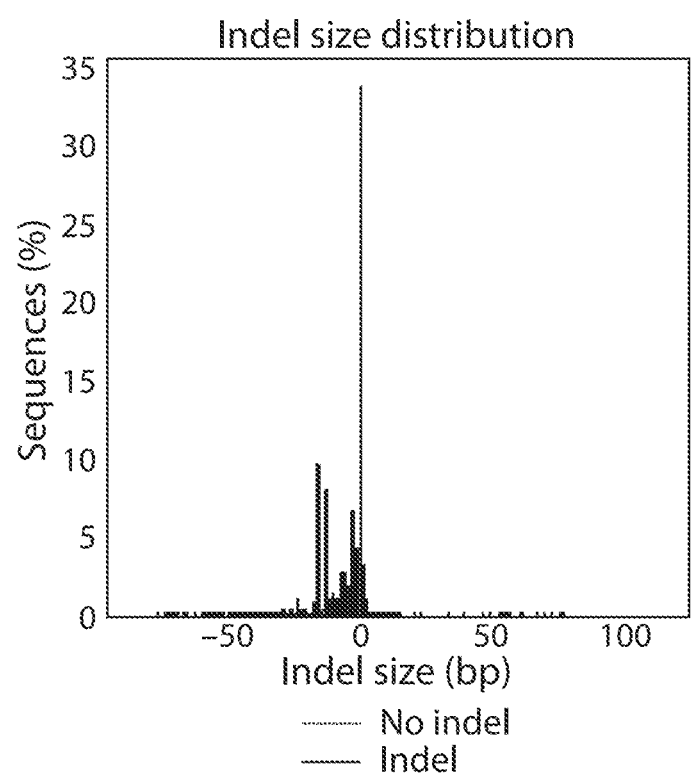
Figure 8D:
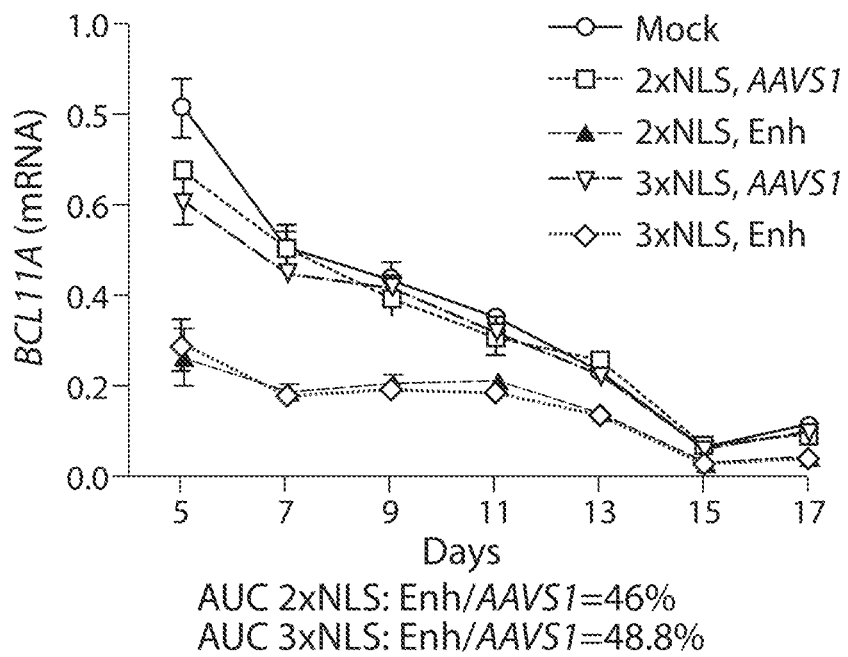
Figure 8E:
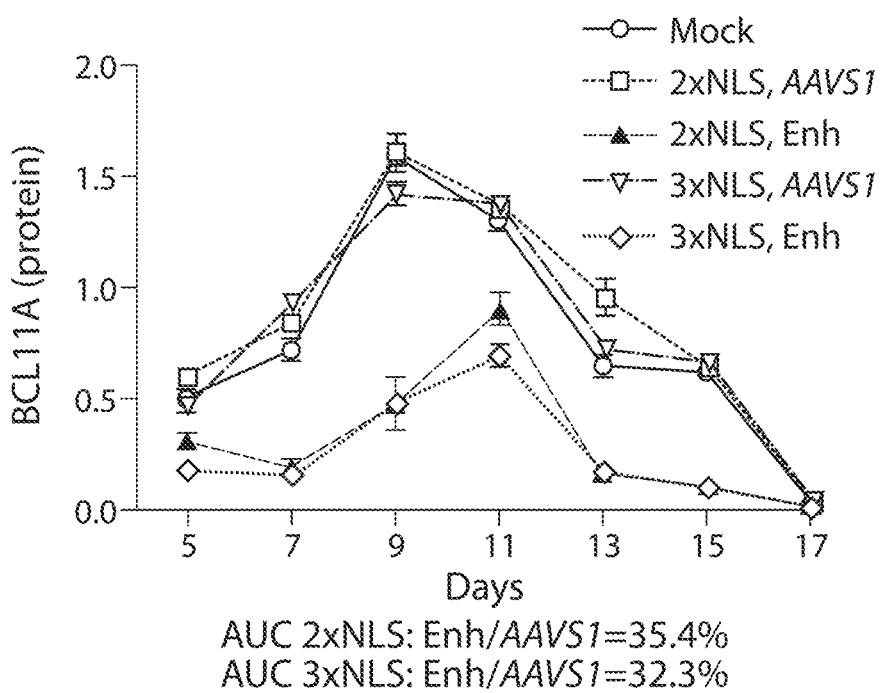
Figure 8F:
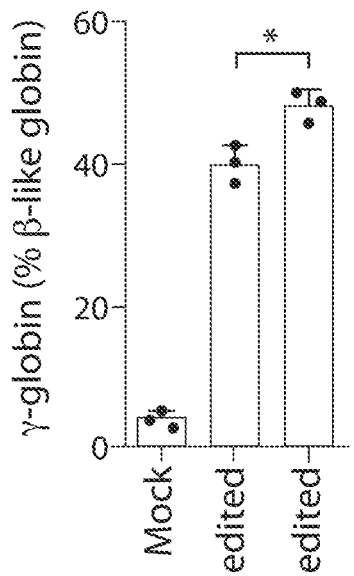
Figure 8G:
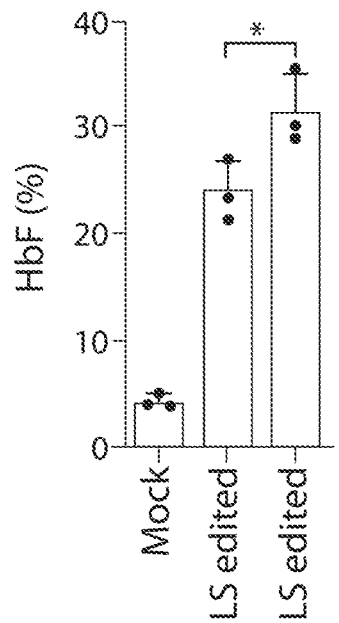

The SpCas9 protein used in the experiments described herein included two SV40 nuclear localization signal sequences (NLSs) on the C-terminus[14] (subsequently called 2×NLS-Cas9). It was hypothesized that additional orthogonal nuclear localization sequences could improve genome editing efficiency. A c-Myc-like NLS was appended to the N-terminus and both SV40 and nucleoplasmin NLSs to the C-terminus of SpCas9 (subsequently called 3×NLS-Cas9) (FIG. 2a). Human CD34+ HSPCs were electroporated with BCL11A enhancer targeting RNPs at concentrations ranging from 1-10 μM and found increased indel frequencies at all doses with 3×NLS-Cas9 (FIG. 2b). At doses of 5 μM and greater the indel frequency exceeded 95%. The viability of cells electroporated with 3×NLS-Cas9 was inferior compared to those receiving 2×NLS-Cas9. However as the concentration of 2×NLS-Cas9 was reduced, viability approached that of 3×NLS-Cas9 treated cells (FIG. 2c), indicating that a component of the diluent for 2×NLS-Cas9 might be protective. The 2×NLS-Cas9 stock was dissolved in 10% glycerol, whereas the 3×NLS-Cas9 stock was not dissolved in glycerol. Cells were electroporated with 3×NLS-Cas9 with a final glycerol concentration ranging from 0 to 8% and found that additional glycerol protected the cells from loss of viability (FIG. 2d). This protective effect was observed with 2×NLS-Cas9, 3×NLS-Cas9, and without Cas9, indicating that glycerol was protective against electroporation-mediated toxicity independent of genome editing (FIG. 2d). Similar protection against electroporation toxicity with glycine was observed, consistent with a possible osmoprotectant effect (FIG. 8a). There was a slight decrement of editing with increasing doses of glycerol, indicating a balance between maximizing cell viability and genome editing efficiency (FIG. 2e). It was found that 3×NLS-Cas9 RNP electroporation was able to achieve up to 98.1% indels in CD34+ HSPCs (FIG. 2f, 8b, 8c). There was a similar distribution of alleles as with 2×NLS-Cas9 editing, with the +1 bp insertion the most frequent indel, followed by the −15 bp and −13 bp deletions. It was observed that a similar magnitude of decrease in BCL11A mRNA and protein level during in vitro erythroid maturation with 2×NLS-Cas9 or 3×NLS-Cas9 RNP electroporation, although there was a modest increase in both γ-globin and HbF induction with 3×NLS-Cas9 (p<0.05, FIG. 2g, 8d-8g).

Figures 2H, 2I:
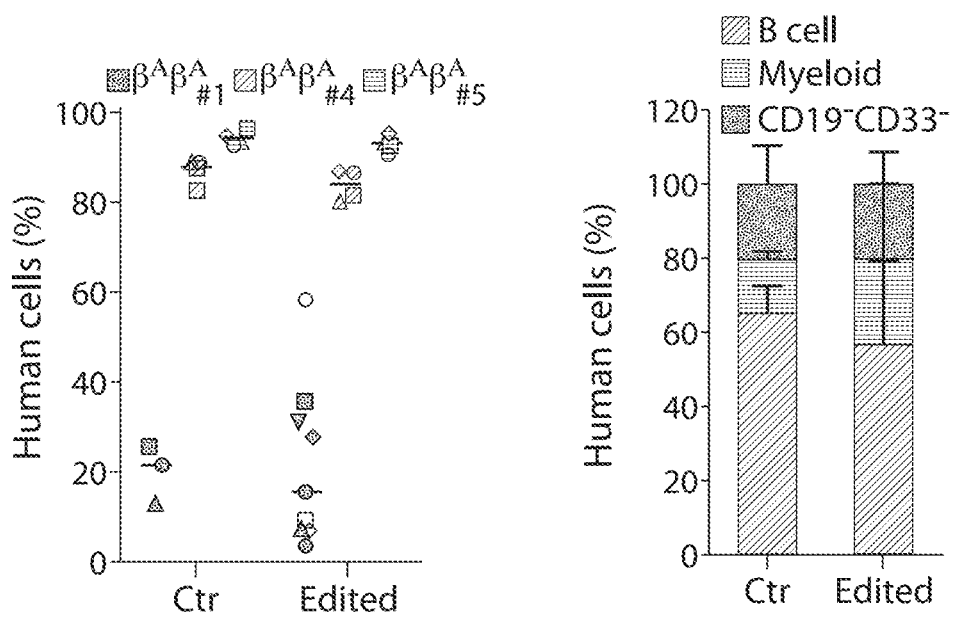
Figure 9A:
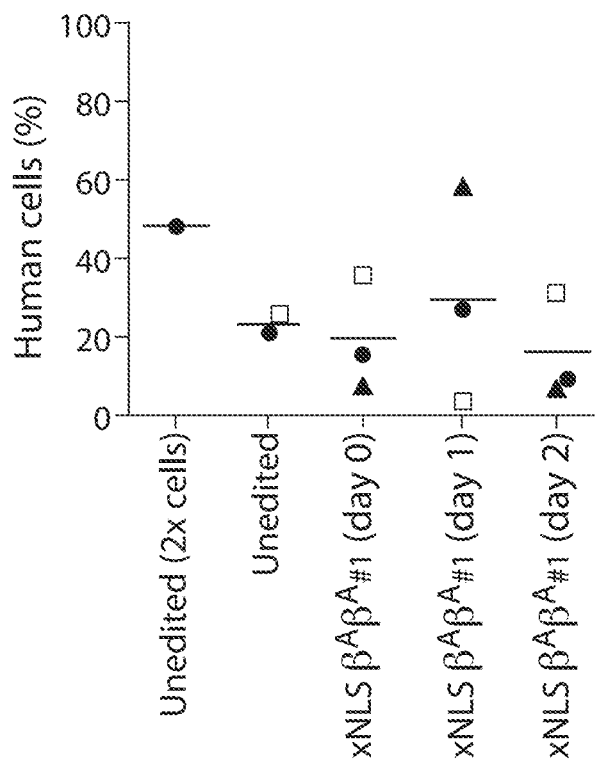
FIG. 9A-9I show long-term multi-lineage reconstituting HSCs edited with 3×NLS-Cas9.
Figure 9B:
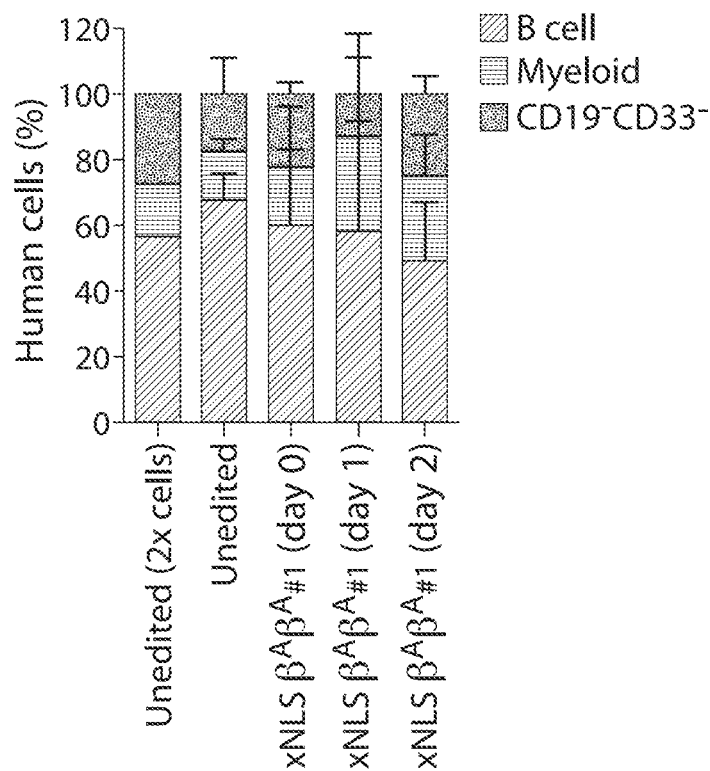
Figure 9C:
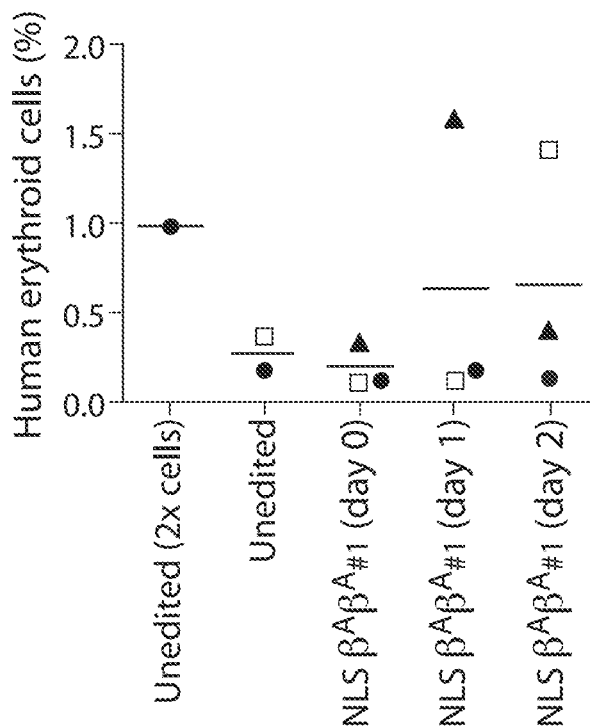
Figure 9D:
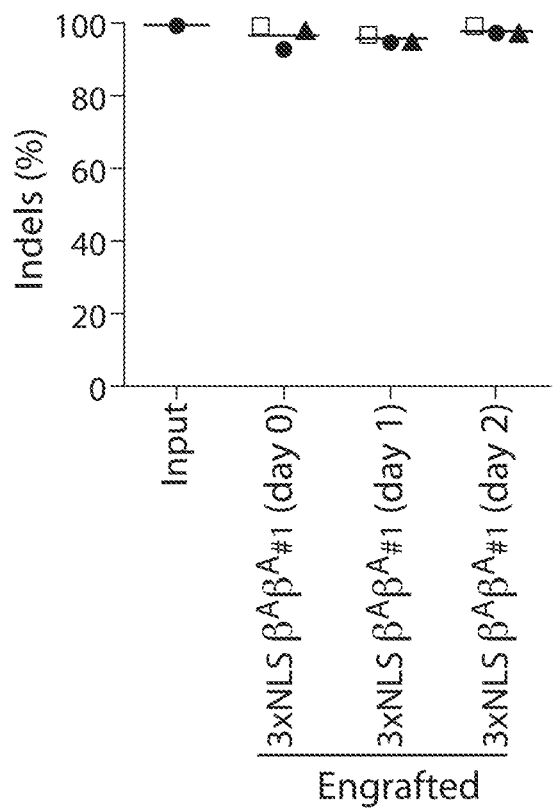
Figure 9E:
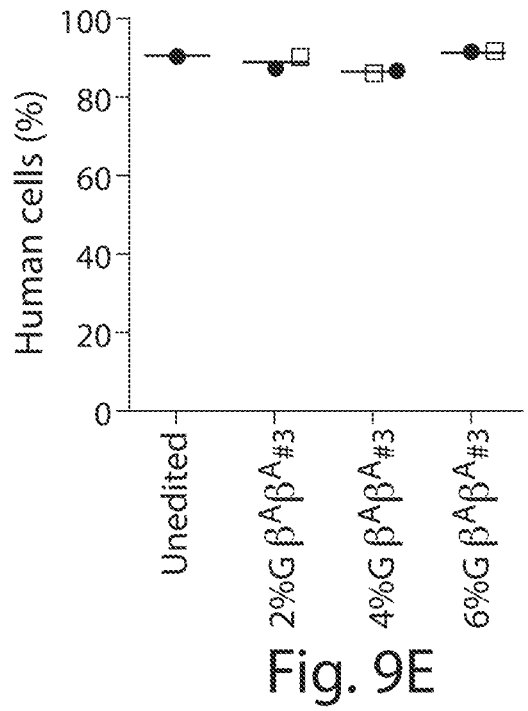
Figure 9F:
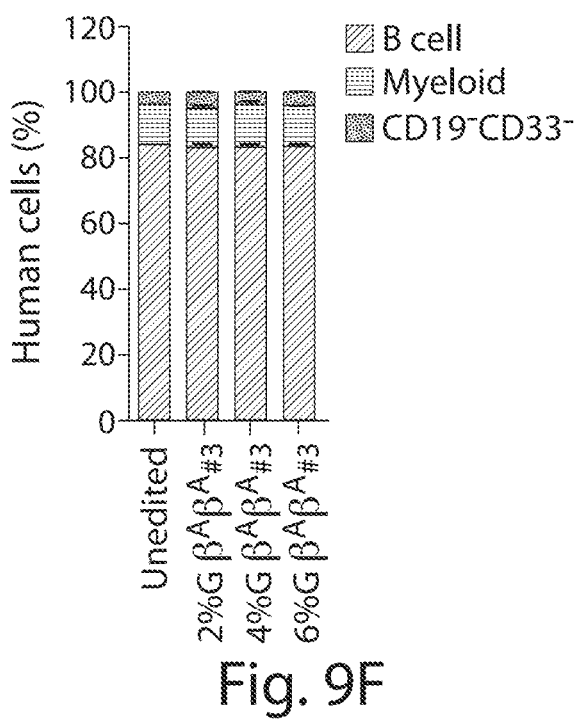
Figure 9G:
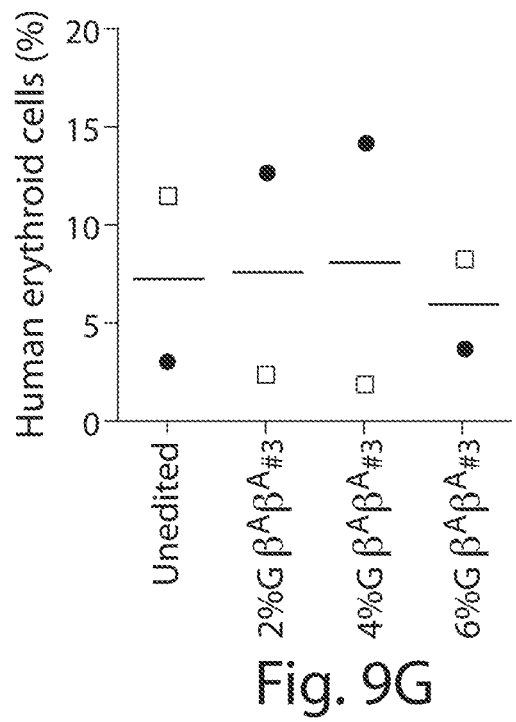
Figure 9H:
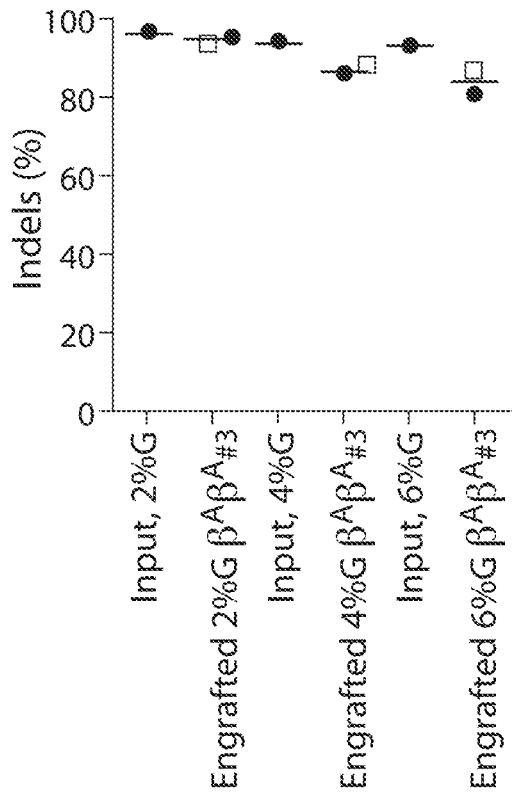
Figure 9I:
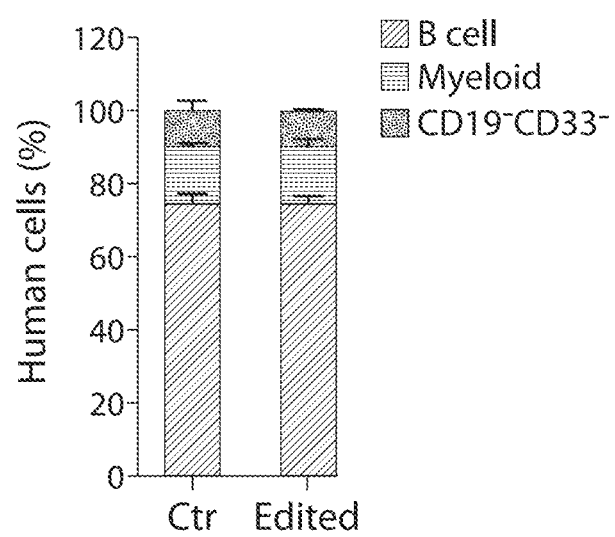
Figure 10A:
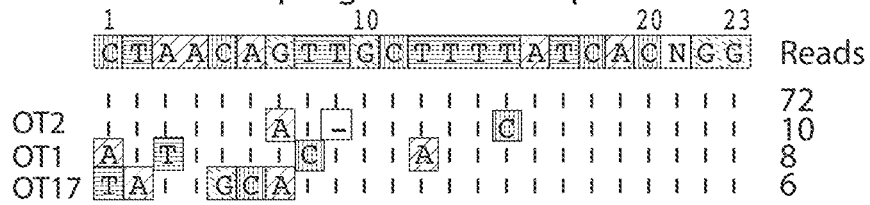
FIGS. 10A and 10B show off-target analysis of human CD34+ HSPCs edited by SpCas9 RNP targeting BCL11A enhancer.
Figure 10A:
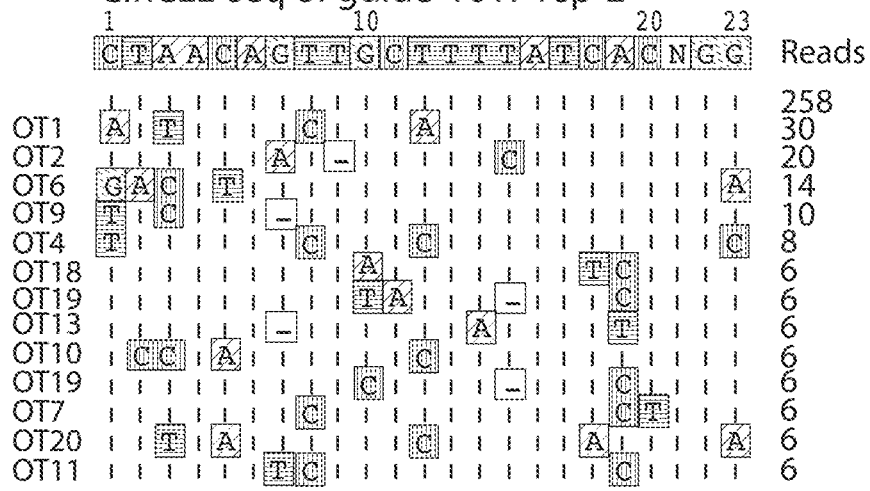
Figure 10A:
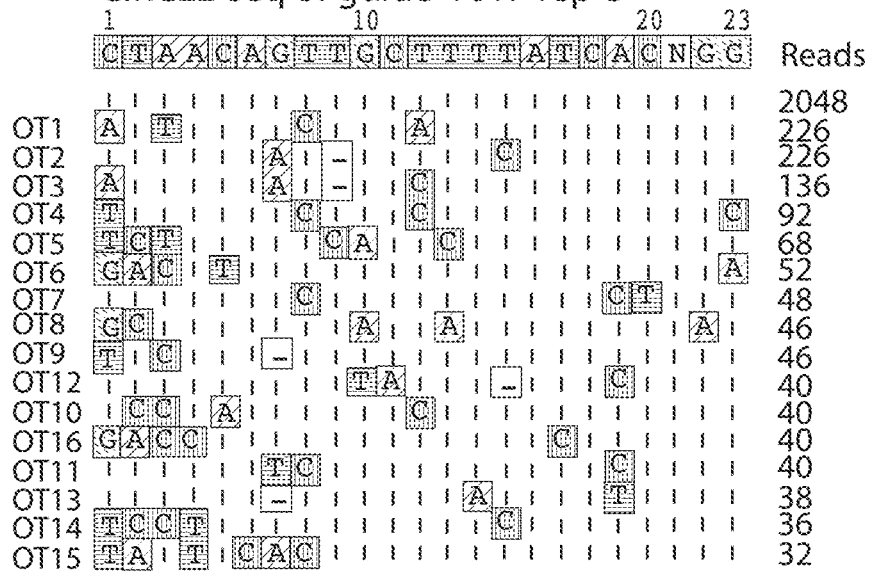

It was hypothesized that maximizing genome editing efficiency might increase the fraction of indels in engrafting edited HSCs and enhance HbF induction in erythroid progeny. RNP electroporation with 3×NLS-Cas9 and BCL11A enhancer MS-sgRNA-1617 resulted in similar human marrow engraftment after 16 weeks with edited and unedited CD34+ HSPCs, with a dose-dependent relationship between cell infusion dose and human cell engraftment (FIG. 2h, FIG. 12b). No difference in human engraftment was observed if cells were infused 0, 1, or 2 days following electroporation (FIG. 10a). Edited cells showed similar capacity for lymphoid, myeloid, and erythroid engraftment (FIG. 2i, 9b, 9c). Engrafting human cells maintained 96.5% indels, similar to the 98.1% indels observed in the input cells (FIG. 2j, 9d). In the bone marrow, BCL11A expression was preserved in edited B-lymphocytes but reduced by 82.7% in edited erythroid cells (FIG. 2k, 2l). γ-globin was elevated from 2.2% to 70.8% total β-like globin in edited human erythroid cells (FIG. 2m, 9c). Transplant of CD34+ HSPCs electroporated with 3×NLS-Cas9 and MS-sgRNA-1617 and supplemented with 2%, 4% or 6% glycerol also yielded potent human engraftment while maintaining high indel frequencies in the repopulating cells (FIG. 9e-9h). The 3×NLS-Cas9 edited bone marrow cells were also able to support secondary transplantation to a similar level as unedited cells, while maintaining a mean indel frequency of 96.5%, consistent with gene editing of self-renewing HSCs (FIG. 2n, 2o, 13d, 13e). The high efficiency of therapeutic editing within engrafting hematopoietic cells was consistently observed using HSPCs from four different healthy donors (FIG. 2h-2o, 9a-9i).

Figure 10B:
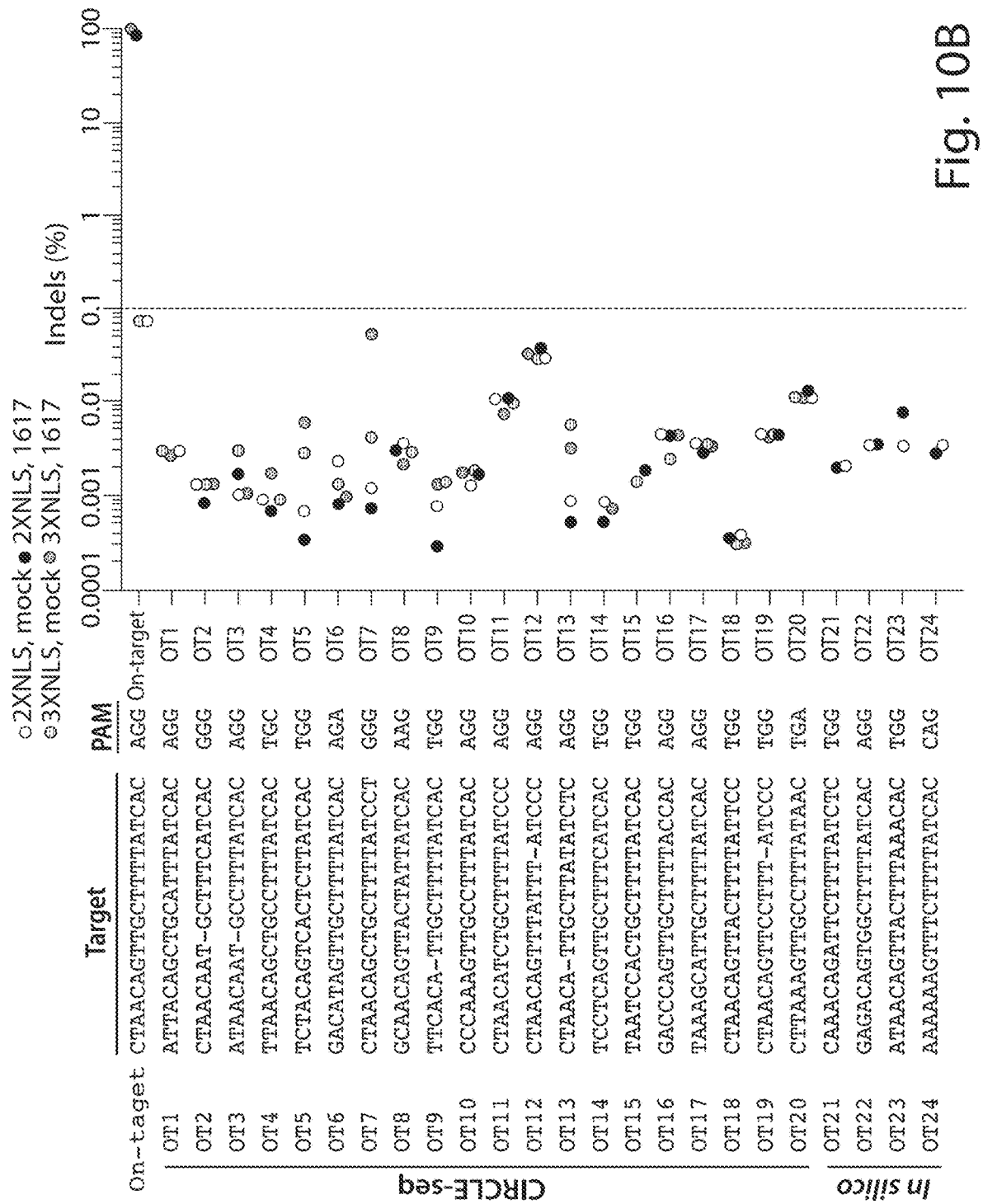
Figure 10C:
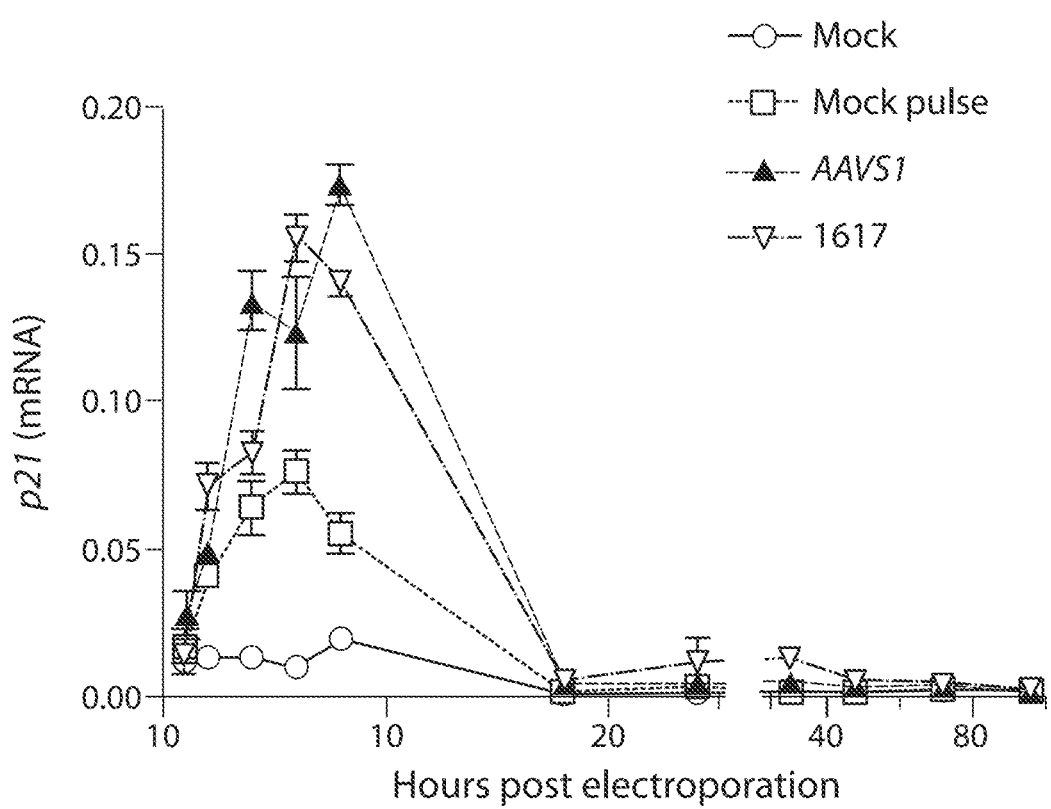

To test the specificity of the RNP sgRNA-1617, CIRCLE-seq, a method to define genome-wide target sequences susceptible to RNP cleavage in vitro[15], was performed, identifying 20 potential off-target sites (FIG. 10a, and data not shown). Amplicon deep sequencing of each of these 20 off-target sites from CD34+ HSPCs edited with both 2×NLS-Cas9 and 3×NLS-Cas9 did not identify any off-target sites at which Cas9-dependent indels were observed, at the limit of detection of 0.1% allele frequency (FIG. 10b). From the same edited gDNA, 81.0-95.5% on-target indels were observed at the BCL11A enhancer. In addition, four additional in silico predicted off-target sites not identified by CIRCLE-seq (data not shown) were tested by amplicon deep sequencing and did not detect indels (FIG. 10b). Recent studies have emphasized that p53 is induced following programmable nuclease mediated DNA cleavage[16,17]. Consistent with intact DNA damage response, transient induction of P21 transcript following Cas9:sgRNA RNP electroporation to CD34+ HSPCs was observed, with peak levels between 4 and 8 hours after electroporation (FIG. 10c). Since a difference in human chimerism were not observed in xenotransplant recipients, it appeared unlikely that this DNA damage response had a major impact on HSPC engraftment potential. In pluripotent stem cells, clones with P53 mutation or inhibition have been reported to have a selective advantage following gene editing[17]. Targeted deep sequencing of edited CD34+ HSPCs was performed using a clinically approved 95-gene sequencing panel designed to identify recurrent somatically acquired hematologic malignancy associated mutations, including TP53 among loci tested[18]. Variant alleles at TP53 or any other of the hematologic malignancy associated loci were not observed in the edited HSPCs (data not shown). Together these data indicate an absence of detectable genotoxicity.

Figure 3A:
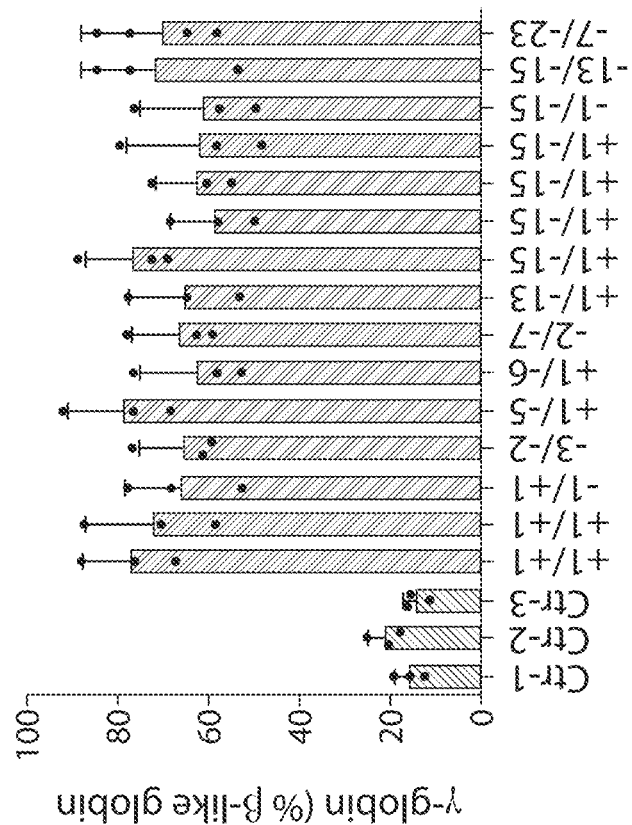
Figure 3B:
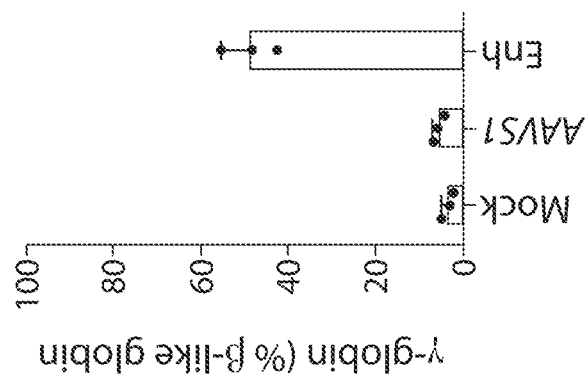
Figure 3C:
Figures 3H, 3I, 3J:
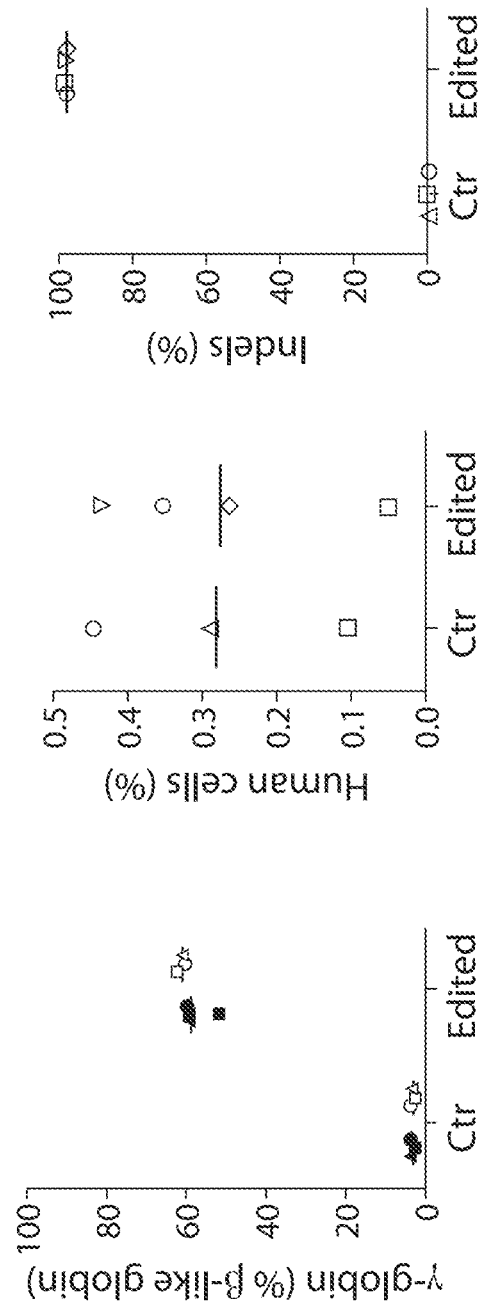
Figure 3K:
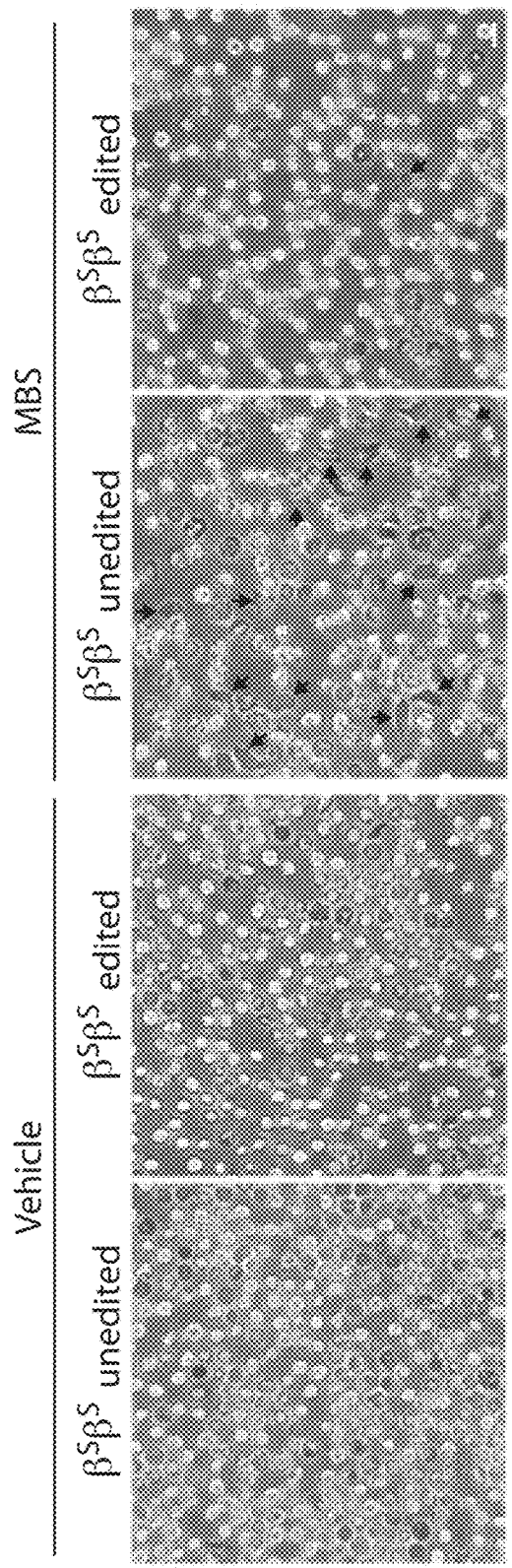
Figure 3L:
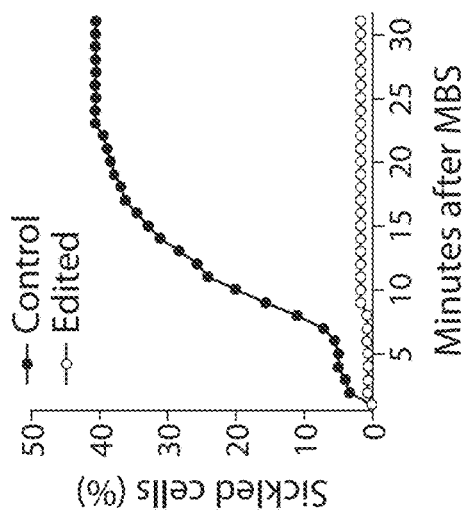
Figure 11A:
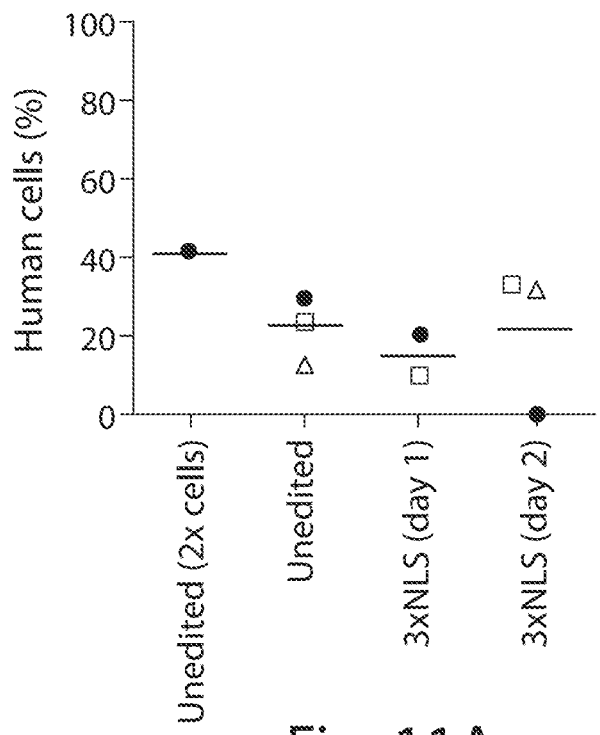
FIG. 11A-11H show editing of BCL11A enhancer in SCD patient ($\beta^S\beta^S$) HSPCs. NBSGW mice were transplanted with 3×NLS-Cas9 RNP with MS-sgRNA-1617 edited $\beta^S\beta^S_{\#1}$ CD34+ HSPCs 24 h (day 1) or 48 h (day 2) after electroporation. BM were collected 16 weeks after transplantation and analyzed by flow cytometry for human cell chimerism (FIG. 11A) multilineage reconstitution (FIG. 11B) or human erythroid cells (FIG. 11C) in BM, as well as the indel frequencies determined by TIDE analysis (FIG. 11D). Error bars indicate standard deviation.
Figure 11B:
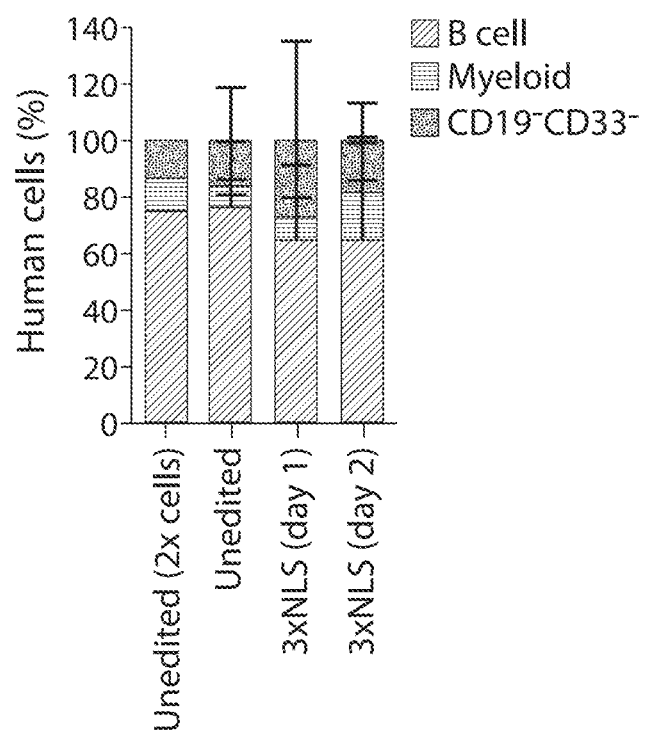
Figure 11C:
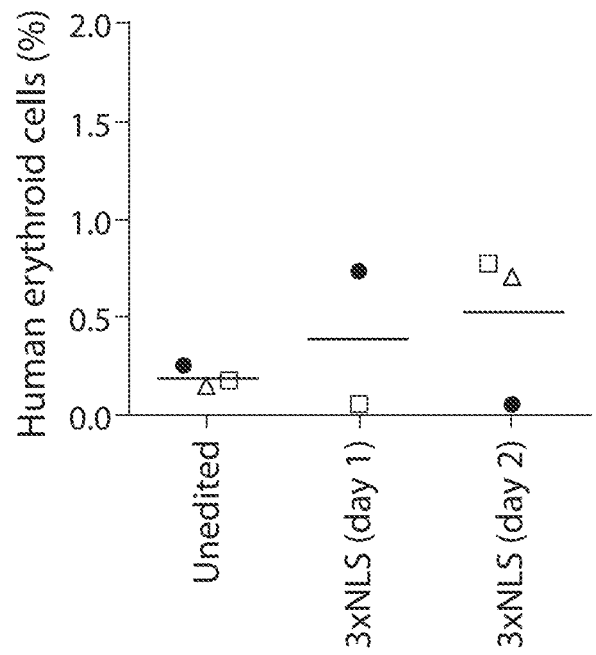
Figure 11D:
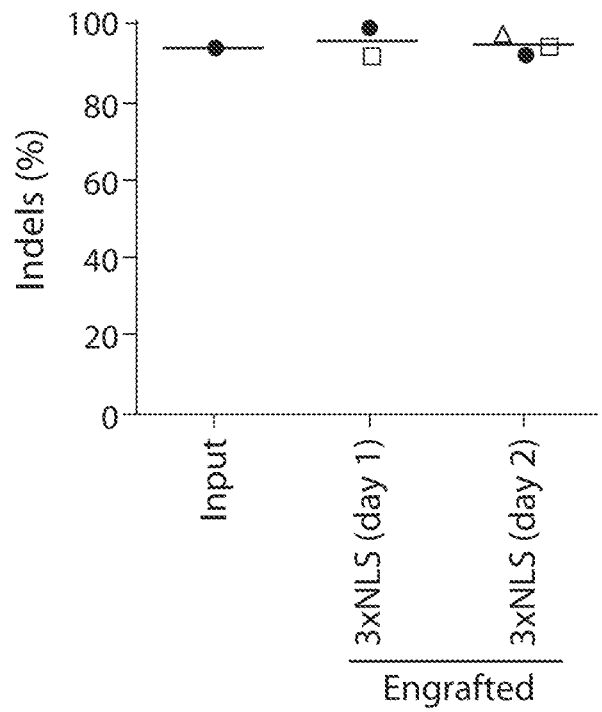
Figure 11E:
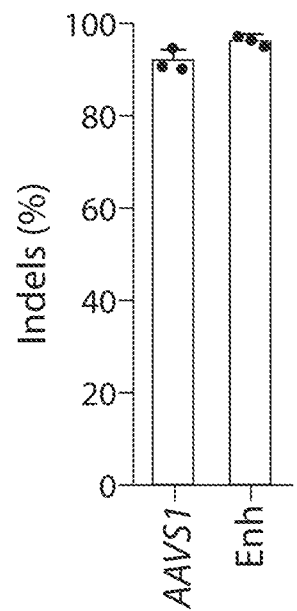
Figure 11F:
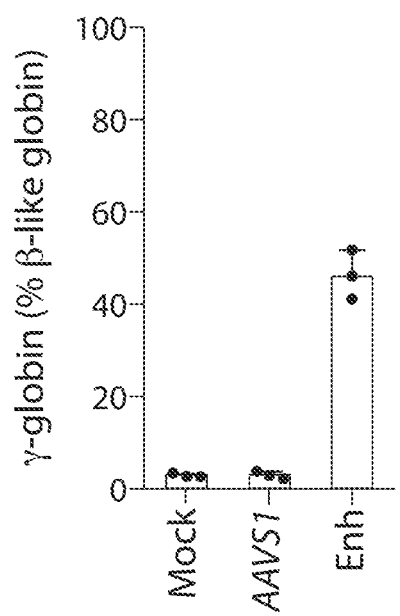
Figure 11G:
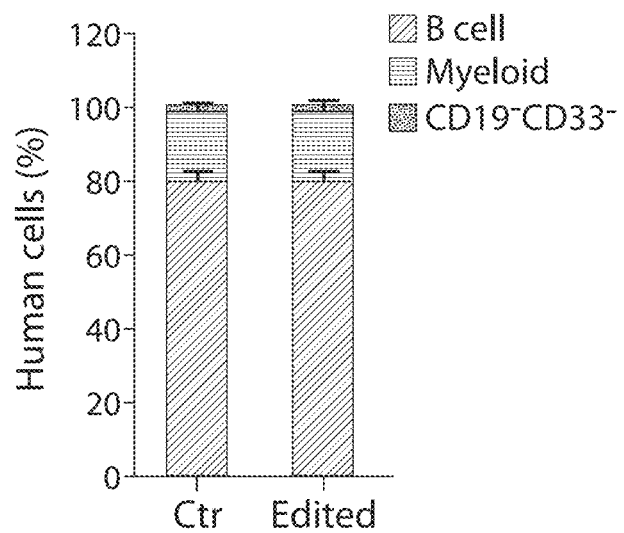
Figure 11H:
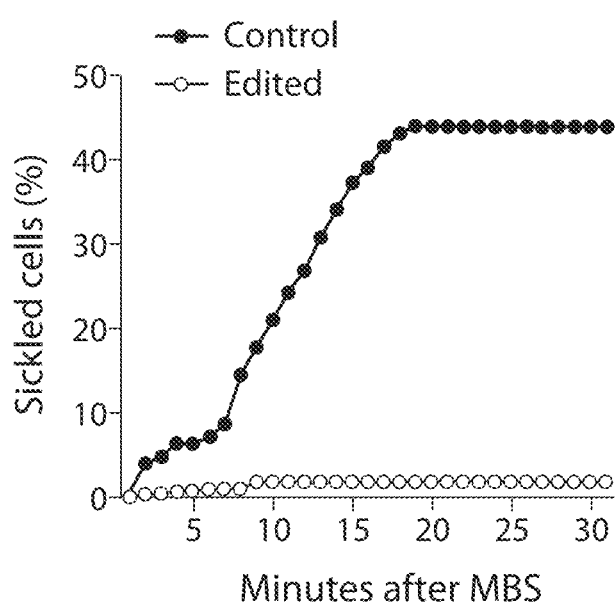

To determine if this optimized BCL11A enhancer editing strategy could be effective in SCD, plerixafor-mobilized peripheral blood CD34+ HSPCs were obtained from two patients[19-21]. It was demonstrated that 94.2%-95.7% indels at the BCL11A enhancer following RNP electroporation of CD34+ HSPCs (FIG. 3a, 11e). In vitro erythroid differentiated progeny showed 47.6% γ-globin in edited cells as compared to 4.5% in unedited cells (FIG. 3b). Clonal analysis demonstrated that biallelic indels of the BCL11A enhancer, as short as 1 bp in length, resulted in robust induction of γ-globin, consistent with healthy donor results (total of 63 colonies analyzed from 4 donors, FIG. 3c, 5i, 7d, 7e, and data not shown). Similar human lymphoid, myeloid, and erythroid engraftment of edited and unedited SCD HSPCs were observed (FIG. 3d, 11b, 11c, 11g). There were similar results when edited cells were infused 1 or 2 days following editing (FIG. 11a-11d). Edited cells showed 96.7% indels after 16 weeks of bone marrow engraftment as compared to 95.0% indels in input HSPCs (FIG. 3e). BCL11A expression in erythroid cells was reduced by 83.1% while it was preserved in B-lymphocytes (FIG. 3f, 3g). Edited bone marrow human erythroid cells expressed 59.0% γ-globin as compared to 3.5% in unedited cells (FIG. 3h). The edited bone marrow SCD cells were able to support secondary transplantation to a similar level as unedited SCD cells, while maintaining a mean indel frequency of 98.1%, consistent with gene editing of self-renewing HSCs (FIG. 3i, 3j). CD34+ HSPCs were collected from the bone marrow of mice engrafted by SCD and healthy donor cells and subject to in vitro erythroid differentiation. In all cases of BCL11A enhancer editing, HbF levels were elevated (FIG. 12d). In healthy donor cells, HbF levels rose from 4.1% in unedited to 35.9% in 3×NLS-Cas9 RNP edited cells, and in SCD patient cells, HbF levels rose from 13.9% to 47.5%. While unedited SCD enucleated erythroid cells derived from engrafting HSCs demonstrated robust in vitro sickling following sodium metabisulfite (MBS) treatment, edited SCD cells were resistant to sickling (FIG. 3k, 3l, 11h; data not shown).

Figure 4A:
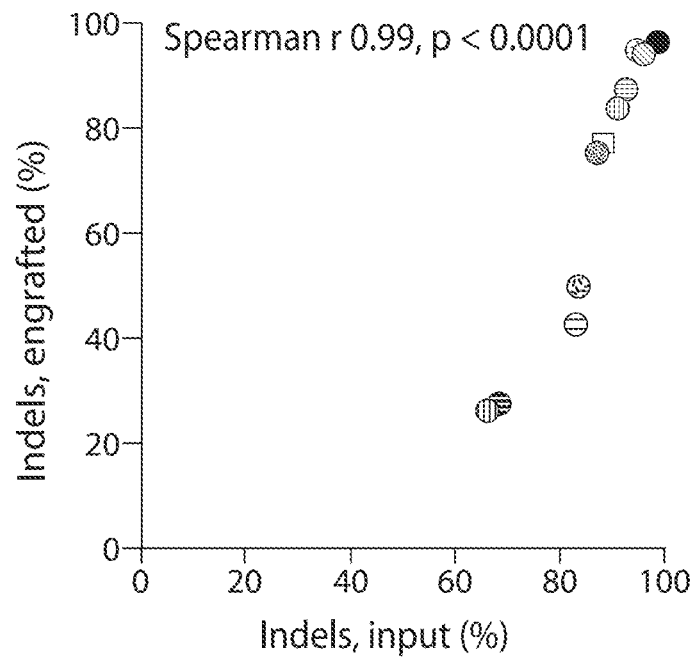
FIG. 4A-4G show persistence of NHEJ repaired alleles in HSCs.
Figure 4B:
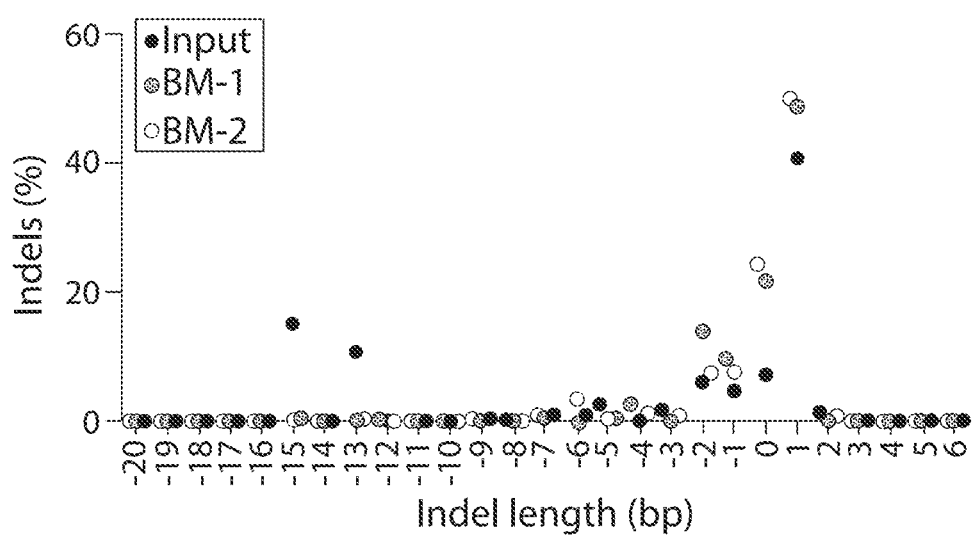
Figure 4C:
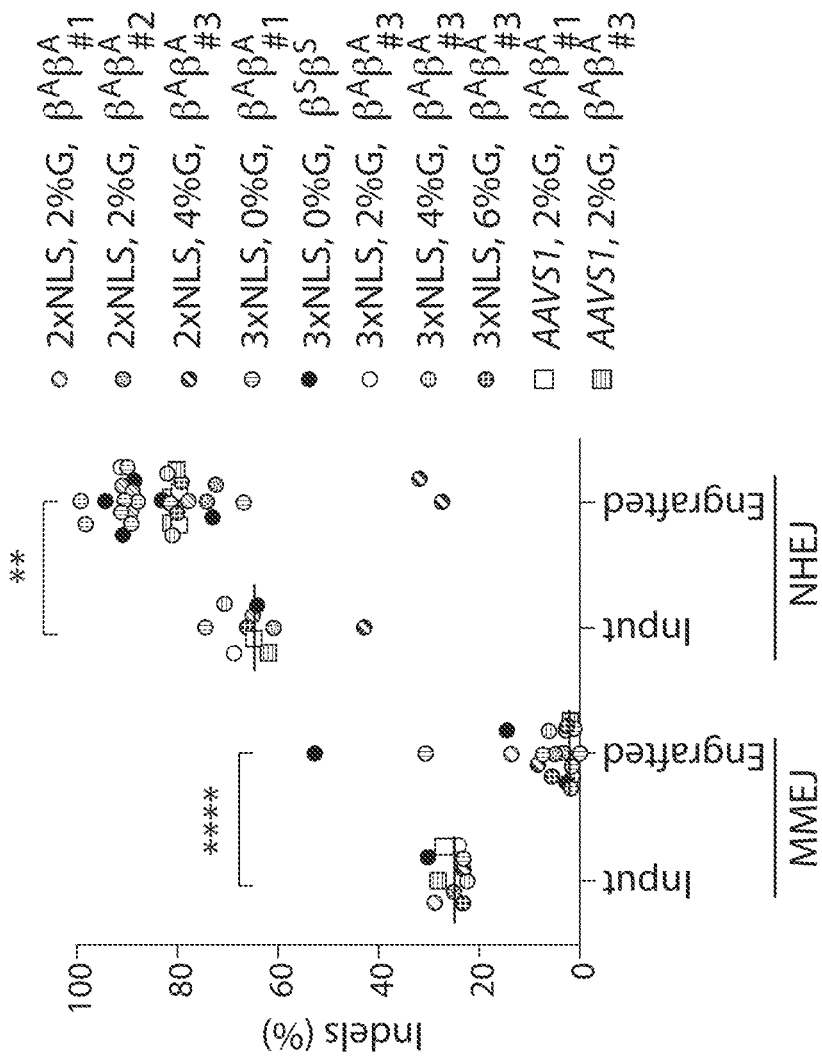
Figure 4D:
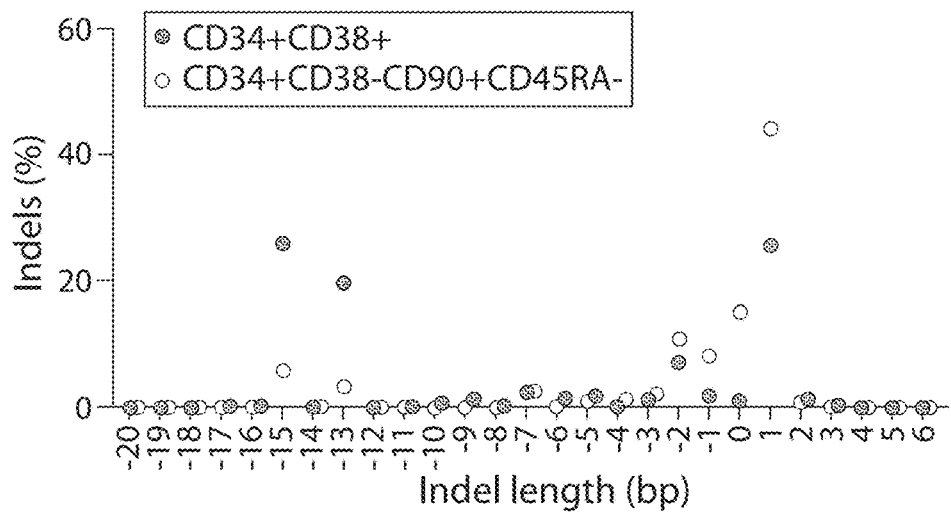
Figure 4E:
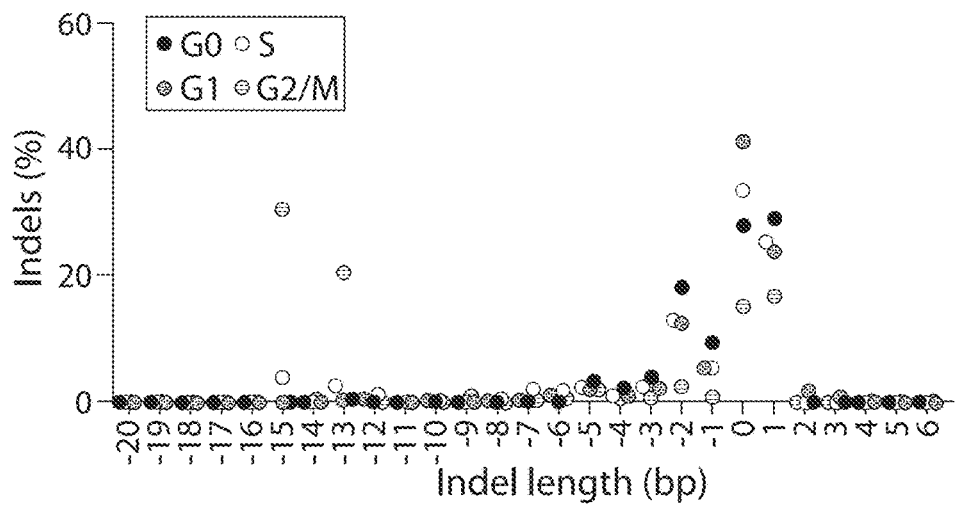
Figure 4F:
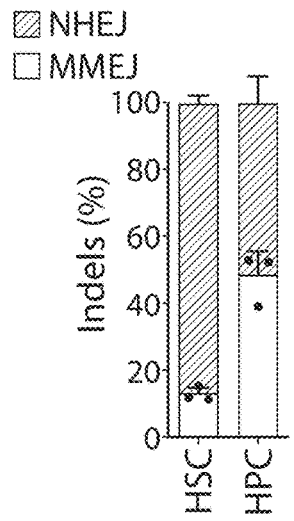
Figure 4G:
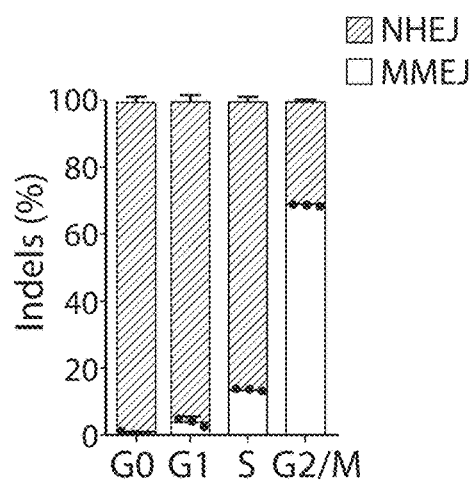
Figure 12A:
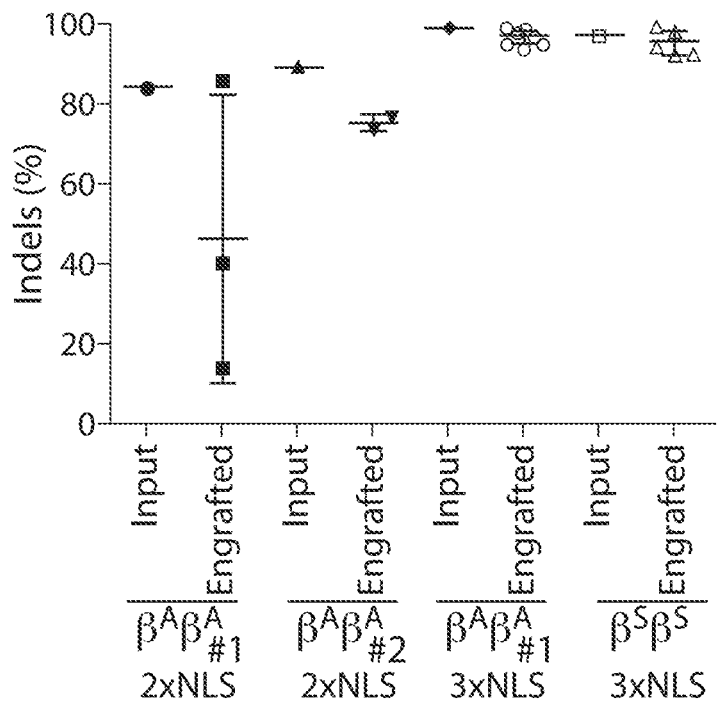
FIG. 12A-12F show summary of engraftment analysis.
Figure 12B:
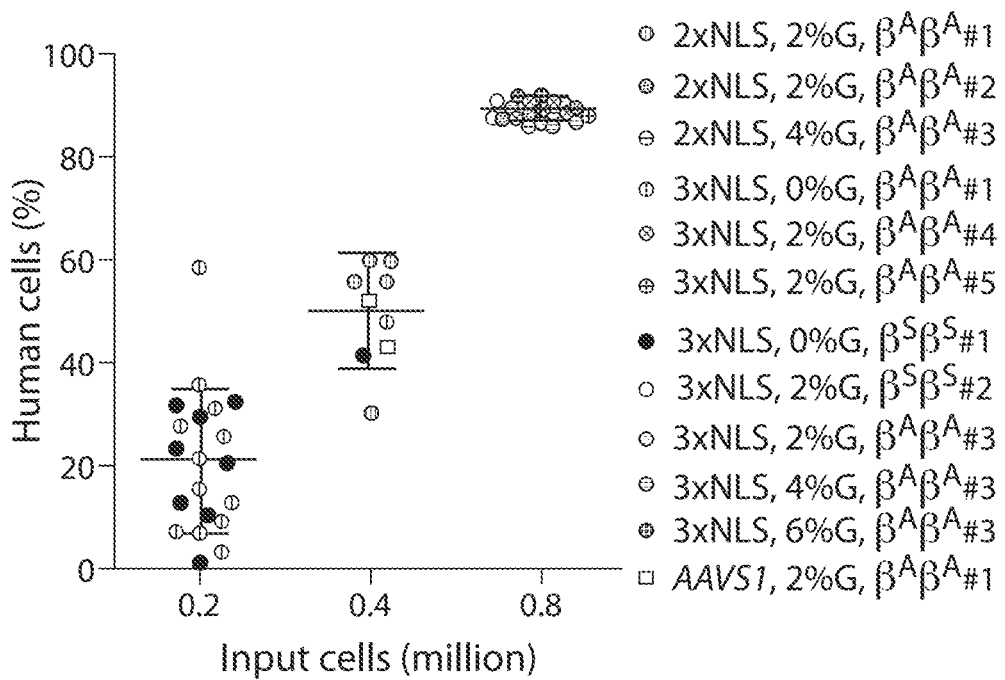
Figure 12C:
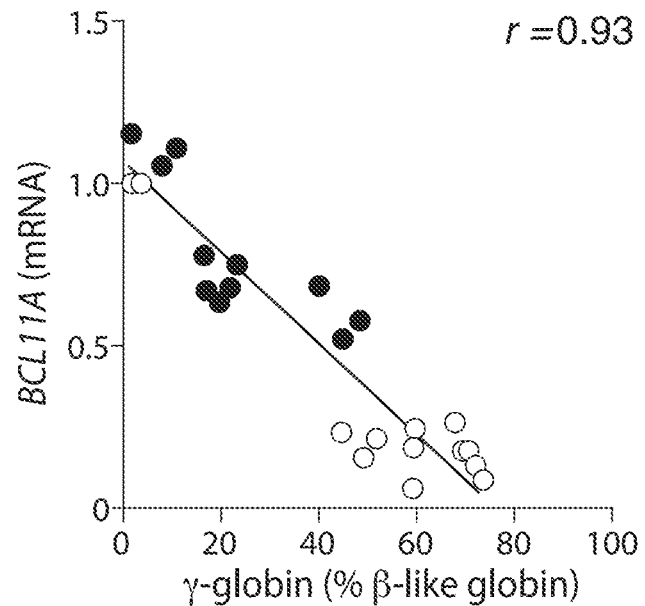
Figure 12D:
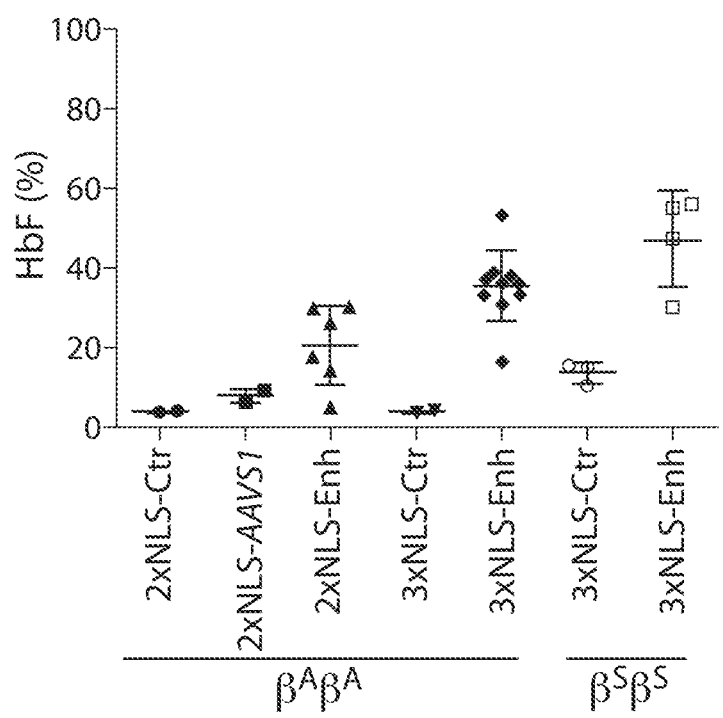
Figure 12E:
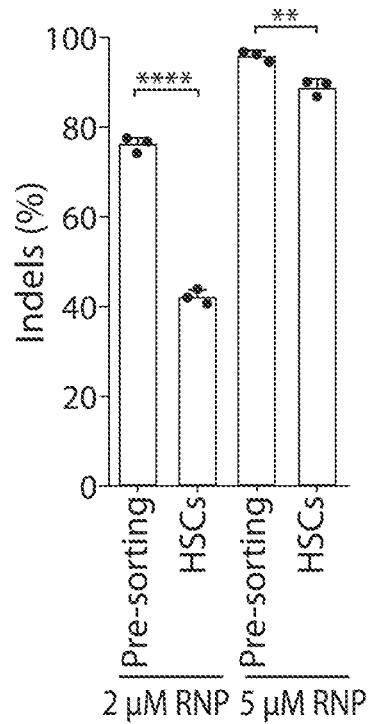
Figure 12F:
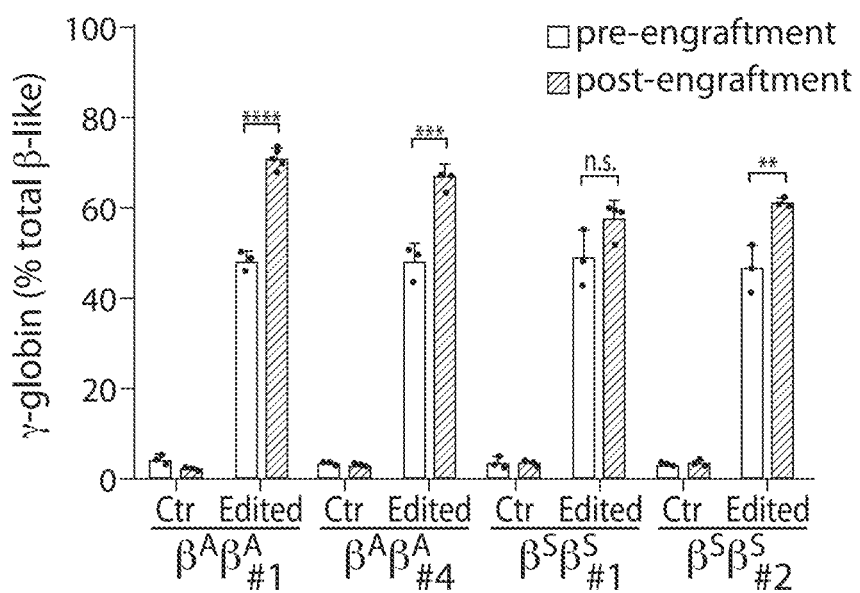
Figure 13A:
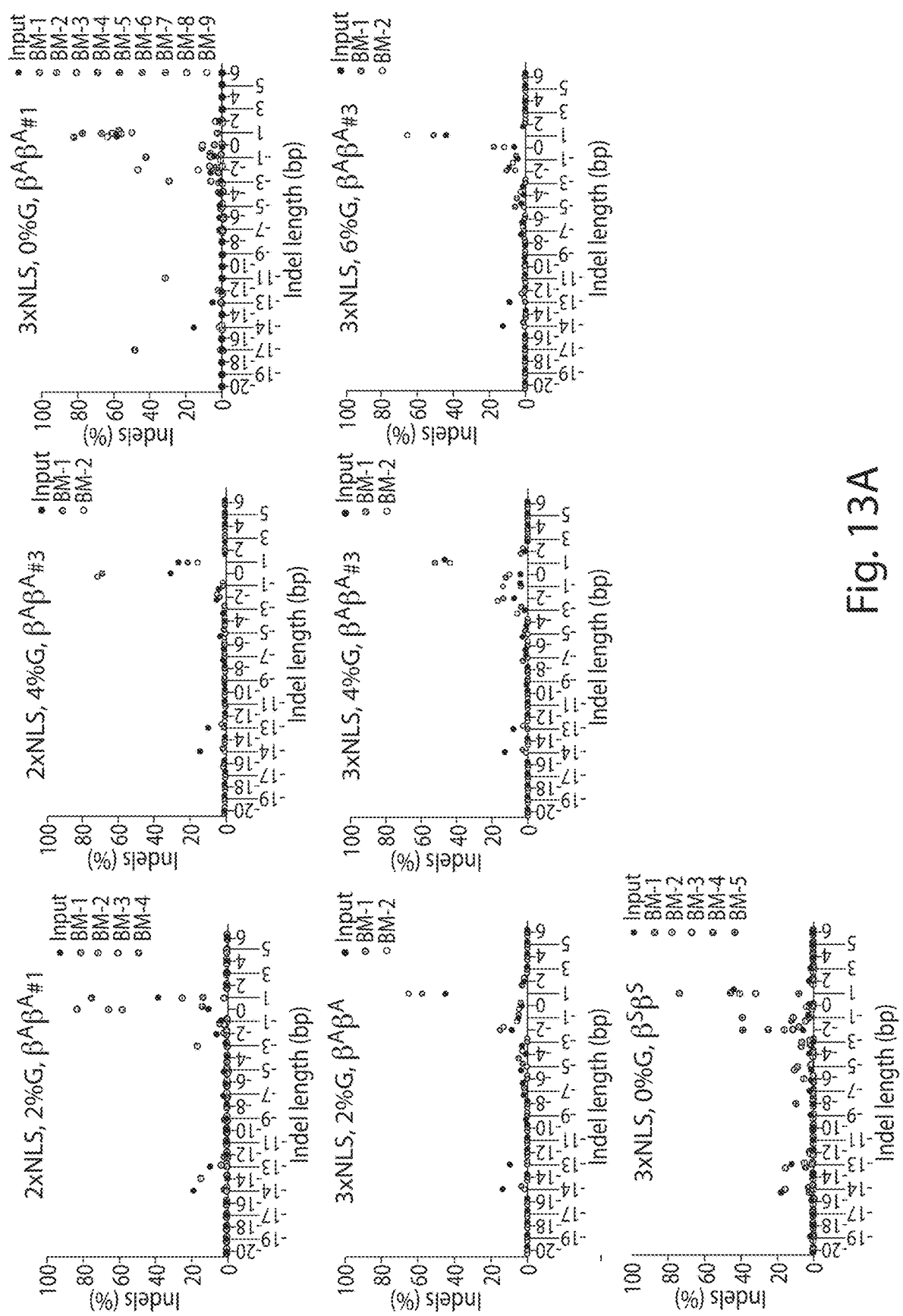
Figure 13B:
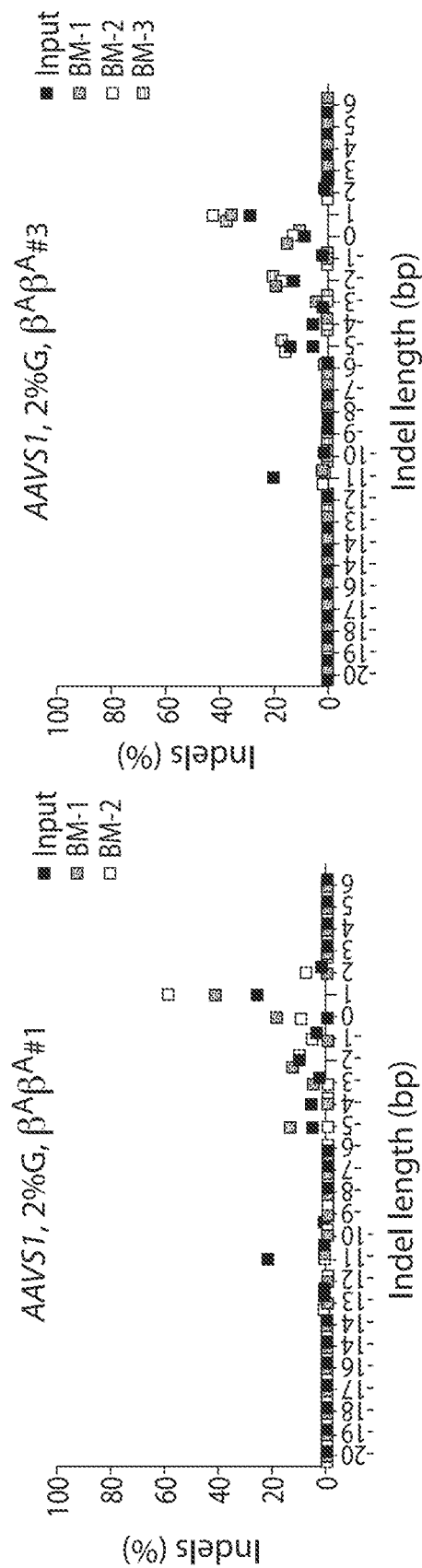
Figure 13C:
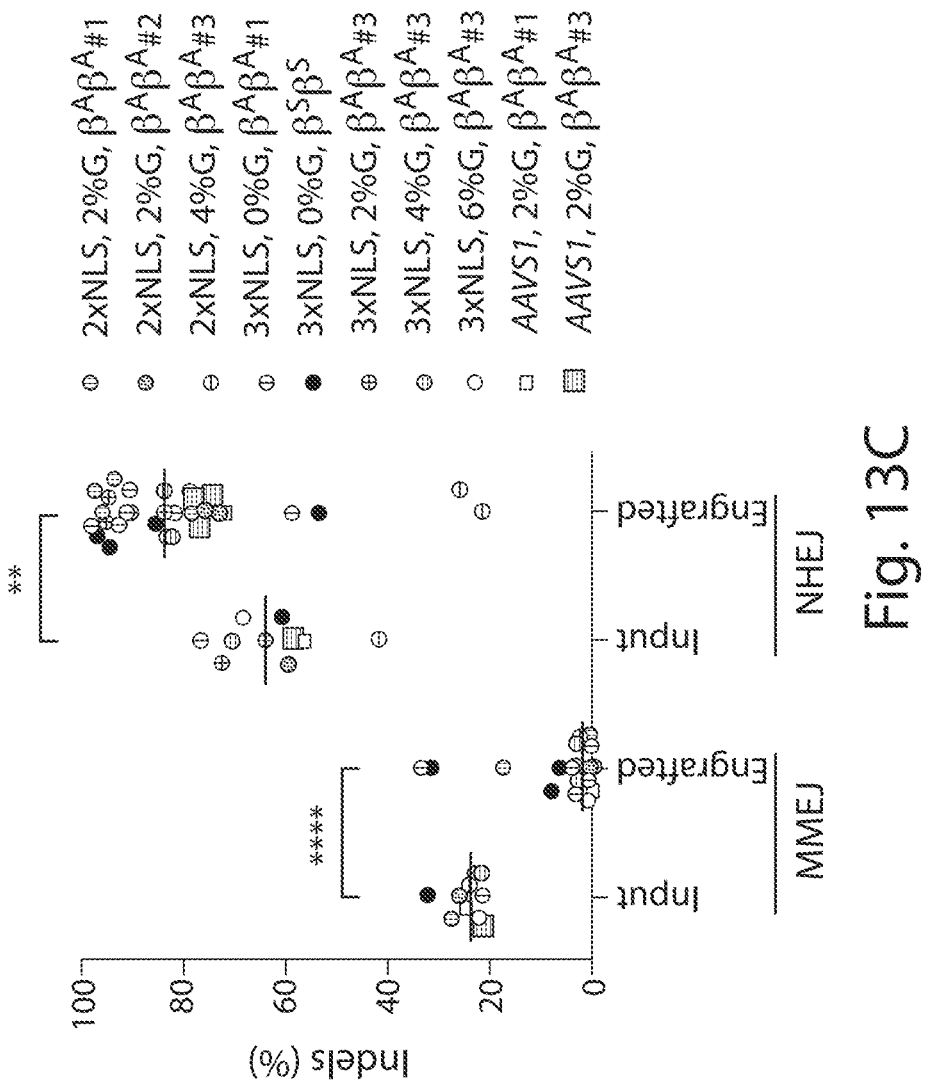
Figure 13E:
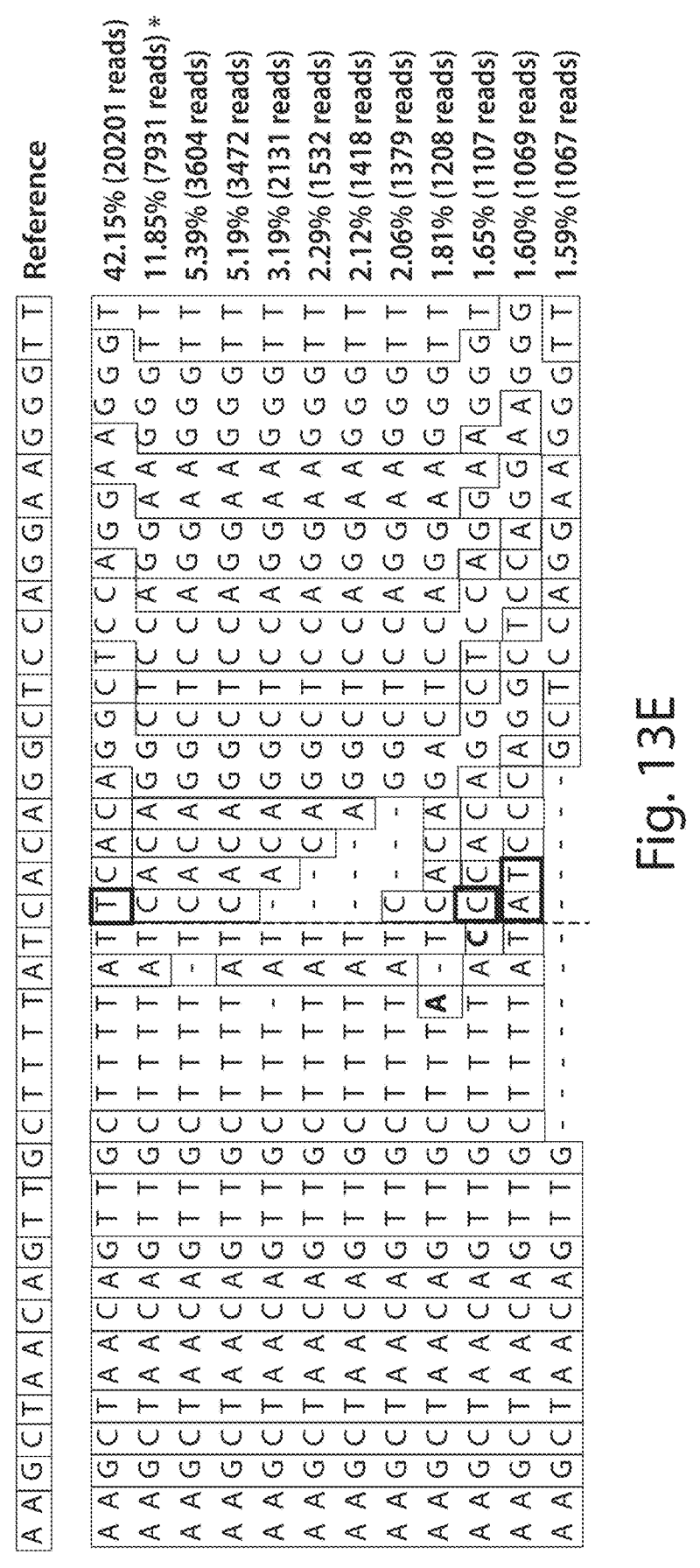
Figure 13G:
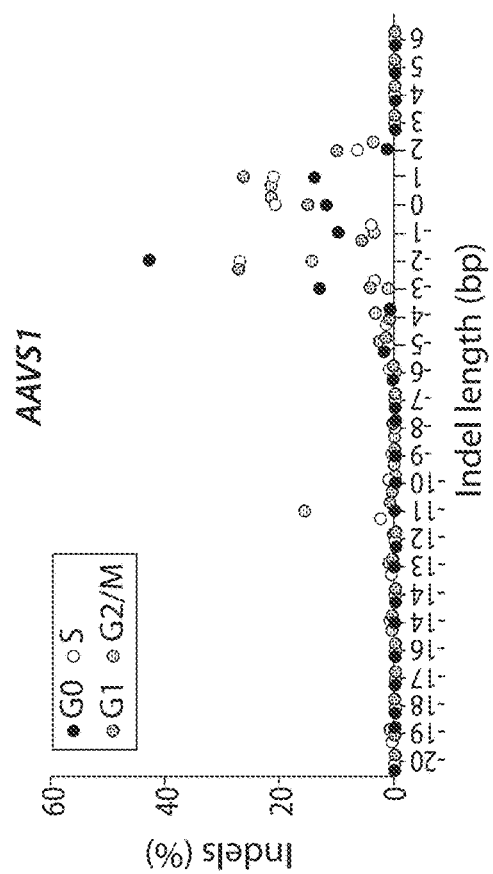
Figure 13F:
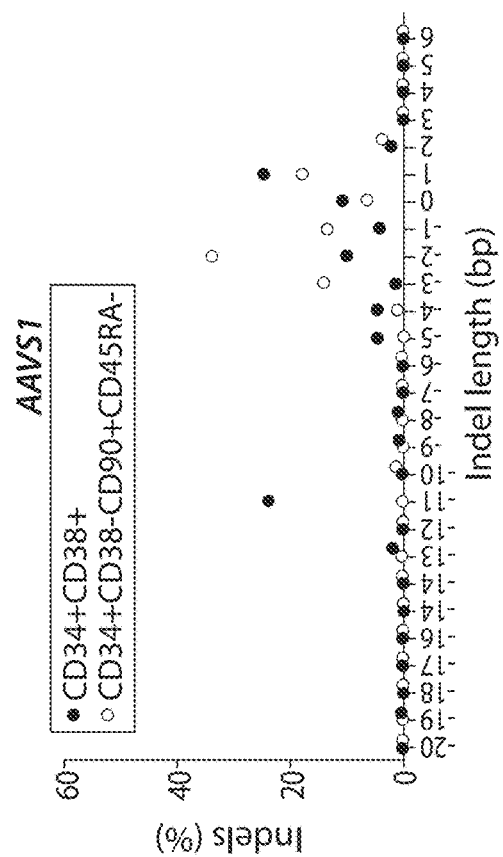
Figure 14A:
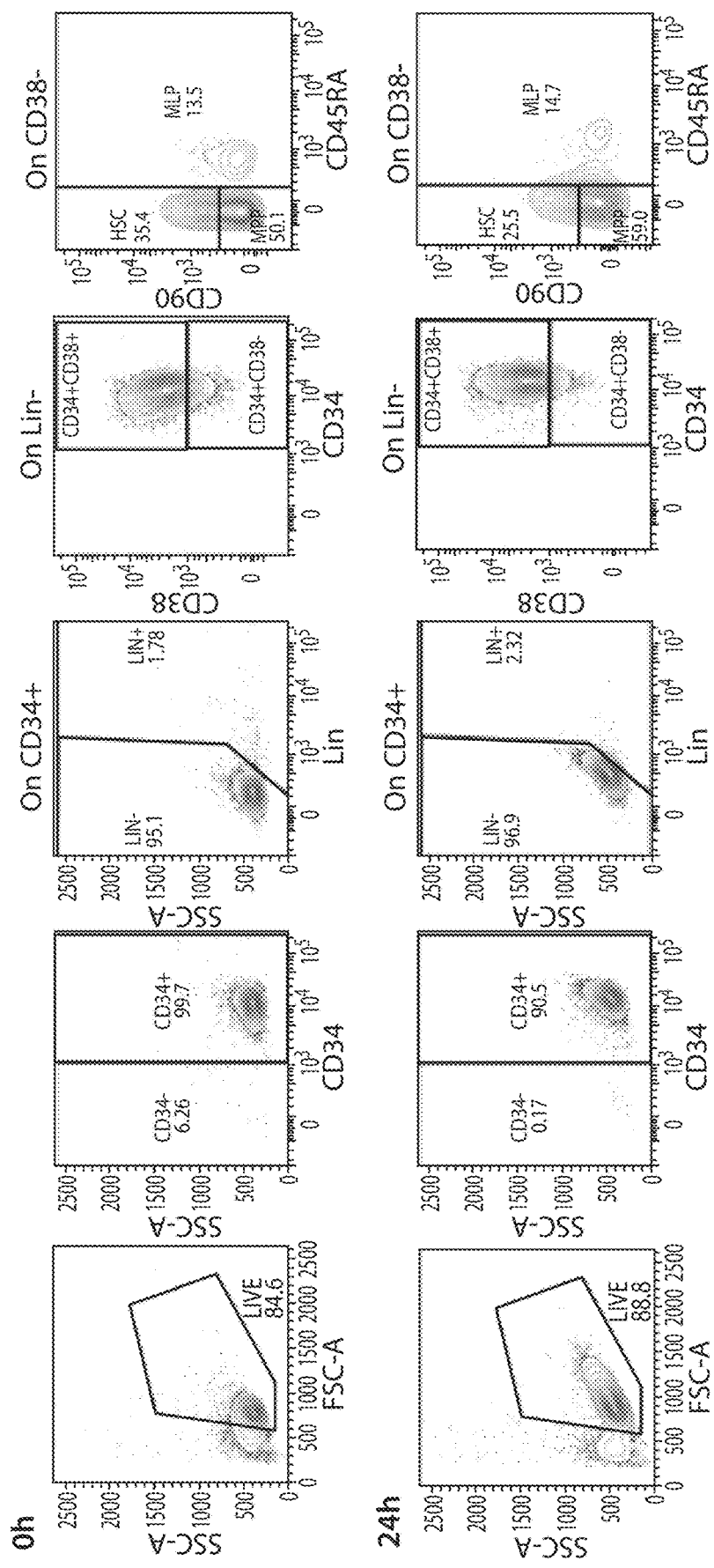
Figure 14B:
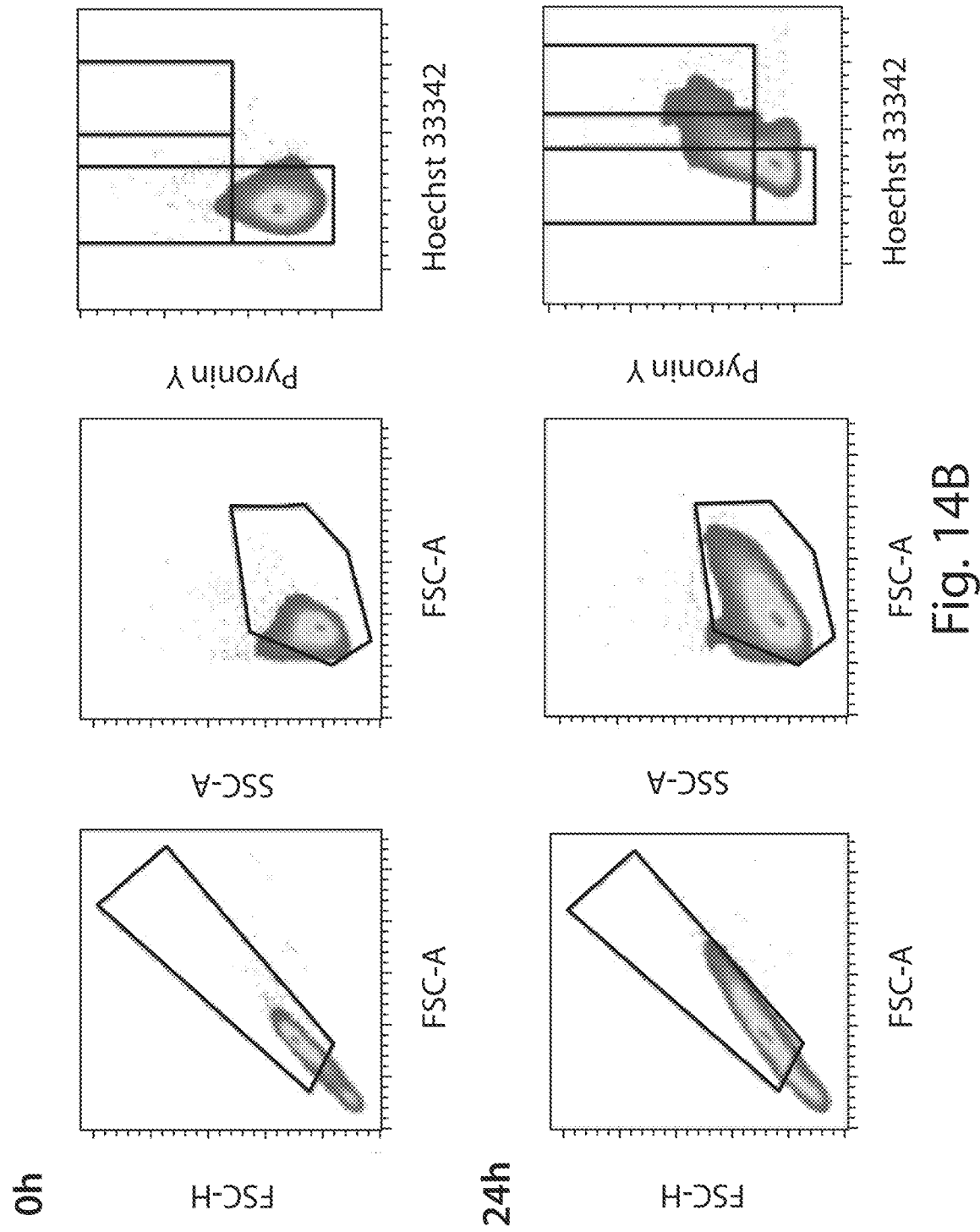
Figure 15:
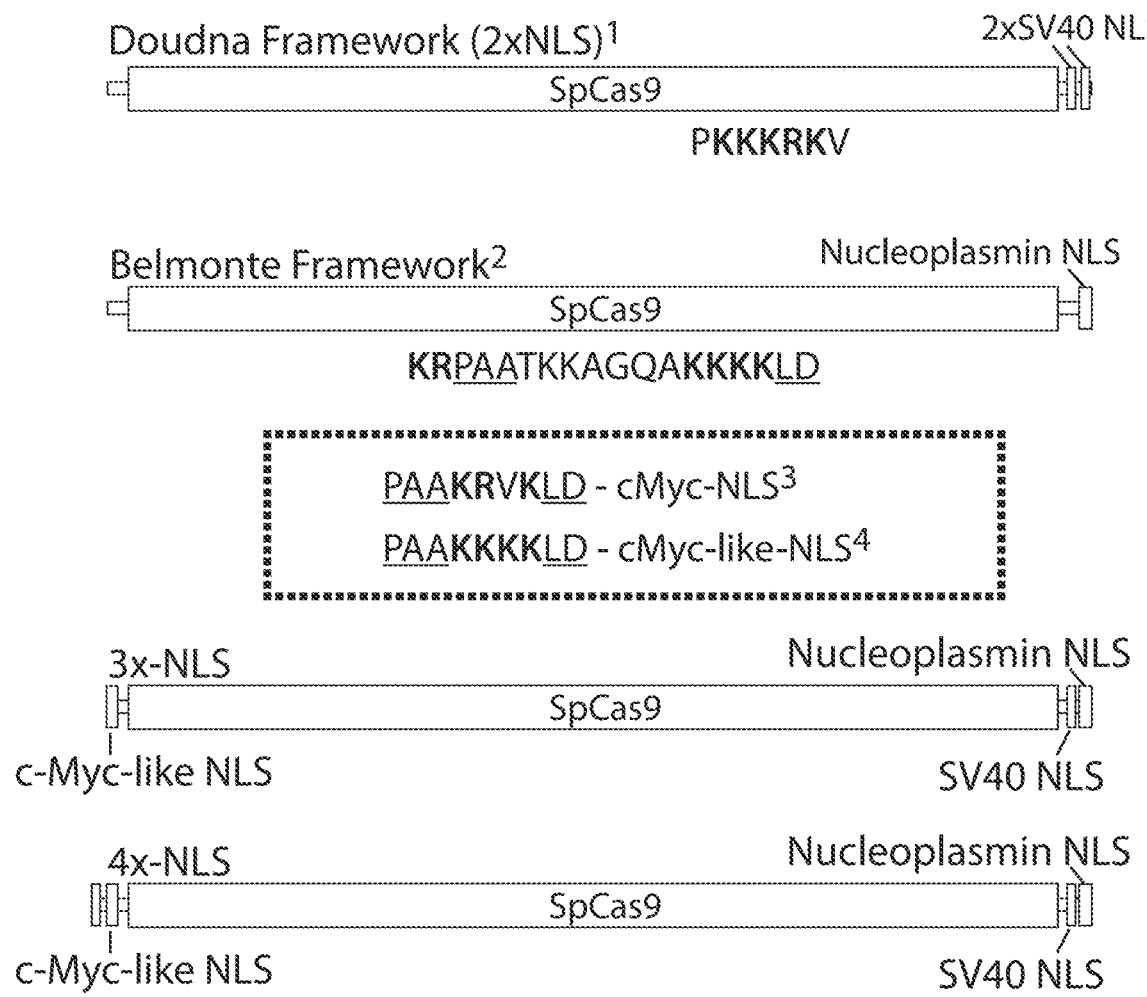
FIG. 15 shows SpCas9 frameworks that differ based on the number and type of nuclear localization sequences. Two published frameworks (Doudna and Belmonte) contain two and one nuclear localization signal (NLS) sequence. These references are incorporated herein by reference in their entireties. Designed herein are two additional SpCas9 frameworks with three (3×NLS) or four (4×NLS) nuclear localization signals, one of which is the cMyc-like NLS.
Figure 16:
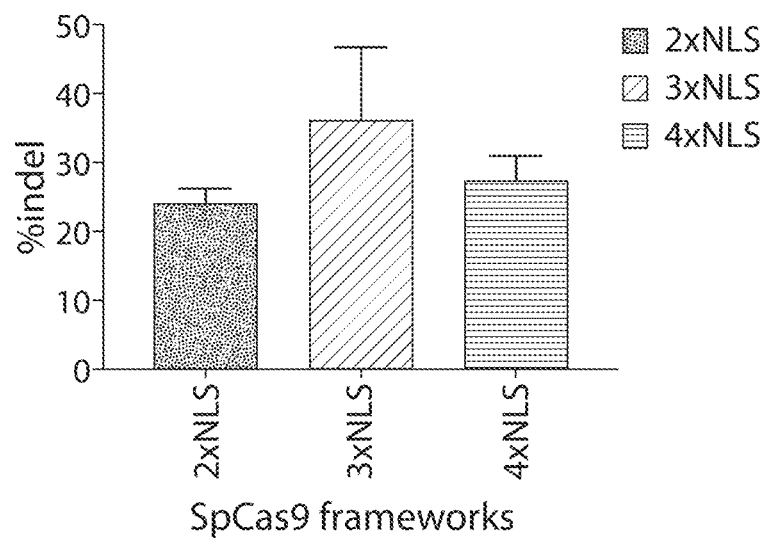
FIG. 16 shows 2×NLS, 3×NLS and 4×NLS SpCas9 frameworks were tested for editing efficiency at the DNMT1 locus when delivered by transient transfection to HEK293T cells with a sgRNA targeting this locus. Expression plasmids for the SpCas9 protein and sgRNA were delivered by PolyFect (Qiagen) and cells were harvested after 72 hours. Editing rates were determined by TIDE analysis of PCR amplicons spanning the target locus. The 3×NLS-SpCas9 framework has the highest activity.
Figure 17:
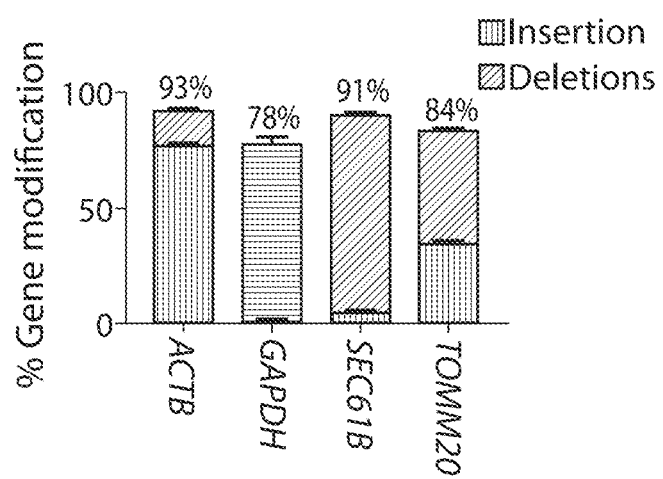
FIG. 17 shows 3×NLS-SpCas9 ribonucleoprotein (RNP) complex achieves high editing rates in HEK293T cells. 3×NLS-SpCas9 protein complexed with a synthetic sgRNA (Synthego) targeting each locus was delivered by NEON electroporation into HEK293T cells. Cells were harvested after 72 hours. Editing rates were determined by Illumina deep sequencing of PCR amplicons spanning the target locus.
Figure 18:
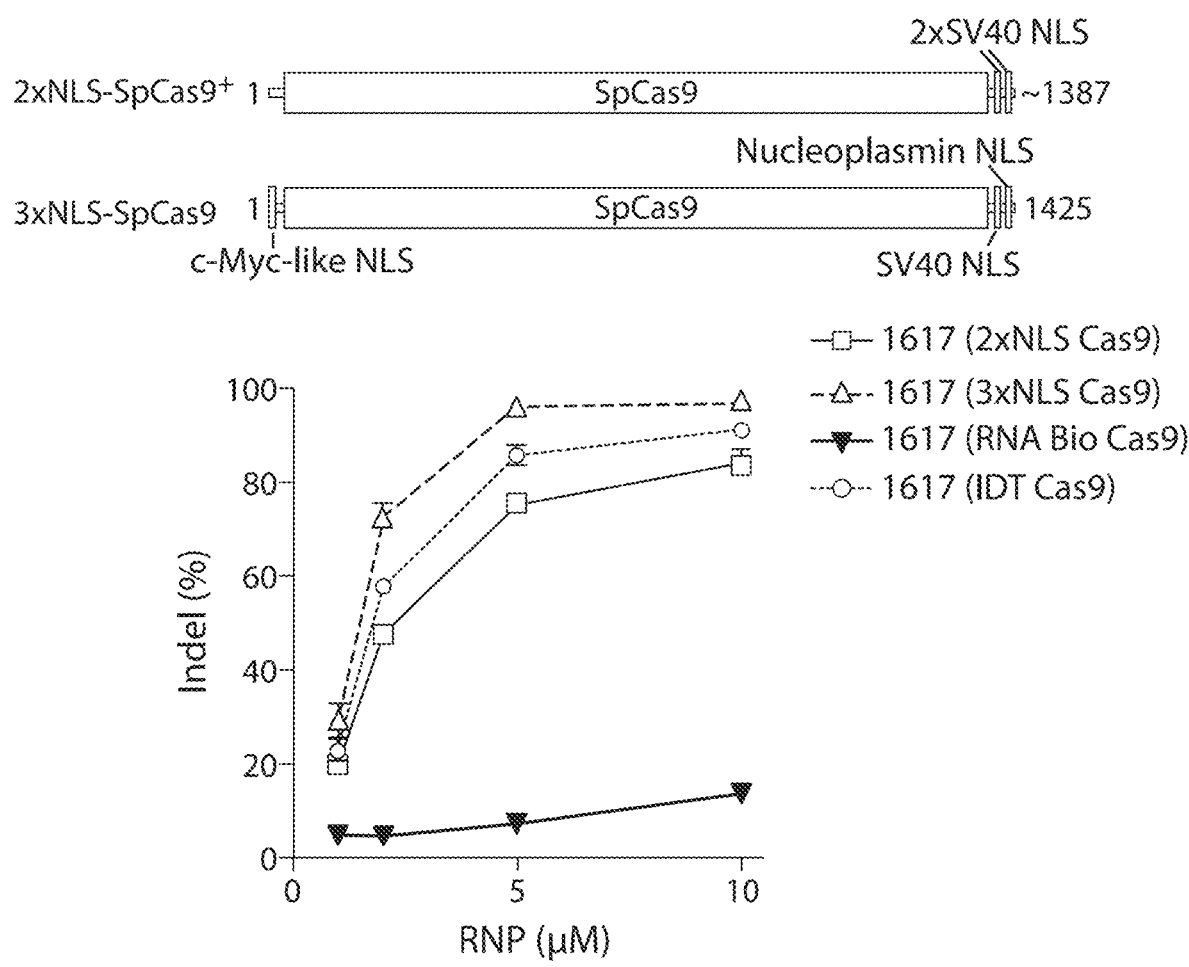
FIG. 18 shows 3×NLS-SpCas9 has a higher editing rate in CD34+ HSPCs than SpCas9 protein from other sources. SpCas9 ribonucleoprotein (RNP) complexes composed of proteins with different numbers and types of NLSs were tested for editing efficiency in CD34+ HSPCs when delivered with a sgRNA targeting the +58 erythroid enhancer of BCL11A (1617 sgRNA). SpCas9 RNPs were delivered by Lozna 4D nucleofection. These RNPs are our 3×NLS-Cas9 (blue triangles), the Doudna 2×NLS-Cas9 (red squares), as well as commercially available IDT Cas9 [(Alt-R SpCas9 V3; green circles] and PNA Bio Cas9 [CP02 black triangles]) in complex with the sgRNA BCL11A enhancer #1617.

Erythroid cells differentiated in vitro from the bone marrow of mice engrafted with 3×NLS-Cas9 edited cells showed more potent induction of HbF compared to 2×NLS-Cas9 edited cells, consistent with greater persistence of edited alleles in repopulating HSCs (FIG. 12a, 12d). Comparing all of the transplant results, there was a strong correlation (Spearman r=0.99, p<0.0001) between indel frequencies in input HSPCs as compared to human cells engrafting the bone marrow after 16 weeks (FIG. 4a). With reduced RNP concentration, disproportionate loss of indels was observed from an HSC-enriched immunophenotype population as compared to bulk HSPCs (FIG. 12e). It was found that the indel spectrum in repopulating cells was different than in input HSPCs (FIG. 4b, 13a, 13b). For example, in HSPCs edited with 2×NLS-Cas9 with 2% glycerol the second and third most common deletions were 15 bp and 13 bp deletions, comprising together 25.9% of alleles (FIG. 4b). These deletions were nearly absent in the engrafted cells, comprising together 1.0% of alleles. The 15-bp and 13-bp deletions were both predicted products of MMEJ repair[22] (data not shown). These results indicated that NHEJ may be favored relative to MMEJ repair in the long-term repopulating HSC population relative to the bulk HSPC population. Each of the repair alleles, at BCL11A and AAVS1, were classified as originating from NHEJ or MMEJ and compared their abundance in input HSPCs used for transplantation or in the engrafted cells resulting from these transplants. Together these data comprised 10 independent transplants conducted with 33 recipient mice across BCL11A and AAVS1. A significant decrease in the fraction of edited alleles repaired by MMEJ (median 25.2% versus 3.4%, p<0.0001) and a concomitant increase in the fraction of edited alleles repaired by NHEJ (median 64.5% versus 81.0%, p<0.005) in engrafted human cells as compared to input HSPCs (FIG. 4c, 13c) was observed. Since similar results targeting BCL11A and AAVS1 were observed, it appeared unlikely there was locus-specific selection against MMEJ edited repopulating cells. It was speculated that quiescent HSCs would be relatively refractory to MMEJ repair, predominantly found in S and G2 phases of the cell cycle[23,24]. Comparing CD34+ HSPCs immediately after thawing and following 24 hours in culture, similar HSC immunophenotype was observed by CD34, CD38, CD90, and CD45RA markers, increase of cell size and shift from predominantly G0 to active cycling (FIG. 14a-14d). After 24 hours of prestimulation culture, RNP electroporation was performed and then 2 hours later sorted HSPCs into an enriched population of HSCs (CD34+ CD38− CD90+ CD45RA−) as compared to committed progenitors (CD34+ CD38+) or based on G0, G1, S, and G2/M phase gates. Following an additional four days in culture, the indel spectrum was determined by sequence analysis. Depletion of the MMEJ alleles and enrichment of NHEJ alleles from the HSC was observed as compared to committed progenitor population for both BCL11A enhancer and AAVS1 edited cells (FIG. 4d, 4f, 13f). Near complete absence of MMEJ alleles from G0 and G1 phase HSPCs and enrichment in G2/M phase HSPCs was found after BCL11A enhancer or AAVS1 editing (FIG. 4e, 4g, 13g). These data indicate that quiescent and engrafting HSCs appear to favor NHEJ as compared to MMEJ repair[23-25].

Previous experiments of genome editing in human HSPCs have shown variability in editing efficiency, specificity, and persistence in long-term engrafting HSCs (Table 2)[6,26-34]. Most prior studies have shown some reduction in indel frequency in engrafting cells as compared to input HSPCs (Table 2). The durability of therapeutic genome edits in the context of human hematopoietic autotransplant remains uncertain.

Herein, this concern is addressed by introducing therapeutic edits as a nearly complete reaction in long-term engrafting HSCs. An optimized protocol was developed for selection-free, HSC expansion-free BCL11A enhancer editing using modified synthetic sgRNA, SpCas9 protein with an additional NLS, and reformulated electroporation buffer in which ~95% therapeutic edits were achieved in healthy donor and patient-derived engrafting cells without detectable genotoxicity. Even 1 bp indels following cleavage at core sequences within the BCL11A erythroid enhancer disrupt the GATA1 binding motif and are sufficient for robust HbF induction. Although on-target large deletions following Cas9 cleavage[35] were not specifically investigate, it has previously been observed that kilobase scale deletions at the intronic BCL11A erythroid enhancer to result in erythroid-restricted loss of BCL11A expression[2-4].

It is specifically contemplated herein that an alternate plausible strategies for genome editing to ameliorate the β-hemoglobinopathies include targeting the β-globin cluster for gene repair or to mimic hereditary persistence of fetal hemoglobin alleles[26,27,30,36-39]. The efficiency of these homology and microhomology based maneuvers in HSCs in the absence of selection or HSC expansion remains to be determined, and in the case of gene repair the clinically relevant delivery of an extrachromosomal donor sequence presents an additional challenge. Ex vivo BCL11A enhancer editing approaching complete allelic disruption appears to be a realistic and scalable strategy with existing technology for durable HbF induction for the β-hemoglobinopathies. Emulating this efficiency could contribute to the success of industry-sponsored clinical trials of BCL11A enhancer editing using ZFNs (NCT03432364) and Cas9 (NCT03655678). Highly efficient HSC editing could be adapted for biological investigation and genetic amelioration of additional blood disorders[40].

REFERENCES

1. Lettre, G. & Bauer, D. E. Fetal haemoglobin in sickle-cell disease: From genetic epidemiology to new therapeutic strategies. *Lancet* 387, 2554-2564 (2016).
2. Bauer, D. E. et al. An Erythroid Enhancer of BCL11A Subject to Genetic Variation Determines Fetal Hemoglobin Level. *Science* 342, 253-257 (2013).
3. Canver, M. C. et al. BCL11A enhancer dissection by Cas9-mediated in situ saturating mutagenesis. *Nature* 527, 192-197 (2015).
4. Smith, E. et al. Strict in vivo specificity of the Bcl11a erythroid enhancer. *Blood* 128, 2338-2342 (2016).
5. Vierstra, J. et al. Functional footprinting of regulatory DNA. *Nat. Methods* 12, 927-30 (2015).
6. Chang, K.-H. et al. Long-Term Engraftment and Fetal Globin Induction upon BCL11A Gene Editing in Bone-Marrow-Derived CD34+ Hematopoietic Stem and Progenitor Cells. *Mol. Ther. —Methods Clin. Dev.* 4, 137-148 (2017).
7. Kim, S., Kim, D., Cho, S. W., Kim, J. & Kim, J. Highly efficient RNA-guided genome editing in human cells via delivery of purified Cas9 ribonucleoproteins. *Genome Res.* 24, 1012-1019 (2014).
8. Lin, S., Staahl, B., Alla, R. K. & Doudna, J a Enhanced homology-directed human genome engineering by controlled timing of CRISPR/Cas9 delivery. *Elife* 3, 1-13 (2014).
9. Hendel, A. et al. Chemically modified guide RNAs enhance CRISPR-Cas genome editing in human primary cells. Nat. Biotechnol. 33, 985-989 (2015).
10. Tsai, S.-F. et al. Cloning of cDNA for the major DNA-binding protein of the erythroid lineage through expression in mammalian cells. *Nature* 339, 446-451 (1989).
11. McIntosh, B. E. et al. Nonirradiated NOD,B6.SCID Il2r??−/− kitW41/W41 (NBSGW) mice support multilineage engraftment of human hematopoietic cells. *Stem Cell Reports* 4, 171-180 (2015).
12. Lu, X., Wood, D. K. & Higgins, J. M. Deoxygenation Reduces Sickle Cell Blood Flow at Arterial Oxygen Tension. *Biophys. J.* 110, 2751-2758 (2016).
13. Estcourt, L., Fortin, P., Hopewell, S., Trivella, M. & Wang, W. C. Blood transfusion for preventing primary and secondary stroke in people with sickle cell disease.

Cochrane DataBase Syst. Rev. 1-88 (2017). doi:10.1002/14651858.CD003146.pub3.www.cochranelibrary.com
14. Lin, S., Staahl, B., Alla, R. K. & Doudna, J a Enhanced homology-directed human genome engineering by controlled timing of CRISPR/Cas9 delivery. *Elife* 3, 1-13 (2014).
15. Tsai, S. Q. et al. CIRCLE-seq: A highly sensitive in vitro screen for genome-wide CRISPR-Cas9 nuclease off-targets. *Nat. Methods* 14, 607-614 (2017).
16. Haapaniemi, E., Botla, S., Persson, J., Schmierer, B. & Taipale, J. CRISPR-Cas9 genome editing induces a p53-mediated DNA damage response. *Nat. Med.* (2018). doi:10.1038/s41591-018-0049-z
17. Ihry, R. J. et al. p53 inhibits CRISPR-Cas9 engineering in human pluripotent stem cells. *Nat. Med.* (2018). doi:10.1038/s41591-018-0050-6
18. Kluk, M. J. et al. Validation and Implementation of a Custom Next-Generation Sequencing Clinical Assay for Hematologic Malignancies. *J. Mol. Diagnostics* 18, 507-515 (2016).
19. Lagresle-Peyrou, C. et al. Plerixafor enables the safe, rapid, efficient mobilization of haematopoietic stem cells in sickle cell disease patients after exchange transfusion. *Haematologica* haematol.2017.184788 (2018). doi:10.3324/haematol.2017.184788
20. Boulad, F. et al. Safety and efficacy of plerixafor dose escalation for the mobilization of CD34+ hematopoietic progenitor cells in patients with sickle cell disease: interim results. *Haematologica* Epub ahead, haematol.2017.187047 (2018).
21. Esrick, E. B. et al. Successful hematopoietic stem cell mobilization and apheresis collection using plerixafor alone in sickle cell patients. *Blood Adv.* 2, 2505-2512 (2018).
22. Bae, S., Kweon, J., Kim, H. S. & Kim, J.-S. Microhomology-based choice of Cas9 nuclease target sites. *Nat. Methods* 11, 705-706 (2014).
23. Truong, L. N. et al. Microhomology-mediated End Joining and Homologous Recombination share the initial end resection step to repair DNA double-strand breaks in mammalian cells. *Proc. Natl. Acad. Sci.* 110, 7720-7725 (2013).
24. Sfeir, A. & Symington, L. S. Microhomology-Mediated End Joining: A Back-up Survival Mechanism or Dedicated Pathway? *Trends Biochem. Sci.* 40, 701-714 (2015).
25. Mohrin, M. et al. Hematopoietic stem cell quiescence promotes error-prone DNA repair and mutagenesis. *Cell Stem Cell* 7, 174-185 (2010).
26. DeWitt, M. A. et al. Selection-free genome editing of the sickle mutation in human adult hematopoietic stem/progenitor cells. *Sci. Transl. Med.* 8, (2016).
27. Dever, D. P. et al. CRISPR/Cas9 β-globin gene targeting in human haematopoietic stem cells. *Nature* 539, 384-389 (2016).
28. Genovese, P. et al. Targeted genome editing in human repopulating haematopoietic stem cells. *Nature* 510, 235-40 (2014).
29. Wang, J. et al. Homology-driven genome editing in hematopoietic stem and progenitor cells using ZFN mRNA and AAV6 donors. *Nat. Biotechnol.* 33, 1256-1263 (2015).
30. Hoban, M. D. et al. Correction of the sickle-cell disease mutation in human hematopoietic stem/progenitor cells. *Blood* 125, 2597-604 (2015).
31. Ravin, S. S. De et al. CRISPR-Cas9 gene repair of hematopoietic stem cells from patients with X-linked chronic granulomatous disease. *Sci. Transl. Med.* 9, 1-10 (2017).
32. Gundry, M. C. et al. Highly Efficient Genome Editing of Murine and Human Hematopoietic Progenitor Cells by CRISPR/Cas9. *Cell Rep* 17, 1453-1461 (2016).
33. Holt, N. et al. Human hematopoietic stem/progenitor cells modified by zinc-finger nucleases targeted to CCR5 control HIV-1 in vivo. *Nat. Biotechnol.* 28, 839-847 (2010).
34. Diez, B. et al. Therapeutic gene editing in CD 34+ hematopoietic progenitors from Fanconi anemia patients. 9, 1574-1588 (2017).
35. Kosicki, M., Tomberg, K. & Bradley, A. Repair of CRISPR-Cas9-induced double-stranded breaks leads to large deletions and complex rearrangements. *Nat. Biotechnol.* (2018). doi:10.1038/nbt.4192
36. Traxler, E. A. et al. A genome-editing strategy to treat β-hemoglobinopathies that recapitulates a mutation associated with a benign genetic condition. *Nat. Med.* 22, 987-990 (2016).
37. Liu, N. et al. Direct Promoter Repression by BCL11A Controls the Fetal to Adult Hemoglobin Switch. *Cell* 173, 430-442.e17 (2018).
38. Martyn, G. E. et al. Natural regulatory mutations elevate fetal globin via disruption of BCL11A or ZBTB7A binding. *Nat. Genet.* 50, 498-503 (2018).
39. Vakulskas, C. A. et al. A high-fidelity Cas9 mutant delivered as a ribonucleoprotein complex enables efficient gene editing in human hematopoietic stem and progenitor cells. *Nat. Med.* (2018). doi:10.1038/s41591-018-0137-0
40. Xu, S. et al. Editing aberrant splice sites efficiently restores β-globin expression in (3-thalassemia. *Blood*, (2019). Accepted.

Methods and Reproducibility

Cell Culture

Human CD34+ HSPCs from mobilized peripheral blood of deidentified healthy donors were obtained from Fred Hutchinson Cancer Research Center, Seattle, Wash. Sickle cell disease patient and β-thalassemia patient CD34+ HSPCs were isolated from plerixafor mobilized (for sickle cell disease, IRB P00023325, FDA IND 131740) or unmobilized (for β-thalassemia) peripheral blood following Boston Children's Hospital institutional review board approval and patient informed consent. CD34+ HSPCs were enriched using the Miltenyi CD34 Microbead kit (Miltenyi Biotec). CD34+ HSPCs were thawed on day 0 into X-VIVO 15 (Lonza, 04-418Q) supplemented with 100 ng ml$^{-1}$ human SCF, 100 ng ml$^{-1}$ human thrombopoietin (TPO) and 100 ng ml$^{-1}$ recombinant human Flt3-ligand (Flt3-L). HSPCs were electroporated with Cas9 RNP 24 h after thawing and maintained in X-VIVO media with cytokines. For in vitro erythroid maturation experiments, 24 h after electroporation, HSPCs were transferred into erythroid differentiation medium (EDM) consisting of IMDM supplemented with 330 μg ml—holo-human transferrin, 10 μg ml—recombinant human insulin, 2 IU ml—heparin, 5% human solvent detergent pooled plasma AB, 3 IU ml$^-$ erythropoietin, 1% L-glutamine, and 1% penicillin/streptomycin. During days 0-7 of culture, EDM was further supplemented with 10$^{-6}$M hydrocortisone (Sigma), 100 ng ml$^{-1}$ human SCF, and 5 ng ml$^{-1}$ human IL-3 (R&D) as EDM-1. During days 7-11 of culture, EDM was supplemented with 100 ng ml$^{-1}$ human SCF only as EDM-2. During days 11-18 of culture, EDM had no additional supplements as EDM-3. Enucleation percentage and γ-globin induction were assessed on day 18 of erythroid culture.

In Vitro Transcription of sgRNAs

Firstly, sgRNAs with T7 promoter were amplified by PCR from pX458 plasmid with specific primers (data not shown) and in vitro transcribed using MEGAshortscript T7 kit (Life Technologies). After transcription, the sgRNAs were purified with MEGAclear kit (Life Technologies) according to manufacturer's instructions.

RNP Electroporation

Electroporation was performed using Lonza 4D Nucleofector (V4XP-3032 for 20 µl Nucleocuvette Strips or V4XP-3024 for 100 µl Nucleocuvettes) as the manufacturer's instructions. 2×NLS-Cas9 was obtained from QB3 Macro-Lab of University of California, Berkeley. The modified synthetic sgRNA (2'-O-methyl 3' phosphorothioate modifications in the first and last 3 nucleotides) was from Synthego. sgRNA concentration is calculated using the full-length product reporting method, which is 3-fold lower than the OD reporting method. CD34+ HSPCs were thawed 24 h before electroporation. For 20 µl Nucleocuvette Strips, the RNP complex was prepared by mixing Cas9 (200 pmol) and sgRNA (200 pmol, full-length product reporting method) and incubating for 15 min at room temperature immediately before electroporation. For indicated experiments in which glycerol was supplemented, 30% glycerol solution was added to Cas9 protein prior to addition of sgRNA. 50 K HSPCs resuspended in 20 µl P3 solution were mixed with RNP and transferred to a cuvette for electroporation with program EO-100. For 100 µl cuvette electroporation, the RNP complex was made by mixing 1000 pmol Cas9 and 1000 pmol sgRNA. 5M HSPCs were resuspended in 100 µl P3 solution for RNP electroporation as described above. The electroporated cells were resuspended with X-VIVO media with cytokines and changed into EDM 24 h later for in vitro differentiation. For mouse transplantation experiments, cells were maintained in X-VIVO 15 with SCF, TPO, and Flt3-L for 0-2 days as indicated prior to infusion.

Measurement of Cell Viability and Indel Frequencies

For the viability analysis, cell numbers were counted 48 h after electroporation, the viability was calculated as the cell number ratio of electroporated cells to mock control without electroporation. Indel frequencies were measured with cells cultured in EDM 5 days after electroporation. Briefly, genomic DNA was extracted using the Qiagen Blood and Tissue kit. BCL11A enhancer DHS h+58 functional core was amplified with KOD Hot Start DNA Polymerase and corresponding primers using the following cycling conditions: 95 degrees for 3 min; 35 cycles of 95 degrees for 20 s, 60 degrees for 10 s, and 70 degrees for 10 s; 70 degrees for 5 min. Resulting PCR products were subjected to Sanger sequencing. Sequencing traces were imported to TIDE software for indel frequency measurement with 40 bp decomposition window.

RT-qPCR Quantification of γ-Globin Induction and p21 Expression

RNA isolation with RNeasy columns (Qiagen, 74106), reverse transcription with iScript cDNA synthesis kit (Bio-Rad, 170-8890), RT-qPCR with iQ SYBR Green Supermix (Bio-Rad, 170-8880) was subject to determine γ-globin induction using primers amplifying HBG1/2, HBB or HBA1/2 cDNA. For quantification of p21 mRNA, HSPCs were electroporated 24 hours post thawing, then were cultured in X-VIVO 15 medium plus cytokines as described above and harvested at different time point post editing.

Hemoglobin HPLC

Hemolysates were prepared from erythroid cells after 18 days of differentiation using Hemolysate reagent (5125, Helena Laboratories) and analyzed with D-10 Hemoglobin Analyzer (Bio-Rad) or high-performance liquid chromatography (HPLC) in the clinical laboratory of the Brigham and Women's Hospital using clinically calibrated standards for the human hemoglobins.

Determination of BCL11A mRNA and Protein Level

Cells was directly lysed into the RLT plus buffer (Qiagen) for total RNA extraction according to manufacturer's instructions provided in the RNeasy Plus Mini Kit. BCL11A mRNA expression was determined by primers amplifying BCL11A or CAT as internal control. CAT was used as a reference transcript since it is both highly expressed and stable throughout erythroid maturation[40]. All gene expression data represent the mean of at least three technical replicates. For in vitro differentiation, BCL11A mRNA level was measured on day 11 unless otherwise indicated. BCL11A protein level was measured by western blot analysis as described previously[41] with following antibodies: BCL11A (Abcam, ab19487), GAPDH (Cell Signaling, 5174S). The western blot results were quantified with ImageJ software.

Clonal Culture of CD34+ HSPCs

Edited CD34+ HSPCs were sorted into 150 µl EDM-1 in 96-well round bottom plates (Nunc) at one cell per well using FACSAria II. The cells were changed into EDM-2 media 7 days later in 96-well flat bottom plates (Nunc). After additional 4 days of culture, 1/10 of cells in each well was harvested for genotyping analysis, the remaining cells were changed into 150 µl-500 µl EDM-3 at 1M ml$^{-1}$ for further differentiation. After additional 7 days of culture, 1/10 of the cells were stained with Hoechst 33342 for enucleation analysis, the remaining cells were harvested with sufficient material for RNA isolation with RNeasy Micro Kit (74004, Qiagen) and RT-qPCR in technical triplicate or a single hemoglobin HPLC measurement per colony.

In Vitro Sickling and Microscopy Analysis

In vitro differentiated erythroid cells were stained with 2 µg ml$^{-1}$ of the cell-permeable DNA dye Hoechst 33342 (Life Technologies) and the enucleated cells which are negative for Hoechst 33342 were FACS sorted and subjected to in vitro sickling assay. Sickling was induced by adding 500 µl freshly prepared 2% sodium metabisulfite (MBS) solution prepared in PBS into enucleated cells resuspended with 500 µl EDM-3 in 24-well plate, followed by incubation at room temperature. Live cell images were acquired using a Nikon Eclipse Ti inverted microscope. Image acquisition was performed at room temperature and air in 24-well plate. Time-lapse images were recorded for 30 min with 10 seconds of intervals per sample.

Human CD34+ HSPC Transplant and Flow Cytometry Analysis

All animal experiments were approved by the Boston Children's Hospital Institutional Animal Care and Use Committee. CD34+ HSPCs were obtained from deidentified healthy donors or from β-hemoglobinopathy patients under protocols approved by the institutional review board of Boston Children's Hospital, with the informed consent of all participants, and complying with relevant ethical regulations. NOD.Cg-Kit$^{W-41J}$ Tyr$^+$ Prkdc$^{scid}$ Il2rg$^{tm1Wjl}$ (NBSGW) mice were obtained from Jackson Laboratory (Stock 026622). Non-irradiated NBSGW female mice (4-5 weeks of age) were infused by retro-orbital injection with 0.2-0.8M CD34$^+$ HSPCs (resuspended in 200 µl DPBS) derived from healthy donors or SCD patients. Equal numbers of pre-electroporation CD34$^+$ HSPCs were used for experiments comparing in vitro culture for 0, 1, or 2 days following electroporation. Bone marrow was isolated for human xenograft analysis 16 weeks post engraftment. Serial transplants were conducted using retro-orbital injection of bone marrow cells from the primary recipients. For flow cytometry analysis of bone marrow, BM cells were first incubated with Human TruStain FcX (422302, BioLegend) and TruStain fcX ((anti-mouse CD16/32, 101320, BioLegend) blocking antibodies for 10 min, followed by the incubation with V450 Mouse Anti-Human CD45 Clone HI30 (560367, BD Biosciences), PE-eFluor 610 mCD45 Monoclonal Antibody (30-F11) (61-0451-82, Thermo Fisher), FITC anti-human CD235a Antibody (349104, BioLegend), PE anti-human CD33 Antibody (366608, BioLegend), APC anti-human CD19 Antibody (302212, BioLegend) and Fixable Viability Dye eFluor 780 for live/dead staining (65-0865-14, Thermo Fisher). Percentage human engraftment was calculated as hCD45$^+$ cells/(hCD45$^+$ cells+mCD45$^+$ cells)×100. B cells (CD19$^+$) and myeloid (CD33$^+$) lineages were gated on the hCD45$^+$ population. Human erythroid cells (CD235a$^+$) were gated on mCD45$^-$hCD45$^-$ population. For the staining with immunophenotype markers of HSCs, CD34$^+$ HSPCs were incubated with Pacific Blue anti-human CD34 Antibody (343512, Biolegend), PE/Cy5 anti-human CD38 (303508, Biolegend), APC anti-human CD90 (328114, Biolegend), APC-H7 Mouse Anti-Human CD45RA (560674, BD Bioscience) and Brilliant Violet 510 anti-human Lineage Cocktail (348807, Biolegend). Cell cycle phase in live CD34$^+$ HSPCs was detected by flow cytometry as described previously[42]. Cells were resuspended in pre-warmed HSPC medium. First, Hoechst 33342 was added to a final concentration of 10 µg/ml and incubated at 37 degrees for 15 min. Then Pyronin Y was added directly to cells at a final concentration of 3 µg/ml and incubated at 37 degrees for 15 min. After washing with PBS, flow cytometric analysis or cell sorting was performed. Cell sorting was performed on a FACSAria II machine (BD Biosciences).

Amplicon Deep Sequencing

For indel frequencies or off-target analysis with deep sequencing, BCL11A enhancer loci or potential off-target loci were amplified with corresponding primers firstly. After another round of PCR with primers containing sample-specific barcodes and adaptor, amplicons were sequenced for 2×150 paired-end reads with MiSeq Sequencing System (Illumina). The deep sequencing data was analyzed by CRISPResso software[43]. In particular, a minimum alignment identity of 75%, window size of 2 bp around the cleavage site to quantify indels, an average PHRED quality score of 30 and excluded substitutions to limit potential false positives was used. For OT10, in which the amplicon includes homologous genomic sequences, a minimum alignment identity of 90% were used.

Flow Cytometry for F-Cell, Enucleation and Cell Size Analysis

Intracellular staining was performed as described previously. Cells were fixed with 0.05% glutaraldehyde (Sigma) for 10 min at room temperature and then permeabilized with 0.1% Triton X-100 (Life Technologies) for 5 min at room temperature. Cells were stained with anti-human antibodies for HbF (clone HbF-1 with FITC; Life Technologies) for 30 min in the dark. Cells were washed to remove unbound antibody before FACS analysis. Control cells without staining were used as negative control. For the enucleation analysis, cells were stained with 2 µg ml$^1$ of the cell-permeable DNA dye Hoechst 33342 (Life Technologies) for 10 min at 37° C. The Hoechst 33342 negative cells were further gated for cell size analysis with Forward Scatter (FSC) A parameter. Median value of forward scatter intensity normalized by data from healthy donors collected at the same time was used to characterize the cell size.

ImageStream Analysis

In vitro differentiated D18 erythroid cells stained with Hoechst 33342 were resuspended with 150 µl DPBS for analysis with Imagestream X Mark II (Merck Millipore). Well-focused Hoechst negative single cells were gated for circularity analysis with IDEAS software. Cells with circularity score above 15 were further gated to exclude cell debris and aggregates. No fewer than 2000 gated cells were analyzed to obtain a median circularity score.

Preparation of 3×NLS-SpCas9

The plasmid expressing 3×NLS-SpCas9 was constructed in the pET21a expression plasmid (Novagen) and is available on Addgene (ID #114365). The recombinant S. pyogenes Cas9 with a 6×His tag and c-Myc-like nuclear localization signal (NLS) at the N-terminus[44], SV40 and nucleoplasmin NLS at the C-terminus was expressed in E. coli Rosetta (DE3)pLysS cells (EMD Millipore). Cells were grown at 37 degrees to an OD600 of ~0.2, then shifted to 18 degrees and induced at an OD600 of ~0.4 for 16 hours with IPTG (1 mM final concentration). Following induction, cells were resuspended with Nickel-NTA buffer (20 mM TRIS+ 500 mM NaCl+20 mM imidazole+1 mM TCEP, pH 8.0) supplemented with HALT protease inhibitor and lysed with M-110s Microfluidizer (Microfluidics) following the manufacturer's instructions. The protein was purified with Ni-NTA resin and eluted with elution buffer (20 mM TRIS, 250 mM NaCl, 250 mM Imidazole, 10% glycerol, pH 8.0). Subsequently, 3×NLS-SpCas9 protein was further purified by cation exchange chromatography (Column=5 ml HiTrap-S, Buffer A=20 mM HEPES pH 7.5+1 mM TCEP, Buffer B=20 mM HEPES pH 7.5+1 M NaCl+1 mM TCEP, Flow rate=5 ml/min, CV=column volume=5 ml) and size-exclusion chromatography (SEC) on Hiload 16/600 Superdex 200 pg column (Isocratic size-exclusion running buffer=20 mM HEPES pH 7.5, 150 mM NaCl, 1 mM TCEP), then reconstituted in a formulation of 20 mM HEPES+150 mM NaCl, pH 7.4.

CIRCLE-Seq Library Preparation and Data Analysis

CIRCLE-seq experiments were performed as described previously[15]. In brief, purified genomic DNA was sheared to an average length of 300 bp, end repaired, A tailed, and ligated to uracil-containing stem-loop adaptor. Adaptor-ligated DNA was treated with Lambda Exonuclease (NEB) and E. coli Exonuclease I (NEB), followed by treatment with USER enzyme (NEB) and T4 polynucleotide kinase (NEB), then circularized with T4 DNA ligase, and treated with Plasmid-Safe ATP-dependent DNase (Epicentre) to degrade linear DNA. The circularized DNA was in vitro cleaved by SpCas9 RNP coupled with sgRNA-1617. Cleaved products were A tailed, ligated with a hairpin adaptor, treated with USER enzyme (NEB), and amplified by Kapa HiFi polymerase (Kapa Biosystems). The libraries were sequenced with 150 bp paired-end reads on an Illumina MiSeq instrument. The CIRCLE-seq sequencing data was analyzed by open-source Python package circleseq (https://github.com/tsailabSJ/circleseq).

Microhomology Analysis

The sequence around sgRNA-1617 target site of BCL11A enhancer region was uploaded to Microhomology-Predictor of CRISPR RGEN tools (http://www.rgenome.net/mich-calculator/) for microhomology sequence analysis. The 13-bp and 15-bp deletions have corresponding pattern scores of 283.2 and 261.0 respectively. The corresponding indel patterns were also identified by deep sequencing analysis. For BCL11A enhancer and AAVS1, indel sizes from −9 to −20 (representing most of the RGEN-predicted microhomology indels) were classified as MMEJ repaired alleles and indel sizes from −8 to +6 were classified as NHEJ repaired alleles.

Statistics and Reproducibility unpaired two-tailed Student's t-test, Pearson correlation and Spearman correlation using GraphPad Prism, was utilized for analyses as indicated in Figure Legends.

Data Availability Statement

The deep sequencing data that support the findings of this study are publicly accessible from the National Center for Biotechnology Information Bioproject database with the accession number PRJNA517275 (available on the world wide web at www.ncbi.nlm.nih.gov/bioproject/PRJNA517275), including the editing efficiency, pre- or post-mice transplant data in FIGS. 1a-1m and 4a-4g and the off-target assessment in FIG. 10a-10b. There are no restrictions on availability of the data from this study.

All patents and scientific articles cited herein are incorporated herein by reference in their entireties.

REFERENCES

41. An, X. et al. Global transcriptome analyses of human and murine terminal erythroid differentiation. *Blood* 123, 3466-3478 (2014).

42. Guda, S. et al. miRNA-embedded shRNAs for lineage-specific BCL11A knockdown and hemoglobin F induction. *Mol. Ther.* 23, 1465-1474 (2015).

43. Eddaoudi, A., Canning, S. L. & Kato, I. in *Cellular Quiescence: Methods and Protocols, Methods in Molecular Biology* 1686, 49-57 (2018).

44. Pinello, L. et al. CRISPResso: sequencing analysis toolbox for CRISPR-Cas9 genome editing. *Nat. Biotechnol.* 34, 695-697 (2016).

45. Makkerh, J. P. S., Dingwall, C. & Laskey, R. A. Comparative mutagenesis of nuclear localization signals reveals the importance of neutral and acidic amino acids. *Curr. Biol.* 6, 1025-1027 (1996).

TABLE 2

Published reports of genome editing in human CD34+ hematopoietic stem and progenitor cells. All references cited within table 2 are incorporated herein by reference in their entireties.

| Disease | Reference | CD34+ cell source | Locus | Editing modality | Therapeutic edit | In vitro edits | Healthy donor CD34+ cells In vivo BM edits | Secondary transplant |
|---|---|---|---|---|---|---|---|---|
| β-hemoglobin disorder | Hoban, Blood 2015 | CB, mPB, BM (SCD) | HBB | ZFN mRNA, IDLV, ssODN | HDR | 32% indels, 10% HDR | 4.8% indels, 0.24% HDR (16 week) | — |
| | Hoban, Mol Ther 2016 | CB, mPB, BM (SCD) | HBB | Cas9 mRNA, IDLV sgRNA and donor | HDR | 10% indels, 18% HDR | — | — |
| | Ye, PNAS 206 | mPB, BM | HBB | Cas9:sgRNA plasmid | Precise deletion | Not tested in unselected cells | — | — |
| | Dewitt, STM 2016 | mPB, PB (SCD) | HBB ssODN | Cas9 RNP, | HDR | ~40-50% indels, ~20-30% HDR, ~30% unedited | 46% indels, 2.3% HDR (16 week) | — |
| | Dever, Nature 2016 | CB, mPB, BM, PB (SCD) | HBB | Cas9 RNP or mRNA, AAV6 | HDR | 60% indels, 18% HDR, 16% unedited | 3.5% (unselected) | 7% HDR (unselected) |
| | Chang, MT Meth Clin Dev, 2017 | BM | BCL11A | ZFN mRNA | Indel | 70% indels | 50% indels (16 week) | 23% indels (8 week) |
| | Mettananda, Nat Commun, 2017 | CB, PB (β-thal) | HBA1/2 | Cas9:sgRNA plasmid | Precise deletion | 70% deletions (selected) | 0-71% deletion (selected) | Deletion present |
| | Wen, J Hem Onc, 2017 | PB (SCD) | HBB | Cas9 mRNA, RNP | HDR | — | — | — |
| | Antoniani, Blood 2018 | mPB, mPB (SCD) | HBB | Cas9 plasmid | Precise deletion | 7.4% deletion, 6.8% inversion | — | — |
| | Vakulskas, Nature Medicine 2018 | CB, mPB, PB (SCD) | HBB | Cas9 RNP, AAV6 | HDR | 60-70% indels, 28-30% HDR | — | — |
| | Holt, NBT 2010 | CB | CCR5 | ZFN plasmid | Indel | 17% indels | 11% indels (8-12 week) | 16% indels |
| Other diseases | Genovese, Nature 2014 | CB, BM, BM (SCID-X1) | IL2RG | ZFN, IDLV | HDR | 45-61% indels, 6% HDR | 20-43% indels, 1-2% HDR | — |
| | Wang, NBT 2015 | FL, mPB | CCR5; AAVS1 | ZFN mRNA, AAV6 | Indel, HDR | ~20-50% indels, 26-43% HDR | HDR 1-15%, indels not reported | ~3-50% HDR |
| | De Ravin, NBT 2016 | mPB, mPB (X-CGD) | AAVS1 | ZFN mRNA, AAV6 | HDR | 15.2% indels, 38.8% HDR | Indels not reported, 10.8% HDR | — |
| | Cai, eLife 2016 | CB | AAVS1 | ZFN-loaded IDLV | HDR | 5% indels, 1% HDR | — | — |

TABLE 2-continued

Published reports of genome editing in human CD34+ hematopoietic stem and progenitor cells. All references cited within table 2 are incorporated herein by reference in their entireties.

| Reference | Source | Target | Reagents | In vitro edits | In vivo BM edits |
|---|---|---|---|---|---|
| Gundry, Cell Reports 2016 | CB | CD45 | Cas9 RNP | 73% indels | 14-87% indels (8 weeks) | — |
| Bjurstrom, MT Nuc Acid, 2016 | mPB | BCL11A | ZFN, TALEN, Cas9 mRNA, sgRNA plasmid | 5-25% indels | Indel | 3.3-4.3% indels (20 weeks) | — |
| Ma, Integrative Biology, 2017 | Not reported | C/EBPa | Cas9 RNP with nano-silicon blade | Not quantified | — | — | — |
| Xu, Mol Ther, 2017 | FL | CCR5 | Cas9, paired truncated sgRNA plasmid | 27% indels | Indel | 32% indels (12 weeks) | 24.7% indels |
| Diez, EMBO Mol Med, 2017 | CB, mPB (FA-A) | AAVS1 | ZFN mRNA, IDLV | 57% indels, 7% HDR | HDR | 6% HDR | 1% HDR |
| De Ravin, STM, 2017 | mPB, mPB (X-CGD) | CYBB | Cas9 mRNA, ssODN | Up to 70% indels, up to 21% HDR | HDR | — | — |
| Bak, eLife, 2017 | CB, mPB, BM | IL2RG, CCR5, RUNX1c, ASXL1, STAG2, AAVS1 | Cas9 RNP, AAV6 | Indels not reported in unselected cells, 21.7% HDR | HDR | 30-100% HDR (selected) | — |
| Tothova, CSC, 2017 | CB | TET2, ASXL1, DNMT3A, RUNX1, TP53, NF1, EZH2, STAG2, SMC3, U2AF1, SRSF2 | Cas9 plasmid | ~53% indels (selected) | — | 4-36% indels (selected) | Indels present |

| Disease | Reference | In vitro edits | In vivo BM edits | Secondary transplant | Sickling correction | Patient CD34+cells | Off-target allele frequency |
|---|---|---|---|---|---|---|---|
| β-hemoglobin disorder | Hoban, Blood 2015 | ~35% indels, 18% HDR | — | — | — | | Not tested (only HBD found by integration site analysis) |
| | Hoban, Mol Ther 2016 | 16% indels, 20% HDR | — | — | — | | Not tested in HSPCs |
| | Ye, PNAS 206 | — | — | — | — | | |
| | Dewitt, STM 2016 | ~60% indels, ~20% HDR, ~20% unedited | — | — | — | | None found by T7E1 assay at bioinformatic sites 0.1-80% |

TABLE 2-continued

Published reports of genome editing in human CD34+ hematopoietic stem and progenitor cells. All references cited within table 2 are incorporated herein by reference in their entireties.

| | | | | | |
|---|---|---|---|---|---|
| | Dever, Nature 2016 | ~68% indels without donor. ~50% HDR, ~40% indels, ~10% unedited with donor. | — | — | ~1.2% |
| | Chang, MT Meth Clin Dev, 2017 | | | | Not tested |
| | Mettananda, Nat Commun, 2017 | 55% deletions (selected) | — | — | None found at bioinformatic sites |
| | Wen, J Hem Onc, 2017 | ~4.5% HDR | — | — | Not tested |
| | Antoniani, Blood 2018 | Not reported | — | From ~65% sickled cells (control) to ~30% sickled cells (edited population) | 0.3-4.6% |
| | Vakulskas, Nature Medicine 2018 | 64-70% HDR, indels not reported | — | — | ~30% or ~1.5% with WT or HiFi Cas9 |
| | Holt, NBT 2010 | — | — | NA | Not tested |
| | Genovese, Nature 2014 | 3-11% indels | — | NA | 0.2-0.7% |
| | Wang, NBT 2015 | — | — | NA | 0.1-7.0% |
| | De Ravin, NBT 2016 | 20.5% indels, 7.1% HDR | ~1.9-5.4% HDR | NA | Not tested |
| | Cai, eLife 2016 | — | — | NA | Not tested |
| | Gundry, Cell Reports 2016 | — | — | NA | 0.1-7.0% |
| | Bjurstrom, MT Nuc Acid, 2016 | — | — | NA | Not tested in HSPCs |
| | Ma, Integrative Biology, 2017 | — | — | NA | — |
| | Xu, Mol Ther, 2017 | — | — | NA | None found by 100x WGS |
| | Diez, EMBO Mol Med, 2017 | 0-5% HDR | — | NA | 0.2-0.5% |
| | De Ravin, STM, 2017 | 50-75% indels, 10-25% HDR, 10-30% unedited | 40-60% indels, 5-20% HDR, 20-50% unedited (8-20 weeks) | NA | None found at bioinformatic sites |
| Other diseases | Bak, eLife, 2017 | — | — | NA | Not tested |
| | Tothova, CSC, 2017 | — | — | NA | None found at bioinformatic sites |

What is claimed:

1. A synthetic nucleic acid molecule encoding a Cas9 enzyme comprising a c-Myc-like nuclear localization signal sequence fused to its amino terminus and an SV40 large T-antigen (SV40) nuclear localization signal sequence and nucleoplasmin nuclear localization signal sequence fused to its carboxyl terminus,
   wherein the synthetic nucleic acid molecule is used in combination with a guide RNA, whereby the guide RNA targets and hybridizes with a target sequence of a DNA molecule encoding at least one gene product and the polypeptide encoded by the synthetic nucleic acid molecule cleaves the DNA molecule encoding the at least one gene product, whereby expression of the at least one gene product is altered,
   wherein the DNA molecule encoding the at least one gene product is a BCL11A gene sequence,
   wherein the sequence of the synthetic nucleic acid molecule is set forth by SEQ ID NO: 21.

2. A composition comprising the synthetic nucleic molecule of claim 1.

3. The composition of claim 2, further comprising a guide RNA that targets and hybridizes to a target sequence on a DNA molecule.

4. A ribonucleoprotein (RNP) complex comprising the polypeptide encoded by the synthetic nucleic acid of claim 1 and a guide RNA that targets and hybridizes to a target sequence in the BCL11A gene.

5. A method of altering expression of at least one gene product, the method comprising introducing into a cell the synthetic nucleic acid molecule of claim 1 and at least one guide RNA that targets and hybridizes with a target sequence of the BCL11A gene, wherein the cell is an hematopoietic stem and progenitor cell (HSPC) or an erythroid progenitor cell.

6. A method of altering expression of at least one gene product, the method comprising introducing into a cell the composition of claim 2 and at least one guide RNA that targets and hybridizes with a target sequence of the BCL11A gene, wherein the cell is an HSPC or an erythroid progenitor cell.

7. A method of altering expression of at least one gene product, the method comprising introducing into a cell the RNP complex of claim 4, wherein the cell is an HSPC or an erythroid progenitor cell.

8. The method of claim 5, wherein the BCL11A gene product alters the expression of fetal hemoglobin.

* * * * *

SEQUENCE LISTING

<160> NUMBER OF SEQ ID NOS: 160

<210> SEQ ID NO 1
<211> LENGTH: 7
<212> TYPE: PRT
<213> ORGANISM: Simian virus 40

<400> SEQUENCE: 1

Pro Lys Lys Lys Arg Lys Val
1               5

<210> SEQ ID NO 2
<211> LENGTH: 16
<212> TYPE: PRT
<213> ORGANISM: Unknown
<220> FEATURE:
<223> OTHER INFORMATION: Description of Unknown:
      Nucleoplasmin bipartite NLS sequence

<400> SEQUENCE: 2

Lys Arg Pro Ala Ala Thr Lys Lys Ala Gly Gln Ala Lys Lys Lys Lys
1               5                   10                  15

<210> SEQ ID NO 3
<211> LENGTH: 9
<212> TYPE: PRT
<213> ORGANISM: Unknown
<220> FEATURE:
<223> OTHER INFORMATION: Description of Unknown:
      C-myc NLS sequence

<400> SEQUENCE: 3

Pro Ala Ala Lys Arg Val Lys Leu Asp
1               5

<210> SEQ ID NO 4
<211> LENGTH: 11
<212> TYPE: PRT
<213> ORGANISM: Unknown
<220> FEATURE:
<223> OTHER INFORMATION: Description of Unknown:
      C-myc NLS sequence

<400> SEQUENCE: 4

Arg Gln Arg Arg Asn Glu Leu Lys Arg Ser Pro
1               5                   10

<210> SEQ ID NO 5
<211> LENGTH: 38
<212> TYPE: PRT
<213> ORGANISM: Homo sapiens

<400> SEQUENCE: 5

Asn Gln Ser Ser Asn Phe Gly Pro Met Lys Gly Gly Asn Phe Gly Gly
1               5                   10                  15

Arg Ser Ser Gly Pro Tyr Gly Gly Gly Gly Gln Tyr Phe Ala Lys Pro
            20                  25                  30

Arg Asn Gln Gly Gly Tyr
        35

<210> SEQ ID NO 6
<211> LENGTH: 42
<212> TYPE: PRT
<213> ORGANISM: Unknown
<220> FEATURE:
<223> OTHER INFORMATION: Description of Unknown:

IBB domain from importin-alpha sequence

<400> SEQUENCE: 6

Arg Met Arg Ile Glx Phe Lys Asn Lys Gly Lys Asp Thr Ala Glu Leu
1               5                   10                  15

Arg Arg Arg Arg Val Glu Val Ser Val Glu Leu Arg Lys Ala Lys Lys
            20                  25                  30

Asp Glu Gln Ile Leu Lys Arg Arg Asn Val
            35                  40

<210> SEQ ID NO 7
<211> LENGTH: 8
<212> TYPE: PRT
<213> ORGANISM: Unknown
<220> FEATURE:
<223> OTHER INFORMATION: Description of Unknown:
      Myoma T protein sequence

<400> SEQUENCE: 7

Val Ser Arg Lys Arg Pro Arg Pro
1               5

<210> SEQ ID NO 8
<211> LENGTH: 8
<212> TYPE: PRT
<213> ORGANISM: Unknown
<220> FEATURE:
<223> OTHER INFORMATION: Description of Unknown:
      Myoma T protein sequence

<400> SEQUENCE: 8

Pro Pro Lys Lys Ala Arg Glu Asp
1               5

<210> SEQ ID NO 9
<211> LENGTH: 8
<212> TYPE: PRT
<213> ORGANISM: Homo sapiens

<400> SEQUENCE: 9

Pro Gln Pro Lys Lys Lys Pro Leu
1               5

<210> SEQ ID NO 10
<211> LENGTH: 12
<212> TYPE: PRT
<213> ORGANISM: Mus musculus

<400> SEQUENCE: 10

Ser Ala Leu Ile Lys Lys Lys Lys Lys Met Ala Pro
1               5                   10

<210> SEQ ID NO 11
<211> LENGTH: 5
<212> TYPE: PRT
<213> ORGANISM: Influenza virus

<400> SEQUENCE: 11

Asp Arg Leu Arg Arg
1               5

<210> SEQ ID NO 12
<211> LENGTH: 7
<212> TYPE: PRT
<213> ORGANISM: Influenza virus

```
<400> SEQUENCE: 12

Pro Lys Gln Lys Lys Arg Lys
1               5

<210> SEQ ID NO 13
<211> LENGTH: 10
<212> TYPE: PRT
<213> ORGANISM: Hepatitis delta virus

<400> SEQUENCE: 13

Arg Lys Leu Lys Lys Lys Ile Lys Lys Leu
1               5                   10

<210> SEQ ID NO 14
<211> LENGTH: 10
<212> TYPE: PRT
<213> ORGANISM: Mus musculus

<400> SEQUENCE: 14

Arg Glu Lys Lys Lys Phe Leu Lys Arg Arg
1               5                   10

<210> SEQ ID NO 15
<211> LENGTH: 20
<212> TYPE: PRT
<213> ORGANISM: Homo sapiens

<400> SEQUENCE: 15

Lys Arg Lys Gly Asp Glu Val Asp Gly Val Asp Glu Val Ala Lys Lys
1               5                   10                  15

Lys Ser Lys Lys
            20

<210> SEQ ID NO 16
<211> LENGTH: 17
<212> TYPE: PRT
<213> ORGANISM: Homo sapiens

<400> SEQUENCE: 16

Arg Lys Cys Leu Gln Ala Gly Met Asn Leu Glu Ala Arg Lys Thr Lys
1               5                   10                  15

Lys

<210> SEQ ID NO 17
<211> LENGTH: 21
<212> TYPE: PRT
<213> ORGANISM: Unknown
<220> FEATURE:
<223> OTHER INFORMATION: Description of Unknown:
      53BP1 sequence

<400> SEQUENCE: 17

Gly Lys Arg Lys Leu Ile Thr Ser Glu Glu Glu Arg Ser Pro Ala Lys
1               5                   10                  15

Arg Gly Arg Lys Ser
            20

<210> SEQ ID NO 18
<211> LENGTH: 6
<212> TYPE: PRT
<213> ORGANISM: Unknown
<220> FEATURE:
<223> OTHER INFORMATION: Description of Unknown:
```

BRCA1 sequence

<400> SEQUENCE: 18

Lys Arg Lys Arg Arg Pro
1               5

<210> SEQ ID NO 19
<211> LENGTH: 20
<212> TYPE: PRT
<213> ORGANISM: Unknown
<220> FEATURE:
<223> OTHER INFORMATION: Description of Unknown:
      SRC-1 sequence

<400> SEQUENCE: 19

Lys Arg Lys Gly Ser Pro Cys Asp Thr Leu Ala Ser Ser Thr Glu Lys
1               5                   10                  15

Arg Arg Arg Glu
            20

<210> SEQ ID NO 20
<211> LENGTH: 12
<212> TYPE: PRT
<213> ORGANISM: Unknown
<220> FEATURE:
<223> OTHER INFORMATION: Description of Unknown:
      IRF3 sequence

<400> SEQUENCE: 20

Lys Arg Asn Phe Arg Ser Ala Leu Asn Arg Lys Glu
1               5                   10

<210> SEQ ID NO 21
<211> LENGTH: 4293
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 21

| | | | | | |
|---|---|---|---|---|---|
| ccggcagcta | agaaaaagaa | actggatggc | agcgtcgaca | tggataagaa | atactcaata | 60 |
| ggcttagata | tcggcacaaa | tagcgtcgga | tgggcggtga | tcactgatga | atataaggtt | 120 |
| ccgtctaaaa | agttcaaggt | tctgggaaat | acagaccgcc | acagtatcaa | aaaaaatctt | 180 |
| atagggctc | ttttatttga | cagtggagag | acagcggaag | cgactcgtct | caaacggaca | 240 |
| gctcgtagaa | ggtatacacg | tcggaagaat | cgtatttgtt | atctacagga | gattttttca | 300 |
| aatgagatgg | cgaaagtaga | tgatagtttc | tttcatcgac | ttgaagagtc | ttttttggtg | 360 |
| gaagaagaca | gaagcatga | acgtcatcct | attttggaa | atatagtaga | tgaagttgct | 420 |
| tatcatgaga | aatatccaac | tatctatcat | ctgcgaaaaa | aattggtaga | ttctactgat | 480 |
| aaagcggatt | tgcgcttaat | ctatttggcc | ttagcgcata | tgattaagtt | tcgtggtcat | 540 |
| tttttgattg | agggagattt | aaatcctgat | aatagtgatg | tggacaaact | atttatccag | 600 |
| ttggtacaaa | cctacaatca | attatttgaa | gaaaacccta | ttaacgcaag | tggagtagat | 660 |
| gctaaagcga | ttctttctgc | acgattgagt | aaatcaagac | gattagaaaa | tctcattgct | 720 |
| cagctccccg | gtgagaagaa | aaatggctta | tttgggaatc | tcattgcttt | gtcattgggt | 780 |
| ttgacccta | attttaaatc | aaattttgat | ttggcagaag | atgctaaatt | acagctttca | 840 |
| aaagatactt | acgatgatga | tttagataat | ttattggcgc | aaattggaga | tcaatatgct | 900 |

```
gatttgtttt tggcagctaa gaatttatca gatgctattt tactttcaga tatcctaaga    960
gtaaatactg aaataactaa ggctccccta tcagcttcaa tgattaaacg ctacgatgaa   1020
catcatcaag acttgactct tttaaaagct ttagttcgac aacaacttcc agaaaagtat   1080
aaagaaatct tttttgatca atcaaaaaac ggatatgcag gttatattga tgggggagct   1140
agccaagaag aattttataa atttatcaaa ccaattttag aaaaaatgga tggtactgag   1200
gaattattgg tgaaactaaa tcgtgaagat ttgctgcgca agcaacggac ctttgacaac   1260
ggctctattc cccatcaaat tcacttgggt gagctgcatg ctattttgag aagacaagaa   1320
gacttttatc cattttttaaa agacaatcgt gagaagattg aaaaaatctt gacttttcga   1380
attccttatt atgttggtcc attggcgcgt ggcaatagtc gttttgcatg gatgactcgg   1440
aagtctgaag aaacaattac cccatggaat tttgaagaag ttgtcgataa aggtgcttca   1500
gctcaatcat ttattgaacg catgacaaac tttgataaaa atcttccaaa tgaaaaagta   1560
ctaccaaaac atagtttgct ttatgagtat tttacggttt ataacgaatt gacaaaggtc   1620
aaatatgtta ctgaaggaat gcgaaaacca gcatttcttt caggtgaaca gaagaaagcc   1680
attgttgatt tactcttcaa aacaaatcga aaagtaaccg ttaagcaatt aaaagaagat   1740
tatttcaaaa aaatagaatg ttttgatagt gttgaaattt caggagttga agatagattt   1800
aatgcttcat taggtaccta ccatgatttg ctaaaaatta ttaaagataa agattttttg   1860
gataatgaag aaaatgaaga tatcttagag gatattgttt taacattgac cttatttgaa   1920
gatagggaga tgattgagga aagacttaaa acatatgctc acctctttga tgataaggtg   1980
atgaaacagc ttaaacgtcg ccgttatact ggttggggac gtttgtctcg aaaattgatt   2040
aatggtatta gggataagca atctggcaaa acaatattag atttttttgaa atcagatggt   2100
tttgccaatc gcaattttat gcagctgatc catgatgata gtttgacatt taaagaagac   2160
attcaaaaag cacaagtgtc tggacaaggc gatagtttac atgaacatat tgcaaattta   2220
gctggtagcc ctgctattaa aaaaggtatt ttacagactg taaaagttgt tgatgaattg   2280
gtcaaagtaa tggggcggca taagccagaa aatatcgtta ttgaaatggc acgtgaaaat   2340
cagacaactc aaaagggcca gaaaaattcg cgagagcgta tgaaacgaat cgaagaaggt   2400
atcaaagaat taggaagtca gattcttaaa gagcatcctg ttgaaaatac tcaattgcaa   2460
aatgaaaagc tctatctcta ttatctccaa aatggaagag acatgtatgt ggaccaagaa   2520
ttagatatta atcgtttaag tgattatgat gtcgatcaca ttgttccaca aagtttcctt   2580
aaagacgatt caatagacaa taaggtctta acgcgttctg ataaaaatcg tggtaaatcg   2640
gataacgttc caagtgaaga agtagtcaaa aagatgaaaa actattggag acaacttcta   2700
aacgccaagt taatcactca acgtaagttt gataatttaa cgaaagctga acgtggaggt   2760
ttgagtgaac ttgataaagc tggtttttatc aaacgccaat tggttgaaac tcgccaaatc   2820
actaagcatg tggcacaaat tttggatagt cgcatgaata ctaaatacga tgaaaatgat   2880
aaacttattc gagaggttaa agtgattacc ttaaatctca attagtttc tgacttccga   2940
aaagatttcc aattctataa agtacgtgag attaacaatt accatcatgc ccatgatgcg   3000
tatctaaatg ccgtcgttgg aactgctttg attaagaaat atccaaaact tgaatcggag   3060
tttgtctatg gtgattataa agtttatgat gttcgtaaaa tgattgctaa gtctgagcaa   3120
gaaataggca aagcaaccgc aaaatatttc ttttactcta atatcatgaa cttcttcaaa   3180
acagaaatta cacttgcaaa tggagagatt cgcaaacgcc ctctaatcga aactaatggg   3240
gaaactggag aaattgtctg ggataaaggg cgagattttg ccacagtgcg caaagtattg   3300
```

-continued

```
tccatgcccc aagtcaatat tgtcaagaaa acagaagtac agacaggcgg attctccaag    3360
gagtcaattt taccaaaaag aaattcggac aagcttattg ctcgtaaaaa agactgggat    3420
ccaaaaaaat atggtggttt tgatagtcca acggtagctt attcagtcct agtggttgct    3480
aaggtggaaa aagggaaatc gaagaagtta aaatccgtta aagagttact agggatcaca    3540
attatggaaa gaagttcctt tgaaaaaaat ccgattgact ttttagaagc taaaggatat    3600
aaggaagtta aaaagactt aatcattaaa ctacctaaat atagtctttt tgagttagaa    3660
aacggtcgta aacggatgct ggctagtgcc ggagaattac aaaaaggaaa tgagctggct    3720
ctgccaagca aatatgtgaa tttttttatat ttagctagtc attatgaaaa gttgaagggt    3780
agtccagaag ataacgaaca aaaacaattg tttgtggagc agcataagca ttatttagat    3840
gagattattg agcaaatcag tgaattttct aagcgtgtta ttttagcaga tgccaattta    3900
gataaagttc ttagtgcata taacaaacat agagacaaac caatacgtga acaagcagaa    3960
aatattattc atttatttac gttgacgaat cttggagctc ccgctgcttt taaatattttt   4020 gatacaacaa ttgatcgtaa acgatatacg tctacaaaag aagttttaga tgccactctt    4080
atccatcaat ccatcactgg tctttatgaa acacgcattg atttgagtca gctaggaggt    4140
gacaccggtg gtggtcccgg gggtggtgcg gccgcaggca gcggaagccc taagaaaaaa    4200
cgaaaagttg gcagcggaag caaaaggccg gcggccacga aaaaggccgg ccaggcaaaa    4260
aagaaaaagc tcgagcacca ccaccaccac cac                                 4293
```

<210> SEQ ID NO 22
<211> LENGTH: 1431
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 22

```
Pro Ala Ala Lys Lys Lys Lys Leu Asp Gly Ser Val Asp Met Asp Lys
1               5                   10                  15

Lys Tyr Ser Ile Gly Leu Asp Ile Gly Thr Asn Ser Val Gly Trp Ala
            20                  25                  30

Val Ile Thr Asp Glu Tyr Lys Val Pro Ser Lys Lys Phe Lys Val Leu
        35                  40                  45

Gly Asn Thr Asp Arg His Ser Ile Lys Lys Asn Leu Ile Gly Ala Leu
    50                  55                  60

Leu Phe Asp Ser Gly Glu Thr Ala Glu Ala Thr Arg Leu Lys Arg Thr
65                  70                  75                  80

Ala Arg Arg Arg Tyr Thr Arg Arg Lys Asn Arg Ile Cys Tyr Leu Gln
                85                  90                  95

Glu Ile Phe Ser Asn Glu Met Ala Lys Val Asp Asp Ser Phe Phe His
            100                 105                 110

Arg Leu Glu Glu Ser Phe Leu Val Glu Glu Asp Lys Lys His Glu Arg
        115                 120                 125

His Pro Ile Phe Gly Asn Ile Val Asp Glu Val Ala Tyr His Glu Lys
    130                 135                 140

Tyr Pro Thr Ile Tyr His Leu Arg Lys Lys Leu Val Asp Ser Thr Asp
145                 150                 155                 160

Lys Ala Asp Leu Arg Leu Ile Tyr Leu Ala Leu Ala His Met Ile Lys
                165                 170                 175
```

-continued

```
Phe Arg Gly His Phe Leu Ile Glu Gly Asp Leu Asn Pro Asp Asn Ser
            180                 185                 190

Asp Val Asp Lys Leu Phe Ile Gln Leu Val Gln Thr Tyr Asn Gln Leu
        195                 200                 205

Phe Glu Glu Asn Pro Ile Asn Ala Ser Gly Val Asp Ala Lys Ala Ile
    210                 215                 220

Leu Ser Ala Arg Leu Ser Lys Ser Arg Arg Leu Glu Asn Leu Ile Ala
225                 230                 235                 240

Gln Leu Pro Gly Glu Lys Lys Asn Gly Leu Phe Gly Asn Leu Ile Ala
                245                 250                 255

Leu Ser Leu Gly Leu Thr Pro Asn Phe Lys Ser Asn Phe Asp Leu Ala
            260                 265                 270

Glu Asp Ala Lys Leu Gln Leu Ser Lys Asp Thr Tyr Asp Asp Asp Leu
        275                 280                 285

Asp Asn Leu Leu Ala Gln Ile Gly Asp Gln Tyr Ala Asp Leu Phe Leu
    290                 295                 300

Ala Ala Lys Asn Leu Ser Asp Ala Ile Leu Leu Ser Asp Ile Leu Arg
305                 310                 315                 320

Val Asn Thr Glu Ile Thr Lys Ala Pro Leu Ser Ala Ser Met Ile Lys
                325                 330                 335

Arg Tyr Asp Glu His His Gln Asp Leu Thr Leu Leu Lys Ala Leu Val
            340                 345                 350

Arg Gln Gln Leu Pro Glu Lys Tyr Lys Glu Ile Phe Phe Asp Gln Ser
        355                 360                 365

Lys Asn Gly Tyr Ala Gly Tyr Ile Asp Gly Gly Ala Ser Gln Glu Glu
    370                 375                 380

Phe Tyr Lys Phe Ile Lys Pro Ile Leu Glu Lys Met Asp Gly Thr Glu
385                 390                 395                 400

Glu Leu Leu Val Lys Leu Asn Arg Glu Asp Leu Leu Arg Lys Gln Arg
                405                 410                 415

Thr Phe Asp Asn Gly Ser Ile Pro His Gln Ile His Leu Gly Glu Leu
            420                 425                 430

His Ala Ile Leu Arg Arg Gln Glu Asp Phe Tyr Pro Phe Leu Lys Asp
        435                 440                 445

Asn Arg Glu Lys Ile Glu Lys Ile Leu Thr Phe Arg Ile Pro Tyr Tyr
    450                 455                 460

Val Gly Pro Leu Ala Arg Gly Asn Ser Arg Phe Ala Trp Met Thr Arg
465                 470                 475                 480

Lys Ser Glu Glu Thr Ile Thr Pro Trp Asn Phe Glu Glu Val Val Asp
                485                 490                 495

Lys Gly Ala Ser Ala Gln Ser Phe Ile Glu Arg Met Thr Asn Phe Asp
            500                 505                 510

Lys Asn Leu Pro Asn Glu Lys Val Leu Pro Lys His Ser Leu Leu Tyr
        515                 520                 525

Glu Tyr Phe Thr Val Tyr Asn Glu Leu Thr Lys Val Lys Tyr Val Thr
    530                 535                 540

Glu Gly Met Arg Lys Pro Ala Phe Leu Ser Gly Glu Gln Lys Lys Ala
545                 550                 555                 560

Ile Val Asp Leu Leu Phe Lys Thr Asn Arg Lys Val Thr Val Lys Gln
                565                 570                 575

Leu Lys Glu Asp Tyr Phe Lys Lys Ile Glu Cys Phe Asp Ser Val Glu
            580                 585                 590

Ile Ser Gly Val Glu Asp Arg Phe Asn Ala Ser Leu Gly Thr Tyr His
```

```
            595                 600                 605
Asp Leu Leu Lys Ile Ile Lys Asp Lys Asp Phe Leu Asp Asn Glu Glu
    610                 615                 620

Asn Glu Asp Ile Leu Glu Asp Ile Val Leu Thr Leu Thr Leu Phe Glu
625                 630                 635                 640

Asp Arg Glu Met Ile Glu Arg Leu Lys Thr Tyr Ala His Leu Phe
                    645                 650                 655

Asp Asp Lys Val Met Lys Gln Leu Lys Arg Arg Tyr Thr Gly Trp
            660                 665                 670

Gly Arg Leu Ser Arg Lys Leu Ile Asn Gly Ile Arg Asp Lys Gln Ser
                675                 680                 685

Gly Lys Thr Ile Leu Asp Phe Leu Lys Ser Asp Gly Phe Ala Asn Arg
    690                 695                 700

Asn Phe Met Gln Leu Ile His Asp Asp Ser Leu Thr Phe Lys Glu Asp
705                 710                 715                 720

Ile Gln Lys Ala Gln Val Ser Gly Gln Gly Asp Ser Leu His Glu His
                    725                 730                 735

Ile Ala Asn Leu Ala Gly Ser Pro Ala Ile Lys Lys Gly Ile Leu Gln
                740                 745                 750

Thr Val Lys Val Val Asp Glu Leu Val Lys Val Met Gly Arg His Lys
    755                 760                 765

Pro Glu Asn Ile Val Ile Glu Met Ala Arg Glu Asn Gln Thr Thr Gln
770                 775                 780

Lys Gly Gln Lys Asn Ser Arg Glu Arg Met Lys Arg Ile Glu Glu Gly
785                 790                 795                 800

Ile Lys Glu Leu Gly Ser Gln Ile Leu Lys Glu His Pro Val Glu Asn
                    805                 810                 815

Thr Gln Leu Gln Asn Glu Lys Leu Tyr Leu Tyr Tyr Leu Gln Asn Gly
                820                 825                 830

Arg Asp Met Tyr Val Asp Gln Glu Leu Asp Ile Asn Arg Leu Ser Asp
    835                 840                 845

Tyr Asp Val Asp His Ile Val Pro Gln Ser Phe Leu Lys Asp Asp Ser
850                 855                 860

Ile Asp Asn Lys Val Leu Thr Arg Ser Asp Lys Asn Arg Gly Lys Ser
865                 870                 875                 880

Asp Asn Val Pro Ser Glu Glu Val Val Lys Lys Met Lys Asn Tyr Trp
                885                 890                 895

Arg Gln Leu Leu Asn Ala Lys Leu Ile Thr Gln Arg Lys Phe Asp Asn
                900                 905                 910

Leu Thr Lys Ala Glu Arg Gly Gly Leu Ser Glu Leu Asp Lys Ala Gly
    915                 920                 925

Phe Ile Lys Arg Gln Leu Val Glu Thr Arg Gln Ile Thr Lys His Val
930                 935                 940

Ala Gln Ile Leu Asp Ser Arg Met Asn Thr Lys Tyr Asp Glu Asn Asp
945                 950                 955                 960

Lys Leu Ile Arg Glu Val Lys Val Ile Thr Leu Lys Ser Lys Leu Val
                    965                 970                 975

Ser Asp Phe Arg Lys Asp Phe Gln Phe Tyr Lys Val Arg Glu Ile Asn
                980                 985                 990

Asn Tyr His His Ala His Asp Ala Tyr Leu Asn Ala Val Val Gly Thr
            995                 1000                1005

Ala Leu Ile Lys Lys Tyr Pro Lys Leu Glu Ser Glu Phe Val Tyr
    1010                1015                1020
```

-continued

Gly Asp Tyr Lys Val Tyr Asp Val Arg Lys Met Ile Ala Lys Ser
1025            1030            1035

Glu Gln Glu Ile Gly Lys Ala Thr Ala Lys Tyr Phe Phe Tyr Ser
1040            1045            1050

Asn Ile Met Asn Phe Phe Lys Thr Glu Ile Thr Leu Ala Asn Gly
1055            1060            1065

Glu Ile Arg Lys Arg Pro Leu Ile Glu Thr Asn Gly Glu Thr Gly
1070            1075            1080

Glu Ile Val Trp Asp Lys Gly Arg Asp Phe Ala Thr Val Arg Lys
1085            1090            1095

Val Leu Ser Met Pro Gln Val Asn Ile Val Lys Lys Thr Glu Val
1100            1105            1110

Gln Thr Gly Gly Phe Ser Lys Glu Ser Ile Leu Pro Lys Arg Asn
1115            1120            1125

Ser Asp Lys Leu Ile Ala Arg Lys Lys Asp Trp Asp Pro Lys Lys
1130            1135            1140

Tyr Gly Gly Phe Asp Ser Pro Thr Val Ala Tyr Ser Val Leu Val
1145            1150            1155

Val Ala Lys Val Glu Lys Gly Lys Ser Lys Lys Leu Lys Ser Val
1160            1165            1170

Lys Glu Leu Leu Gly Ile Thr Ile Met Glu Arg Ser Ser Phe Glu
1175            1180            1185

Lys Asn Pro Ile Asp Phe Leu Glu Ala Lys Gly Tyr Lys Glu Val
1190            1195            1200

Lys Lys Asp Leu Ile Ile Lys Leu Pro Lys Tyr Ser Leu Phe Glu
1205            1210            1215

Leu Glu Asn Gly Arg Lys Arg Met Leu Ala Ser Ala Gly Glu Leu
1220            1225            1230

Gln Lys Gly Asn Glu Leu Ala Leu Pro Ser Lys Tyr Val Asn Phe
1235            1240            1245

Leu Tyr Leu Ala Ser His Tyr Glu Lys Leu Lys Gly Ser Pro Glu
1250            1255            1260

Asp Asn Glu Gln Lys Gln Leu Phe Val Glu Gln His Lys His Tyr
1265            1270            1275

Leu Asp Glu Ile Ile Glu Gln Ile Ser Glu Phe Ser Lys Arg Val
1280            1285            1290

Ile Leu Ala Asp Ala Asn Leu Asp Lys Val Leu Ser Ala Tyr Asn
1295            1300            1305

Lys His Arg Asp Lys Pro Ile Arg Glu Gln Ala Glu Asn Ile Ile
1310            1315            1320

His Leu Phe Thr Leu Thr Asn Leu Gly Ala Pro Ala Ala Phe Lys
1325            1330            1335

Tyr Phe Asp Thr Thr Ile Asp Arg Lys Arg Tyr Thr Ser Thr Lys
1340            1345            1350

Glu Val Leu Asp Ala Thr Leu Ile His Gln Ser Ile Thr Gly Leu
1355            1360            1365

Tyr Glu Thr Arg Ile Asp Leu Ser Gln Leu Gly Gly Asp Thr Gly
1370            1375            1380

Gly Gly Pro Gly Gly Gly Ala Ala Ala Gly Ser Gly Ser Pro Lys
1385            1390            1395

Lys Lys Arg Lys Val Gly Ser Gly Ser Lys Arg Pro Ala Ala Thr
1400            1405            1410

-continued

Lys Lys  Ala Gly Gln Ala Lys  Lys Lys Lys Leu Glu  His His His
    1415                1420               1425

His His  His
    1430

<210> SEQ ID NO 23
<211> LENGTH: 4
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 23

Gly Gly Ser Gly
1

<210> SEQ ID NO 24
<211> LENGTH: 12
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 24
ggcggtagcg gc                                                           12

<210> SEQ ID NO 25
<211> LENGTH: 12
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 25

Gly Gly Ser Gly Gly Gly Ser Gly Gly Gly Ser Gly
1               5                   10

<210> SEQ ID NO 26
<211> LENGTH: 36
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 26
ggcggtagcg gcggaggcag cggtggcggc agcggc                                 36

<210> SEQ ID NO 27
<211> LENGTH: 20
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 27

Gly Gly Ser Gly Gly Gly Ser Gly Gly Gly Ser Gly Gly Gly Ser Gly
1               5                   10                  15

Gly Gly Ser Gly
            20

<210> SEQ ID NO 28

```
<211> LENGTH: 60
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 28
ggcggtagcg gcggcggtag cggcggaggc agcggtggcg gcagcggcgg cggtagcggc    60

<210> SEQ ID NO 29
<211> LENGTH: 15
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 29

Thr Gly Gly Gly Pro Gly Gly Gly Ala Ala Ala Gly Ser Gly Ser
1               5                   10                  15

<210> SEQ ID NO 30
<211> LENGTH: 45
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 30
accggtggtg gtcccggggg tggtgcggcc gcaggcagcg gaagc                    45

<210> SEQ ID NO 31
<211> LENGTH: 32
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 31

Ser Gly Gly Ser Ser Gly Gly Ser Ser Gly Ser Glu Thr Pro Gly Thr
1               5                   10                  15

Ser Glu Ser Ala Thr Pro Glu Ser Ser Gly Gly Ser Ser Gly Gly Ser
            20                  25                  30

<210> SEQ ID NO 32
<211> LENGTH: 96
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 32
tctggaggat ctagcggagg atcctctgga agcgagacac aggcacaag cgagtccgcc     60 acaccagaga gctccggcgg ctcctccgga ggatcc                              96

<210> SEQ ID NO 33
<211> LENGTH: 6
<212> TYPE: PRT
<213> ORGANISM: Artificial Sequence
<220> FEATURE:
<223> OTHER INFORMATION: Description of Artificial Sequence: Synthetic
      6xHis tag
```

<400> SEQUENCE: 33

His His His His His His
1               5

<210> SEQ ID NO 34
<211> LENGTH: 171
<212> TYPE: DNA
<213> ORGANISM: Homo sapiens

<400> SEQUENCE: 34
actcttagac ataacacacc agggtcaata caactttgaa gctagtctag tgcaagctaa    60
cagttgcttt tatcacaggc tccaggaagg gtttggcctc tgattagggt gggggcgtgg   120
gtggggtaga agaggactgg cagacctctc catcggtggc cgtttgccca g            171

<210> SEQ ID NO 35
<211> LENGTH: 40
<212> TYPE: DNA
<213> ORGANISM: Homo sapiens

<400> SEQUENCE: 35
aagctaacag ttgctttat cacaggctcc aggaagggtt                           40

<210> SEQ ID NO 36
<211> LENGTH: 40
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 36
aagctaacag ttgctttat tcacaggctc caggaagggt                           40

<210> SEQ ID NO 37
<211> LENGTH: 25
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 37
aagctaacag gctccaggaa gggtt                                          25

<210> SEQ ID NO 38
<211> LENGTH: 27
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 38
aagctaacag ttgctccagg aagggtt                                        27

<210> SEQ ID NO 39
<211> LENGTH: 38
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 39
aagctaacag ttgcttttca caggctccag gaagggtt                                    38

<210> SEQ ID NO 40
<211> LENGTH: 38
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 40
aagctaacag ttgcttttat caggctccag gaagggtt                                    38

<210> SEQ ID NO 41
<211> LENGTH: 40
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 41
aagctaacag ttgcttttat cacaggctcc aggaagggtt                                  40

<210> SEQ ID NO 42
<211> LENGTH: 33
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 42
aagctaacag ttgcacaggc tccaggaagg gtt                                         33

<210> SEQ ID NO 43
<211> LENGTH: 39
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 43
aagctaacag ttgcttttat acaggctcca ggaagggtt                                   39

<210> SEQ ID NO 44
<211> LENGTH: 40
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 44
aagctaacag ttgcttttat atcacaggct ccaggaaggg                                  40

<210> SEQ ID NO 45
<211> LENGTH: 39
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 45
aagctaacag ttgcttttac acaggctcca ggaagggtt                                   39

<210> SEQ ID NO 46
<211> LENGTH: 39
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 46
aagctaacag ttgcttttc acaggctcca ggaagggtt                          39

<210> SEQ ID NO 47
<211> LENGTH: 27
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 47
aagctaacac aggctccagg aagggtt                                      27

<210> SEQ ID NO 48
<211> LENGTH: 40
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 48
agctaacagt tgcttttaat cacaggctcc aggaagggtt                        40

<210> SEQ ID NO 49
<211> LENGTH: 36
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 49
aagctaacag ttgcttcaca ggctccagga agggtt                            36

<210> SEQ ID NO 50
<211> LENGTH: 37
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 50
aagctaacag ttgctttcac aggctccagg aagggtt                           37

<210> SEQ ID NO 51
<211> LENGTH: 40
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 51
aagctaacag ttgcttttat ccacaggctc caggaagggt                        40

<210> SEQ ID NO 52
<211> LENGTH: 34
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 52
aagctaacag ttgtcacagg ctccaggaag ggtt                          34

<210> SEQ ID NO 53
<211> LENGTH: 40
<212> TYPE: DNA
<213> ORGANISM: Homo sapiens

<400> SEQUENCE: 53
aagctaacag ttgctttttat cacaggctcc aggaagggtt                   40

<210> SEQ ID NO 54
<211> LENGTH: 40
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 54
aagctaacag ttgctttttat tcacaggctc caggaagggt                   40

<210> SEQ ID NO 55
<211> LENGTH: 40
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 55
aagctaacag ttgctttttat cacaggctcc aggaagggtt                   40

<210> SEQ ID NO 56
<211> LENGTH: 25
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 56
aagctaacag gctccaggaa gggtt                                    25

<210> SEQ ID NO 57
<211> LENGTH: 27
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 57
aagctaacag ttgctccagg aagggtt                                  27

<210> SEQ ID NO 58
<211> LENGTH: 27
<212> TYPE: DNA

```
<213> ORGANISM: Artificial Sequence
<220> FEATURE:
<223> OTHER INFORMATION: Description of Artificial Sequence: Synthetic
      oligonucleotide

<400> SEQUENCE: 58
aagctaacac aggctccagg aagggtt                                            27

<210> SEQ ID NO 59
<211> LENGTH: 38
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 59
aagctaacag ttgcttttat caggctccag gaagggtt                                38

<210> SEQ ID NO 60
<211> LENGTH: 38
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 60
aagctaacag ttgcttttca caggctccag gaagggtt                                38

<210> SEQ ID NO 61
<211> LENGTH: 33
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 61
aagctaacag ttgcacaggc tccaggaagg gtt                                     33

<210> SEQ ID NO 62
<211> LENGTH: 35
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 62
aagctaacag ttgctaacag gctccaggaa gggtt                                   35

<210> SEQ ID NO 63
<211> LENGTH: 38
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 63
aagctaacag ttgcttttaa caggctccag gaagggtt                                38

<210> SEQ ID NO 64
<211> LENGTH: 39
<212> TYPE: DNA
<213> ORGANISM: Artificial Sequence
```

```
<220> FEATURE:
<223> OTHER INFORMATION: Description of Artificial Sequence: Synthetic
      oligonucleotide

<400> SEQUENCE: 64
aagctaacag ttgctttat cacaggctcc aggaagggt                              39

<210> SEQ ID NO 65
<211> LENGTH: 40
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 65
aagctaacag ttgctttat atcacaggct ccaggaaggg                             40

<210> SEQ ID NO 66
<211> LENGTH: 40
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 66
aagctaacag ttgcttttaa cacaggctcc aggaagggtt                            40

<210> SEQ ID NO 67
<211> LENGTH: 17
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 67
aagctccagg aagggtt                                                     17

<210> SEQ ID NO 68
<211> LENGTH: 18
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 68
aagctaacag gaagggtt                                                    18

<210> SEQ ID NO 69
<211> LENGTH: 23
<212> TYPE: DNA
<213> ORGANISM: Homo sapiens
<220> FEATURE:
<221> NAME/KEY: modified_base
<222> LOCATION: (21)..(21)
<223> OTHER INFORMATION: a, c, t, g, unknown or other

<400> SEQUENCE: 69
ctaacagttg cttttatcac ngg                                              23

<210> SEQ ID NO 70
<211> LENGTH: 23
<212> TYPE: DNA
<213> ORGANISM: Artificial Sequence
```

```
<220> FEATURE:
<223> OTHER INFORMATION: Description of Artificial Sequence: Synthetic
      oligonucleotide
<220> FEATURE:
<221> NAME/KEY: modified_base
<222> LOCATION: (21)..(21)
<223> OTHER INFORMATION: a, c, t, g, unknown or other

<400> SEQUENCE: 70
ctaacagttg cttttatcac ngg                                              23

<210> SEQ ID NO 71
<211> LENGTH: 22
<212> TYPE: DNA
<213> ORGANISM: Artificial Sequence
<220> FEATURE:
<223> OTHER INFORMATION: Description of Artificial Sequence: Synthetic
      oligonucleotide
<220> FEATURE:
<221> NAME/KEY: modified_base
<222> LOCATION: (20)..(20)
<223> OTHER INFORMATION: a, c, t, g, unknown or other

<400> SEQUENCE: 71
ctaacaatgc tttcatcacn gg                                               22

<210> SEQ ID NO 72
<211> LENGTH: 23
<212> TYPE: DNA
<213> ORGANISM: Artificial Sequence
<220> FEATURE:
<223> OTHER INFORMATION: Description of Artificial Sequence: Synthetic
      oligonucleotide
<220> FEATURE:
<221> NAME/KEY: modified_base
<222> LOCATION: (21)..(21)
<223> OTHER INFORMATION: a, c, t, g, unknown or other

<400> SEQUENCE: 72
attacagctg catttatcac ngg                                              23

<210> SEQ ID NO 73
<211> LENGTH: 23
<212> TYPE: DNA
<213> ORGANISM: Artificial Sequence
<220> FEATURE:
<223> OTHER INFORMATION: Description of Artificial Sequence: Synthetic
      oligonucleotide
<220> FEATURE:
<221> NAME/KEY: modified_base
<222> LOCATION: (21)..(21)
<223> OTHER INFORMATION: a, c, t, g, unknown or other

<400> SEQUENCE: 73
taaagcattg cttttatcac ngg                                              23

<210> SEQ ID NO 74
<211> LENGTH: 23
<212> TYPE: DNA
<213> ORGANISM: Homo sapiens
<220> FEATURE:
<221> NAME/KEY: modified_base
<222> LOCATION: (21)..(21)
<223> OTHER INFORMATION: a, c, t, g, unknown or other

<400> SEQUENCE: 74
ctaacagttg cttttatcac ngg                                              23

<210> SEQ ID NO 75
```

```
<211> LENGTH: 23
<212> TYPE: DNA
<213> ORGANISM: Artificial Sequence
<220> FEATURE:
<223> OTHER INFORMATION: Description of Artificial Sequence: Synthetic
      oligonucleotide
<220> FEATURE:
<221> NAME/KEY: modified_base
<222> LOCATION: (21)..(21)
<223> OTHER INFORMATION: a, c, t, g, unknown or other

<400> SEQUENCE: 75
ctaacagttg cttttatcac ngg                                                23

<210> SEQ ID NO 76
<211> LENGTH: 23
<212> TYPE: DNA
<213> ORGANISM: Artificial Sequence
<220> FEATURE:
<223> OTHER INFORMATION: Description of Artificial Sequence: Synthetic
      oligonucleotide
<220> FEATURE:
<221> NAME/KEY: modified_base
<222> LOCATION: (21)..(21)
<223> OTHER INFORMATION: a, c, t, g, unknown or other

<400> SEQUENCE: 76
attacagctg catttatcac ngg                                                23

<210> SEQ ID NO 77
<211> LENGTH: 22
<212> TYPE: DNA
<213> ORGANISM: Artificial Sequence
<220> FEATURE:
<223> OTHER INFORMATION: Description of Artificial Sequence: Synthetic
      oligonucleotide
<220> FEATURE:
<221> NAME/KEY: modified_base
<222> LOCATION: (20)..(20)
<223> OTHER INFORMATION: a, c, t, g, unknown or other

<400> SEQUENCE: 77
ctaacaatgc tttcatcacn gg                                                 22

<210> SEQ ID NO 78
<211> LENGTH: 23
<212> TYPE: DNA
<213> ORGANISM: Artificial Sequence
<220> FEATURE:
<223> OTHER INFORMATION: Description of Artificial Sequence: Synthetic
      oligonucleotide
<220> FEATURE:
<221> NAME/KEY: modified_base
<222> LOCATION: (21)..(21)
<223> OTHER INFORMATION: a, c, t, g, unknown or other

<400> SEQUENCE: 78
gacatagttg cttttatcac nga                                                23

<210> SEQ ID NO 79
<211> LENGTH: 22
<212> TYPE: DNA
<213> ORGANISM: Artificial Sequence
<220> FEATURE:
<223> OTHER INFORMATION: Description of Artificial Sequence: Synthetic
      oligonucleotide
<220> FEATURE:
<221> NAME/KEY: modified_base
<222> LOCATION: (20)..(20)
<223> OTHER INFORMATION: a, c, t, g, unknown or other
```

```
<400> SEQUENCE: 79
ttcacattgc ttttatcacn gg                                              22

<210> SEQ ID NO 80
<211> LENGTH: 23
<212> TYPE: DNA
<213> ORGANISM: Artificial Sequence
<220> FEATURE:
<223> OTHER INFORMATION: Description of Artificial Sequence: Synthetic
      oligonucleotide
<220> FEATURE:
<221> NAME/KEY: modified_base
<222> LOCATION: (21)..(21)
<223> OTHER INFORMATION: a, c, t, g, unknown or other

<400> SEQUENCE: 80
ttaacagctg cctttatcac ngc                                             23

<210> SEQ ID NO 81
<211> LENGTH: 23
<212> TYPE: DNA
<213> ORGANISM: Artificial Sequence
<220> FEATURE:
<223> OTHER INFORMATION: Description of Artificial Sequence: Synthetic
      oligonucleotide
<220> FEATURE:
<221> NAME/KEY: modified_base
<222> LOCATION: (21)..(21)
<223> OTHER INFORMATION: a, c, t, g, unknown or other

<400> SEQUENCE: 81
ctaacagtta cttttattcc ngg                                             23

<210> SEQ ID NO 82
<211> LENGTH: 22
<212> TYPE: DNA
<213> ORGANISM: Artificial Sequence
<220> FEATURE:
<223> OTHER INFORMATION: Description of Artificial Sequence: Synthetic
      oligonucleotide
<220> FEATURE:
<221> NAME/KEY: modified_base
<222> LOCATION: (20)..(20)
<223> OTHER INFORMATION: a, c, t, g, unknown or other

<400> SEQUENCE: 82
ctaacagttt atttatcccn gg                                              22

<210> SEQ ID NO 83
<211> LENGTH: 22
<212> TYPE: DNA
<213> ORGANISM: Artificial Sequence
<220> FEATURE:
<223> OTHER INFORMATION: Description of Artificial Sequence: Synthetic
      oligonucleotide
<220> FEATURE:
<221> NAME/KEY: modified_base
<222> LOCATION: (20)..(20)
<223> OTHER INFORMATION: a, c, t, g, unknown or other

<400> SEQUENCE: 83
ctaacattgc ttatatctcn gg                                              22

<210> SEQ ID NO 84
<211> LENGTH: 23
<212> TYPE: DNA
<213> ORGANISM: Artificial Sequence
<220> FEATURE:
<223> OTHER INFORMATION: Description of Artificial Sequence: Synthetic
```

```
      oligonucleotide
<220> FEATURE:
<221> NAME/KEY: modified_base
<222> LOCATION: (21)..(21)
<223> OTHER INFORMATION: a, c, t, g, unknown or other

<400> SEQUENCE: 84
cccaaagttg cctttatcac ngg                                            23

<210> SEQ ID NO 85
<211> LENGTH: 22
<212> TYPE: DNA
<213> ORGANISM: Artificial Sequence
<220> FEATURE:
<223> OTHER INFORMATION: Description of Artificial Sequence: Synthetic
      oligonucleotide
<220> FEATURE:
<221> NAME/KEY: modified_base
<222> LOCATION: (20)..(20)
<223> OTHER INFORMATION: a, c, t, g, unknown or other

<400> SEQUENCE: 85
ctaacagttc ctttatcccn gg                                             22

<210> SEQ ID NO 86
<211> LENGTH: 23
<212> TYPE: DNA
<213> ORGANISM: Artificial Sequence
<220> FEATURE:
<223> OTHER INFORMATION: Description of Artificial Sequence: Synthetic
      oligonucleotide
<220> FEATURE:
<221> NAME/KEY: modified_base
<222> LOCATION: (21)..(21)
<223> OTHER INFORMATION: a, c, t, g, unknown or other

<400> SEQUENCE: 86
ctaacagctg cttttatcct ngg                                            23

<210> SEQ ID NO 87
<211> LENGTH: 23
<212> TYPE: DNA
<213> ORGANISM: Artificial Sequence
<220> FEATURE:
<223> OTHER INFORMATION: Description of Artificial Sequence: Synthetic
      oligonucleotide
<220> FEATURE:
<221> NAME/KEY: modified_base
<222> LOCATION: (21)..(21)
<223> OTHER INFORMATION: a, c, t, g, unknown or other

<400> SEQUENCE: 87
cttaaagttg cctttataac nga                                            23

<210> SEQ ID NO 88
<211> LENGTH: 23
<212> TYPE: DNA
<213> ORGANISM: Artificial Sequence
<220> FEATURE:
<223> OTHER INFORMATION: Description of Artificial Sequence: Synthetic
      oligonucleotide
<220> FEATURE:
<221> NAME/KEY: modified_base
<222> LOCATION: (21)..(21)
<223> OTHER INFORMATION: a, c, t, g, unknown or other

<400> SEQUENCE: 88
ctaacatctg cttttatccc ngg                                            23
```

```
<210> SEQ ID NO 89
<211> LENGTH: 23
<212> TYPE: DNA
<213> ORGANISM: Homo sapiens
<220> FEATURE:
<221> NAME/KEY: modified_base
<222> LOCATION: (21)..(21)
<223> OTHER INFORMATION: a, c, t, g, unknown or other

<400> SEQUENCE: 89
ctaacagttg cttttatcac ngg                                           23

<210> SEQ ID NO 90
<211> LENGTH: 23
<212> TYPE: DNA
<213> ORGANISM: Artificial Sequence
<220> FEATURE:
<223> OTHER INFORMATION: Description of Artificial Sequence: Synthetic
      oligonucleotide
<220> FEATURE:
<221> NAME/KEY: modified_base
<222> LOCATION: (21)..(21)
<223> OTHER INFORMATION: a, c, t, g, unknown or other

<400> SEQUENCE: 90
ctaacagttg cttttatcac ngg                                           23

<210> SEQ ID NO 91
<211> LENGTH: 23
<212> TYPE: DNA
<213> ORGANISM: Artificial Sequence
<220> FEATURE:
<223> OTHER INFORMATION: Description of Artificial Sequence: Synthetic
      oligonucleotide
<220> FEATURE:
<221> NAME/KEY: modified_base
<222> LOCATION: (21)..(21)
<223> OTHER INFORMATION: a, c, t, g, unknown or other

<400> SEQUENCE: 91
attacagctg catttatcac ngg                                           23

<210> SEQ ID NO 92
<211> LENGTH: 22
<212> TYPE: DNA
<213> ORGANISM: Artificial Sequence
<220> FEATURE:
<223> OTHER INFORMATION: Description of Artificial Sequence: Synthetic
      oligonucleotide
<220> FEATURE:
<221> NAME/KEY: modified_base
<222> LOCATION: (20)..(20)
<223> OTHER INFORMATION: a, c, t, g, unknown or other

<400> SEQUENCE: 92
ctaacaatgc tttcatcacn gg                                            22

<210> SEQ ID NO 93
<211> LENGTH: 22
<212> TYPE: DNA
<213> ORGANISM: Artificial Sequence
<220> FEATURE:
<223> OTHER INFORMATION: Description of Artificial Sequence: Synthetic
      oligonucleotide
<220> FEATURE:
<221> NAME/KEY: modified_base
<222> LOCATION: (20)..(20)
<223> OTHER INFORMATION: a, c, t, g, unknown or other

<400> SEQUENCE: 93
```
ataacaatgc ctttatcacn gg                      22

<210> SEQ ID NO 94
<211> LENGTH: 23
<212> TYPE: DNA
<213> ORGANISM: Artificial Sequence
<220> FEATURE:
<223> OTHER INFORMATION: Description of Artificial Sequence: Synthetic
      oligonucleotide
<220> FEATURE:
<221> NAME/KEY: modified_base
<222> LOCATION: (21)..(21)
<223> OTHER INFORMATION: a, c, t, g, unknown or other

<400> SEQUENCE: 94
ttaacagctg cctttatcac ngc                     23

<210> SEQ ID NO 95
<211> LENGTH: 23
<212> TYPE: DNA
<213> ORGANISM: Artificial Sequence
<220> FEATURE:
<223> OTHER INFORMATION: Description of Artificial Sequence: Synthetic
      oligonucleotide
<220> FEATURE:
<221> NAME/KEY: modified_base
<222> LOCATION: (21)..(21)
<223> OTHER INFORMATION: a, c, t, g, unknown or other

<400> SEQUENCE: 95
tctacagtca ctcttatcac ngg                     23

<210> SEQ ID NO 96
<211> LENGTH: 23
<212> TYPE: DNA
<213> ORGANISM: Artificial Sequence
<220> FEATURE:
<223> OTHER INFORMATION: Description of Artificial Sequence: Synthetic
      oligonucleotide
<220> FEATURE:
<221> NAME/KEY: modified_base
<222> LOCATION: (21)..(21)
<223> OTHER INFORMATION: a, c, t, g, unknown or other

<400> SEQUENCE: 96
gacatagttg ctttatcac nga                      23

<210> SEQ ID NO 97
<211> LENGTH: 23
<212> TYPE: DNA
<213> ORGANISM: Artificial Sequence
<220> FEATURE:
<223> OTHER INFORMATION: Description of Artificial Sequence: Synthetic
      oligonucleotide
<220> FEATURE:
<221> NAME/KEY: modified_base
<222> LOCATION: (21)..(21)
<223> OTHER INFORMATION: a, c, t, g, unknown or other

<400> SEQUENCE: 97
ctaacagctg cttttatcct ngg                     23

<210> SEQ ID NO 98
<211> LENGTH: 23
<212> TYPE: DNA
<213> ORGANISM: Artificial Sequence
<220> FEATURE:
<223> OTHER INFORMATION: Description of Artificial Sequence: Synthetic
      oligonucleotide
<220> FEATURE:

```
<221> NAME/KEY: modified_base
<222> LOCATION: (21)..(21)
<223> OTHER INFORMATION: a, c, t, g, unknown or other

<400> SEQUENCE: 98
gcaacagtta ctattatcac nag                                        23

<210> SEQ ID NO 99
<211> LENGTH: 22
<212> TYPE: DNA
<213> ORGANISM: Artificial Sequence
<220> FEATURE:
<223> OTHER INFORMATION: Description of Artificial Sequence: Synthetic
      oligonucleotide
<220> FEATURE:
<221> NAME/KEY: modified_base
<222> LOCATION: (20)..(20)
<223> OTHER INFORMATION: a, c, t, g, unknown or other

<400> SEQUENCE: 99
ttcacattgc ttttatcacn gg                                         22

<210> SEQ ID NO 100
<211> LENGTH: 22
<212> TYPE: DNA
<213> ORGANISM: Artificial Sequence
<220> FEATURE:
<223> OTHER INFORMATION: Description of Artificial Sequence: Synthetic
      oligonucleotide
<220> FEATURE:
<221> NAME/KEY: modified_base
<222> LOCATION: (20)..(20)
<223> OTHER INFORMATION: a, c, t, g, unknown or other

<400> SEQUENCE: 100
ctaacagttt atttatcccn gg                                         22

<210> SEQ ID NO 101
<211> LENGTH: 23
<212> TYPE: DNA
<213> ORGANISM: Artificial Sequence
<220> FEATURE:
<223> OTHER INFORMATION: Description of Artificial Sequence: Synthetic
      oligonucleotide
<220> FEATURE:
<221> NAME/KEY: modified_base
<222> LOCATION: (21)..(21)
<223> OTHER INFORMATION: a, c, t, g, unknown or other

<400> SEQUENCE: 101
cccaaagttg cctttatcac ngg                                        23

<210> SEQ ID NO 102
<211> LENGTH: 23
<212> TYPE: DNA
<213> ORGANISM: Artificial Sequence
<220> FEATURE:
<223> OTHER INFORMATION: Description of Artificial Sequence: Synthetic
      oligonucleotide
<220> FEATURE:
<221> NAME/KEY: modified_base
<222> LOCATION: (21)..(21)
<223> OTHER INFORMATION: a, c, t, g, unknown or other

<400> SEQUENCE: 102
gacccagttg cttttaccac ngg                                        23

<210> SEQ ID NO 103
<211> LENGTH: 23
```

```
<212> TYPE: DNA
<213> ORGANISM: Artificial Sequence
<220> FEATURE:
<223> OTHER INFORMATION: Description of Artificial Sequence: Synthetic
      oligonucleotide
<220> FEATURE:
<221> NAME/KEY: modified_base
<222> LOCATION: (21)..(21)
<223> OTHER INFORMATION: a, c, t, g, unknown or other

<400> SEQUENCE: 103
ctaacatctg cttttatccc ngg                                              23

<210> SEQ ID NO 104
<211> LENGTH: 22
<212> TYPE: DNA
<213> ORGANISM: Artificial Sequence
<220> FEATURE:
<223> OTHER INFORMATION: Description of Artificial Sequence: Synthetic
      oligonucleotide
<220> FEATURE:
<221> NAME/KEY: modified_base
<222> LOCATION: (20)..(20)
<223> OTHER INFORMATION: a, c, t, g, unknown or other

<400> SEQUENCE: 104
ctaacattgc ttatatctcn gg                                               22

<210> SEQ ID NO 105
<211> LENGTH: 23
<212> TYPE: DNA
<213> ORGANISM: Artificial Sequence
<220> FEATURE:
<223> OTHER INFORMATION: Description of Artificial Sequence: Synthetic
      oligonucleotide
<220> FEATURE:
<221> NAME/KEY: modified_base
<222> LOCATION: (21)..(21)
<223> OTHER INFORMATION: a, c, t, g, unknown or other

<400> SEQUENCE: 105
tcctcagttg ctttcatcac ngg                                              23

<210> SEQ ID NO 106
<211> LENGTH: 23
<212> TYPE: DNA
<213> ORGANISM: Artificial Sequence
<220> FEATURE:
<223> OTHER INFORMATION: Description of Artificial Sequence: Synthetic
      oligonucleotide
<220> FEATURE:
<221> NAME/KEY: modified_base
<222> LOCATION: (21)..(21)
<223> OTHER INFORMATION: a, c, t, g, unknown or other

<400> SEQUENCE: 106
taatccactg cttttatcac ngg                                              23

<210> SEQ ID NO 107
<211> LENGTH: 23
<212> TYPE: DNA
<213> ORGANISM: Homo sapiens

<400> SEQUENCE: 107
ctaacagttg cttttatcac agg                                              23

<210> SEQ ID NO 108
<211> LENGTH: 23
<212> TYPE: DNA
```

<213> ORGANISM: Artificial Sequence
<220> FEATURE:
<223> OTHER INFORMATION: Description of Artificial Sequence: Synthetic
      oligonucleotide

<400> SEQUENCE: 108
attacagctg catttatcac agg                                              23

<210> SEQ ID NO 109
<211> LENGTH: 22
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 109
ctaacaatgc tttcatcacg gg                                               22

<210> SEQ ID NO 110
<211> LENGTH: 22
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 110
ataacaatgc ctttatcaca gg                                               22

<210> SEQ ID NO 111
<211> LENGTH: 23
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 111
ttaacagctg cctttatcac tgc                                              23

<210> SEQ ID NO 112
<211> LENGTH: 23
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 112
tctacagtca ctcttatcac tgg                                              23

<210> SEQ ID NO 113
<211> LENGTH: 23
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 113
gacatagttg cttttatcac aga                                              23

<210> SEQ ID NO 114
<211> LENGTH: 23
<212> TYPE: DNA
<213> ORGANISM: Artificial Sequence

```
<220> FEATURE:
<223> OTHER INFORMATION: Description of Artificial Sequence: Synthetic
      oligonucleotide

<400> SEQUENCE: 114
ctaacagctg cttttatcct ggg                                              23

<210> SEQ ID NO 115
<211> LENGTH: 23
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 115
gcaacagtta ctattatcac aag                                              23

<210> SEQ ID NO 116
<211> LENGTH: 22
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 116
ttcacattgc ttttatcact gg                                               22

<210> SEQ ID NO 117
<211> LENGTH: 23
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 117
cccaaagttg cctttatcac agg                                              23

<210> SEQ ID NO 118
<211> LENGTH: 23
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 118
ctaacatctg cttttatccc agg                                              23

<210> SEQ ID NO 119
<211> LENGTH: 22
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 119
ctaacagttt atttatccca gg                                               22

<210> SEQ ID NO 120
<211> LENGTH: 22
<212> TYPE: DNA
<213> ORGANISM: Artificial Sequence
<220> FEATURE:
```

```
<223> OTHER INFORMATION: Description of Artificial Sequence: Synthetic
      oligonucleotide

<400> SEQUENCE: 120
ctaacattgc ttatatctca gg                                             22

<210> SEQ ID NO 121
<211> LENGTH: 23
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 121
tcctcagttg ctttcatcac tgg                                            23

<210> SEQ ID NO 122
<211> LENGTH: 23
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 122
taatccactg cttttatcac tgg                                            23

<210> SEQ ID NO 123
<211> LENGTH: 23
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 123
gacccagttg cttttaccac agg                                            23

<210> SEQ ID NO 124
<211> LENGTH: 23
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 124
taaagcattg cttttatcac agg                                            23

<210> SEQ ID NO 125
<211> LENGTH: 23
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 125
ctaacagtta cttttattcc tgg                                            23

<210> SEQ ID NO 126
<211> LENGTH: 22
<212> TYPE: DNA
<213> ORGANISM: Artificial Sequence
<220> FEATURE:
<223> OTHER INFORMATION: Description of Artificial Sequence: Synthetic
``` oligonucleotide

<400> SEQUENCE: 126
ctaacagttc ctttatccct gg                                        22

<210> SEQ ID NO 127
<211> LENGTH: 23
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 127
cttaaagttg cctttataac tga                                       23

<210> SEQ ID NO 128
<211> LENGTH: 23
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 128
caaacagatt cttttatctc tgg                                       23

<210> SEQ ID NO 129
<211> LENGTH: 23
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 129
gagacagtgg cttttatcac agg                                       23

<210> SEQ ID NO 130
<211> LENGTH: 23
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 130
ataacagtta ctttaaacac tgg                                       23

<210> SEQ ID NO 131
<211> LENGTH: 23
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 131
aaaaaagttt cttttatcac cag                                       23

<210> SEQ ID NO 132
<211> LENGTH: 40
<212> TYPE: DNA
<213> ORGANISM: Homo sapiens

<400> SEQUENCE: 132
aagctaacag ttgctttttat cacaggctcc aggaagggtt         40

<210> SEQ ID NO 133
<211> LENGTH: 40
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 133
aagctaacag ttgctttttat tcacaggctc caggaagggt         40

<210> SEQ ID NO 134
<211> LENGTH: 38
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 134
aagctaacag ttgcttttca caggctccag gaagggtt            38

<210> SEQ ID NO 135
<211> LENGTH: 40
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 135
aagctaacag ttgctttttat cacaggctcc aggaagggtt         40

<210> SEQ ID NO 136
<211> LENGTH: 39
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 136
aagctaacag ttgctttttat acaggctcca ggaagggtt          39

<210> SEQ ID NO 137
<211> LENGTH: 39
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 137
aagctaacag ttgctttatc acaggctcca ggaagggtt           39

<210> SEQ ID NO 138
<211> LENGTH: 37
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 138
aagctaacag ttgctttttat aggctccagg aagggtt            37

```
<210> SEQ ID NO 139
<211> LENGTH: 37
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 139
aagctaacag ttgcttttat cggctccagg aagggtt                              37

<210> SEQ ID NO 140
<211> LENGTH: 38
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 140
aagctaacag ttgcttttat caggctccag gaagggtt                             38

<210> SEQ ID NO 141
<211> LENGTH: 40
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 141
aagctaacag ttgcttttat atcacaggct ccaggaaggg                           40

<210> SEQ ID NO 142
<211> LENGTH: 40
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 142
aagctaacag ttgcttttac ccacaggctc caggaagggt                           40

<210> SEQ ID NO 143
<211> LENGTH: 40
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 143
aagctaacag ttgcttttat ccacaggctc caggaagggt                           40

<210> SEQ ID NO 144
<211> LENGTH: 27
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 144
aagctatcac aggctccagg aagggtt                                         27
```

```
<210> SEQ ID NO 145
<211> LENGTH: 25
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 145
aagctaacag gctccaggaa gggtt                                           25

<210> SEQ ID NO 146
<211> LENGTH: 40
<212> TYPE: DNA
<213> ORGANISM: Homo sapiens

<400> SEQUENCE: 146
aagctaacag ttgcttttat cacaggctcc aggaagggtt                           40

<210> SEQ ID NO 147
<211> LENGTH: 40
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 147
aagctaacag ttgcttttat tcacaggctc caggaagggt                           40

<210> SEQ ID NO 148
<211> LENGTH: 40
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 148
aagctaacag ttgcttttat cacaggctcc aggaagggtt                           40

<210> SEQ ID NO 149
<211> LENGTH: 38
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 149
aagctaacag ttgcttttca caggctccag gaagggtt                             38

<210> SEQ ID NO 150
<211> LENGTH: 39
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 150
aagctaacag ttgctttatc acaggctcca ggaagggtt                            39

<210> SEQ ID NO 151
<211> LENGTH: 39
<212> TYPE: DNA
```

<213> ORGANISM: Artificial Sequence
<220> FEATURE:
<223> OTHER INFORMATION: Description of Artificial Sequence: Synthetic
      oligonucleotide

<400> SEQUENCE: 151
aagctaacag ttgcttttat acaggctcca ggaagggtt                         39

<210> SEQ ID NO 152
<211> LENGTH: 38
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 152
aagctaacag ttgcttttat caggctccag gaagggtt                          38

<210> SEQ ID NO 153
<211> LENGTH: 37
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 153
aagctaacag ttgcttttat aggctccagg aagggtt                           37

<210> SEQ ID NO 154
<211> LENGTH: 37
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 154
aagctaacag ttgcttttat cggctccagg aagggtt                           37

<210> SEQ ID NO 155
<211> LENGTH: 38
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 155
aagctaacag ttgctttaca caggctccag gaagggtt                          38

<210> SEQ ID NO 156
<211> LENGTH: 40
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 156
aagctaacag ttgctttac ccacaggctc caggaagggt                         40

<210> SEQ ID NO 157
<211> LENGTH: 40
<212> TYPE: DNA
<213> ORGANISM: Artificial Sequence

```
<220> FEATURE:
<223> OTHER INFORMATION: Description of Artificial Sequence: Synthetic
      oligonucleotide

<400> SEQUENCE: 157
aagctaacag ttgcttttat atcacaggct ccaggaaggg                                40

<210> SEQ ID NO 158
<211> LENGTH: 28
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 158
aagctaacag ttggctccag gaagggtt                                             28

<210> SEQ ID NO 159
<211> LENGTH: 18
<212> TYPE: PRT
<213> ORGANISM: Unknown
<220> FEATURE:
<223> OTHER INFORMATION: Description of Unknown:
      Nucleoplasmin NLS sequence

<400> SEQUENCE: 159

Lys Arg Pro Ala Ala Thr Lys Lys Ala Gly Gln Ala Lys Lys Lys Lys
1               5                   10                  15

Leu Asp

<210> SEQ ID NO 160
<211> LENGTH: 9
<212> TYPE: PRT
<213> ORGANISM: Unknown
<220> FEATURE:
<223> OTHER INFORMATION: Description of Unknown:
      C-myc-like NLS sequence

<400> SEQUENCE: 160

Pro Ala Ala Lys Lys Lys Lys Leu Asp
1               5
```